(12) United States Patent
Nye et al.

(10) Patent No.: US 8,377,360 B2
(45) Date of Patent: Feb. 19, 2013

(54) SYSTEMS AND METHODS FOR PROVIDING A PERSONAL AFFECTOR MACHINE

(75) Inventors: Paul H Nye, Redmond, WA (US); John Desautels, Mill Creek, WA (US)

(73) Assignee: 2Bot Corporation, Redmond, WA (US)

(*) Notice: Subject to any disclaimer, the term of this patent is extended or adjusted under 35 U.S.C. 154(b) by 829 days.

(21) Appl. No.: 12/029,032

(22) Filed: Feb. 11, 2008

(65) Prior Publication Data

US 2008/0192104 A1  Aug. 14, 2008

Related U.S. Application Data

(60) Provisional application No. 60/889,707, filed on Feb. 13, 2007, provisional application No. 60/990,110, filed on Nov. 26, 2007.

(51) Int. Cl.
*B28B 17/00* (2006.01)

(52) U.S. Cl. ............ 264/308; 425/174.4; 425/375; 425/381

(58) Field of Classification Search ........... 264/308; 101/103; 425/174.4, 375, 381; 409/212, 409/251, 337, 339, 344
See application file for complete search history.

(56) References Cited

U.S. PATENT DOCUMENTS

| | | | |
|---|---|---|---|
| 3,943,849 A * | 3/1976 | Vasilantone | 101/123 |
| 3,973,890 A | 8/1976 | Porter et al. | |
| 3,975,974 A | 8/1976 | Harris | |
| 3,977,277 A | 8/1976 | Baston et al. | |
| 4,036,442 A | 7/1977 | Barnes | |
| 4,065,239 A | 12/1977 | Gergely | |
| 4,083,096 A | 4/1978 | Baston et al. | |
| 4,094,217 A | 6/1978 | Exline | |
| 4,097,212 A | 6/1978 | Morishima et al. | |
| 4,179,959 A | 12/1979 | Lingl, Jr. | |
| 4,192,635 A | 3/1980 | Hunke et al. | |
| 4,225,301 A | 9/1980 | Eustacchio | |
| 4,245,972 A | 1/1981 | Anders | |
| 4,261,285 A | 4/1981 | Pearl | |
| 4,269,584 A | 5/1981 | Kroll et al. | |
| 4,312,686 A | 1/1982 | Smith et al. | |
| 4,404,903 A * | 9/1983 | Cronin | 101/123 |
| 4,413,969 A | 11/1983 | McDonald | |
| 4,442,741 A | 4/1984 | Whittingham et al. | |

(Continued)

FOREIGN PATENT DOCUMENTS

EP  1599012 A1  11/2005
WO  WO-00/18569 A2  4/2000

OTHER PUBLICATIONS

Roland, Modela Pro MDX-500, User Manual (attached).

(Continued)

*Primary Examiner* — Yogendra Gupta
*Assistant Examiner* — Emmanuel S Luk
(74) *Attorney, Agent, or Firm* — Smith Gambrell & Russell LLP

(57) ABSTRACT

This invention relates generally to software and mechanics, and more specifically, to systems and methods for providing a personal affector machine. In one embodiment, the invention includes a top frame; a cross-member, the cross-member extending from the top frame, the cross-member configurable to do any of translate and rotate relative to the top frame; an affector head, the affector head coupled to the cross-member, the affector head configurable to do any of translate, rotate, and gyrate relative to the top frame, the affector head having an affector; a bottom frame, the bottom frame coupled to the top frame; and a cassette, the cassette configurable to removably securing material therein, the cassette being removably attachable to the bottom frame, wherein the affector is configurable to affecting the material within the cassette in a plurality of dimensions.

25 Claims, 91 Drawing Sheets

U.S. PATENT DOCUMENTS

| | | | |
|---|---|---|---|
| 4,495,132 A | 1/1985 | Johnson | |
| 4,503,006 A | 3/1985 | Kato | |
| 4,529,370 A | 7/1985 | Holmes et al. | |
| 4,558,977 A | 12/1985 | Inoue et al. | |
| 4,606,873 A | 8/1986 | Biglione et al. | |
| 4,648,317 A * | 3/1987 | Bubley et al. | 101/123 |
| 4,648,829 A | 3/1987 | Cattani | |
| 4,755,121 A | 7/1988 | Stefanati et al. | |
| 4,764,102 A | 8/1988 | Takahashi | |
| 4,850,382 A * | 7/1989 | Williams | 134/167 R |
| 4,850,839 A | 7/1989 | Cowley et al. | |
| 4,906,170 A | 3/1990 | Nelson et al. | |
| 4,907,371 A | 3/1990 | Shoda et al. | |
| 5,030,083 A | 7/1991 | Kohno et al. | |
| 5,039,016 A | 8/1991 | Gunzel, Jr. et al. | |
| 5,093,943 A | 3/1992 | Wei | |
| 5,099,090 A | 3/1992 | Allan et al. | |
| 5,204,124 A * | 4/1993 | Secretan et al. | 425/145 |
| 5,209,156 A | 5/1993 | Lombard | |
| 5,220,701 A | 6/1993 | Creato et al. | |
| 5,248,924 A | 9/1993 | Niwa | |
| 5,273,418 A | 12/1993 | Kato et al. | |
| 5,284,433 A | 2/1994 | Cates et al. | |
| 5,303,437 A | 4/1994 | Hung | |
| 5,304,055 A | 4/1994 | Van Lengerich et al. | |
| 5,320,793 A | 6/1994 | Lombard | |
| 5,340,433 A * | 8/1994 | Crump | 156/578 |
| 5,374,175 A | 12/1994 | Bortfeldt et al. | |
| 5,380,978 A | 1/1995 | Pryor | |
| 5,395,575 A | 3/1995 | Stribbell et al. | |
| 5,412,548 A | 5/1995 | Yee | |
| 5,429,487 A | 7/1995 | Tajima et al. | |
| 5,435,714 A | 7/1995 | Van Lengerich et al. | |
| 5,439,623 A | 8/1995 | Fintel | |
| 5,465,752 A | 11/1995 | Higgins | |
| 5,486,104 A | 1/1996 | Cowley | |
| 5,506,607 A * | 4/1996 | Sanders et al. | 347/1 |
| 5,560,705 A | 10/1996 | Shiau | |
| 5,577,437 A | 11/1996 | Hurd | |
| 5,596,251 A | 1/1997 | Miller | |
| 5,629,028 A | 5/1997 | Trumbull | |
| 5,633,021 A * | 5/1997 | Brown et al. | 425/375 |
| 5,636,498 A | 6/1997 | Belanger et al. | |
| 5,636,949 A | 6/1997 | Nakamura et al. | |
| 5,641,522 A | 6/1997 | Satanovsky | |
| 5,641,529 A | 6/1997 | Kunas | |
| 5,656,230 A * | 8/1997 | Khoshevis | 264/401 |
| 5,656,233 A | 8/1997 | Weder et al. | |
| 5,678,388 A | 10/1997 | Weder | |
| 5,679,293 A | 10/1997 | Cowley | |
| 5,714,187 A | 2/1998 | Froidevaux et al. | |
| 5,717,599 A * | 2/1998 | Menhennett et al. | 700/118 |
| 5,733,081 A * | 3/1998 | Dowdle et al. | 409/137 |
| 5,733,201 A | 3/1998 | Caldwell et al. | |
| 5,735,995 A | 4/1998 | Bull et al. | |
| 5,740,051 A * | 4/1998 | Sanders et al. | 700/119 |
| 5,765,937 A | 6/1998 | Shiau | |
| 5,773,043 A | 6/1998 | Hunter | |
| 5,791,763 A | 8/1998 | Kam-Hoi | |
| 5,802,813 A | 9/1998 | Weder | |
| 5,845,664 A | 12/1998 | Ryder et al. | |
| 5,848,458 A * | 12/1998 | Bullen | 29/33 K |
| 5,880,684 A | 3/1999 | Diekhans et al. | |
| 5,911,928 A | 6/1999 | Shimazu et al. | |
| 5,919,509 A | 7/1999 | Cremers et al. | |
| 5,932,062 A * | 8/1999 | Manser | 156/357 |
| 5,948,336 A | 9/1999 | Yoshida et al. | |
| 5,958,327 A | 9/1999 | Beven et al. | |
| 5,962,039 A | 10/1999 | Katou et al. | |
| 5,966,130 A | 10/1999 | Benman, Jr. | |
| 5,989,374 A | 11/1999 | Bull et al. | |
| 6,000,775 A | 12/1999 | Muraki | |
| 6,001,181 A * | 12/1999 | Bullen | 118/679 |
| 6,017,114 A | 1/2000 | Elgee et al. | |
| 6,021,358 A | 2/2000 | Sachs | |
| 6,022,127 A | 2/2000 | Krietzman | |
| 6,026,330 A | 2/2000 | Chuang | |
| 6,045,237 A | 4/2000 | Parsons et al. | |
| 6,152,021 A | 11/2000 | Weinstein et al. | |
| 6,167,798 B1 | 1/2001 | Weinstein et al. | |
| 6,174,045 B1 | 1/2001 | Kerr | |
| 6,177,950 B1 | 1/2001 | Robb | |
| 6,187,358 B1 | 2/2001 | Inoue et al. | |
| 6,189,439 B1 | 2/2001 | Weinstein | |
| 6,197,355 B1 | 3/2001 | Zietlow et al. | |
| 6,207,214 B1 | 3/2001 | Kim | |
| 6,214,282 B1 | 4/2001 | Katou et al. | |
| 6,215,498 B1 | 4/2001 | Filo et al. | |
| 6,220,847 B1 | 4/2001 | Yoshida et al. | |
| 6,261,077 B1 * | 7/2001 | Bishop et al. | 425/174.4 |
| 6,263,789 B1 | 7/2001 | Karner | |
| 6,277,425 B1 | 8/2001 | Nash et al. | |
| 6,283,609 B1 | 9/2001 | Parsons et al. | |
| 6,299,324 B1 | 10/2001 | Kim | |
| 6,303,165 B1 | 10/2001 | Karner | |
| 6,347,562 B1 | 2/2002 | Gerber, Jr. | |
| 6,348,982 B2 | 2/2002 | Iseki et al. | |
| 6,409,902 B1 | 6/2002 | Yang et al. | |
| 6,435,009 B1 | 8/2002 | Tilley | |
| 6,464,915 B1 | 10/2002 | Schaen | |
| 6,508,972 B1 | 1/2003 | Lietz | |
| 6,511,309 B1 | 1/2003 | Hunter | |
| 6,558,720 B1 | 5/2003 | Karner | |
| 6,567,228 B1 | 5/2003 | Bhandari et al. | |
| 6,587,130 B1 | 7/2003 | Amari et al. | |
| 6,625,832 B2 | 9/2003 | Montague et al. | |
| 6,628,287 B1 | 9/2003 | Duda et al. | |
| 6,722,872 B1 * | 4/2004 | Swanson et al. | 425/225 |
| 6,733,268 B2 | 5/2004 | Oki et al. | |
| 6,761,550 B2 | 7/2004 | Zietlow et al. | |
| 6,764,627 B2 | 7/2004 | D'Angelo | |
| 6,848,297 B2 | 2/2005 | Tilley | |
| 6,905,645 B2 * | 6/2005 | Iskra | 264/128 |
| 6,964,073 B1 | 11/2005 | Curry | |
| 6,964,562 B2 | 11/2005 | Hunter | |
| 6,973,292 B2 | 12/2005 | Liao | |
| 7,037,095 B1 | 5/2006 | Farnsworth et al. | |
| 7,074,029 B2 * | 7/2006 | Stockwell et al. | 425/174.4 |
| 7,092,194 B2 | 8/2006 | Meyer | |
| 7,140,234 B2 | 11/2006 | Tilley | |
| 7,153,454 B2 * | 12/2006 | Khoshnevis | 264/34 |
| 7,172,397 B2 | 2/2007 | Fridley | |
| 7,175,107 B2 | 2/2007 | Amaduzzi | |
| 7,185,533 B2 | 3/2007 | Lee et al. | |
| 7,204,408 B2 | 4/2007 | Cato | |
| 7,290,999 B2 | 11/2007 | Farnsworth et al. | |
| 7,291,364 B2 * | 11/2007 | Faulkner et al. | 427/427.2 |
| 7,306,216 B2 | 12/2007 | Lee et al. | |
| 7,320,279 B2 | 1/2008 | Hunter | |
| 7,343,783 B2 | 3/2008 | Tilley | |
| 7,357,629 B2 * | 4/2008 | Weiskopf et al. | 425/188 |
| 7,360,258 B2 | 4/2008 | Jaye et al. | |
| 7,411,204 B2 | 8/2008 | Appleby et al. | |
| 7,435,368 B2 * | 10/2008 | Davidson et al. | 264/113 |
| 7,439,997 B2 | 10/2008 | Van Brocklin | |
| 7,452,196 B2 * | 11/2008 | Khoshnevis | 425/64 |
| 7,455,873 B2 | 11/2008 | Zietlow et al. | |
| 7,524,178 B2 | 4/2009 | Rosse et al. | |
| 7,536,129 B2 | 5/2009 | Lee et al. | |
| 7,543,912 B2 | 6/2009 | Anderson, Jr. et al. | |
| 7,549,854 B2 | 6/2009 | Lipson | |
| 7,594,278 B2 | 9/2009 | Huh | |
| 7,597,835 B2 * | 10/2009 | Marsac | 264/310 |
| 7,614,866 B2 * | 11/2009 | Sperry et al. | 425/174.4 |
| 7,641,326 B2 | 1/2010 | Umeda et al. | |
| 7,658,603 B2 * | 2/2010 | Medina et al. | 425/375 |
| 7,661,294 B2 | 2/2010 | Dam | |
| 7,681,459 B1 | 3/2010 | Yang et al. | |
| 7,690,909 B2 * | 4/2010 | Wahlstrom | 425/375 |
| 7,771,767 B2 | 8/2010 | Hunter | |
| 7,784,963 B2 | 8/2010 | Galli et al. | |
| 7,788,750 B2 | 9/2010 | Norstrem | |
| 7,818,828 B2 | 10/2010 | Zhou | |
| 7,837,269 B2 | 11/2010 | Bock | |
| 7,850,888 B2 | 12/2010 | Lipson | |
| 7,967,593 B2 | 6/2011 | Takano et al. | |
| 2001/0006387 A1 | 7/2001 | Bennis et al. | |

| | | |
|---|---|---|
| 2001/0021626 A1 | 9/2001 | Mortell et al. |
| 2001/0053661 A1 | 12/2001 | Ohmori |
| 2002/0006217 A1 | 1/2002 | Rubbert et al. |
| 2002/0023306 A1 | 2/2002 | Sajedi et al. |
| 2002/0037337 A1 | 3/2002 | Oki et al. |
| 2002/0081015 A1* | 6/2002 | Alkemper et al. ............ 382/141 |
| 2002/0095236 A1 | 7/2002 | Dundorf |
| 2002/0110634 A1 | 8/2002 | Zietlow et al. |
| 2002/0114537 A1 | 8/2002 | Sutula |
| 2002/0137011 A1 | 9/2002 | Shoher et al. |
| 2002/0147521 A1 | 10/2002 | Mok et al. |
| 2003/0158622 A1 | 8/2003 | Corey |
| 2003/0160356 A1 | 8/2003 | D'Angelo |
| 2003/0164762 A1 | 9/2003 | Ridley |
| 2003/0195642 A1 | 10/2003 | Ragnini |
| 2003/0228387 A1 | 12/2003 | Hunter |
| 2004/0004303 A1* | 1/2004 | Iskra ............................ 264/109 |
| 2004/0026807 A1* | 2/2004 | Andersson et al. ........... 264/40.1 |
| 2004/0035542 A1* | 2/2004 | Ederer et al. .................... 164/45 |
| 2004/0126452 A1* | 7/2004 | Swanson et al. ................ 425/73 |
| 2004/0128951 A1 | 7/2004 | Weder |
| 2004/0187794 A1 | 9/2004 | Nakata |
| 2004/0216619 A1 | 11/2004 | Hunter |
| 2004/0224141 A1 | 11/2004 | Seiling |
| 2004/0247761 A1 | 12/2004 | Zietlow et al. |
| 2005/0017393 A1* | 1/2005 | Stockwell et al. ............ 264/113 |
| 2005/0035215 A1 | 2/2005 | Amaduzzi et al. |
| 2005/0060959 A1 | 3/2005 | Weder |
| 2005/0106277 A1 | 5/2005 | Fridley |
| 2005/0110200 A1* | 5/2005 | Fong ............................. 264/494 |
| 2005/0161861 A1* | 7/2005 | Lammers et al. ............. 264/255 |
| 2005/0189669 A1 | 9/2005 | Hurkes |
| 2005/0191352 A1 | 9/2005 | Hayes et al. |
| 2005/0225007 A1* | 10/2005 | Lai et al. ....................... 264/308 |
| 2005/0242457 A1 | 11/2005 | Seiling |
| 2005/0280185 A1* | 12/2005 | Russell et al. ................ 264/308 |
| 2006/0004477 A1 | 1/2006 | Kopelman et al. |
| 2006/0011486 A1 | 1/2006 | Lockard et al. |
| 2006/0051396 A1 | 3/2006 | Hamilton et al. |
| 2006/0145390 A1 | 7/2006 | Lipson |
| 2006/0153942 A1 | 7/2006 | Farnsworth et al. |
| 2006/0219671 A1* | 10/2006 | Merot et al. ................ 219/121.6 |
| 2006/0236872 A1 | 10/2006 | Nordberg et al. |
| 2006/0242818 A1 | 11/2006 | Penick et al. |
| 2006/0261506 A1 | 11/2006 | Hurkes |
| 2006/0269373 A1 | 11/2006 | Duncan et al. |
| 2006/0281041 A1 | 12/2006 | Rubbert et al. |
| 2007/0008311 A1 | 1/2007 | Yoshino et al. |
| 2007/0038331 A1 | 2/2007 | Hanson |
| 2007/0050072 A1 | 3/2007 | Schwotzer |
| 2007/0130887 A1 | 6/2007 | Weder |
| 2007/0138678 A1* | 6/2007 | Khoshnevis ..................... 264/34 |
| 2007/0172787 A1 | 7/2007 | Fornoff |
| 2007/0202774 A1 | 8/2007 | Yanase et al. |
| 2007/0205184 A1 | 9/2007 | Mazumder et al. |
| 2007/0245903 A1 | 10/2007 | Eden |
| 2007/0276541 A1 | 11/2007 | Sawasaki |
| 2008/0036120 A1 | 2/2008 | Lacagnina |
| 2008/0089970 A1 | 4/2008 | Hunter |
| 2008/0111816 A1 | 5/2008 | Abraham et al. |
| 2008/0233224 A1 | 9/2008 | Rosse et al. |
| 2008/0241324 A1 | 10/2008 | Bohner et al. |
| 2008/0241327 A1 | 10/2008 | Hunter |
| 2008/0296794 A1 | 12/2008 | Lin et al. |
| 2009/0029170 A1 | 1/2009 | Hayes et al. |
| 2009/0206508 A1 | 8/2009 | Weder |
| 2009/0256288 A1 | 10/2009 | Lipson |
| 2009/0267272 A1 | 10/2009 | Takano et al. |
| 2009/0280205 A1 | 11/2009 | Hunter |
| 2009/0302491 A1 | 12/2009 | Hunter |
| 2010/0081363 A1 | 4/2010 | Dahlheimer |
| 2010/0189832 A1 | 7/2010 | Monzen et al. |
| 2010/0224306 A1 | 9/2010 | Sutton et al. |
| 2010/0289170 A1 | 11/2010 | Thepsimuang et al. |
| 2011/0081438 A1 | 4/2011 | Hunter |
| 2011/0109007 A1 | 5/2011 | Ardrey |

OTHER PUBLICATIONS

Roland, MDX-15/20 Scanning and Milling Machine, Overview (attached).
Multi-Cam, MultiCam MG Series, Specifications (attached).
Ameritech, Exact Jr., Specifications (attached).
Techno, CNC Router DaVinci Series, Specifications (attached).
Shopbot, PRSalpha CNC Router, Features (attached).
Gerber Scientific Products, Sabre Routers, Features (attached).
Epilog Laser, Legend 36EXT, Technical Specifications (attached).
Jensen, O.N. et al., "Automation of Matrix-Assisted Laser Desorption/Ionization Mass Spectrometry Using Fuzzy Logic Feedback Control," Anal Chem., 1997, 69: 1706-1714.
Kaplan, C.S. et al., "A New Paradigm for Woodworking with NC," The Journal of Computer-Aided Design and Applications, 2004, 1: 217-222.
Koren, Y. et al., "Reconfigurable Manufacturing Systems," Annals of the CIRP, 1999, 48(2): 527-540.
Krueger, W. and Froehlich, B., "The Responsive Workbench," IEEE Computer Graphics and Applications, 1994, 14(3): 12-15.
Li, W., "Dynamic Reconfigurable Machine Tool Controller," Dissertation submitted to faculty of Brigham Young University, Apr. 2005, pp. 1-154.
Moses, E.I., "The Nationaon Facility: status and plans for laser fusion and high-energy-density experimental studies," 19th Symposium on Fusion Engineering, 2002, pp. 487-492.
Okazaki, Y. et al., "Microfactory and Micro Machine Tools," Reported in The 1st Korea-Japan Conference on Positioning Technology, Daejeon, Korea, 2002, pp. 1-6.
Shetty, D. et al., "Precision Positioning and Vibration Measurement Using Intelligent Instrumentation and Simulation Tools," Paper presented at the 2007 American Society for Engineering Education (ASEE) Conference, 2007, pp. 1-14.
Zhang, W. et al.; "Modelling and Analysis of UV Laser Micromachining of Copper," Int J Adv Manuf Technol., 2001, 18: 323-331.

* cited by examiner

Figure 20
2002
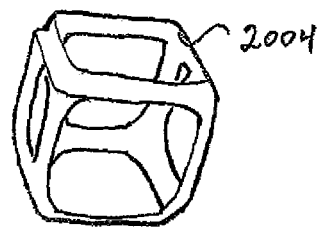
2004
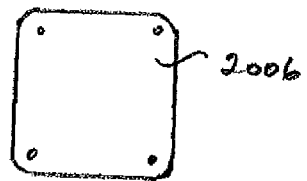
2006
2000 ically, to systems and methods for pro- viding a personal affector machine. -->

SYSTEMS AND METHODS FOR PROVIDING A PERSONAL AFFECTOR MACHINE

PRIORITY CLAIM

This application claims the benefit of U.S. provisional patent application Ser. No. 60/889,707 filed Feb. 13, 2007 and U.S. provisional patent application Ser. No. 60/990,110 filed Nov. 26, 2007. The foregoing applications are incorporated by reference in their entirety as if fully set forth herein.

FIELD OF THE INVENTION

This invention relates generally to software and mechanics, and more specifically, to systems and methods for providing a personal affector machine.

BACKGROUND

It is often desirous to produce physical manifestations of digital content. For example, individuals often use computer printers to produce paper representations of digital photographs, CAD drawings, artwork, or some other digital content contained on a computer. Most computer printers, however, are limited to producing only two-dimensional representations of the digital content even when the digital content contains three-dimensional data. This is because computer printers are based on the principal of depositing ink on a two-dimensional substrate, namely paper. For many applications, two-dimensional representations are satisfactory, such as when producing typed documents or two-dimensional diagrams. However, there are a number of instances where two-dimensional representations are unsatisfactory, such as when the third dimension conveys useful information as in architectural models. Computer printers have attempted to address this issue by using enhanced colors, improving resolution, and even using multiple layers of ink. While these developments have been significant, they don't fully represent third dimensional data.

While there are CNC-type machines that machine three-dimensional objects, these machines are complex, large, expensive, and are not adapted to most business or personal use. These CNC-type machines are often used within a manufacturing process and require significant professional training to safely and successfully operate. Accordingly, individuals or other entities that have a need or desire to produce three-dimensional representations of digital content must decide between losing the third-dimensional data with a computer printer or retaining the third-dimensional data by engaging a manufacturing company having the resources and knowledge required to operate a CNC-type machine. Accordingly, while desirable results have been achieved in the art, there is significant room for improvement. What is needed then are systems and methods for providing a personal affector machine.

SUMMARY

This invention relates generally to software and mechanics, and more specifically, to systems and methods for providing a personal affector machine. In one embodiment, the invention includes a top frame; a cross-member, the cross-member extending from the top frame, the cross-member configurable to do any of translate and rotate relative to the top frame; an affector head, the affector head coupled to the cross-member, the affector head configurable to do any of translate, rotate, and gyrate relative to the top frame, the affector head having an affector; a bottom frame, the bottom frame coupled to the top frame; and a cassette, the cassette configurable to removably securing material therein, the cassette being removably attachable to the bottom frame, wherein the affector is configurable to affecting the material within the cassette in a plurality of dimensions.

BRIEF DESCRIPTION OF THE DRAWINGS

Embodiments of the present invention are described in detail below with reference to the following drawings:

FIG. 20 is a perspective view of components for providing a customizable and extendable personal affector machine, in accordance with an embodiment of the invention;

DETAILED DESCRIPTION

This invention relates generally to software and mechanics, and more specifically, to systems and methods for providing a personal affector machine. Specific details of certain embodiments of the invention are set forth in the following description and in corresponding figures to provide a thorough understanding of such embodiments. The present invention may have additional embodiments, may be practiced without one or more of the details described for any particular described embodiment, or may have any detail for one embodiment practiced with any other detail for another embodiment.

The terms affect, affector, affecting and their variants are used throughout this and related applications in a broad sense for lack of more appropriate words. Affect, affector, affecting, and their variants as used can mean to mechanically, chemically, electrically, biologically, visually, or otherwise alter; to preserve; or to sense, scan, or otherwise retrieve information. Nothing shall be construed to limit affect, affector, affecting, and their variants to their traditional meaning of merely producing an effect or change.

An affector is a device that affects material and can include any of a laser, water jet, oscillating knife, custom tool, jig saw, planer, joiner, drill press, sander, buffer, borer, lathe, cutter, router, welder, drill, saw, bonder, scanner, shaper, print head, sewing tool, sculpting tool, etching tool, ultrasonic knife, plasma torch, optical scanner, ink head, camera, turbine spindle, extruder, glue depositor, air dispenser, chemical depositor, sprayer, proximity sensor, welder, laser range finder, light applicator, punch pin, rasp, hammer, writing instrument, screwdriver, pliers, wrench, magnet, density sensor, or any other tool that serves to alter, preserve, or retrieve information.

Figure 1:
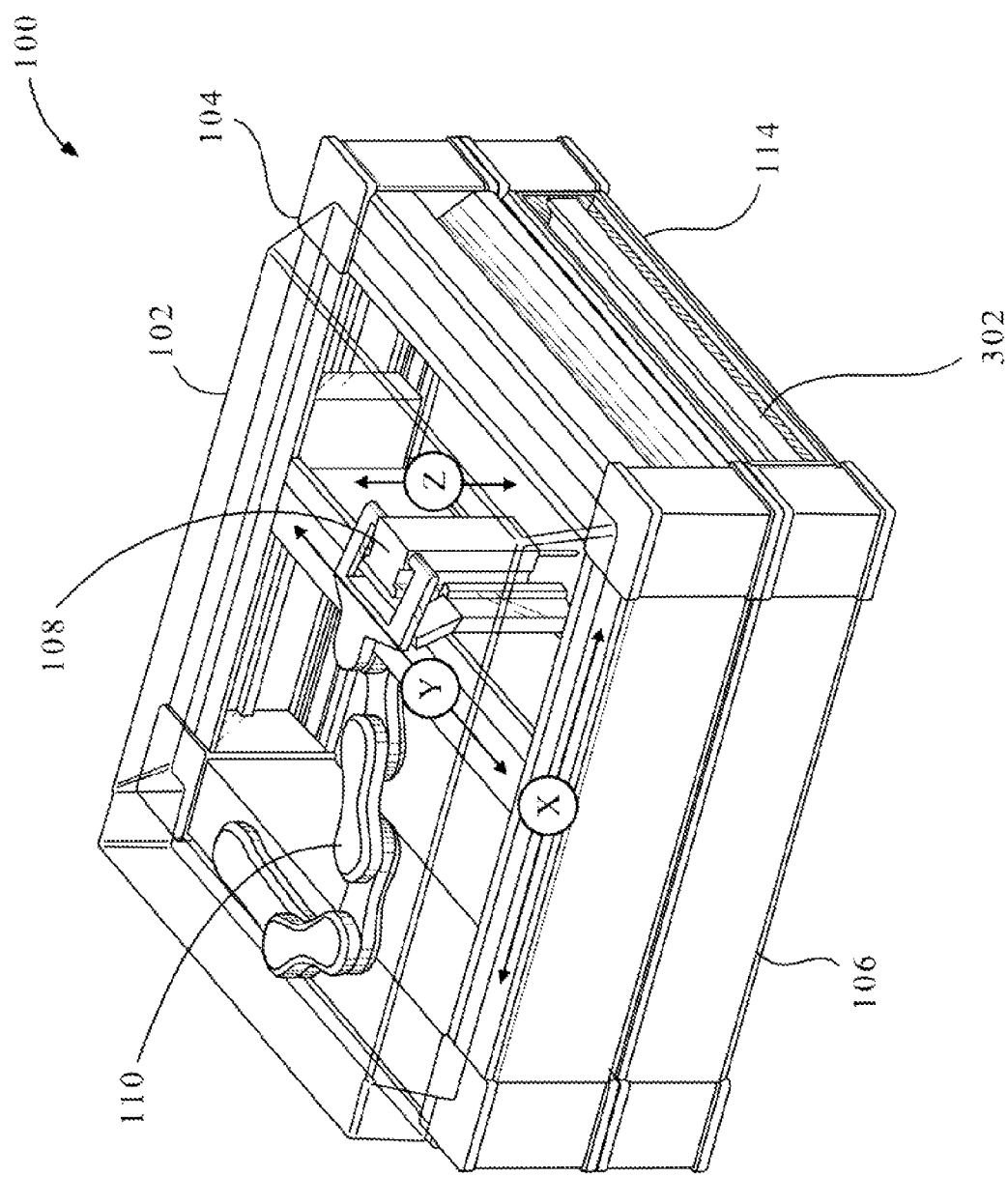
FIG. 1 is a top perspective view of a personal affector machine, in accordance with an embodiment of the invention.

FIG. 1 is a top perspective view of a personal affector machine, in accordance with an embodiment of the invention. In one embodiment, the affector machine 100 includes a main top 102, a top frame 104, a bottom frame 106, an affector head 108, a vacuum system 110, and a cassette 302.

In one embodiment, the bottom frame 106 is coupled to the top frame 104, which is coupled to the main top 102. Together, the bottom frame 106, the top frame 104, and the main top 102 define an internal cavity where material (not visible) can be slidably inserted with a cassette 302 through a cassette opening 114. The affector head 108 located within the cavity is then configurable to affect the material to create an object. The object can be any gas, liquid, solid, or plasma including, but not limited to, signs, engravings, sculptures, masterpieces, famous structures, architectural models, building blocks, models, custom flooring or paneling, culinary art, dishware, furniture, dental products, toys, presentation articles, prototypes, cards, displays, semi-conductors, computer boards, biological cells, molecules, or any other object. In one particular embodiment, the vacuum system 110 is configurable to remove any debris caused from such affecting.

In one particular embodiment, any of hinges, sliding mechanisms, snapping mechanisms, and lifting mechanisms are employed to couple any of the bottom frame 106, the top frame 104, and the main top 102. In another particular embodiment, the main top 102, the top frame 104, and the bottom frame 106 are partially or wholly joined or constructed from fewer or greater separate components. In other embodiments, any of the main top 102, the top frame 104, and the bottom frame 106 may be omitted or separated from the others. In another embodiment, the affector machine 100 is increased or decreased in size or volume. In yet another embodiment, the affector machine 100 is configurable to being modularly extended. In certain embodiments, the affector machine 100 is constructed from any of metal, plastic, wood, composite, or other material. In further embodiments, the affector machine 100 is of a different shape, such as oval, circular, rectangular, spherical, trapezoidal, or any other shape. In yet another embodiment, the bottom frame 106 is alternatively disposed or repositioned relative to the top frame 104, such as placed above or to the side of the top frame 104.

Figure 2:
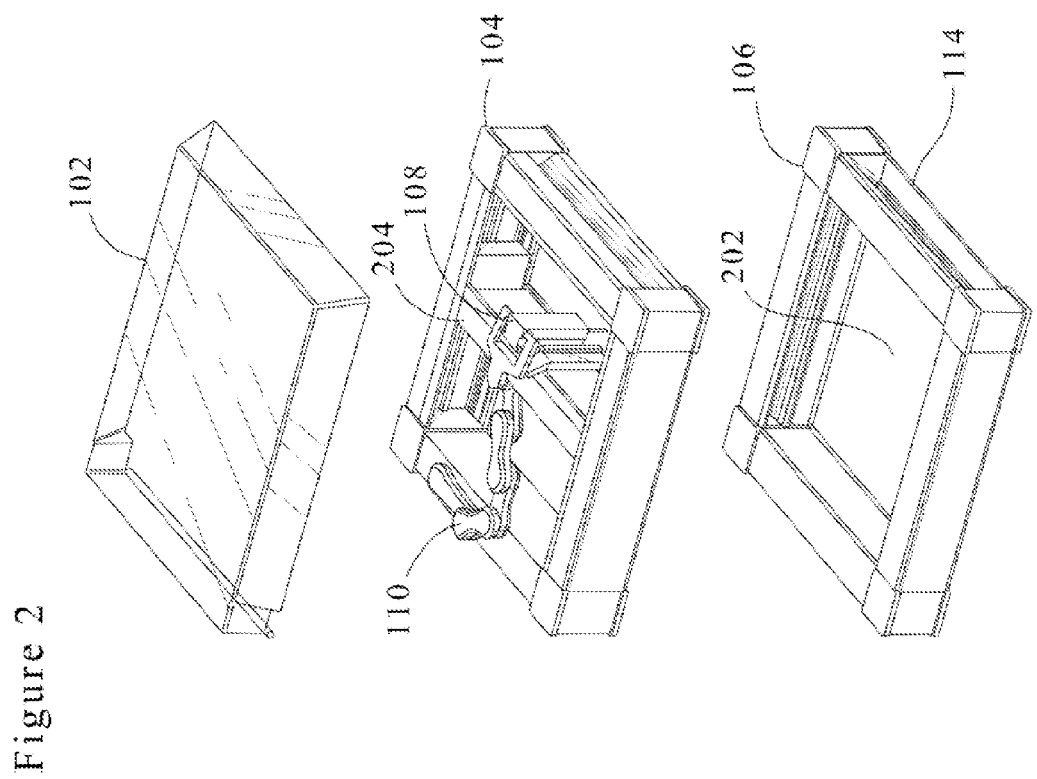
FIG. 2 is an exploded top perspective view of a personal affector machine, in accordance with an embodiment of the invention.

FIG. 2 is an exploded top perspective view of a personal affector machine, in accordance with an embodiment of the invention. In one embodiment, the main top 102 is a generally planar surface constructed from transparent material, such as plastic, that permits a visual impression of activity within the affector machine 100 while also providing protection to an observer.

In one embodiment, the top frame 104 is an approximately square shape that defines a cavity. A cross member 204 extends within the cavity between opposing sides of the top frame 104 and the affector head 108 is coupled to the cross member 204. The cross-member 204 is configured to translate along a length of the opposing sides of the top frame 104 while the affector head 108 is configured to translate along a length of and perpendicularly to the cross member 204. In one particular embodiment, the vacuum system 110 is articulably coupled to the affector head 108.

In one embodiment, the bottom frame 106 is an approximately square shape that defines a cavity, substantially similar to that of the top frame 104. One side of the bottom frame 106 defines the cassette opening 114 for receiving a cassette (not illustrated). Material is configurable to being disposed within the cassette and positioned within the cavity defined by the bottom frame 106. A tray 202 provides a surface beneath the bottom frame 106.

Figure 3:
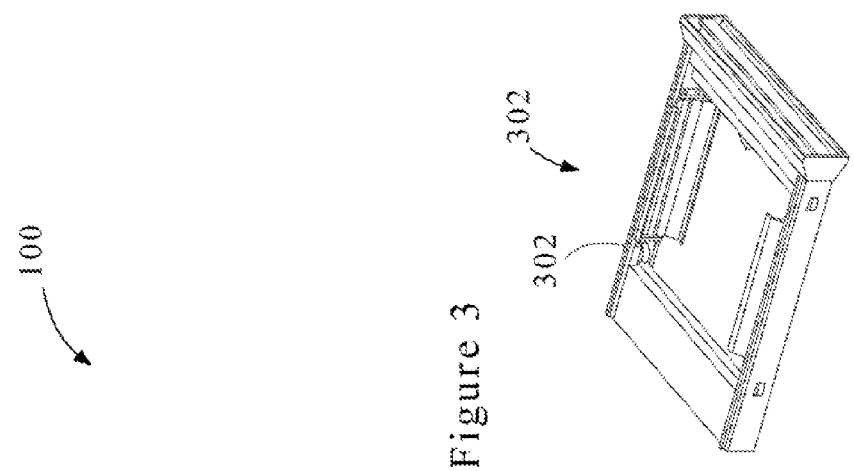
FIG. 3 is a top perspective view of a cassette for use with a personal affector machine, in accordance with an embodiment of the invention.

FIG. 3 is a top perspective view of a cassette for use with the personal affector machine, in accordance with an embodiment of the invention. In one embodiment, the cassette 302 includes a frame configurable to removably receiving material (not illustrated) using clamps. The material is any of foam, wood, plastic, glass, metal, paper, computer equipment, a biological test dish, or any other solid, liquid, gas, or plasma. The cassette 302 is configurable to being inserted into the bottom frame 106 through the cassette opening 114.

Figure 4:
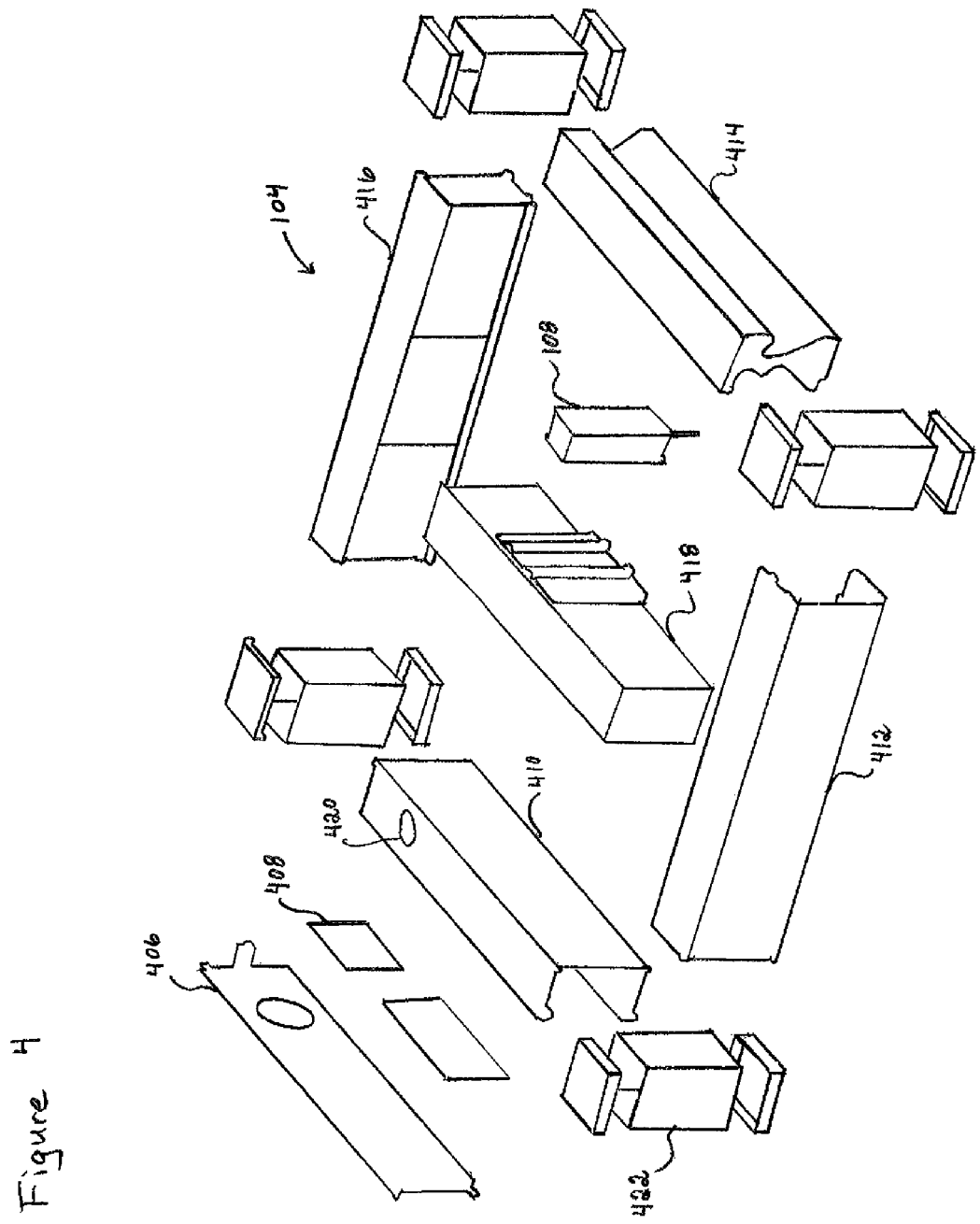
FIG. 4 is an exploded view of a top frame of a personal affector machine, in accordance with an embodiment of the invention.

FIG. 4 is an exploded view of a top frame of a personal affector machine, in accordance with an embodiment of the invention. In one embodiment, the top frame 104 includes a top back member 410, a top left member 412, a top front member 414, and a top right member 416, each coupled at their distal ends by corner connectors 422.

In one embodiment, a top cross member 418 extends between the top left member 412 and the top right member 416. The affector head 108 is removably coupled to the top cross member 418. The top cross member 418 is configurable to transition along a length of the opposing members while the affector head 108 is configured to translate along a length of and perpendicularly to the top cross member 418. Accordingly, the affector head 108 is capable of being moved between the top front member 414 and the top back member 410; being moved between the top left member 412 and the top right member 416; and being moved perpendicularly relative to the top cross member 418, thereby producing motion in three dimensions. In certain embodiments, motions in fewer or greater dimensions is possible.

In one embodiment, the top back member 410 defines a cavity that is configurable to containing a vacuum mount 402, which serves as an interface for receiving a vacuum source. The vacuum mount 402 is coupled to components of the vacuum system 110 through a vacuum channel 420 in the top back member 410. The vacuum system 110 is configurable to move in concert with the affector head 108 using an articulable joint to remove any debris resulting from operation of the affector head 108. A top back cover 406 conceals the vacuum mount 402 while providing interfaces for receiving power, electrical signals, or a vacuum source.

Figure 5:
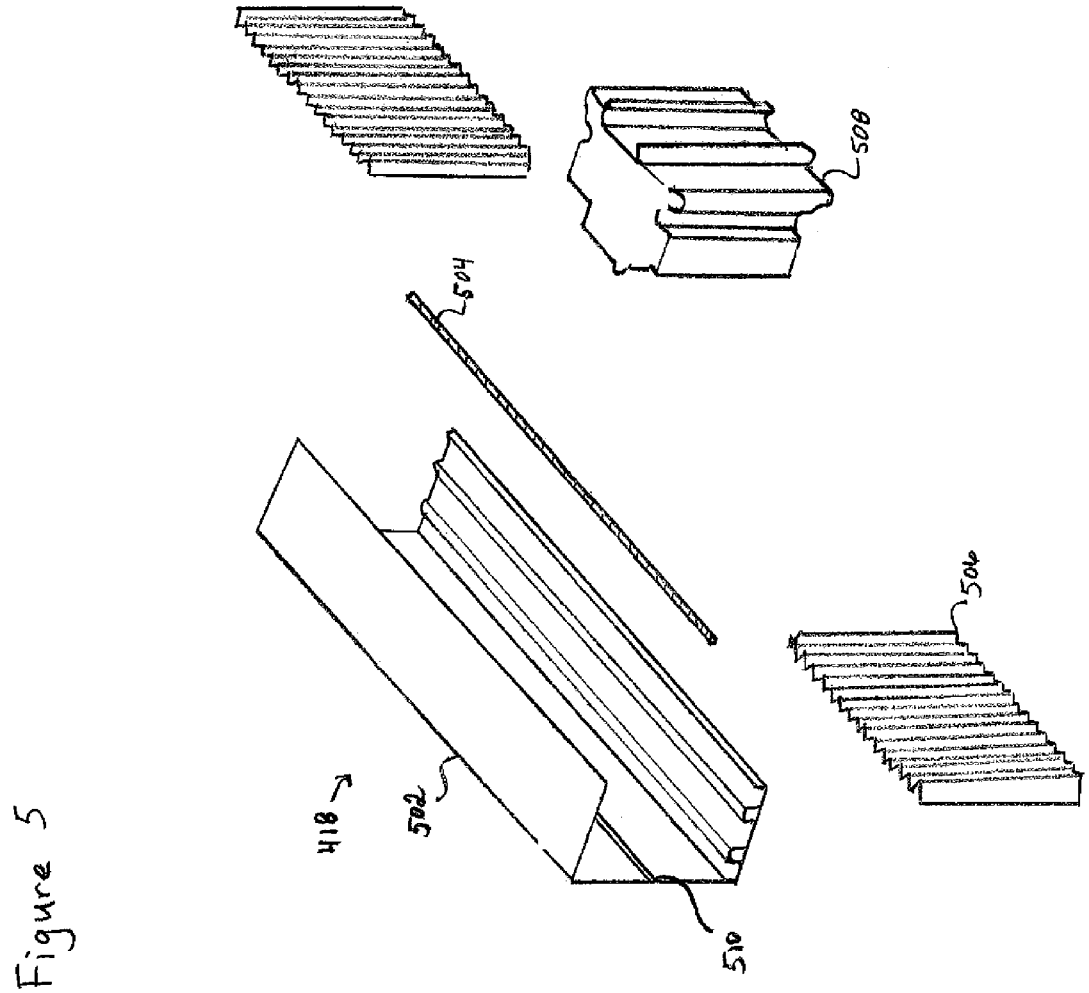
FIG. 5 is an exploded view of a top cross member of a personal affector machine, in accordance with an embodiment of the invention.

FIG. 5 is an exploded view of a top cross member of a personal affector machine, in accordance with an embodiment of the invention. In one embodiment, the top cross member 418 includes a top cross arm beam 502, an x-rack 504, bellows 506, and an x-z motor box 508.

In one embodiment, the top cross arm beam 502 includes a top, back, and bottom surface (not labeled), which define a concave inner channel. The concave inner channel includes a ridge 510 for receiving the x-rack 504 along its length, the x-rack 504 having a threaded surface. The x-z motor box 508 has a stepping motor (FIG. 6) contained therein and is configurable to rollably reside within the inner channel. The stepping motor includes a rotational pinion gear that is configurable to mate with threads on the x-rack 504, thereby permitting rotational movement of the stepping motor to be converted into lateral displacement of the x-z motor box 508 along a length of the top cross arm beam 502. The bellows 506 are an accordion-like membrane disposed adjacent to the x-z motor box 508 that provide a cover to the inner channel of the top cross arm beam 502.

In one particular embodiment, the top cross arm beam 502 is differently shaped. For instance, it may be a single generally planar surface, an elongated beam, or a curved elongated member. In yet a further embodiment, the x-rack 504 is repositioned on the top cross arm beam 502 or omitted in favor of embedded threads on the top cross arm beam 502. In further embodiments, the rack and stepping motor system described herein is replaced in whole or in part by a cable, linear motor, lead screw, magnet, pressure, nuclear power, fusion, stir welding or other motion system. In an alternate embodiment, the rack and stepping motor system includes additional gears. In yet another embodiment, the stepping motor is disposed on the top cross arm beam 502 and the x-rack 504 is positioned on the x-z motor box 508. In another particular embodiment, the x-z motor box 508 is suspended or otherwise mounted on the top cross arm beam 502. In other embodiments, the bellows 506 are omitted or are replaced with a stretchable curtain, a torsion spring rolled curtain, or other similar device. In one particular embodiment, the bellows 506 are water proof.

Figure 6:
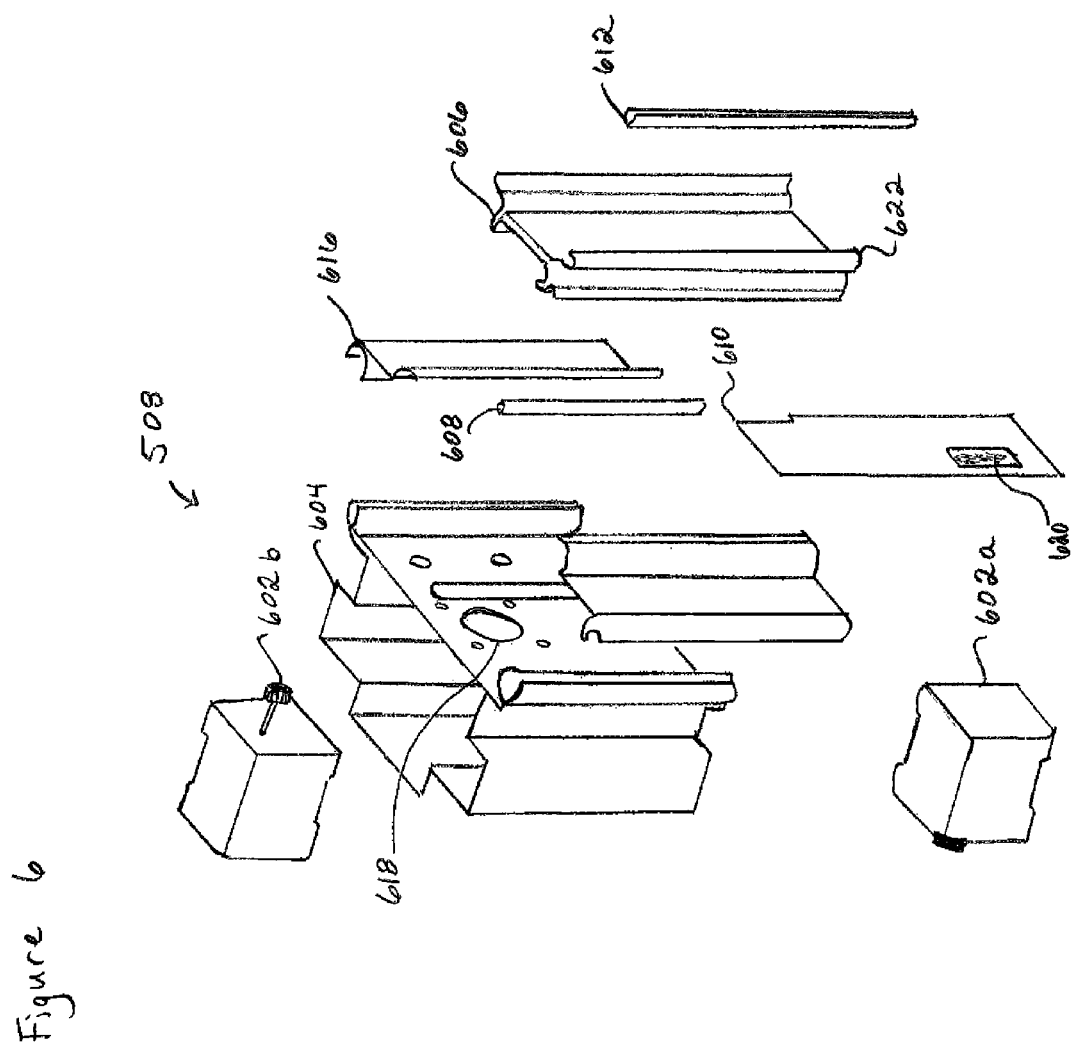
FIG. 6 is an exploded view of a x-z motor box of a personal affector machine, in accordance with an embodiment of the invention.

FIG. 6 is an exploded view of an x-z motor box of a personal affector machine, in accordance with an embodiment of the invention. In one embodiment, the x-z motor box 508 includes a first stepping motor 602(a), a second stepping motor 602(b), an internal housing 604, a head mount plate 606, a z-rack 608, a affector head plug-in 610, a head lock 612, and head doors 616.

Figure 8:
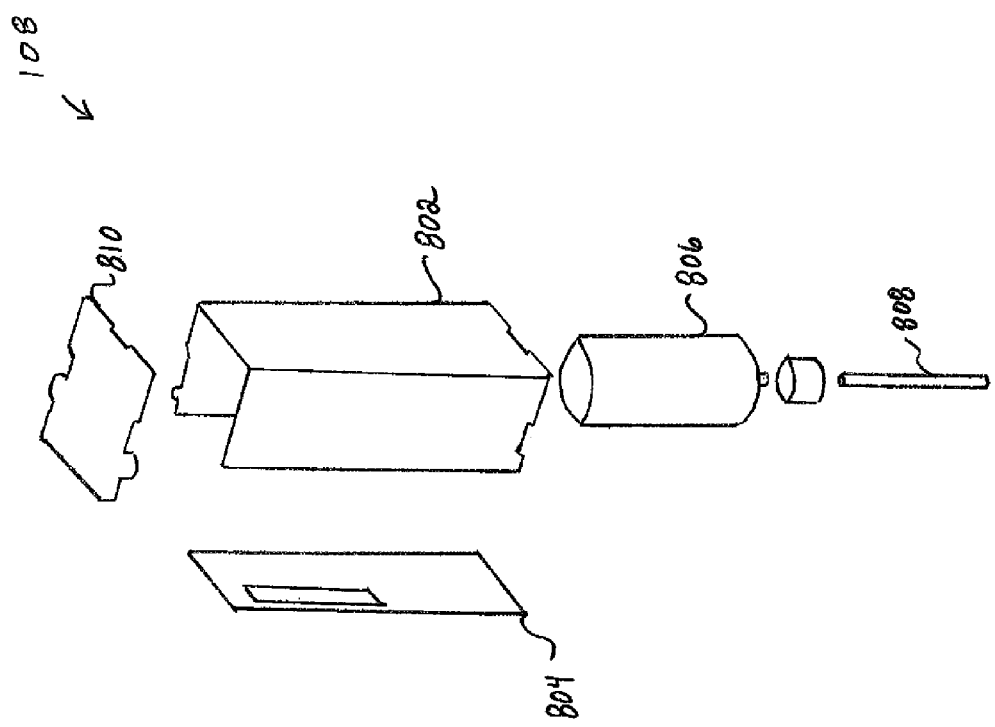
FIG. 8 is an exploded view of an affector head of a personal affector machine, in accordance with an embodiment of the invention.

In one embodiment, the internal housing 604 contains the first and second stepping motors 602. The first stepping motor 602(a) provides a rotational pinion gear that extends through a cavity (not visible) in a rear of the internal housing 604 and is configurable to mate with the x-rack 504 to provide lateral displacement of the x-z motor box 508, as discussed in reference to FIG. 5. The second stepping motor 602(b) provides a rotational pinion gear that extends through a cavity 618 in a front of the internal housing 604 and is configurable to mate with the z-rack 608, the z-rack 608 being disposed along a length of the head mount plate 606, to provide vertical displacement of the head mount plate 606 relative to the internal housing 604. The affector head plug-in 610 is disposed between the internal housing 604 and the head mount plate 606 and has a port 620 that extends through the head mount plate 606 for providing power or electrical signals to the affector head 108 (FIG. 8). The head lock 612 slidably and removably descends into the head lock channel 622 to frictionally lock the affector head 108 (not illustrated) on the head mount plate 606. The head doors 616 further secure the head mount plate 606 along its lateral edges to the internal housing 604.

In further embodiments, the rack and stepping motor system described herein is replaced in whole or in part by a cable, linear motor, lead screw, magnet, pressure, nuclear power, fusion, stir welding or other motion system. In another particular embodiment, the x-z motor box 508 further includes a motion system that provides for rotation of the affector head 108 relative to the internal housing 604. In another particular embodiment, the x-z motor box 508 further includes a gimbal motion system that provides for rotation of the affector head 108 in multiple dimensions relative to the internal housing 604.

Figure 7:
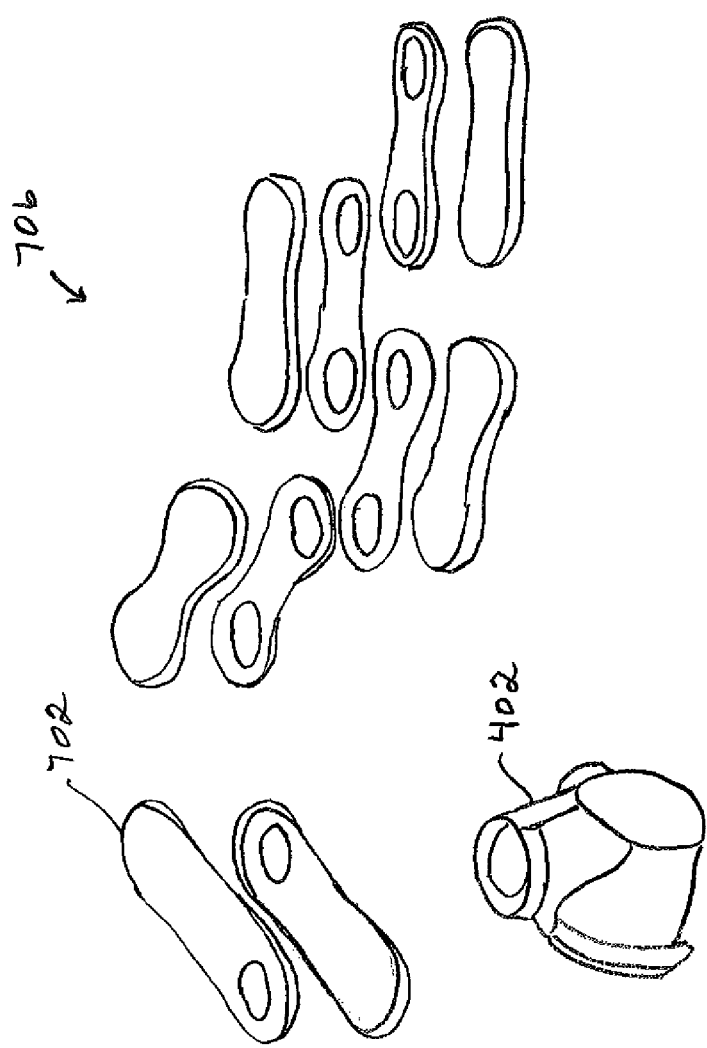
FIG. 7 is an exploded view of a vacuum system of a personal affector machine, in accordance with an embodiment of the invention.

FIG. 7 is an exploded view of a vacuum system of a personal affector machine, in accordance with an embodiment of the invention. The vacuum system 110 includes the vacuum mount 402, an extensible articulable joint 706, and a vacuum head 704.

In one embodiment, the vacuum mount 402 is configured to receive a vacuum source (not illustrated) to provide suction to the vacuum system 110. The extensible articulable joint 706 includes a plurality of vacuum arm components 702 that are movably coupled together and define an internal channel. The extensible articulable joint 706 is coupled on one end to the vacuum mount 402 and on another end to the vacuum head 704. The vacuum head 704 is configured to mount the internal housing 604 adjacent to the affector head 108. Accordingly, the vacuum system 110 is configured to move with the affector head 108 and provide suction to remove debris proximate to the affector head 108.

In certain embodiments, electrical wiring to the affector head 108 is disposed within the vacuum system 110. In a further embodiment, the vacuum system 110 can deliver materials such as water for cooling, compressed air, metal for welding, ink for a print head, a vacuum for holding materials, biological materials, or other solids, liquids, or gasses either in addition to or in lieu of the vacuum system 110. In another embodiment, the vacuum system 110 is alternatively constructed from a hose or other similar system.

FIG. 8 is an exploded view of an affector head of a personal affector machine, in accordance with an embodiment of the invention. In one embodiment, the affector head 108 includes an affector housing 802, an affector driver 804, an affector motor 806, an affector 808, and an affector cap 810.

In one embodiment, the affector housing 802 is coupled to the affector motor 806, which is configurable to removably receiving the affector 808. The affector driver 804 is coupled to a rear of the affector housing 802 and configurable to provide electrical communication between the port 620 on the affector head plug in 610 (FIG. 6) and the affector head 108. The affector cap 810 couples to the affector housing 802 to protect the interior of the affector housing 802.

Figure 10:
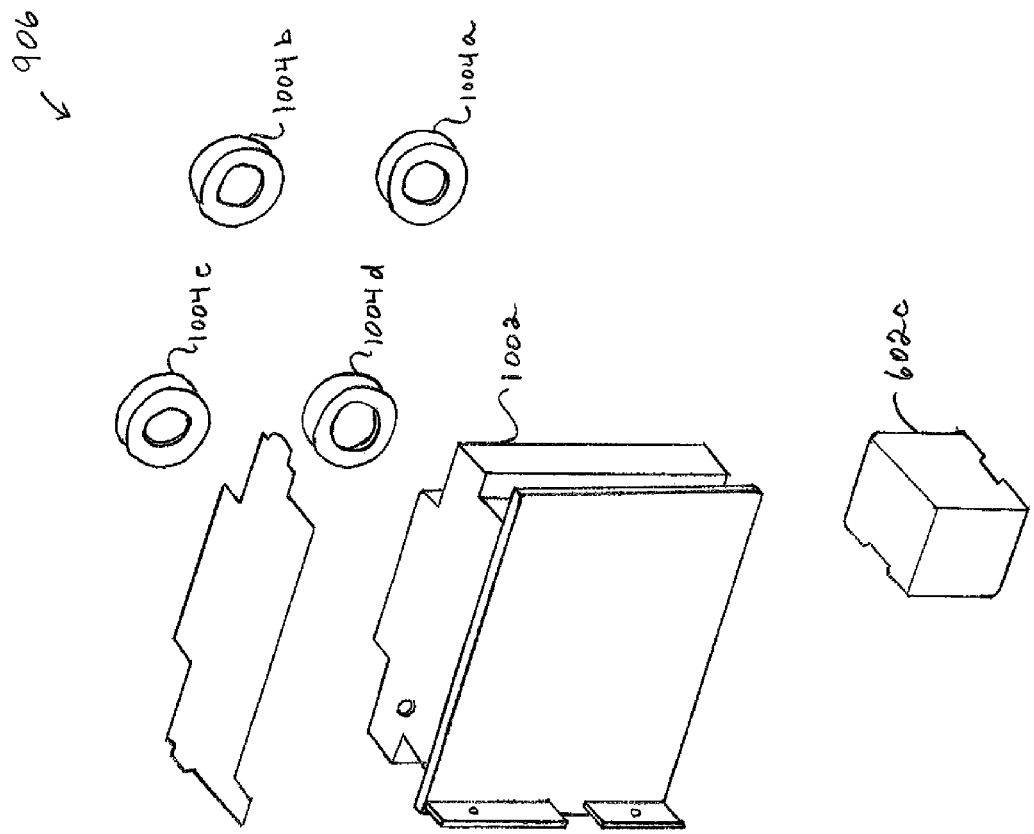
FIG. 10 is an exploded view of a right y-motor box of a personal affector machine, in accordance with an embodiment of the invention.
Figure 11:
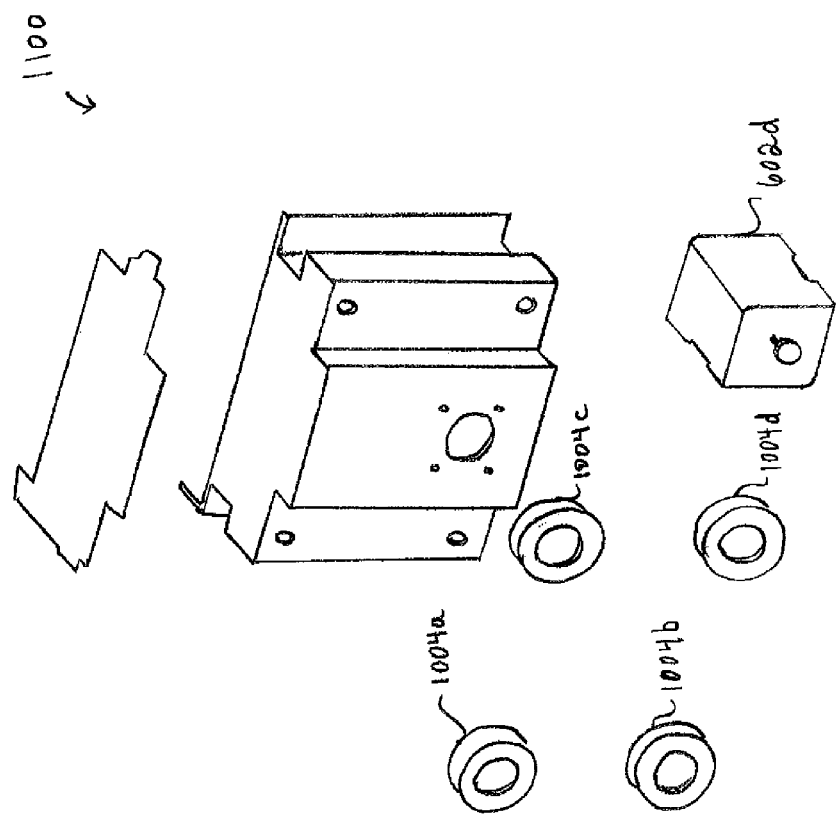
FIG. 11 is an exploded view of a left y-motor box of a personal affector machine, in accordance with an embodiment of the invention.

In one embodiment, the affector 808 is configurable to affect material (not illustrated) in one or more dimensions, such as perpendicularly using the stepping motor in association with the z-rack 608 (FIG. 6), along a length using the stepping motor 602(a) in association with the x-rack 504 (FIGS. 5, 6), or along a height using the stepping motor 602(c) in association with the y-left rack 904 (FIGS. 9, 10) or the stepping motor 602(d) in association with the right y-rack 904 (FIG. 11). The affector 808 is configurable to being controlled and moved manually and/or by using a computer.

In one particular embodiment, the affector motor 806 provides any motion such as vibration, gyration, impact, vertical rotation, horizontal rotation, or oblique rotation. In further embodiments, the affector motor 806 or the affector 808 is replaced or complimented with another affector such as a laser, water jet, oscillating knife, custom tool, jig saw, planer, joiner, drill press, sander, buffer, borer, lathe, cutter, router, welder, drill, saw, bonder, scanner, shaper, print head, sewing tool, sculpting tool, etching tool, ultrasonic knife, plasma torch, optical scanner, ink head, camera, turbine spindle, extruder, glue depositor, air dispenser, chemical depositor, sprayer, proximity sensor, welder, laser range finder, light applicator, punch pin, rasp, hammer, writing instrument, screwdriver, pliers, wrench, magnet, density sensor, or any other tool that serves to alter, preserve, or retrieve information. In one particular embodiment, the affector motor 806 or the affector 808 is replaceable automatically. In another particular embodiment, the affector 808 includes an extension or is extendable to lengthen the affector 808. In yet a further embodiment, a plurality of affectors 808 and/or affector motors 806 are implemented to affect material in fewer passes. In another embodiment, the plurality of affectors 808 are similar or different, such as a glue gun, a laser, and a paint applicator.

Figure 9:
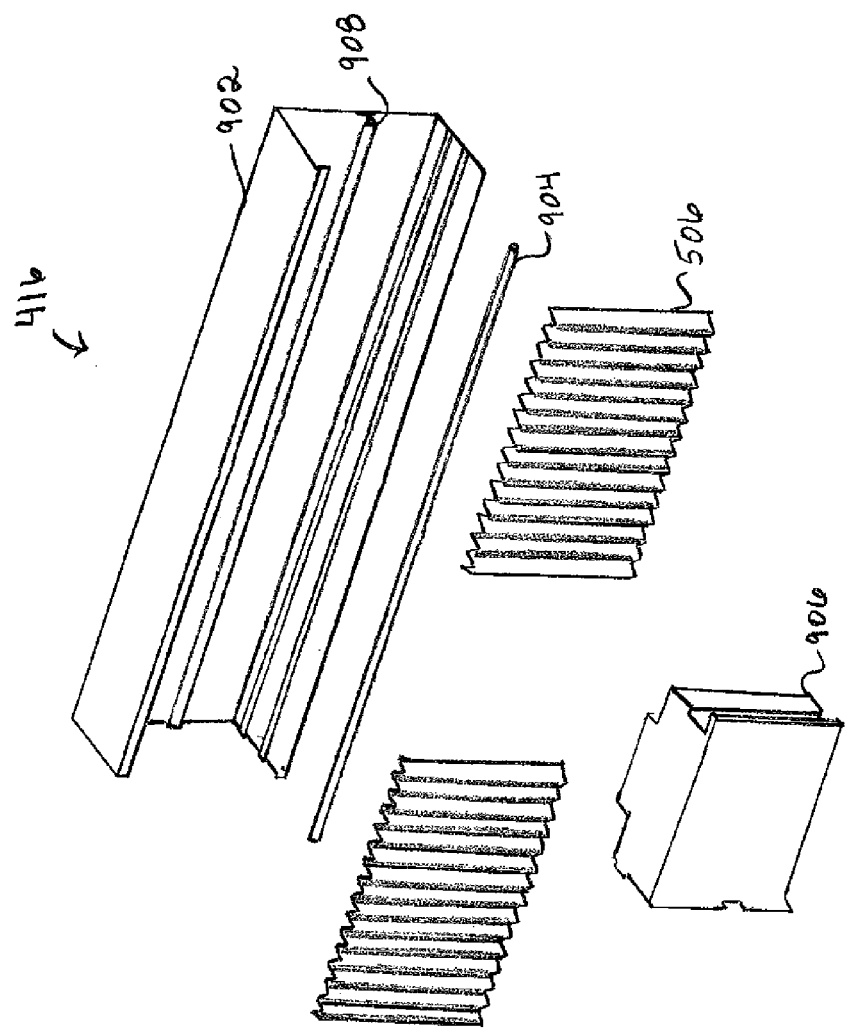
FIG. 9 is an exploded view of a top right member of a personal affector machine, in accordance with an embodiment of the invention.

FIG. 9 is an exploded view of a top right member of a personal affector machine, in accordance with an embodiment of the invention. In one embodiment, the top right member 416 includes a top right side arm beam 902, a right y-rack 904, a right y-motor box 906, and bellows 506. In one embodiment, the top left member 412 is substantially the same as the top right member 416.

In one embodiment, the top right member 416 is substantially similar to the top cross member 418 as described in reference to FIG. 5. Accordingly, in one embodiment the top right side arm beam 902 includes a bottom, side, and top surface (not labeled), which define a concave inner channel. The concave inner channel includes a ridge 908 for receiving the right y-rack 904 along its length, the right y-rack 904 having a threaded surface. The right y-motor box 906 has a stepping motor (FIG. 10) contained therein and is configurable to rollably reside within the inner channel. The stepping motor includes a rotational pinion gear that is configurable to mate with threads on the right y-rack 904, thereby permitting rotational movement of the stepping motor to be converted into lateral displacement of the right y-motor box 906 along a length of the top right side arm beam 902. The bellows 506 are an accordion-like membrane disposed adjacent to the right y-motor box 906 that provide a cover to the inner channel of the top right side arm beam 902.

In one particular embodiment, the top right side arm beam 902 is differently shaped. For instance, it may be a single generally planar surface, an elongated beam, or a curved elongated member. In yet a further embodiment, the right y-rack 904 is repositioned elsewhere on the top right side arm beam 902 or omitted in favor of embedded threads on the top right side arm beam 902. In further embodiments, the rack and stepping motor system described herein is replaced in whole or in part by a cable, linear motor, lead screw, magnet, pressure, nuclear power, fusion, stir welding or other motion system. In an alternate embodiment, the rack and stepping motor system includes additional gears. In yet another embodiment, the stepping motor is disposed on the top right side arm beam 902 and the right y-rack 904 is positioned on the right y-motor box 906. In another particular embodiment, the right y-motor box 906 is suspended or otherwise mounted on the top right side arm beam 902. In other embodiments, the bellows 506 are omitted or are replaced with a stretchable curtain, a torsion spring rolled curtain, or other similar device. In one particular embodiment, the bellows 506 are water proof.

FIG. 10 is an exploded view of a right y-motor box of a personal affector machine, in accordance with an embodiment of the invention. In one embodiment, the right y-motor box 906 includes a housing 1002, a stepping motor 602(c), and a plurality of wheels 1004.

In one embodiment, the plurality of wheels 1004 are rotationally coupled to a rear face (not labeled) of the housing 1002 and configured to rollably receive the inner channel of the top right side arm beam 902 (FIG. 9). Accordingly, the plurality of wheels 1004 permit the housing 1002 to move along a length of the top right member 416. The stepping motor 602(c) is contained within the housing 1002 and has a rotational pinion gear that extends through the rear face to mate with the right y-rack 904 (FIG. 9). Thus, rotational motion from the stepping motor 602(c) is translated to displacement of the right y-motor box 906 along a length of the top right member 416.

In one particular embodiment, the plurality of wheels 1004 are configurable to being mounted on an external surface of the top right side arm beam 902. In yet another embodiment, the wheels 1004 are omitted in favor of an alternative motion system.

FIG. 11 is an exploded view of a left y-motor box of the personal affector machine, in accordance with an embodiment of the invention. In one embodiment, the left y-motor box 1100 is substantially similar to the right y-motor box 906. The top cross member 418 is coupled on its distal ends to the right y-motor box 906 and the left y-motor box 1100. Accordingly, displacement of the right y-motor box 906 and the left y-motor box 1100 provides displacement of the top cross member 418.

Figure 12:
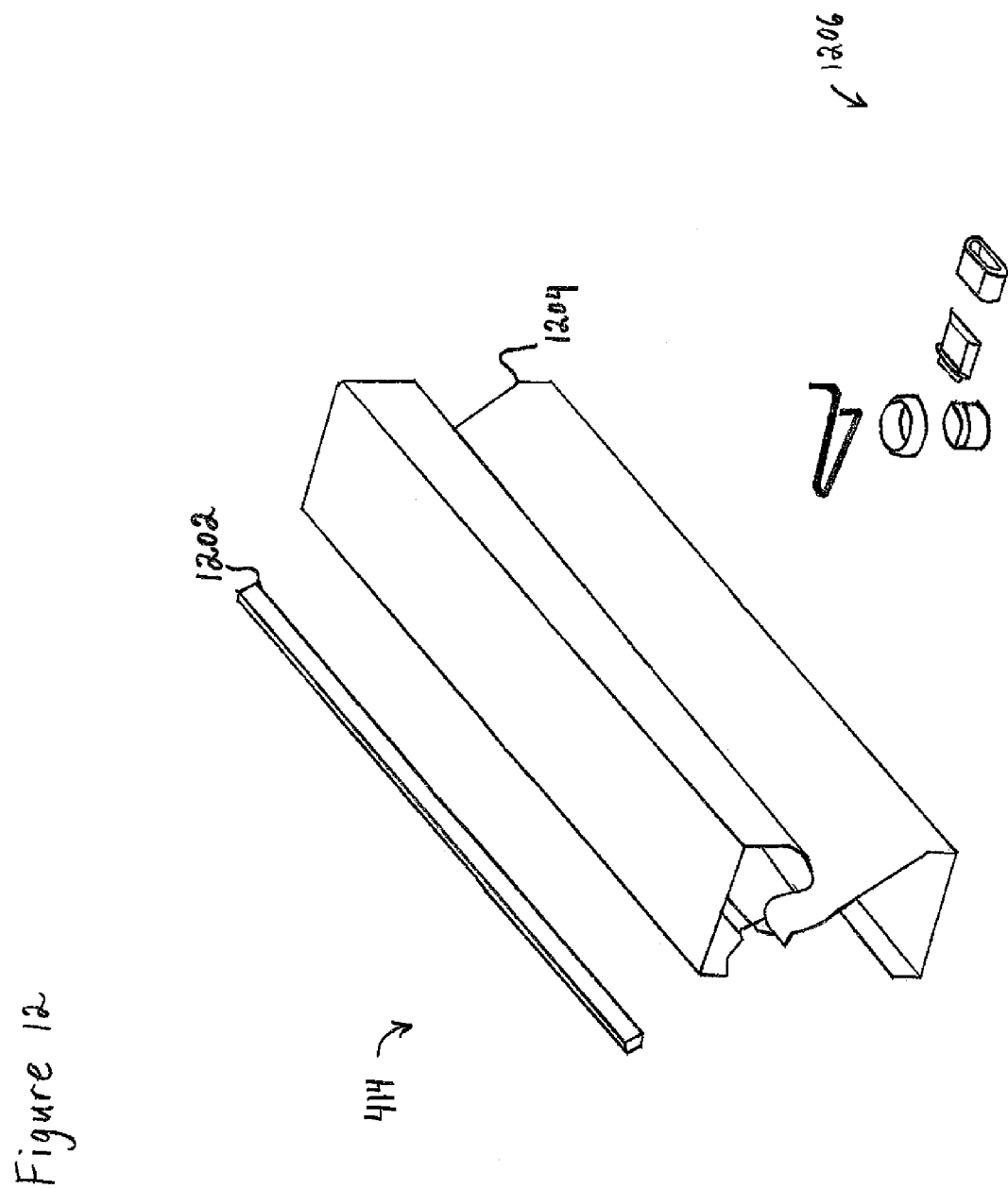
FIG. 12 is an exploded view of a top front member of a personal affector machine, in accordance with an embodiment of the invention.

FIG. 12 is an exploded view of a top front member of a personal affector machine, in accordance with an embodiment of the invention. In one embodiment, the top front member 414 includes lights 1202, a top front beam 1204, and a latch 1206.

In one embodiment, the lights 1202 are mounted along a rear of the top front beam 1204 and configured to illuminate a cavity defined by the top frame 104 and the bottom frame 106 (FIG. 1). The top front beam 1204 includes a depression along its length for providing a handle to lift the top frame 104 from the bottom frame 106. The latch 1206 is positioned within the top front beam 1204 such that it removably locks the top frame 104 and the bottom frame 106 when desired.

In one particular embodiment, the lights 1202 are omitted or alternatively placed on the affector machine 100. In yet a further embodiment, a handle is mounted on a surface of the top front beam 1204. In an alternative embodiment, the latch 1206 is omitted, moved, or replaced with another locking system.

Figure 13:
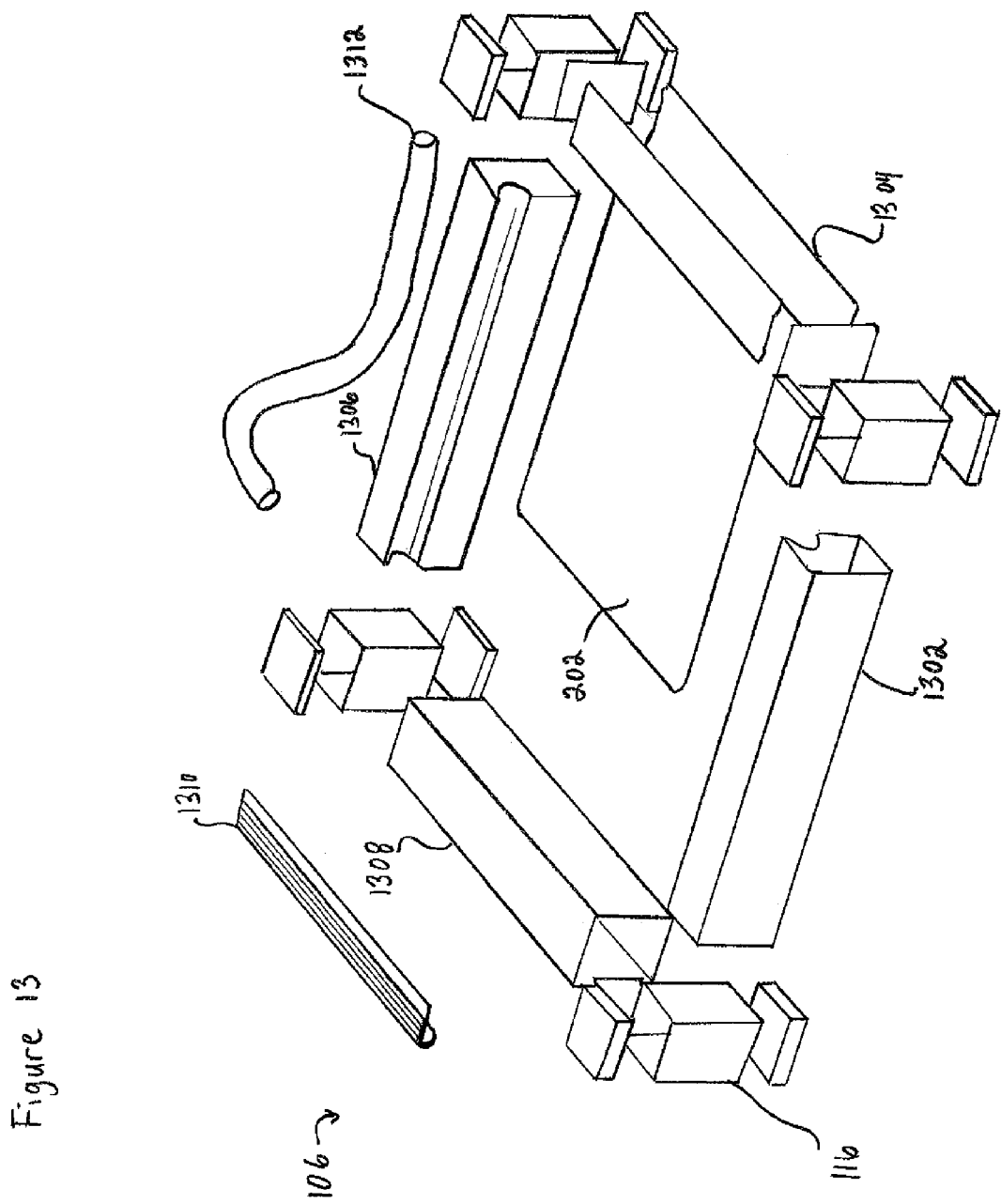
FIG. 13 is an exploded view of a bottom frame of a personal affector machine, in accordance with an embodiment of the invention.

FIG. 13 is an exploded view of a bottom frame of a personal affector machine, in accordance with an embodiment of the invention. In one embodiment, the bottom frame 106 includes a bottom left side member 1302, a bottom front member 1304, a bottom right side member 1306, a bottom back member 1308, a hinge 1310, a hose 1312, corner caps 116, and a tray 202.

In one embodiment, the bottom left side member 1302, the bottom front member 1304, the bottom right side member 1306, and the bottom back member 1308 are coupled together at their distal ends by the corner caps 116. Together, these members define the perimeter of the bottom frame 106 and a cavity for receiving the cassette 302 (FIG. 3). A bottom surface of the cavity is defined by the tray 202. The cassette 302 is configurable to hold material (not illustrated) thereon and to be inserted into the bottom frame 106 through an opening defined by the bottom front member 1304.

In one embodiment, the hinge 1310 is configured to hingedly couple the bottom frame 106 to the top frame 104 to permit the top frame 104 to be lifted from and placed proximate to the cassette 302 and any material residing therein. The hose 1312 is coupled at one end to the vacuum mount 402 (FIG. 7) and is open at an opposing end to remove any debris on the tray 202.

In another embodiment, the cassette 302 is configurable to being depressed into the cavity defined by the bottom frame 106. In yet another embodiment, the cassette 302 is slidably insertable into the bottom frame 106 from a side or a rear. In a further particular embodiment, the cassette 302 is flipable, thereby providing at least two surfaces to which the affector head 108 can affect. In an alternative embodiment, the cassette 302 is placed above or to a side of the top frame 104. In one particular embodiment, the tray 202 is replaced with a vacuum system or garbage system that assists in removing debris.

In one particular embodiment, computing power of the affector machine 100 is distributed to any of the x-z motor box 508, the right y-motor box 906, the left y-motor box 1100, and the affector head 108. In other embodiments, the computing power of the affector machine 100 can be consolidated or further distributed. In one embodiment, wireless communication is employed to communicate with distributed computer power.

In one particular embodiment, the x-z motor box 508, the right y-motor box 906, and the left y-motor box working in association with members to produce movement are partially or completely replaced with at least one robotic arm that produces similar movements.

Figure 14:
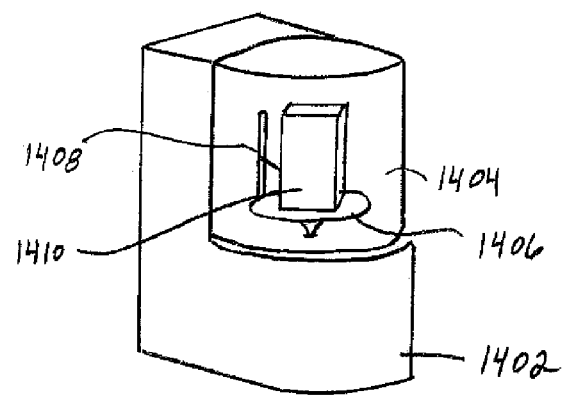
FIG. 14 is a top perspective view of a personal affector machine, in accordance with an embodiment of the invention.

FIG. 14 is a top perspective view of a personal affector machine, in accordance with an embodiment of the invention. In one embodiment, affector machine 1400 includes a housing 1402, a material 1404, a mounting plate 1406, and an affector 1408.

In one embodiment, the mounting plate 1406 is coupled to the housing 1402 and configurable to receive the material 1404. The affector 1408 can be a laser, water jet, oscillating knife, custom tool, jig saw, planer, joiner, drill press, sander, buffer, borer, lathe, cutter, router, welder, drill, saw, bonder, scanner, shaper, print head, sewing tool, sculpting tool, etching tool, ultrasonic knife, plasma torch, optical scanner, ink head, camera, turbine spindle, extruder, glue depositor, air dispenser, chemical depositor, sprayer, proximity sensor, welder, laser range finder, light applicator, punch pin, rasp, hammer, writing instrument, screwdriver, pliers, wrench, magnet, density sensor, or any other tool that serves to alter, preserve, or retrieve information. The affector 1408 is coupled to the housing 1402 and configurable to affect the material 1404. In one embodiment, the affector 1408 is configurable to traversing a length of the material 1404 via a channel 1410 to affect the material 1404 in a first dimension. In another embodiment, the affector 1408 is configurable to moving perpendicularly to the housing 1402 to affect the material 1404 in a second dimension. In yet a further embodiment, the mounting plate 1406 is configurable to rotating about an axis, thereby permitting the affector 1408 to affect the material 1404 in a third dimension. In yet another particular embodiment, the mounting plate 1406 is configurable to tilting relative to the housing 1402, thereby permitting the affector 1408 to affect the material 1404 in a fourth dimension. In certain embodiments, the motion capabilities of the mounting plate 1406 and the affector 1408 are interchanged. For instance, in one embodiment the mounting plate 1406 provides any of the movement that the affector 1408 provides. In another embodiment, the affector 1408 provides any of the movement that the mounting plate 1406 provides. The affector machine 1400 may be practiced with one or more embodiments discussed in reference to other figures.

Figure 15:
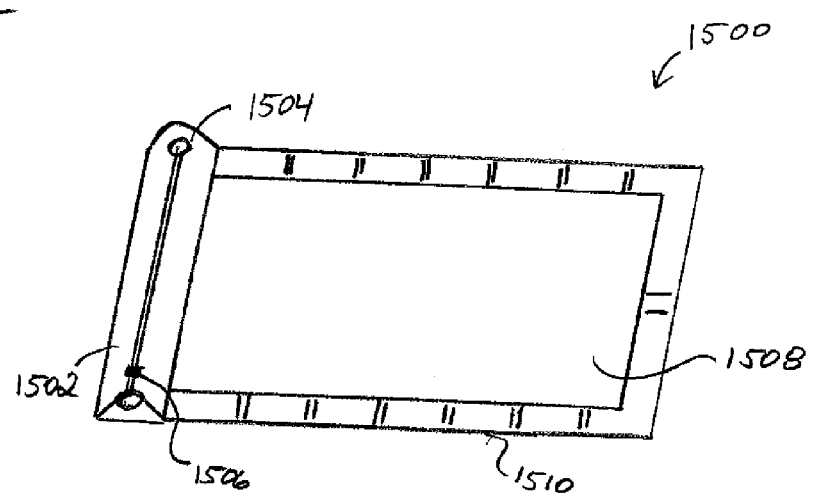
FIG. 15 is a top perspective view of a personal affector machine, in accordance with an embodiment of the invention.

FIG. 15 is a top perspective view of a personal affector machine, in accordance with an embodiment of the invention. In one embodiment, affector machine 1500 includes a housing 1502, wheels 1504, an affector 1506, a material 1508, and a frame 1510.

In one embodiment, the wheels 1504 are coupled to the housing 1502 and are configurable to roll the housing 1502 along the frame 1510 over the material 1508. The affector 1506 can be any of a laser, water jet, oscillating knife, custom tool, jig saw, planer, joiner, drill press, sander, buffer, borer, lathe, cutter, router, welder, drill, saw, bonder, scanner, shaper, print head, sewing tool, sculpting tool, etching tool, ultrasonic knife, plasma torch, optical scanner, ink head, camera, turbine spindle, extruder, glue depositor, air dispenser, chemical depositor, sprayer, proximity sensor, welder, laser range finder, light applicator, punch pin, rasp, hammer, writing instrument, screwdriver, pliers, wrench, magnet, density sensor, or any other tool that serves to alter, preserve, or retrieve information. Accordingly, the rolling of the housing 1502 along the frame 1510 permits the affector 1506 to affect the material 1508 in a first dimension. In one embodiment, the affector 1506 is configurable to traverse the housing 1502 along its length, thereby permitting the affector 1506 to affect the material 1508 in a second dimension. In yet another embodiment, the affector 1506 is configurable to perpendicular to the material 1508, thereby permitting the affector 1506 to affect the material 1508 in a third dimension. The affector machine 1500 may be practiced with one or more embodiments discussed in reference to other figures.

Figure 16:
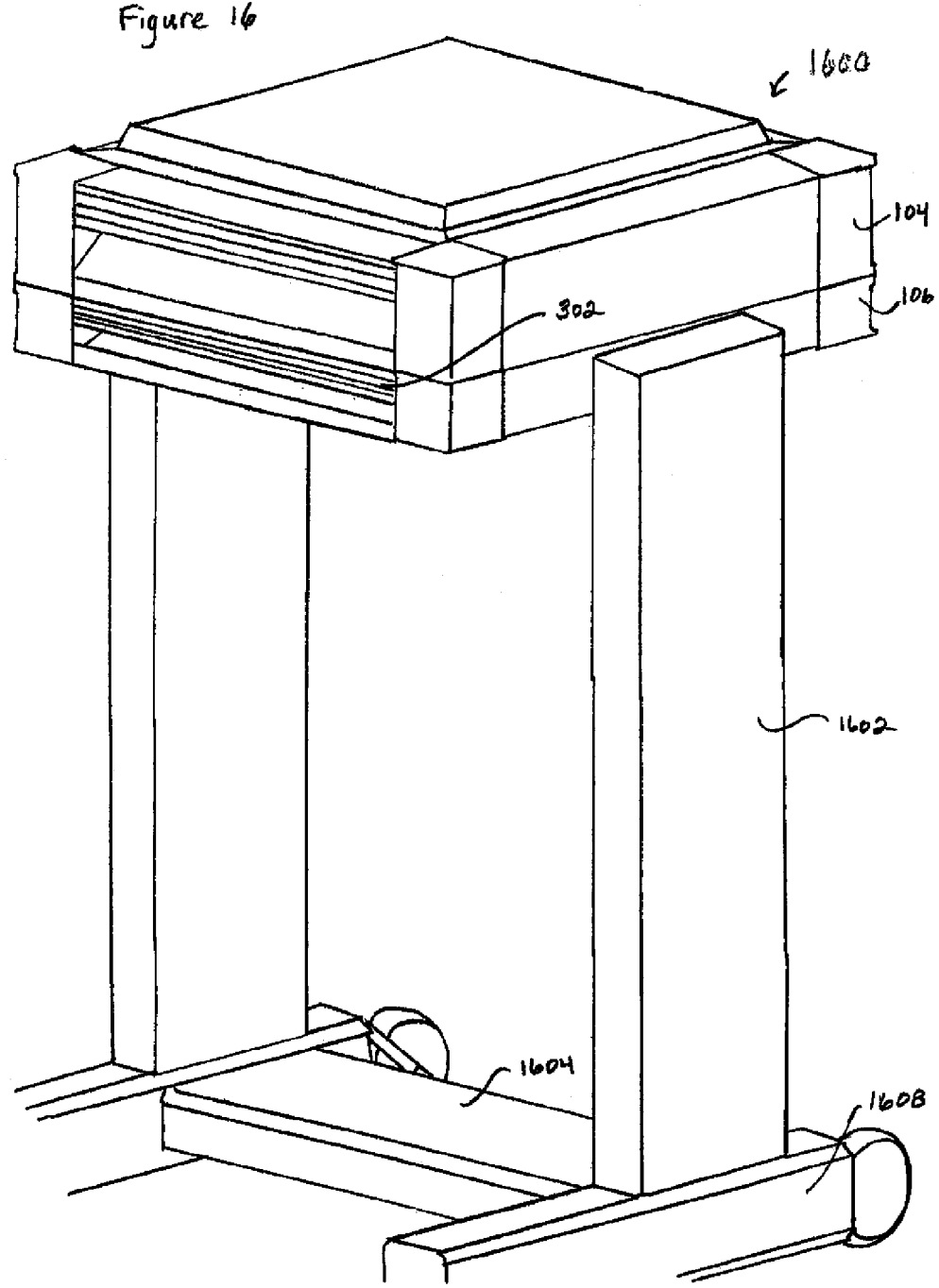
FIG. 16 is a perspective view of a stand for use with a personal affector machine, in accordance with an embodiment of the invention.

FIG. 16 is a perspective view of a stand for use with a personal affector machine, in accordance with an embodiment of the invention. In one embodiment, stand 1600 includes side members 1602, a cross member 1604, a reinforcing support 1606, and base members 1608.

In one embodiment, the side members 1602 are coupled at their distal ends (not labeled) to respective base members 1608, which extend from the side members 1602 approximately perpendicularly. The base members 1608 are coupled by the cross-member 1604 to extend the side members 1602 in an approximately parallel manner. The base members 1608 and the cross member 1604 provide a foundation to support the side members 1602 on a surface such as a floor. In one particular embodiment, the side members 1602 include wheels to roll the stand 1600 to various desired locations. The side members 1602 are bridged by the reinforcing support 1606 at an approximately midpoint position along their length and the side members 1602 are configurable to receive and support a personal affector machine, as it is described in various embodiments in reference to other figures.

In an alternative embodiment, the stand 1600 can be alternatively designed. For example, any of the components can be constructed from a single mold, can embody a different shape, or can include fewer or additional parts. In one particular embodiment, a single side member 1602 extends from a single base support and is configurable to receive a personal affector machine. In another embodiment, the stand 1600 is configurable to hang or be mounted on a side eliminating a need for a base support. In another embodiment, the stand 1600 is configurable to being combined with another stand. In a further embodiment, the stand 1600 components are constructed from a single metal extrusion to reduce manufacturing expenses. In an alternate embodiment, a movable light source is coupled to the stand 1600 and configurable to provide light to a personal affector machine. In a further embodiment, a personal computer is coupled to the stand 1600, such as by a swivel mount, to provide a user interface to send or receive signals to a proximate personal affector machine.

Figure 17:
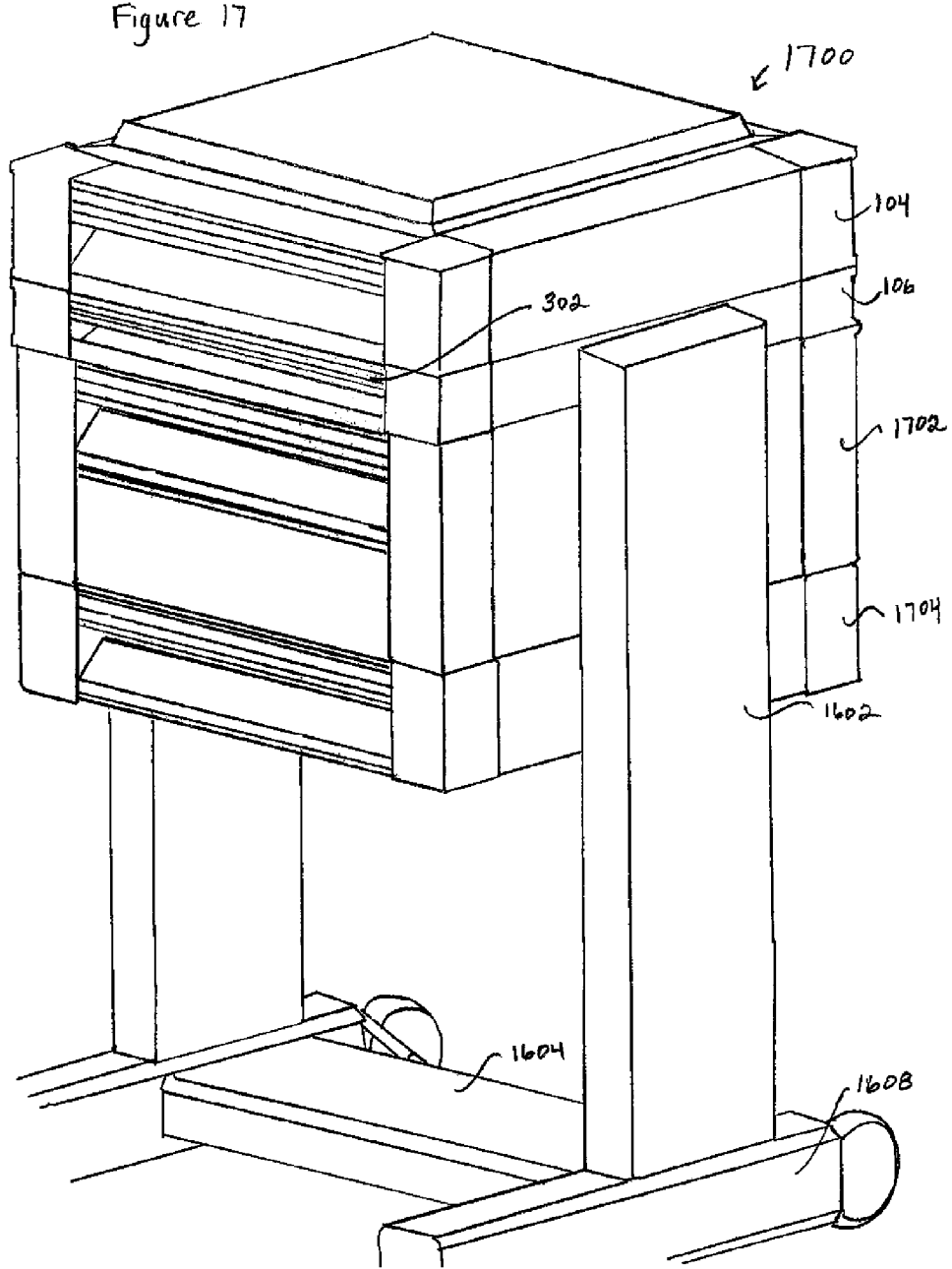
FIG. 17 is a perspective view of a stand for use with a personal affector machine, in accordance with an embodiment of the invention.

FIG. 17 is a perspective view of a stand for use with a personal affector machine, in accordance with an embodiment of the invention. In one embodiment, stand 1700 includes the side members 1602, the base members 1608, and the cross-member 1604 arranged as described in reference to FIG. 16.

In one embodiment, the stand 1700 is configurable to receive a personal affector machine, as describe in reference to other figures. The stand 1700 is further configurable receive a vacuum system 1702 or a cassette storage compartment 1704.

In one embodiment, the vacuum system 1702 includes a vacuum source (not visible) and a vacuum bag (not visible) for efficiently and effectively removing debris from the personal affector machine. In one particular embodiment, the tray 202 (not visible see FIG. 2) includes an aperture for channeling debris to the vacuum bag. The vacuum bag is removable and replaceable.

In one embodiment, the cassette storage compartment 1704 is configurable to removably receive a cassette 302. Accordingly, one cassette 302 can be inserted into the bottom frame 106 of the personal affector machine while another cassette 302 can be stored in the cassette storage compartment 1704 for later use.

In alternative embodiments, the vacuum system 1702 and the cassette storage compartment 1704 can be alternatively positioned, shaped, molded, or constructed. In other embodiments, the vacuum system 1702 can be integrated into the personal affector machine. In one particular embodiment, the vacuum system 1702 is merely a disposal bin that is configurable to receive debris from the personal affector machine. In other embodiments, additional cassette storage compartments 1704 can be disposed on the stand 1700. In yet another embodiment, the stand 1700 includes a system for automatically moving a cassette 302 or other material from the personal affector machine to the cassette storage compartment 1704 or elsewhere. In further embodiments, additional components can be added to the stand 1700, such as drawers for receiving materials, storing replacement parts, or organizing interchangeable parts for a personal affector machine.

Figure 18:
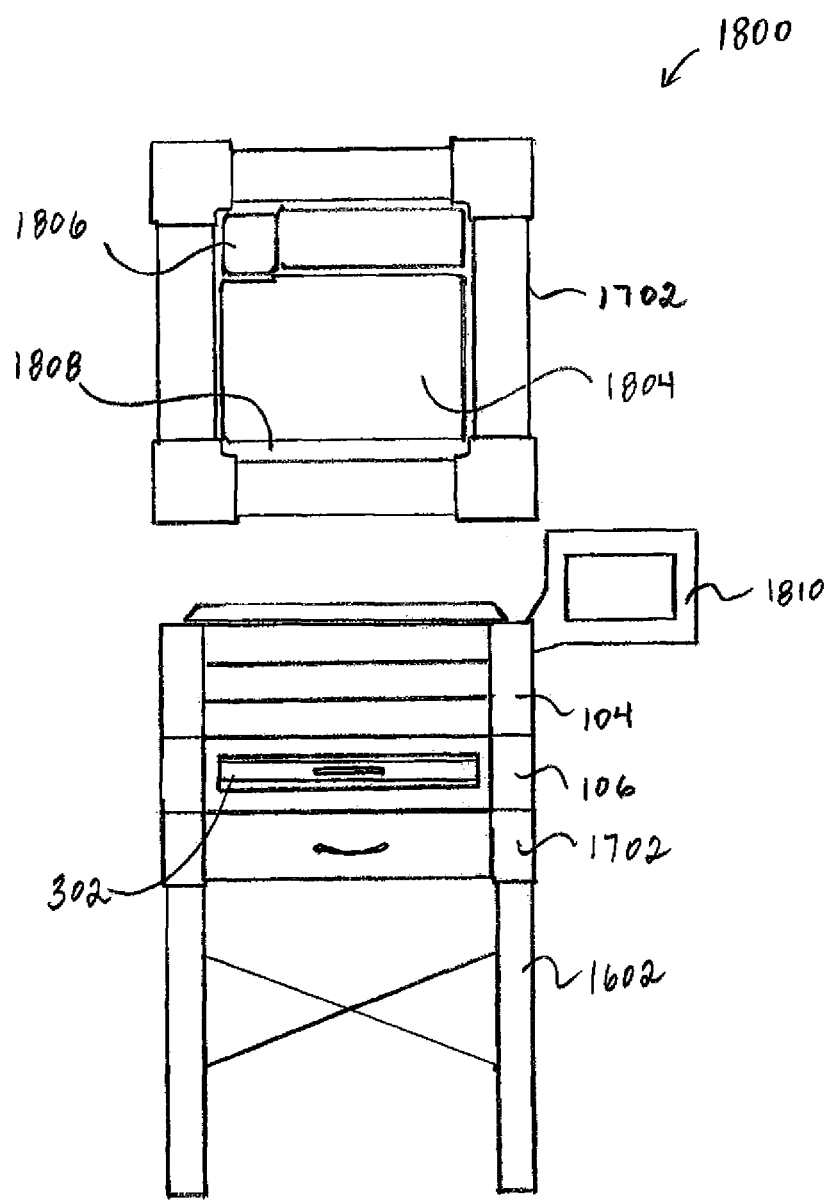
FIG. 18 is a perspective view of a vacuum system for use with a personal affector machine, in accordance with an embodiment of the invention.

FIG. 18 is a perspective view of a vacuum system for use with a personal affector machine, in accordance with an embodiment of the invention. In one embodiment, system 1800 includes the vacuum system 1702, a vacuum source 1806, a vacuum bag 1804, and a vacuum bag seal 1808. The vacuum system 1702 can be implemented in association with the top frame 104, the bottom frame 106, and the cassette 302 of the personal affector machine.

In one embodiment, the vacuum system 1702 includes the vacuum source 1806 and the vacuum bag 1804 disposed therein. The vacuum source 1806 is coupled to the vacuum bag 1804 using a mesh or another type of filter. The vacuum bag 1804 defines an opening for receiving debris therein and includes the vacuum bag seal 1808 that is configurable to removably cover the opening such as with ties, a zipper, adhesive, or some other method. The vacuum system 1702 is positionable proximate to the bottom frame 106 of a personal affector machine, such as below an aperture in the tray 202 (FIG. 2), and is configurable to suctionaly remove debris from the personal affector machine. When the vacuum bag 1804 is full, the vacuum bag seal 1808 seals the vacuum bag 1804 so that the vacuum bag 1804 can be cleanly discarded, emptied, or replaced. In certain embodiments, the vacuum system 1702 can be implemented in coordination with a stand, whereby the vacuum system 1702 is a drawer proximate to a personal affector machine. In other embodiments, the vacuum system is connected to a personal affector machine with a hose or other channel. In yet a further embodiment, any component of the vacuum system 1702 can be separated and placed with other components of a personal affector machine. In one particular embodiment, a computer display 1810 is disposed on a stand and operable to provide a user interface to control or implement software on a personal affector machine.

Figure 19:
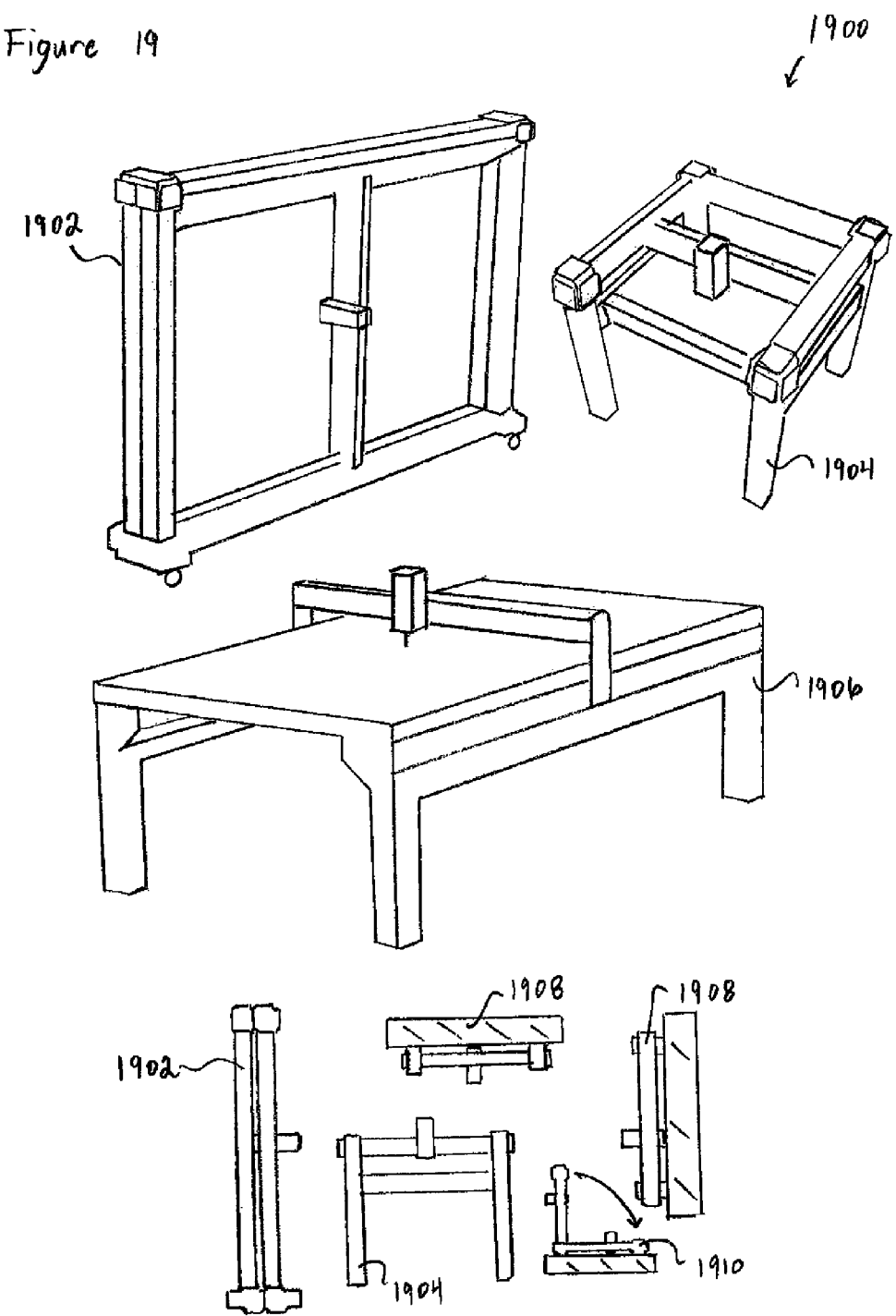
FIG. 19 is a perspective view of various mounting positions of a personal affector machine, in accordance with an embodiment of the invention.

FIG. 19 is a perspective view of various mounting positions of a personal affector machine, in accordance with an embodiment of the invention. In one embodiment, system 1900 includes a side mountable personal affector machine 1902, a stand mountable personal affector machine 1904, a table mountable personal affector machine 1906, a surface mountable personal affector machine 1908, and a swivelable surface mountable personal affector machine 1910.

In one embodiment, the side mountable personal affector machine 1902 includes a top frame and a bottom frame mounted on a side using wheels. The top frame includes perimeter members coupled together at their distal ends by corner connectors and a cross member that includes an affector head. The affector head is configurable to move along the cross member and perpendicularly to the cross member while the cross member is configurable to translate along a length of the top frame, thereby permitting the affector head to affect material in a plurality of dimensions. The bottom frame also includes perimeter members coupled together at their distal ends by corner connectors to define a cavity for receiving material therein, which can be affected by the affector head. The bottom frame can include a cassette for removably holding material or material can be fed through the bottom frame. Further, the top frame can be separated from the bottom frame and disposed adjacent to material, which may not otherwise be able to fit within the bottom frame such as a wall or flooring, to permit the affector head to affect the material. In certain embodiments, the side mountable personal affector machine 1902 is configurable to tilt or rotate at a plurality of angles to provide movement of the affector head about additional axis or to permit the affector head to affect oddly shaped surfaces.

In one embodiment, the stand mountable personal affector machine 1904 includes a top frame and a bottom frame mounted on a stand. The top frame includes perimeter members coupled together at their distal ends by corner connectors. A cross member extends between the perimeter members and includes an affector head disposed thereon. The affector head is configurable to move along a length defined by the cross member and perpendicularly to the cross member while the cross member is configurable to translate along a length of the top frame, thereby permitting the affector to affect material in a plurality of dimensions. The bottom frame includes perimeter members coupled together at their distal ends by corner connectors to define a cavity for receiving material therein, which can be affected by the affector head. The bottom frame can include a removable cassette for securing material for being affected or can permit material to be fed into the personal affector machine for being affected. The top frame can hingedly or slidably be separated from the bottom frame to permit material to be placed or removed from the bottom frame. Alternatively, the top frame can be lifted from the bottom frame and disposed adjacent to material to permit the affector head to affect material that otherwise would not fit within the bottom frame. Legs or other members of the stand can be collapsed for storage or transportation.

In one embodiment, the table mountable personal affector machine 1906 includes a cross member that extends between side members. The cross member includes an affector head configurable to move along a length of the cross member and perpendicularly to the cross member and the cross member is configurable to move along a length defined by the side members, thereby permitting the affector head to affect material in a plurality of dimensions. The side members can be fixedly or removably coupled to a surface, such as a table, wall, floor, ceiling, car body, trailer body, boat hull, desk, canvas, window, house, circuit board, pavement, fence, billboard, statute, or any other conceivable planar, non-planar, regular, or irregular surface. Material can be placed on the surface and secured to permit the affector head to affect the material or, alternatively, the affector head can affect the surface itself. The side members can be circular, spherical, or otherwise two or three dimensionally shaped to permit the affector head to affect material in additional dimensions.

In one embodiment, the surface mountable personal affector machine 1908 includes a top frame defined by perimeter members coupled together at their distal ends by corner connectors. A cross member extends between the perimeter members and is configurable to move along a length defined by the perimeter members. An affector head is coupled to the cross member and configurable to move along a length of the cross member and perpendicularly to the cross member, thereby permitting the affector head to affect a surface in a plurality of dimensions. The top frame can be fixedly or removably coupled to the surface, such as with suction cups, fasteners, magnets, clamps, or other securing devices, to permit the affector head to affect the surface. In one particular embodiment, the swivelable surface mountable personal affector machine 1910 includes a joint that permits the top frame to pivot from the surface to provide access to the surface or to affect another surface.

FIG. 20 is a perspective view of components for providing a customizable and extendable personal affector machine, in accordance with an embodiment of the invention. In one embodiment, components 2000 include members 2002, corner connectors 2004, and corner caps 2006. The plurality of members 2002 are substantially similar elongated beams, which may be curvilinear, having different lengths. Any of the members 2002 can be assembled together at their distal ends using the corner connectors 2004 to define various sized two and three dimensional shapes. The corner caps 2006 are optionally disposable on open portions of the corner connectors 2004 to provide a cover and an affector head (not illustrated) can be coupled to any of the members 2002. Motors (not illustrated), such as stepper motors, linear motors, or other motion systems, are disposable proximate to the affector head to permit the affector head to move relative to a member 2002 and between adjacent members 2002 to permit the adjacent members 2002 to move relative to one another. Accordingly, a customizable and extendable personal affector machine capable of affecting a material in a plurality of dimensions can be assembled easily and inexpensively using very few components. For example, any embodiments described herein, including top and bottom frames, a stand, a drawer, a vacuum system frame, or other similar system, can be constructed using the components 2000. Indeed, a personal affector machine of any shape can be constructed limited perhaps only by imagination.

This application also relates generally to linear motion, and more specifically, to systems and methods for converting rotational motion into linear motion using a modified rack and pinion system.

Figure 21:
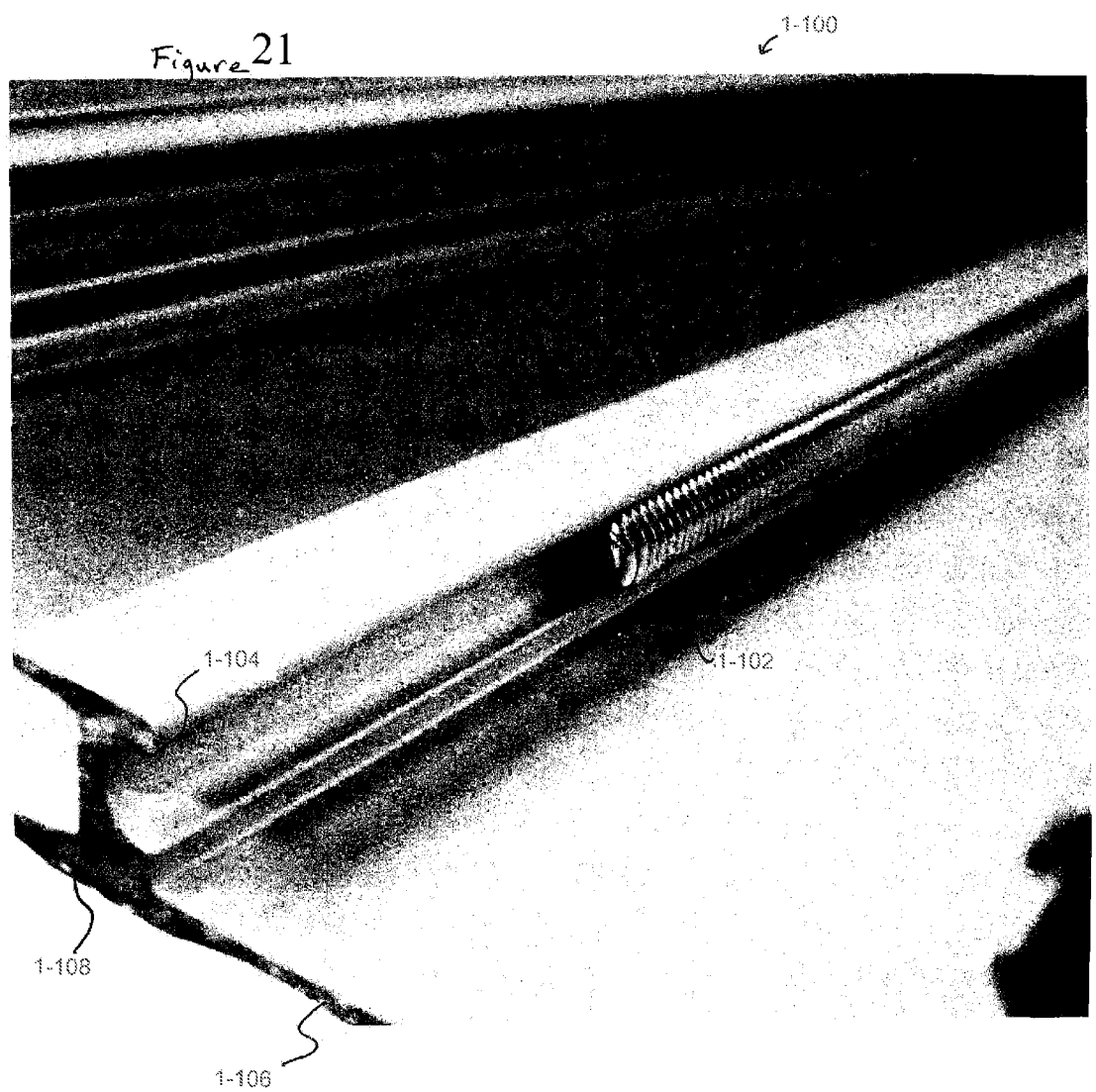
FIG. 21 is a perspective view of a cylindrical rack embedded in an elongated member, in accordance with an embodiment of the invention.

FIG. 21 is a perspective view of a cylindrical rack embedded in an elongated member, in accordance with an embodiment of the invention. In one embodiment, system 1-100 includes a cylindrical rack 1-102 and an elongated member 1-106.

In one embodiment, the elongated member 1-106 is a metal extrusion having a generally planar surface interrupted by a rack receiving channel 1-108 traversing a length of the elongated member 1-106. The rack receiving channel 1-108 includes a concave surface with a finger 1-104 that slightly extends towards an interior of the rack receiving channel 1-108 from a distal edge. The cylindrical rack 1-102 is a rolled rack, commonly referred to as a ready-rod thread, having teeth disposed thereon. The teeth are slightly angled as is common in rolled racks. The cylindrical rack 1-102 is pressed into the rack receiving channel 1-108 and retained therein by the finger 1-104.

In certain embodiments, the elongated member 1-106 is constructed from any material and has any shape. In further embodiments, the cylindrical rack is alternatively coupled to the elongated member 1-106, such as by welding, fasteners, or is merely threads embedded on the elongated member 1-106 itself. In yet a further embodiment, the rack receiving channel 1-108 is embedded within the elongated member 1-106 or alternatively disposed on the elongated member 1-106.

Figure 22:
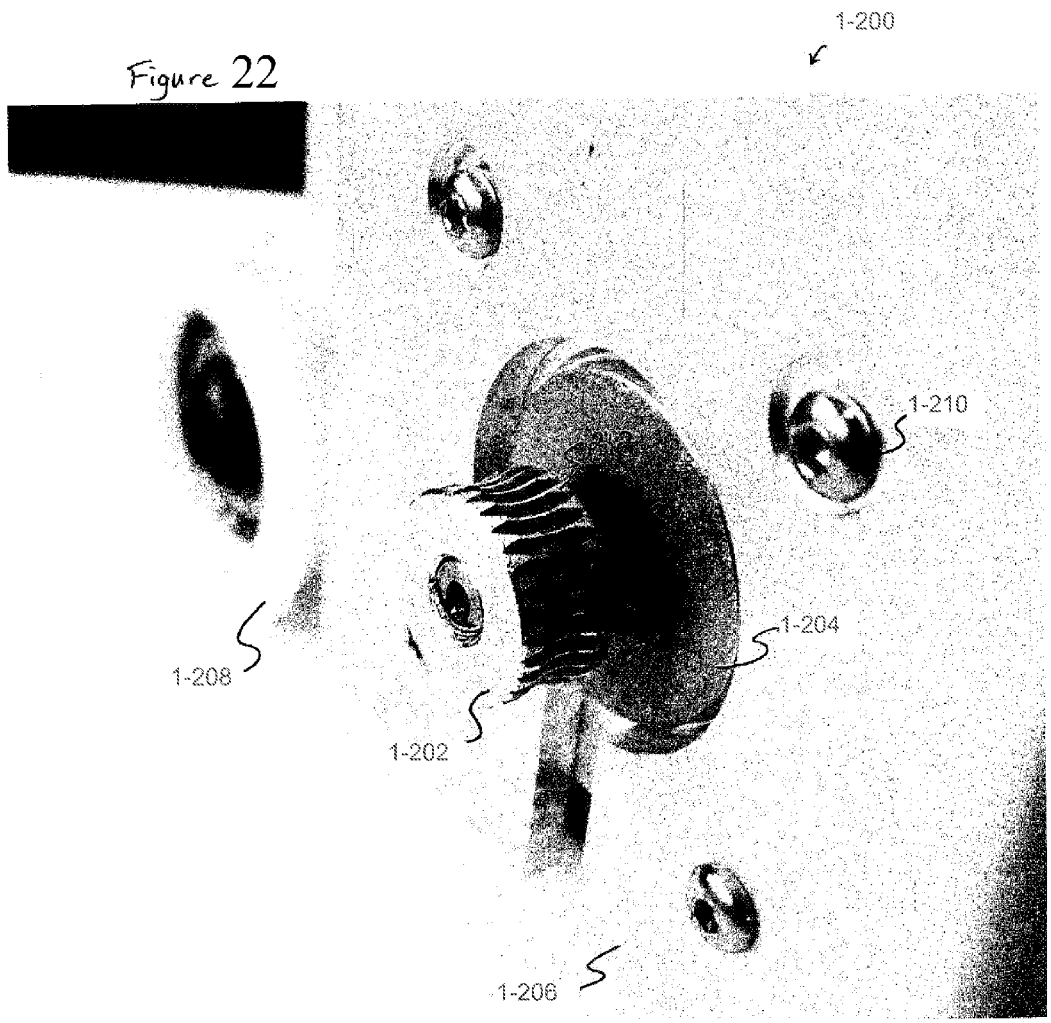
FIG. 22 is a perspective view of a pinion gear coupled to a stepper motor in a housing, in accordance with an embodiment of the invention.

FIG. 22 is a perspective view of a pinion gear coupled to a stepper motor in a housing, in accordance with an embodiment of the invention. In one embodiment, system 1-200 includes a pinion gear 1-202, a stepper motor 1-204, a housing 1-206, and a wheel 1-208.

In one embodiment, the pinion gear 1-202 is coupled to the stepper motor 1-204. The stepper motor 1-204 is coupled to the housing 1-206 by stepper motor mount fasteners 1-210. The wheel 1-208 is rotatably coupled to the housing 1-206.

In one embodiment, the pinion gear 1-202 has a rack engaging surface 1-212 having one, two, or more distinguishable features. First, the rack engaging surface 1-212 is slightly indented with raised lateral edges. The indentation with raised lateral edges increases a surface area of contact between the rack engaging surface 1-212 and the cylindrical rack 1-102 (FIG. 21). Second, the rack engaging surface 1-212 has teeth characterized by a reduced central surface area, thereby more effectively mating with the slightly angled teeth of the cylindrical rack 1-102.

In certain embodiments, the pinion gear 1-202 is constructed from any material and may be larger or small in diameter. Furthermore, the pinion gear 1-202 can have different indentation depths and widths. In another embodiment, the pinion gear 1-202 is not directly coupled to a motor, but rather is part of a gear system.

Figure 23:
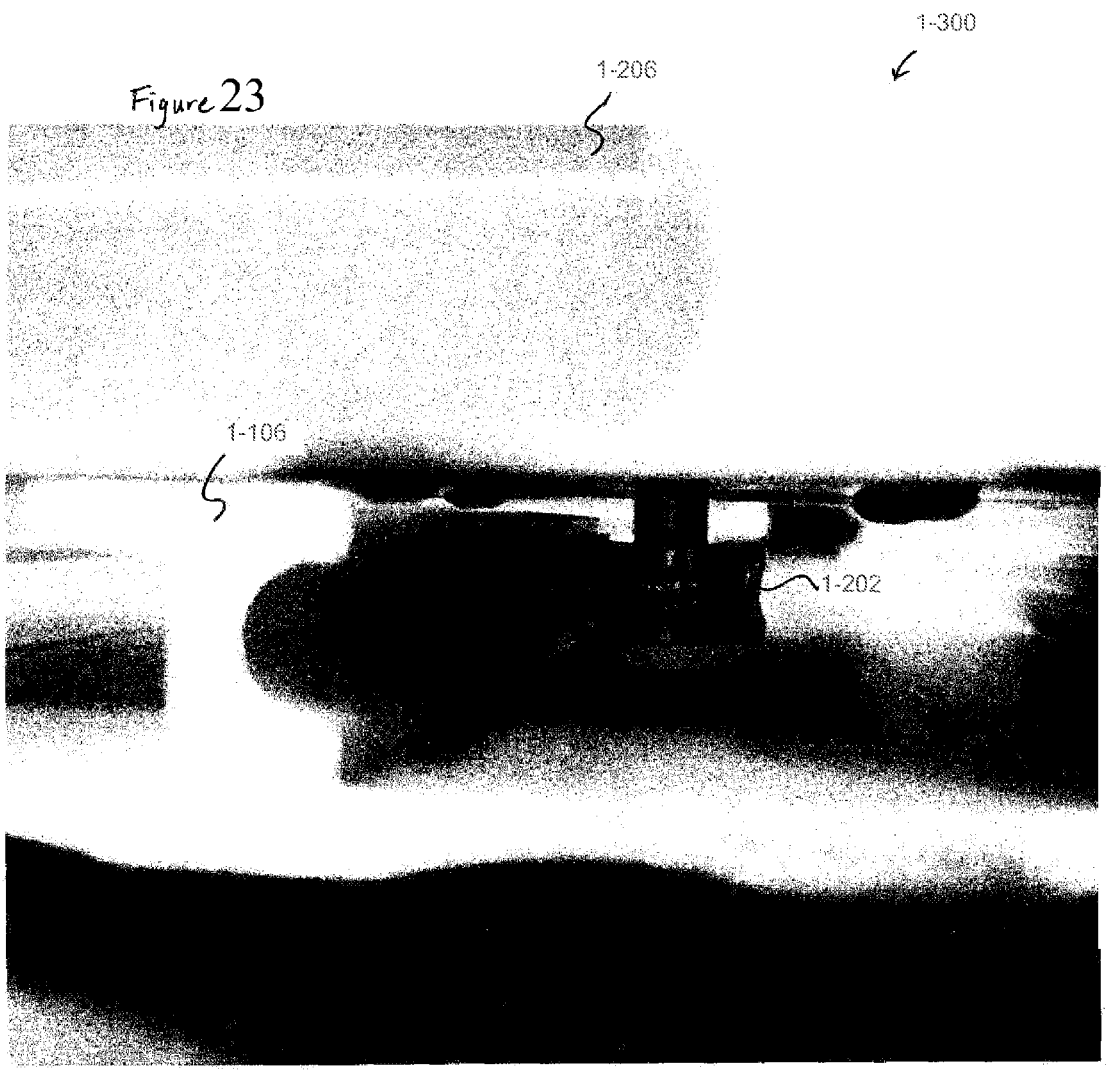
FIG. 23 is a perspective view of a pinion gear engaging a cylindrical rack, in accordance with an embodiment of the invention.

FIG. 23 is a perspective view of a pinion gear engaging a cylindrical rack, in accordance with an embodiment of the invention. In one embodiment system 1-300 includes the elongated member 1-106, the housing 1-206, the cylindrical rack 1-102, and the pinion gear 1-202.

In one embodiment, the cylindrical rack 1-102 is coupled to the elongated member 1-106 along its length as described in reference to FIG. 21. The pinion gear 1-202 is coupled to the stepper motor 1-204 (not visible) as described in reference to FIG. 22, which is fastened to the housing 1-206. As illustrated, the pinion gear 1-202 is mated with teeth of the cylindrical rack 1-102. Rotational motion of the pinion gear 1-202 is thereby converted to linear motion of the housing 1-206 relative to the elongated member 1-106.

Figure 24:
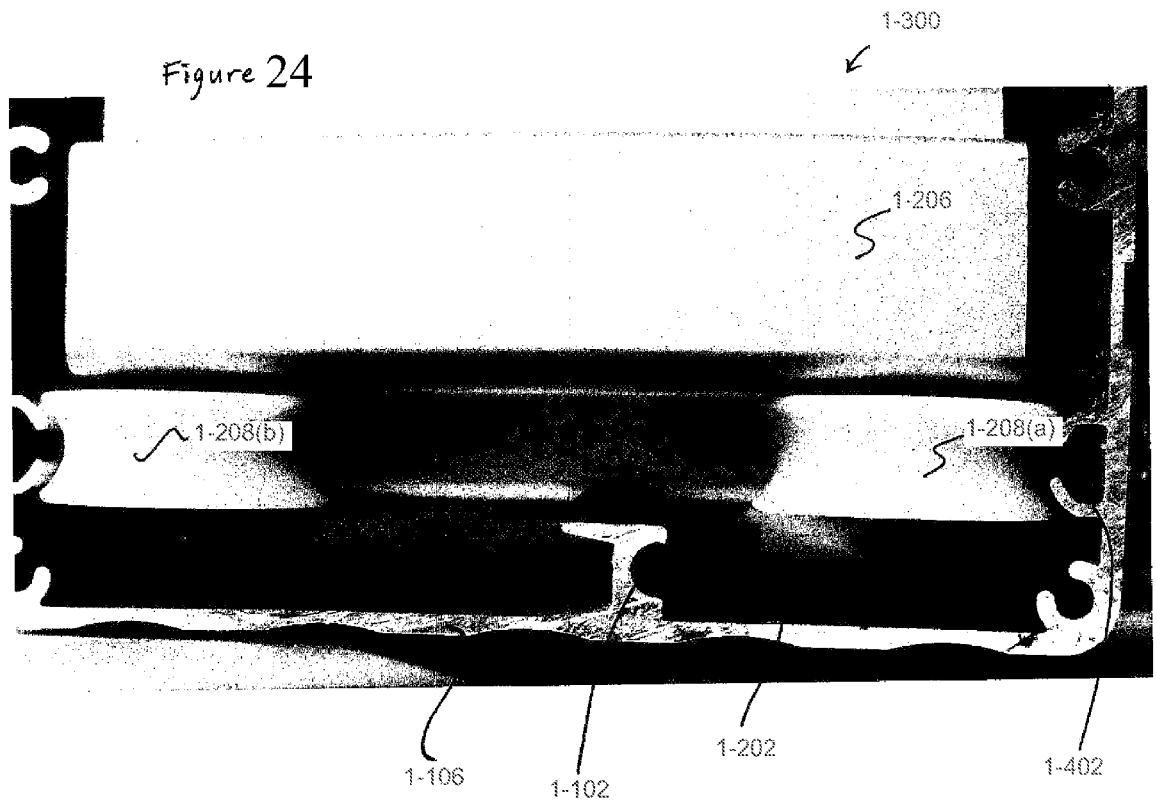
FIG. 24 is a perspective view of a housing rollably coupled to an elongated member, in accordance with an embodiment of the invention.

FIG. 24 is a perspective view of a housing rollably coupled to an elongated member, in accordance with an embodiment of the invention. In one embodiment, system 1-300 includes the elongated member 1-106, the cylindrical rack 1-102, the housing 1-206, the wheels 1-208, and the pinion gear 1-202.

In one embodiment, as described in reference to FIG. 23, the cylindrical rack 1-102 is coupled to the elongated member 1-106. The pinion gear 1-202 is coupled to the housing 1-206 via the stepper motor 1-204 (not visible). The housing 1-206 is rotationally coupled to wheels 1-208(*a*) and 1-208(*b*), which are configurable to roll along a wheel track 1-402. Accordingly, when the pinion gear 1-202 engages the cylindrical rack 1-102, rotational movement of the pinion gear 1-202 is converted to linear movement of the housing 1-206 relative to the cylindrical rack 1-102. The linear movement of the housing 1-206 is facilitated by the wheels 1-208 rolling on the wheel track 1-402.

In one particular embodiment, the pinion gear 1-202 and the cylindrical rack 1-102 are positionally reversed, whereby the pinion gear 1-202 is mounted on the elongated member 1-106 and the cylindrical rack 1-102 is mounted on the housing 1-206. In further embodiments, the cylindrical rack 1-102 is curvilinear. In yet another embodiment, the pinion gear 1-202 rack engaging surface 1-212 and the cylindrical rack 1-102 surface are swapped. In further embodiments, the housing 1-206 is any component, device, or material. In yet an alternate embodiment, the elongated member 1-106 is any component, device, or material. In some embodiments, the wheels 21-08 are rollably coupled to the elongated member 1-106, alternatively positioned, or fewer or greater in number. In one embodiment, a gear system is introduced between the cylindrical rack 1-102 and the pinion gear 1-202. In one particular embodiment, the cylindrical rack 1-102 and/or the wheels 1-208 are positioned on the outside of the elongated member 1-106 rather than on the inside as illustrated.

Figure 25:
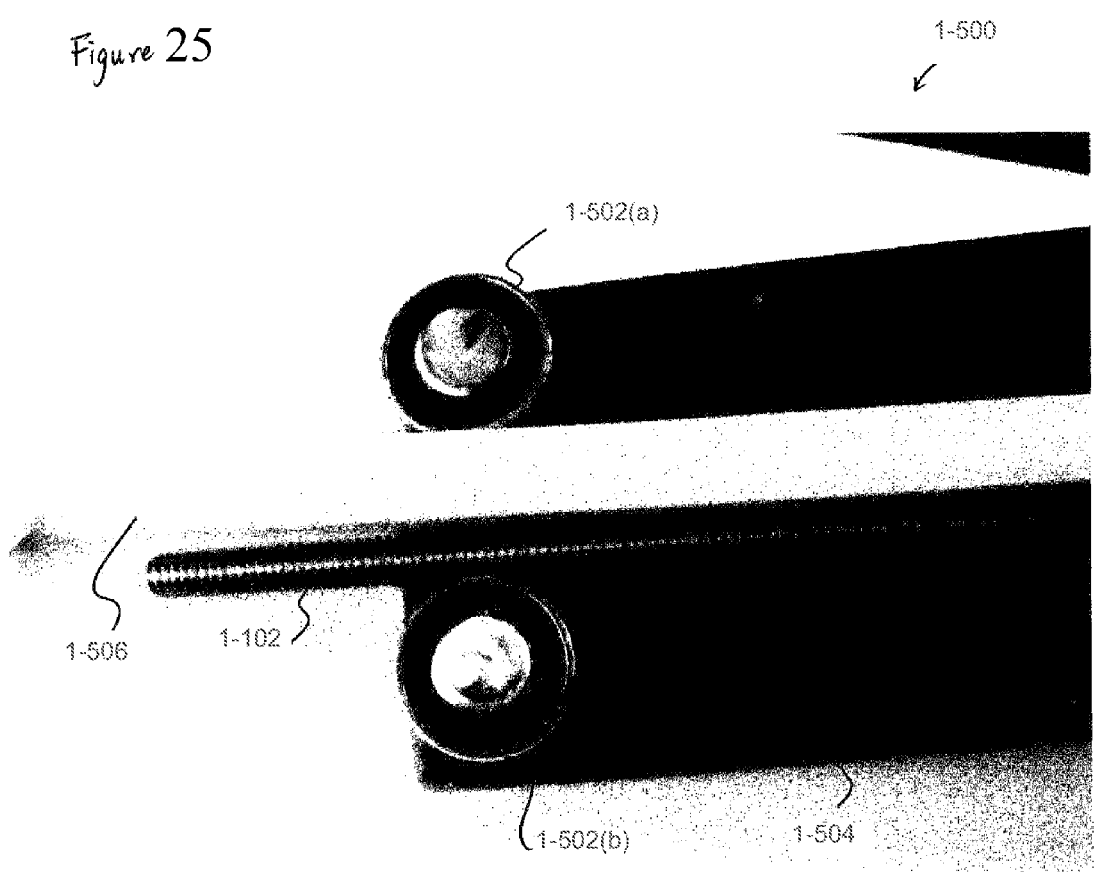
FIG. 25 is a perspective view a rack-elongated member zipper, in accordance with an embodiment of the invention.

FIG. 25 is a perspective view a rack-elongated member zipper, in accordance with an embodiment of the invention. In one embodiment, rack-elongated member zipper 1-500 includes at least two pinch rollers 1-502(*a*) and (*b*), a cylindrical rack 1-102, a compression member 1-506, and a guide plate 1-504.

In one embodiment, the guide plate 1-504 is an elongated inflexible plate with a generally planar surface constructed from metal, hard plastic, or other material having similar characteristics. The at least two pinch rollers 1-502(*a*) and (*b*)

are rollably coupled to a common surface of the guide plate 1-504 and are oppositely disposed on a distal end of the guide plate 1-504. On an opposite side and distal end of the guide plate 1-504 is a handle (not visible) that extends from the guide plate 1-504 to receive force, such as from a person or machine. The compression member 1-506 is an elongated member that is resilient and durable while also providing slight compression under force. In one particular embodiment, the compression member 1-506 is an ultra-high-molecular-weight (UHMW) plastic. The cylindrical rack 1-102 is a rolled rack, commonly referred to as a ready-rod thread, having teeth disposed thereon as described in reference to FIG. 21 supra. The rack-elongated member zipper 1-500 provides sufficient force to press the cylindrical rack 1-102 into the rack receiving channel 1-108 (FIG. 21) while simultaneously preserving structural integrity of the cylindrical rack 1-102 and the elongated member 1-106. To use the rack-elongated member zipper 1-500, the cylindrical rack 1-102 is placed on the elongated member 1-106 adjacent to the rack receiving channel 1-108. The compression member 1-506 is also placed on the elongated member 1-106 adjacent to the cylindrical rack 1-102 on an opposing side from the rack receiving channel 1-108. The rack-elongated member zipper 1-500 is placed on the elongated member 1-106 with the guide plate 1-504 covering the compression member 1-506, the cylindrical rack 1-102, and the rack receiving channel 1-108. The compression member 1-506, the cylindrical rack 1-102, and the rack receiving channel 1-108 are inserted between the at least two pinch rollers 1-502 and the rack-elongated member zipper 1-500 is forced along a length of the elongated member 1-106 using the handle. The force of the rack-elongated member zipper 1-500 along the elongated member 1-106 effectively pinch-presses the cylindrical rack 1-102 into the rack receiving channel 1-108 without significant structural harm to either.

In certain embodiments, the compression member 1-506 is omitted in favor of a similar composition on the at least two pinch rollers. In one particular embodiment, additional pinch rollers 1-502 are implemented on the rack-elongated member zipper 1-500. In yet further embodiments, the rack-elongated member zipper 1-500 can be used in alternative situations where at least two components need to be pressed together.

Figure 26:
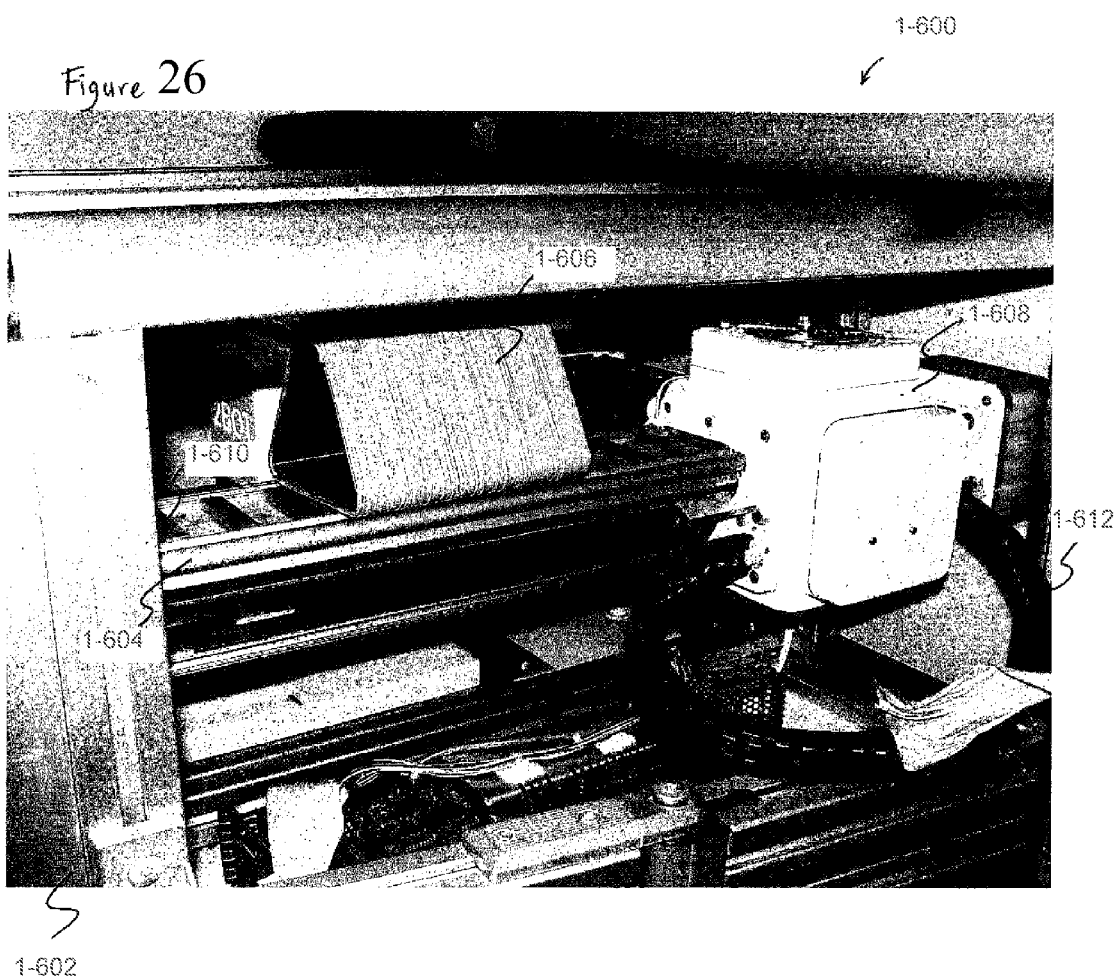
FIG. 26 is a perspective view of a housing mounted on a linear motor, in accordance with an embodiment of the invention.

FIG. 26 is a perspective view of a housing mounted on a linear motor, in accordance with an embodiment of the invention. The discussions in reference to FIGS. 21 to 25 supra have focused on establishing linear motion of a housing by converting rotational movement to linear movement through a modified rack and pinion system. However, many other systems can be used to create linear motion including traditional rack and pinion systems, nut and threaded rod systems, pneumatic and hydraulic compression systems, and linear motors.

This application also relates generally to a material cassette, and more specifically, to systems and methods for providing a material cassette for use with a personal affector machine.

Figure 27:
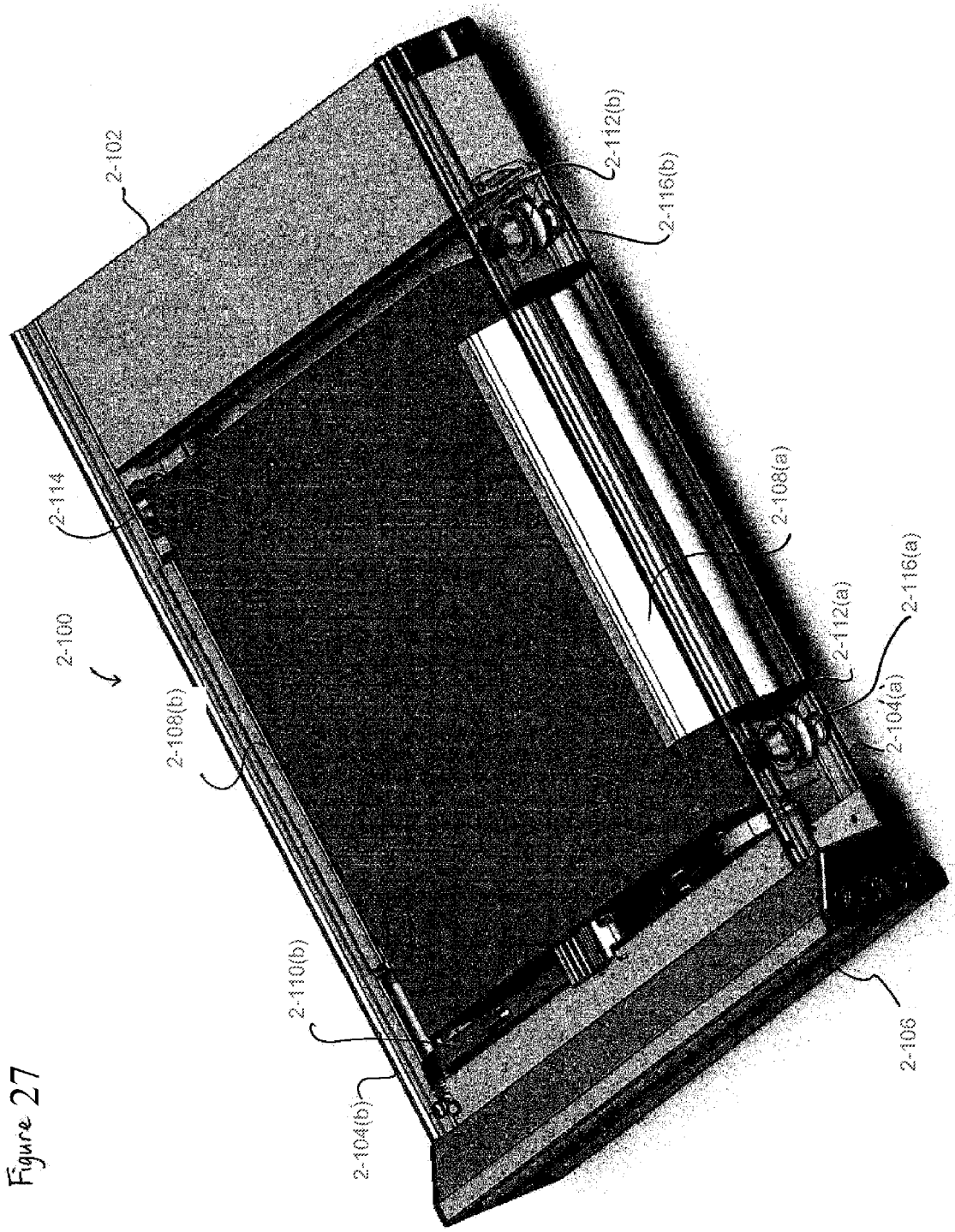
FIG. 27 is a top perspective view of a cassette coupled to a material, in accordance with an embodiment of the invention.

FIG. 27 is a top perspective view of a cassette coupled to a material, in accordance with an embodiment of the invention. In one embodiment, cassette 2-100 includes a rear frame panel 2-102, side frame panels 2-104, a front frame panel 2-106, clamps 2-108, clamping arms 2-110, rollers 2-112, and a material 2-114.

In one embodiment, the cassette 2-100 frame is defined by the rear frame panel 2-102, the side frame panels 2-104, and the front frame panel 2-106, which are coupled together at their distal edges. The clamps 2-108(*a*) and (*b*) are movably coupled to the side frame panels 2-104(*a*) and (*b*) respectively, and are configurable to receive the material 2-114 therein. The clamping arms 2-110(*a*) and (*b*) are coupled to the clamps 2-108(*a*) and (*b*) respectively, and are configurable to adjust a height of the clamps 2-108(*a*) and (*b*). The side frame panels 2-104 define apertures 2-116 at opposing ends of the side frame panels 2-104. The apertures 2-116 are configured to receive a perimeter portion of the rollers 2-112, which are rollably coupled to an interior of the side frame panels 2-104 and are configured to receive guide channels (not shown). Accordingly, the material 2-114 is insertable into the cassette 2-100 between the front frame panel 2-106 and the rear frame panel 2-102 and within the clamps 2-108. The clamping arms 2-110 are adjustable to provide sufficient height of the clamps 2-108 to receive the material 2-114. Once the material 2-114 is inserted within the clamps 2-108, the clamping arms 2-110 are adjusted to reduce a height of the clamps 2-108 to firmly grip the material 2-114. The cassette 2-100 containing the material 2-114 can be slidably inserted into a personal affector machine (not illustrated).

In one particular embodiment, the rear frame panel 2-102, the side frame panels 2-104, and the front frame panel 2-106 are partially or completely formed from a single mold. In one embodiment, the frame panels are constructed from a different material such as plastic, wood, or other composite material. In yet a further embodiment, the frame panels are a different shape such as curved, oval, or rounded. In an alternate embodiment, the frame is a different shape, such as rounded, spherical, or cubicle. In yet another embodiment, the clamps 2-108 are differently positioned, such as on the front frame panel 2-106 and the rear frame panel 2-102. In an alternate embodiment, the clamps 2-108 are replaced by mounts that push into or press against the material 2-114. In a further embodiment, the clamps 2-108 are replaced with a platform for the material 2-114 to rest against or a suspension system for the material 2-114 to hang from. In yet another embodiment, the clamps 2-108 are rotatable about one or more axis to permit the material 2-114 to rotate. In yet a further embodiment, the clamps 2-108 are slidable to permit the material 2-114 to spin in approximately a same plane as the frame. In a further embodiment, the rollers 2-112 are omitted, differently positioned on the cassette 2-100, or fewer or greater in number.

Figure 28:
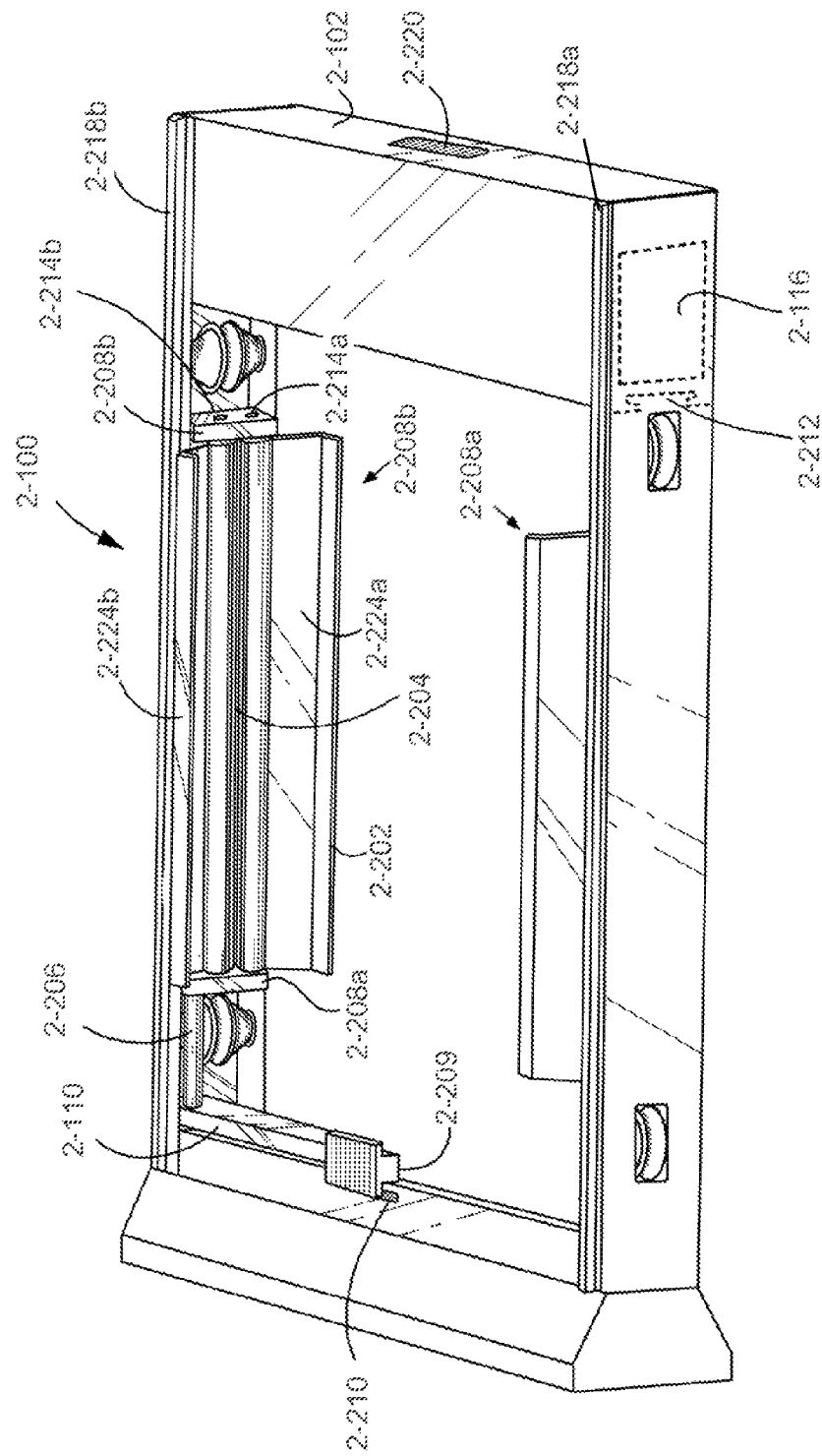
FIG. 28 is a top perspective view of a cassette without a material, in accordance with an embodiment of the invention.

FIG. 28 is a top perspective view of a cassette without a material, in accordance with an embodiment of the invention. In one embodiment, the cassette 2-100 includes the clamps 2-108, clamp bosses 2-208, spring axles 2-206, clamping arms 2-110, an input/output 2-220, rails 2-218, an attachment channel 2-212, and a chamber 2-216.

In one embodiment, the clamps 2-108 comprise a bottom clamp 2-224(*a*) and a top clamp 2-224(*b*), each of which is substantially similar. The bottom clamp 2-224(*a*) includes teeth 2-202 along one edge and gears 2-204 along an opposing edge. Similarly, the top clamp 2-224(*b*) includes teeth 2-202 along one edge and gears 2-204 along an opposing edge. The gears 2-204 of the bottom clamp 2-224(*a*) and the top clamp 2-224(*b*) are intermeshed and configured to transmit motion between the top clamp 2-224(*b*) and the bottom clamp 2-224(*a*) in a manner such that the bottom clamp 2-224(*a*) and the top clamp 2-224(*b*) are self-centering. The teeth 2-202 of the bottom clamp 2-224(*a*) and the top clamp 2-224(*b*) are configured to pinch a material (not illustrated) from opposing sides.

In one embodiment, the bottom clamp 2-224(*a*) is rotationally mounted on opposing ends with its clamp axle 2-214(*a*) extending into clamp bosses 2-208(*a*) and (*b*). Similarly, the top clamp 2-224 is rotationally mounted on opposing ends with its clamp axle 2-214(*b*) extending into clamp bosses 2-208(*a*) and (*b*). On one end of the top clamp 2-224(*b*), the clamp axle 2-214(*b*) is coupled to the spring axle 2-206, which is coupled on its opposing end to the clamping arm 2-110. Accordingly, the clamping arm 2-110 is configurable to serve as a lever to rotate the spring axle 2-206, whereby the spring axle 2-206 transmits its rotational motion to the top clamp 2-224(*b*) and the intermeshing gears 2-204 of the top clamp 2-224(*b*) and bottom clamp 2-224(*a*) transfer the rotational motion to the bottom clamp 2-224(*a*). The clamping arm 2-110 has a hook 2-209 that is configurable to removably couple to a hook receiver 2-210 to secure the clamping arm 2-110 in a desired position.

In one embodiment, the rear frame panel 2-102 includes the input/output 2-220, which serves to provide power, electrical signals, solid, gas, plasma, or liquid to the cassette 2-100. The rear frame panel 2-102 defines a chamber 2-216, which is configurable to receiving and/or containing a motor, a network node, a computer processor, gas, liquids, solids, valves, or other component, material, or object. The attachment channel 2-212 is a groove with flanges that extends a length of the rear frame panel 2-102. The attachment channel is used in certain embodiments to removably receive extensions for use with the cassette 2-100, such as a tube for providing compressed air, a vacuum source, electrical wiring, or other similar device.

In one particular embodiment, the clamps 2-108 sense a material contained therein and automatically adjust to grip the material. In another embodiment, the clamps 2-108 are electrically or electromechanically controlled. In yet a further embodiment, the clamps 2-108 employ a different mechanical mechanism.

Figure 29:
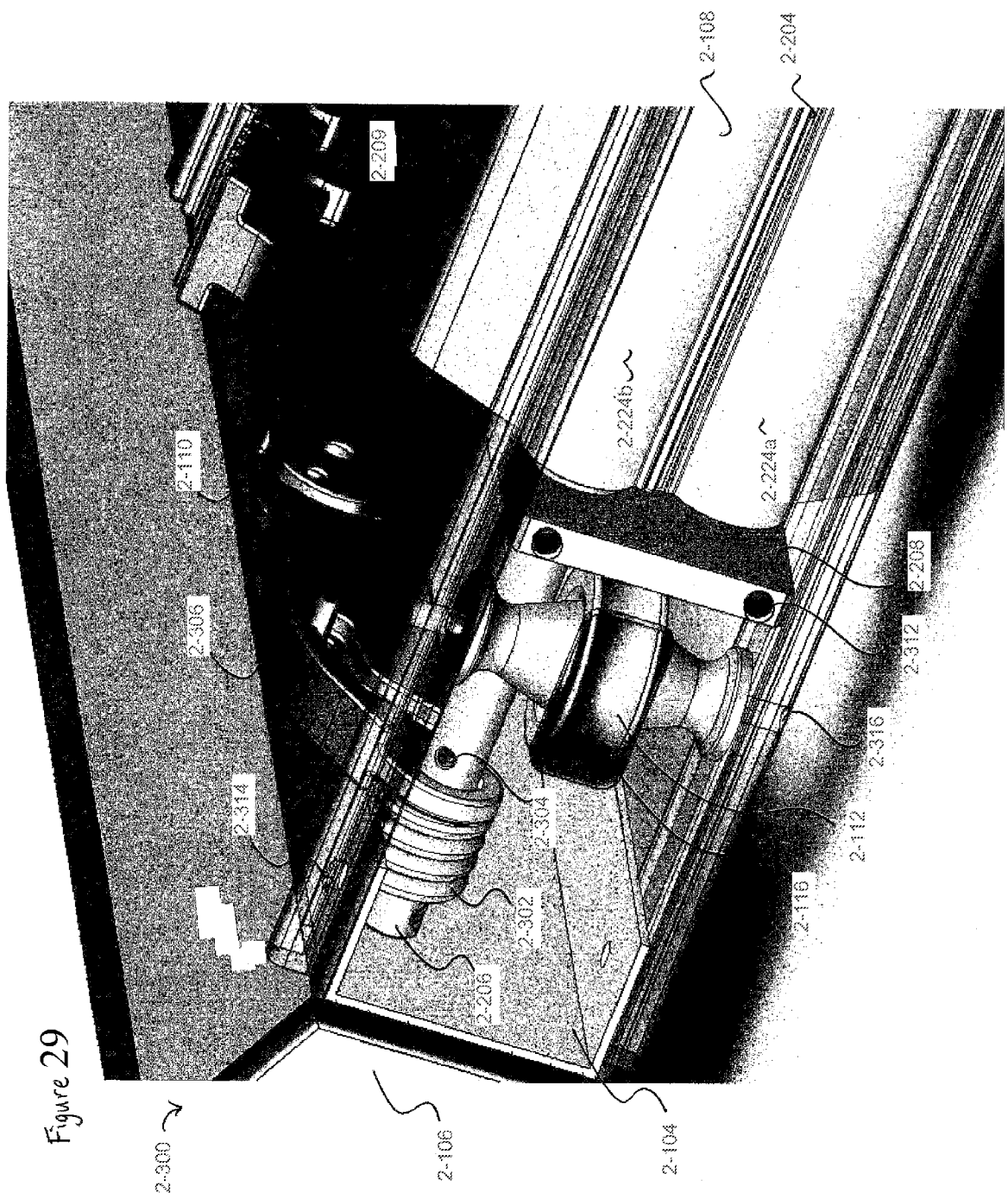
FIG. 29 is an enlarged perspective view of a system for removably coupling to a material, in accordance with an embodiment of the invention.

FIG. 29 is an enlarged perspective view of a system for removably coupling to a material, in accordance with an embodiment of the invention. In one embodiment, system 2-300 includes the side frame panel 2-104, the front frame panel 2-106, the hook 2-209, a handle lever 2-308, a spring handle 2-306, a keeper boss 2-314, the spring axle 2-206, a clamp tension spring 2-302, a keeper pin 2-304, the clamp boss 2-208, a screw boss 2-312, the clamp 2-108, the gears 2-204, the roller 2-112, and a roller spring pin boss 2-316.

In one embodiment, the front frame panel 2-106 and the side frame panel 2-104 are coupled together at their distal edges. The side frame panel 2-104 extends along a length of the cassette 2-100 (FIG. 27). The clamp boss 2-208 is positioned on an interior of the side frame panel 2-104 and is secured to the side frame panel 2-104 using the screw boss 2-312. The clamp boss 2-208 extends approximately perpendicularly from the side frame panel 2-104. Another clamp boss 2-208 is similarly positioned on the opposing end of the clamp 2-108 (FIG. 28).

The clamp 2-108 includes the bottom clamp 2-224(*a*) and the top clamp 2-224(*b*) which are engaged along a surface having the intermeshed gears 2-204. The intermeshed gears 2-204 transmit rotational motion between the bottom clamp 2-224(*a*) and the top clamp 2-224(*b*) in a manner such that the bottom clamp 2-224(*a*) and the top clamp 2-224(*b*) are self-centering. The bottom clamp 2-224(*a*) has a clamp axle 2-214(*a*) (not visible) that extends into the clamp boss 2-208, thereby providing rotational movement of the bottom clamp 2-224(*a*) about its clamp axle 2-214(*a*). The top clamp 2-224(*b*) has a clamp axle 2-214(*b*) (not visible) that similarly extends into the clamp boss 2-208, thereby providing rotational movement of the top clamp 2-224(*b*) about its clamp axle 2-214(*b*). The clamp axle 2-214(*b*) is further coupled to the spring axle 2-206, which serves to extend the clamp axle 2-214(*b*) for receiving the clamping arm 2-110. The clamp tension spring 2-302 and the spring handle 2-306 circumscribe the spring axle 2-206 and are flanked by the keeper pin 2-304 on one end and the keeper boss 2-314 on the other end. The clamp tension spring 2-302 is secured against rotation about the spring axle 2-206 with a first end of the clamp tension spring 2-302 being inserted into the keeper boss 2-314. The second end of the clamp tension spring 2-302 is inserted into the spring handle 2-306, which is coupled to the handle lever 2-308. Together, the spring handle 2-306 and the handle lever 2-308 define the clamping arm 2-110, which serves as a lever. The hook 2-209 is disposed on the handle lever 2-308 and is configurable to removably secure the clamping arm 2-110 to the front frame panel 2-106. Accordingly, the clamping arm 2-110 is configurable to serve as a lever to rotate the spring axle 2-206, whereby the spring axle 2-206 transmits its rotational motion to the top clamp 2-224(*b*) and the intermeshing gears 2-204 of the top clamp 2-224(*b*) and bottom clamp 2-224(*a*) transfer the rotational motion to the bottom clamp 2-224(*a*). The clamp tension spring 2-302 facilitates a secure grip of the clamp 2-108 with regard to various size materials (not illustrated). The side frame panel 2-104 defines an aperture 2-116, which is configured to receive a perimeter portion of the roller 2-112. The roller 2-112 is rollably coupled to an interior of the side frame panel 2-104 using the roller spring pin boss 2-316 and is configured to rollably receive guide channels (not illustrated).

Figure 30:
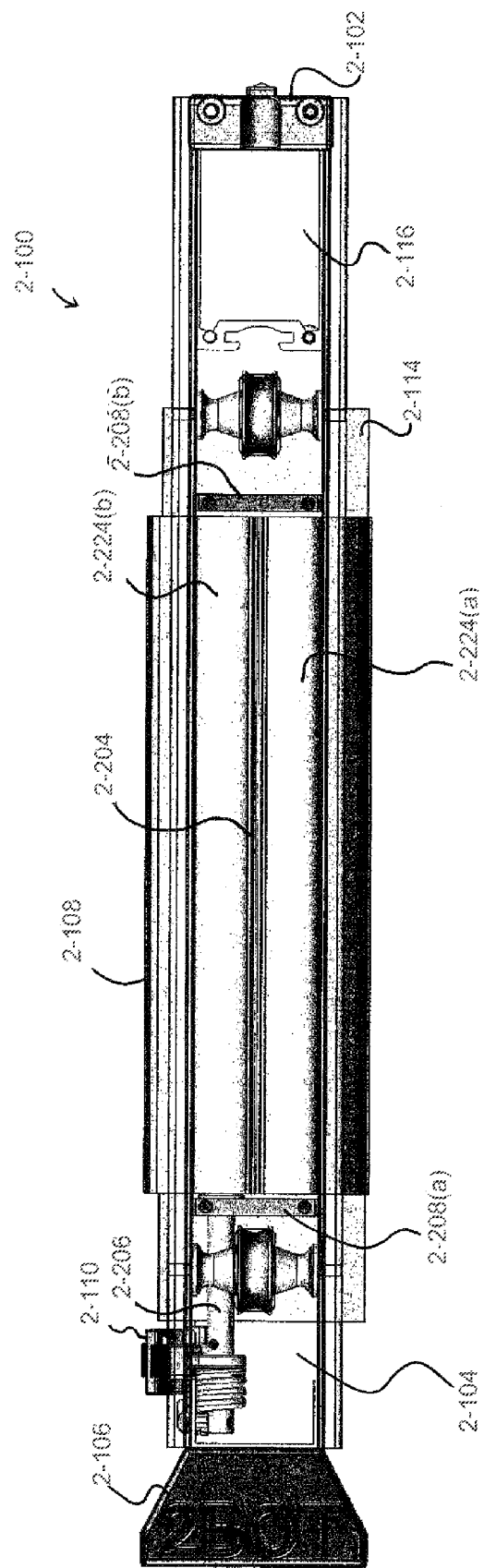
FIG. 30 is a side elevational view of a cassette coupled to a material, in accordance with an embodiment of the invention.

FIG. 30 is a side elevational view of a cassette coupled to a material, in accordance with an embodiment of the invention. In one embodiment, the cassette 2-100 includes a front frame panel 2-106, side frame panels 2-104, and a rear frame panel 2-102.

In one embodiment, the panels are coupled together at their distal edges to define a frame of the cassette 2-100. The clamp 2-108 is comprised of the bottom clamp 2-224(*a*) and the top clamp 2-224(*b*), which are rotationally coupled to the clamp boss 2-208(*a*) and (*b*) on opposing ends. The clamping arm 2-110 provides a lever to rotate the spring axle 2-206, which transmits the rotational motion to the top clamp 2-224(*b*). The top clamp 2-224(*b*) transmits the rotational motion to the bottom clamp 2-224(*a*) through the intermeshed gears 2-204 between the top clamp 2-224(*b*) and the bottom clamp 2-224(*a*) in such a manner that the clamp 2-108 is self centering. Accordingly, the clamp is configurable to securely grip the material 2-114 disposed therein.

Figure 31:
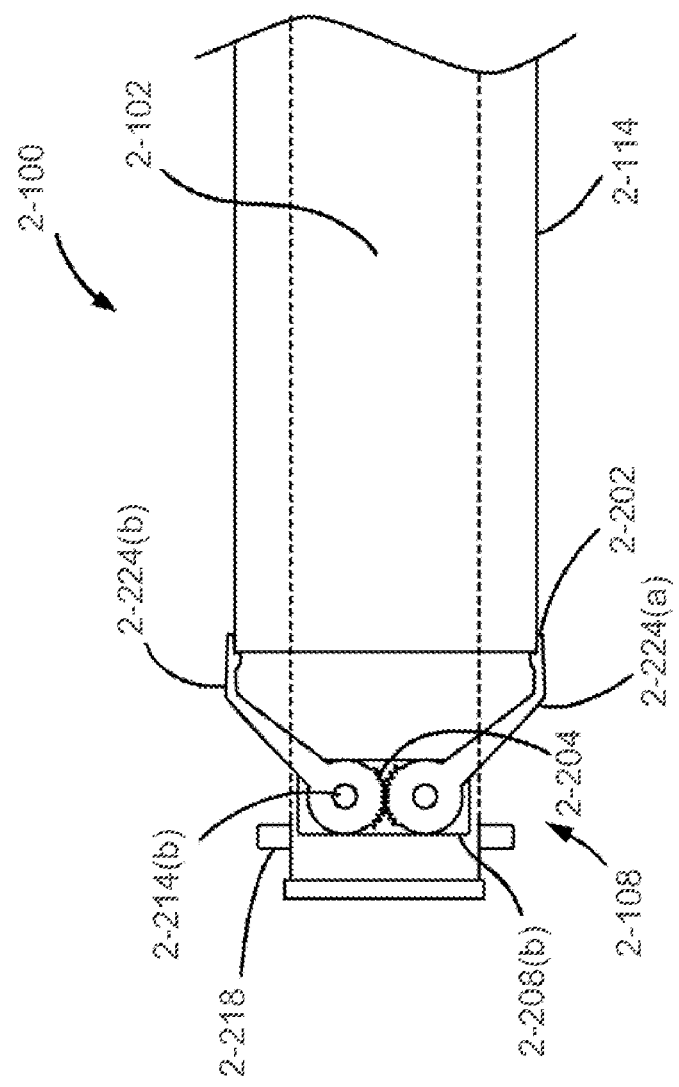
FIG. 31 is a rear elevational view of a cassette coupled to a material, in accordance with an embodiment of the invention.

FIG. 31 is a rear elevational view of a cassette coupled to a material, in accordance with an embodiment of the invention. In one embodiment, the cassette 2-100 includes the rear frame panel 2-102, the clamps 2-108, the teeth 2-202, and the material 2-114.

In one embodiment, the clamps 2-108 are configurable to securely grip the material 2-114 in such a manner that the clamps 2-108 are self-centering. On the distal ends of the clamps 2-108 are teeth 2-202 that are comprised of a plurality of ridges extending a length of the clamps 2-108. The ridges are positioned in such a fashion to provide reduced surface area for increased pressure for multiple sizes of materials. When a material is large and the clamps 2-108 are extended to a maximum width, internal ridges of the teeth 2-202 are configurable to engage the material. When a material is thin, such as a width of a sheet of paper, and the clamps 2-108 are collapsed to a minimum width, external ridges of the teeth 2-202 are configurable to engage the material.

In one embodiment, the input/output 2-220 (FIG. 28) provides power, electrical signals, solid, gas, liquid, or plasma to the cassette 2-100. In another embodiment, the input/output 2-220 indicates whether the cassette 2-100 is in an upright or upside-down position.

Figure 32:
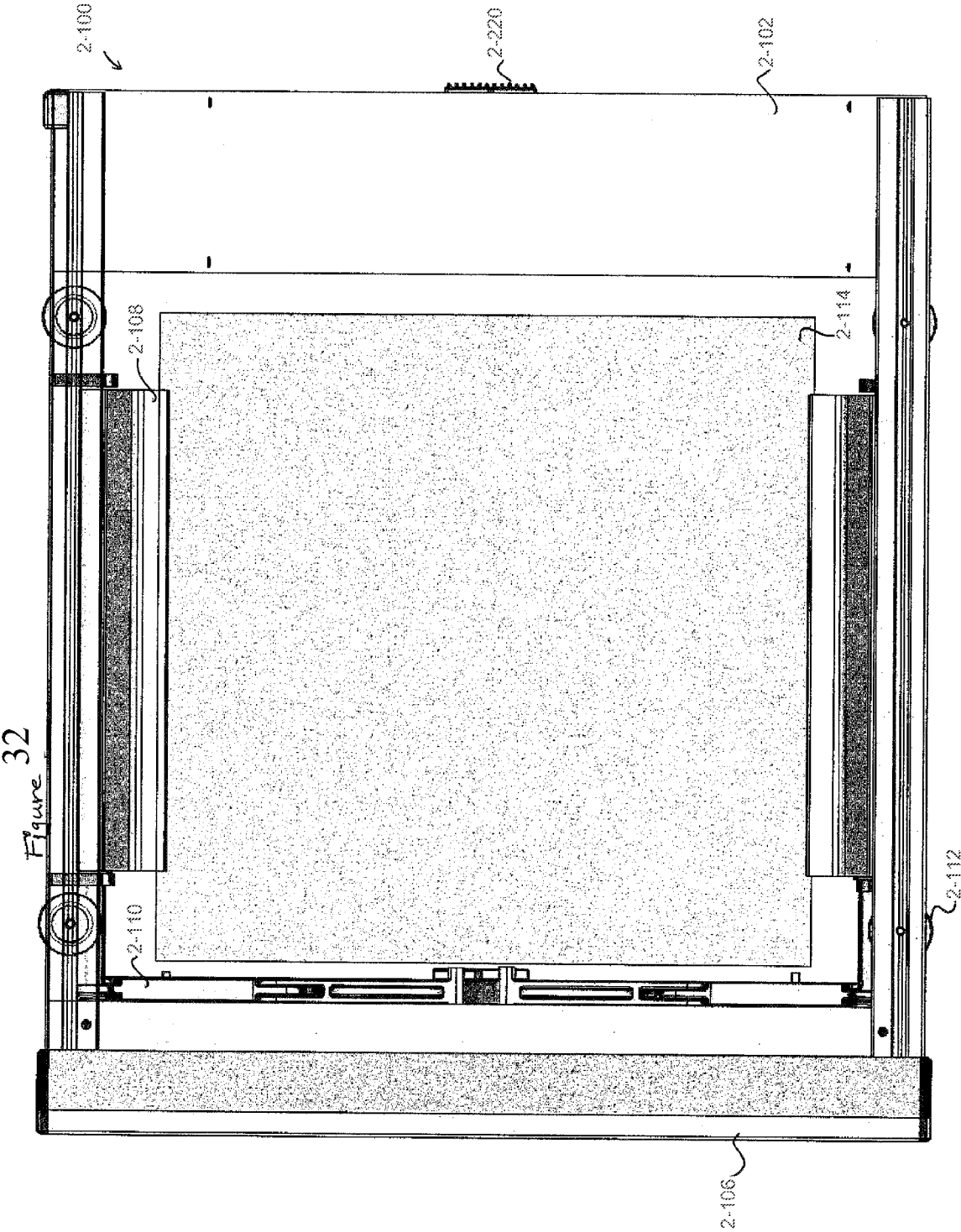
FIG. 32 is a bottom plan view of a cassette coupled to a material, in accordance with an embodiment of the invention.

FIG. 32 is a bottom plan view of a cassette coupled to a material, in accordance with an embodiment of the invention. In one embodiment, the cassette 2-100 is configurable to grip the material 2-114 in a manner whereby the material 2-114 is accessible from multiple sides or angles. As illustrated, the material 2-114 is unobstructedly accessible from a bottom side as well as a top side of the cassette 2-100. In this regard, the material 2-114 can be affected from multiple sides or angles without removing, re-positioning, re-registering, or re-securing the material 2-114 in relation to the cassette 2-100.

In one particular embodiment, the cassette 2-100 is configured to be removably inserted into a personal affector machine. Thus, the cassette 2-100 can be inserted into and removed from the personal affector machine right-side-up or upside-down, thereby permitting the personal affector machine to affect the material 2-114 from multiple sides or angles without repositioning or re-registration the material 2-114 in relation to the cassette 2-100. In yet another embodiment, the cassette 2-100 is accessible from fewer or greater angles, such as from a top or from a side.

Figure 33:
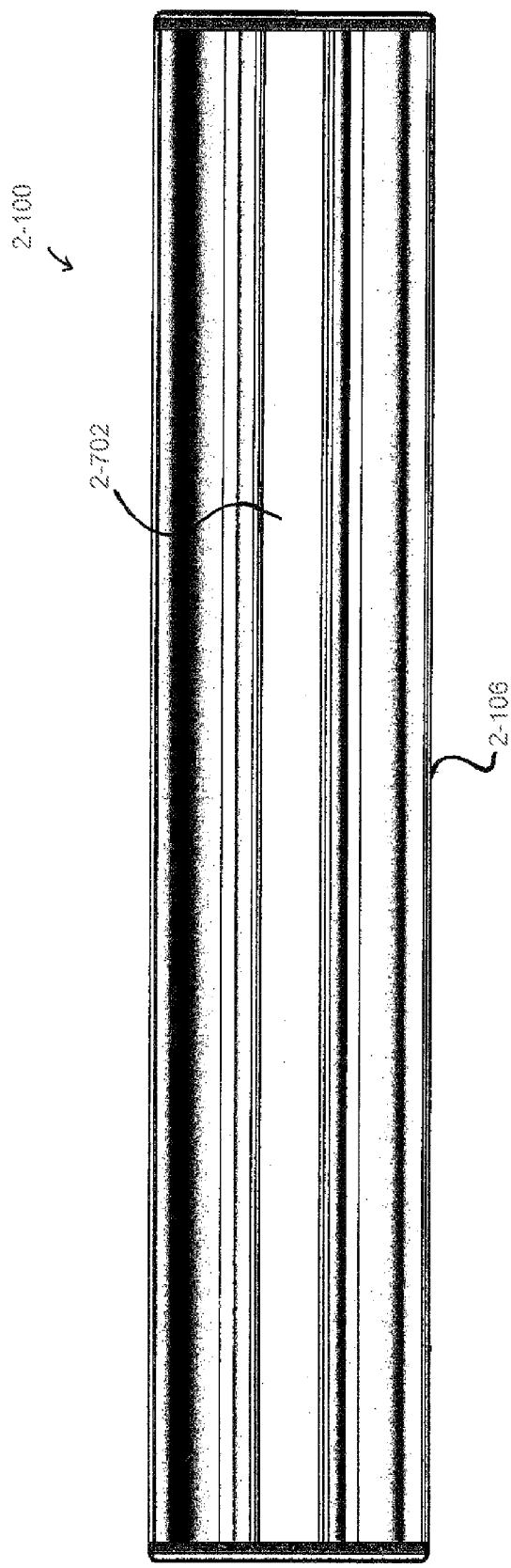
FIG. 33 is a front elevational view of a cassette, in accordance with an embodiment of the invention.

FIG. 33 is a front elevational view of a cassette, in accordance with an embodiment of the invention. In one embodiment, the cassette 2-100 includes a front frame panel 2-106 with a label receiver 2-702 disposed therein. The label receiver 2-702 is a channel having flanges that extend a length of the front frame panel 2-106. Accordingly, a label can be placed in the label receiver 2-702 to identify a material (not illustrated) contained within the cassette 2-100. In a further embodiment, a display or indicator lights are positionable on the label receiver 2-702 or elsewhere.

Figure 34:
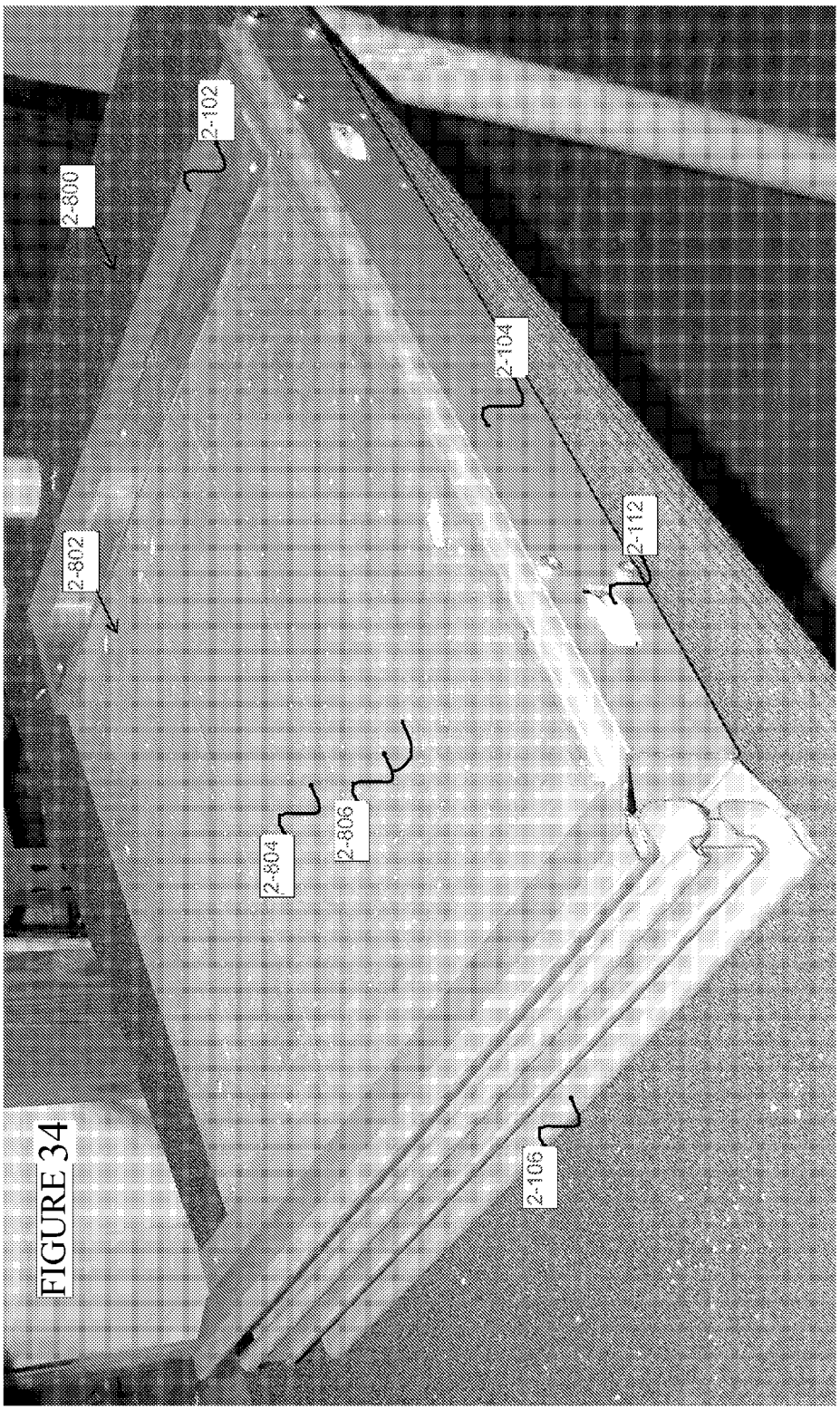
FIG. 34 is a perspective view of a cassette with a vacuum base, in accordance with an embodiment of the invention.

FIG. 34 is a perspective view of a cassette with a vacuum base, in accordance with an embodiment of the invention. In one embodiment, cassette 2-800 includes the front frame panel 2-106, the side frame panels 2-104 (only one illustrated), the rear frame panel 2-102, the rollers 2-112, and a vacuum base 2-802.

In one embodiment, the front frame panel 2-106, the side frame panels 2-104, and the rear frame panel 2-102 are coupled together at their distal edges to define a frame. Disposed within the frame is the vacuum base 2-802 that resides within channels (not visible) in the frame. The vacuum base 2-802 includes a generally planar surface 2-804 having a plurality of apertures 2-806 disposed therein. The plurality of apertures 2-806 are coupled to a vacuum source located within the rear frame panel 2-102 (not visible). Thus, suction from the vacuum source is distributed to the apertures 2-806 on the surface 2-804 of the vacuum base 2-802. Accordingly, a material (not shown), which can be thinner than sheet of paper, is configurable to being removably held on the surface 2-804 of the vacuum base 2-802 by application of suction from the vacuum source.

In one particular embodiment, the frame or the vacuum base 2-802 can be differently shaped, positioned, or constructed from fewer or greater components. In another embodiment, the surface 2-804 can include fewer or greater numbers of the apertures 2-806. In yet further embodiments, the apertures 2-806 can be strategically placed, shaped in a particular design, or have larger or smaller perimeters. In yet another embodiment, the vacuum source can be alternatively positioned. In an alternate embodiment, the vacuum base 2-802 can be coupled to the frame using the clamps 2-108 or another device. In a further embodiment, the vacuum base 2-802 can be reduced in size and shape, such as to a single hose that is mountable or movable on the frame. In a further embodiment, the vacuum base 2-802 can use alternative means to suction, such as a magnet. In another embodiment, the vacuum base 2-802 can include grooves or guides on its surface to position a material. In one particular embodiment, the vacuum base 2-802 is constructed by a personal affector machine producing channels in a material; a vacuum source is coupled to the material thereby producing suction throughout the channels. The cassette 2-800 can be implemented with other embodiments described herein.

Figure 35:
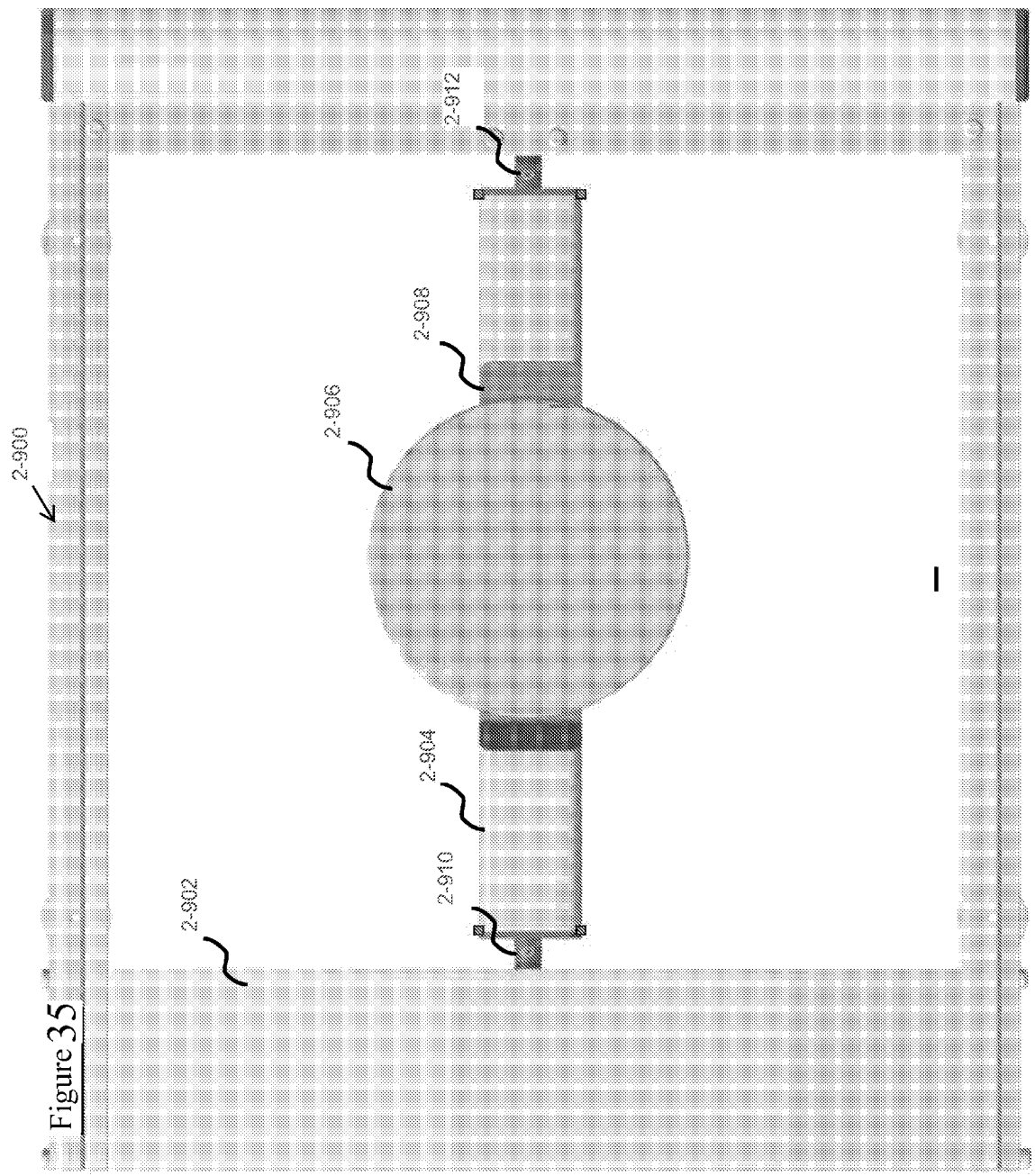
FIG. 35 is a top plan view of a cassette providing rotation about an axis, in accordance with an embodiment of the invention.

FIG. 35 is a top plan view of a cassette providing rotation about an axis, in accordance with an embodiment of the invention. In one embodiment, cassette 2-900 includes a frame 2-902, an axle 2-904 having a depression 2-908, and a material receiving surface 2-906.

In one embodiment, the frame 2-902 is substantially similar as discussed in reference to other figures. Accordingly, in certain embodiments, the frame 2-902 includes a plurality of panels coupled together at their distal ends to define a square or rectangle shape having a cavity. In other embodiments, the frame 2-902 is constructed from a single mold or from fewer or more panels. In another embodiment, the frame 2-902 is a different shape such as oval, triangular, or multi-dimensional.

In one embodiment, the axle 2-904 is positioned within the frame 2-902 and rotationally coupled to the frame 2-902 on opposing ends at a front flange 2-910 and a rear flange 2-912. Accordingly, the axle 2-904 is configurable to rotating about its axis relative to the frame 2-902. In certain embodiments, the axle 2-904 is fixedly coupled to the frame 2-902. In other embodiments, the axle 2-904 is removable from the frame 2-902. In yet a further embodiment, the axle 2-904 is coupled to the frame 2-902 using the clamping arms 2-110 (FIG. 27). In an alternate embodiment, the axle 2-904 is coupled to the frame 2-902 at a single position.

In one embodiment, the material receiving surface 2-906 provides a generally planar surface for receiving a material (not illustrated) and is disposed within the depression 2-908 to be within a plane of the axle 2-904 axis. The material receiving surface 2-906 is rotationally coupled to the axle 2-904 and is configurable to rotate about its axis relative to the axle 2-904. In one particular embodiment, the material receiving surface 2-906 includes clamps or pins to secure a material. In other embodiments, the material receiving surface 2-906 includes a vacuum system to secure a material. In other embodiments, the material receiving surface 2-906 is alternatively disposed relative to the axle 2-904. In yet a further embodiment, the material receiving surface 2-906 is fixedly coupled to the axle 2-904. In an alternate embodiment, the material receiving surface 2-906 is a different shape and can include a non-planar surface. In one particular embodiment, the frame 2-902 is circular and the material receiving surface 2-906 is configurable to extending to the frame 2-902.

Figure 36:
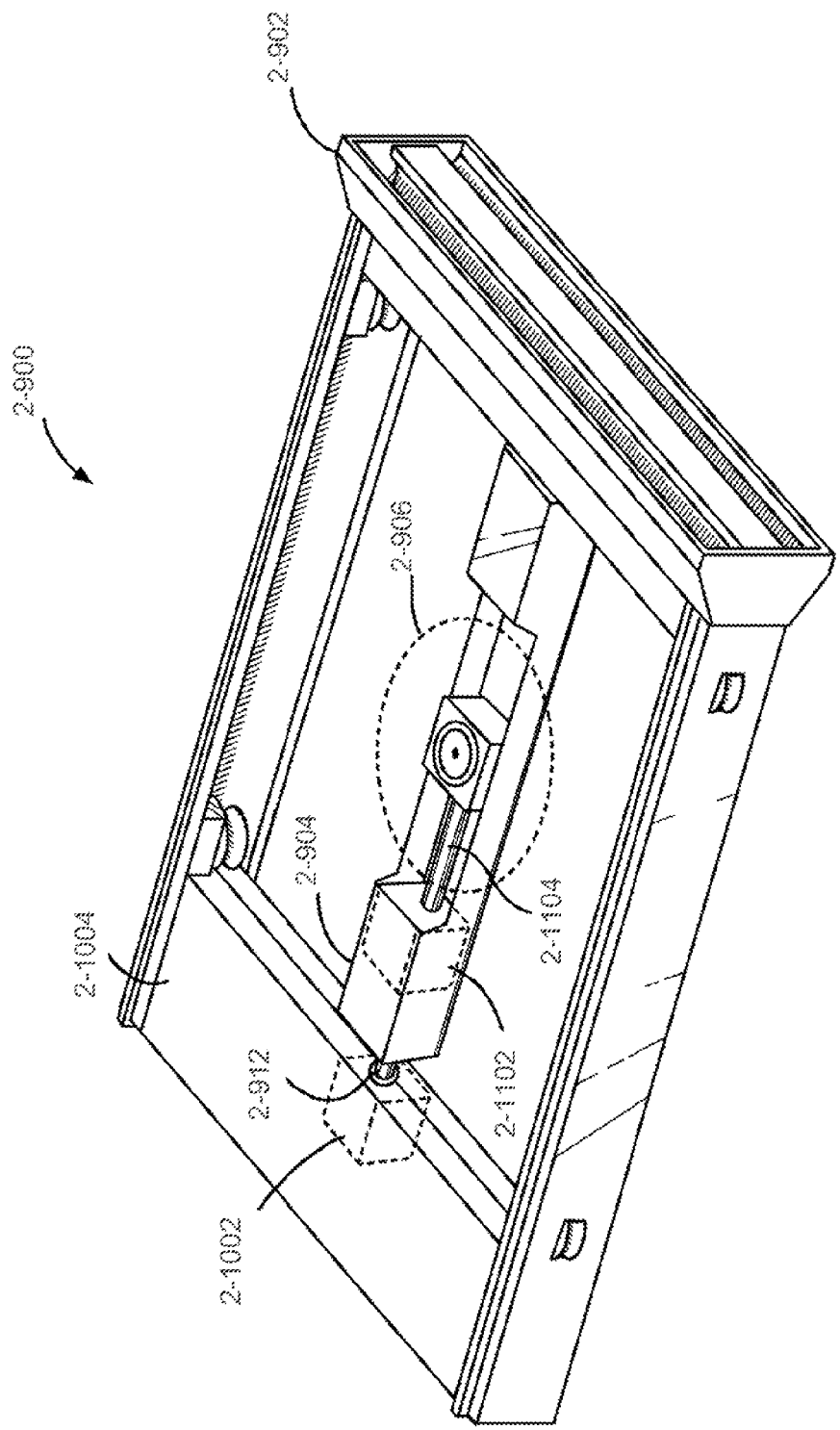
FIG. 36 is a top perspective view of a cassette providing rotation about an axis using a motor, in accordance with an embodiment of the invention.

FIG. 36 is a top perspective view of a cassette providing rotation about an axis using a motor, in accordance with an embodiment of the invention. In one embodiment, the cassette 2-900 includes the frame 2-902, the axle 2-904, the material receiving surface 2-906, and a motor 2-1002.

In one embodiment, the frame 2-902 includes a chamber 2-1004, which defines a cavity. The motor 2-1002 is disposed within the chamber 2-1004 and is configurable to providing rotational motion to a shaft (not visible). The shaft extends through the chamber 2-1004 and is coupled to the rear flange 2-912 of the axle 2-904. Accordingly, the motor 2-1002 is configurable to rotating the axle 2-904, and the material receiving surface 2-906, about its axis. In certain embodiments, a plurality of motors 2-1002 are used to rotate the axle 2-904, such as on opposing ends of the axle 2-904. In another embodiment, a gear system is employed between the motor 2-1002 and the axle 2-904. In yet a further embodiment, the motor 2-1002 is positioned on or within the axle 2-904 and configured to extend its shaft to the frame 2-902. In another embodiment, a different motion system is used such as a magnet, pressure, nuclear power, fusion, or other motion system.

Figure 37:
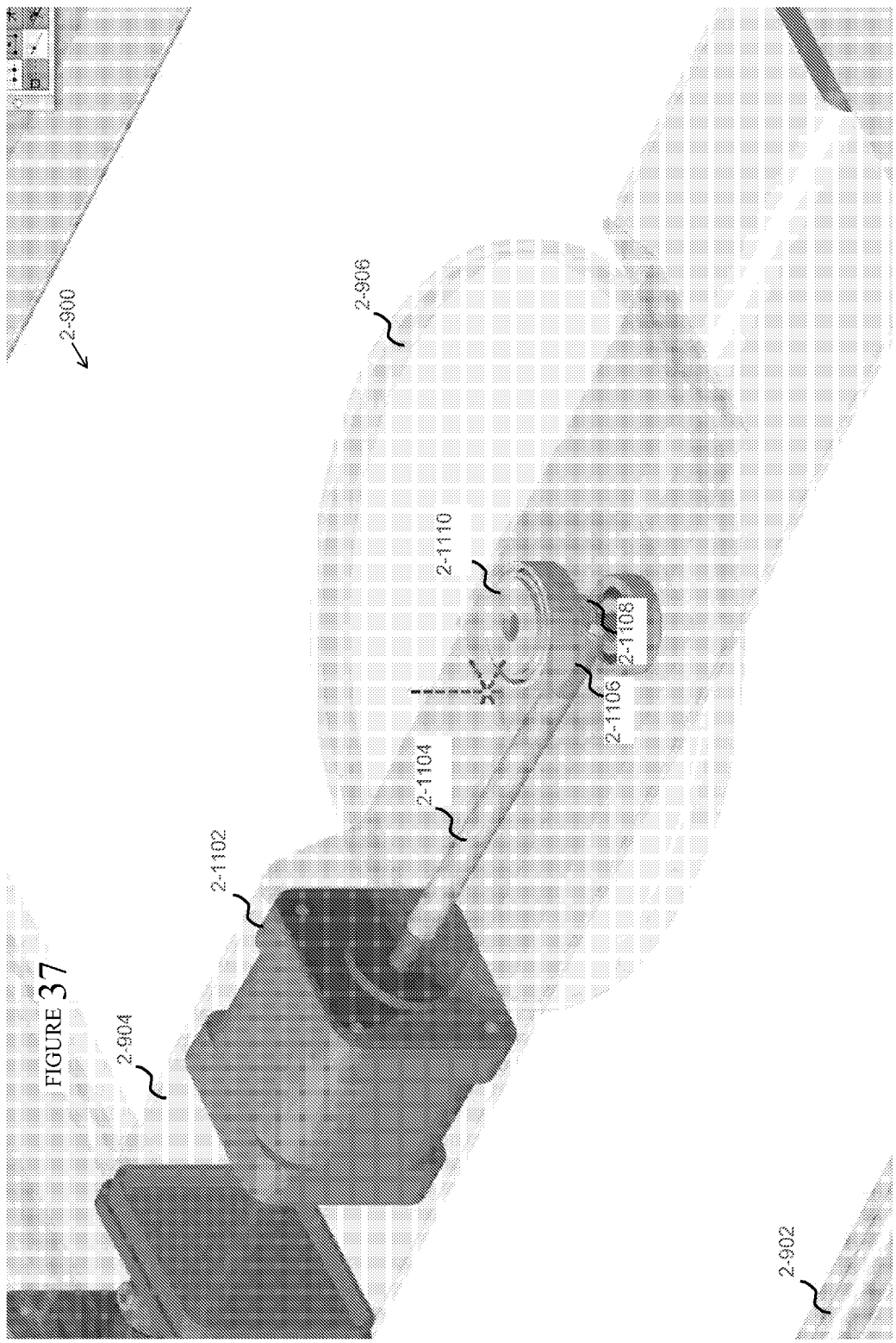
FIG. 37 is an enlarged top perspective view of a cassette providing rotation about an axis using a motor, in accordance with an embodiment of the invention.

FIG. 37 is an enlarged top perspective view of a cassette providing rotation about an axis using a motor, in accordance with an embodiment of the invention. In one embodiment, the cassette 2-900 includes the frame 2-902, the axle 2-904, and the material receiving surface 2-906, a motor 2-1102, a shaft 2-1104, and a material receiving surface mount 2-1110.

In one embodiment, the axle 2-904 defines a cavity therein and the motor 2-1102 is disposed within the cavity. The motor 2-1102 is a stepper motor and is configurable to providing rotational motion to the shaft 2-1104. The shaft 2-1104 is an elongated cylindrical member that extends from the motor 2-1102 and has threads 2-1106 disposed on its distal end. The threads 2-1106 mate with a pinion gear 2-1108. The pinion gear 2-1108 is coupled to the material receiving surface mount 2-1110, which extends through the axle 2-904 to couple with the material receiving surface 2-906. Accordingly, rotational motion from the motor 2-1102 is transferred along the shaft 2-1104 to rotate the material receiving surface 2-906.

In one particular embodiment, the motor 2-1102 is alternatively disposed relative to the axle 2-904, such as on an outside surface of the axle 2-904. In a further embodiment, the shaft 2-1104 is longer or shorter and may include a gear system. In certain embodiments, the material receiving surface 2-906 is coupled to the pinion gear 2-1108 without the material receiving surface mount 2-1110. In yet a further embodiment, the motor 2-1102 is coupled to the material receiving surface 2-906 without necessarily needing gears. In further embodiments, other motor systems can be employed as has been discussed in reference to previous figures.

Figure 38:
FIG. 38 is a bottom perspective view of a cassette providing rotation about an axis using a motor, in accordance with an embodiment of the invention.

FIG. 38 is a bottom perspective view of a cassette providing rotation about an axis using a motor, in accordance with an embodiment of the invention. In one embodiment, the cassette 2-900 includes the frame 2-902, the motor 2-1102, the rear flange 2-912, the front flange 2-910, the axle 2-904, the motor 2-1102, the shaft 2-1104, the material receiving surface mount 2-1110, and the material receiving surface 2-906.

In one embodiment, the motor 2-1002 is coupled to the frame 2-902 and the rear flange 2-912 and is configurable to provide rotational movement of the axle 2-904 about its axis relative to the frame 2-902. The axle 2-904 is rotationally coupled to the frame 2-902 at its distal end by the front flange 2-910. The motor 2-1102 is coupled to the axle 2-904 and is configurable to transferring rotational movement along the shaft 2-1104 to the material receiving surface mount 2-1110. The material receiving surface 2-906 is configurable to being coupled to the material receiving surface mount 2-1110. Accordingly, a material (not illustrated) is configurable to being disposed on the material receiving surface 2-906 and to being rotated about its axis and the axle 2-904 axis. In certain embodiments, the cassette 2-900 can be used in coordination with a personal affector machine as discussed elsewhere in this specification to provide additional axis of rotation for a material being affected. In one particular embodiment, similar rotation can be achieved by integrating one or more embodiments discussed herein into alternative positions on the personal affector machine, such as on an affector head.

Figure 39:
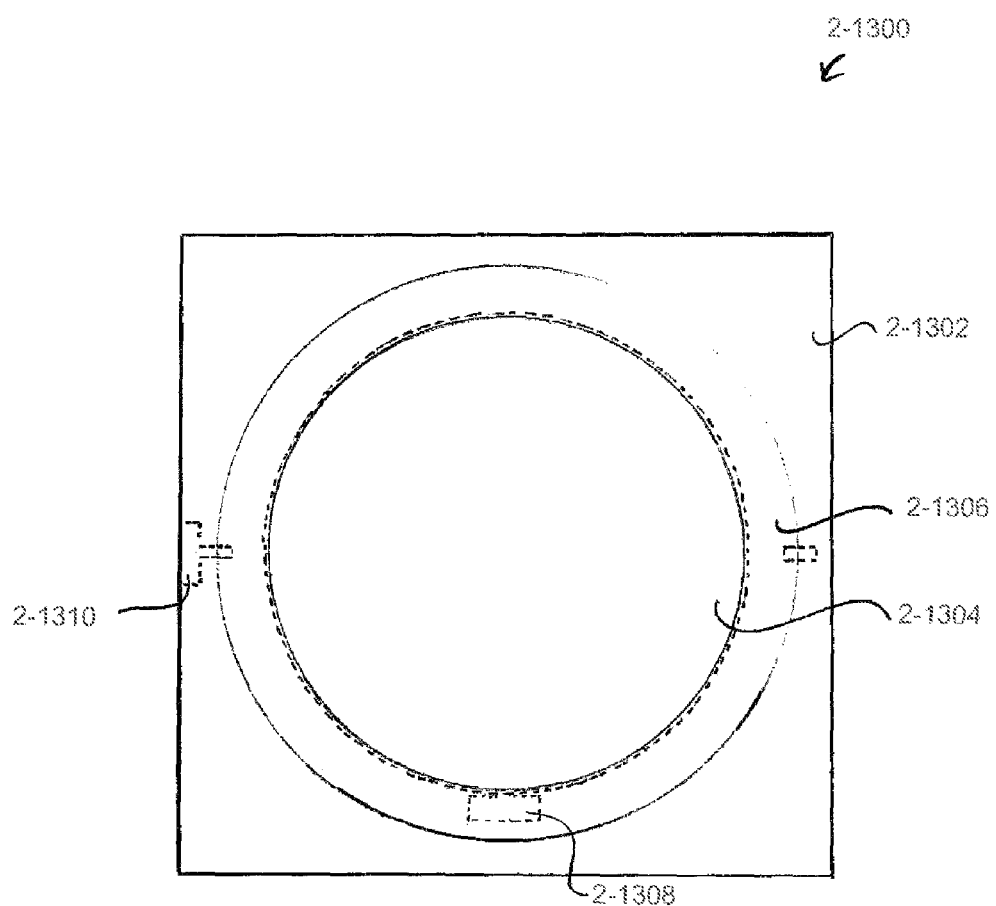
FIG. 39 is a top plan view of a cassette providing rotation about an axis, in accordance with an embodiment of the invention.

FIG. 39 is a top plan view of a cassette providing rotation about an axis, in accordance with an embodiment of the invention. In one embodiment, cassette 2-1300 includes a frame 2-1302, a disk 2-1306, a material receiving surface 2-1304, a motor 2-1038, and a motor 2-1310.

Figure 40:
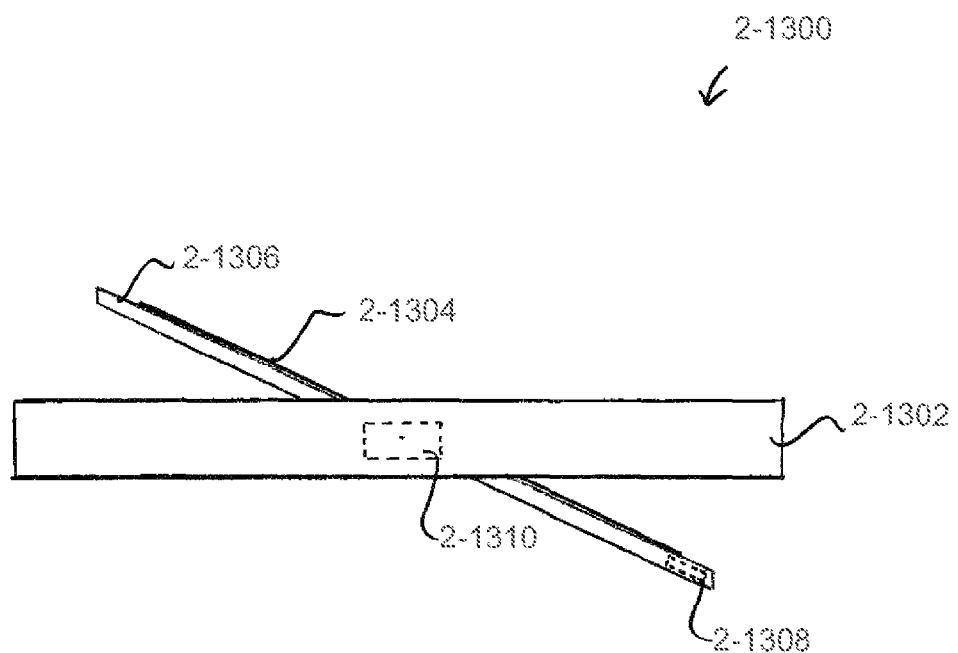
FIG. 40 is a side elevational view of a cassette providing rotation about an axis, in accordance with an embodiment of the invention.

In one embodiment, the frame 2-1302 defines a cylindrical cavity and includes the motor 2-1310, which is configurable to providing rotational motion. The disk 2-1306 is configurable to being disposed within the cavity of the frame 2-1302 and coupled to the motor 2-1310. Accordingly, rotational motion from the motor 2-1310 is configurable to rotating the disk 2-1306 about an axis relative to the frame 2-1302 (FIG. 40). The disk 2-1306 includes the motor 2-1308 configurable to providing rotational motion and a channel (dashed lines) along its inner wall for receiving the material receiving surface 2-1304. The motor 2-1308 is configurable to revolving the material receiving surface 2-1304 within the disk 2-1306. Therefore, a material (not illustrated) on the material receiving surface 2-1304 is configurable to revolving relative to the disk 2-1306 and rotating relative to the frame 2-1302.

In certain embodiments, the disk 2-1306 revolves relative to the frame 2-1302 and the material receiving surface 2-1304 rotates relative to the disk 2-1306. In further embodiments, the motor 2-1310 or 2-1308 is omitted. In other embodiments, a different motion system, such as a magnetic based system, is employed as discussed elsewhere in this application. Cassette 2-1300 can be employed in coordination with various other embodiments described herein.

This application also relates generally to material affecting, and more specifically, to systems and methods for sampling surface geometry descriptions and affecting a physical material based thereon.

Figure 41:
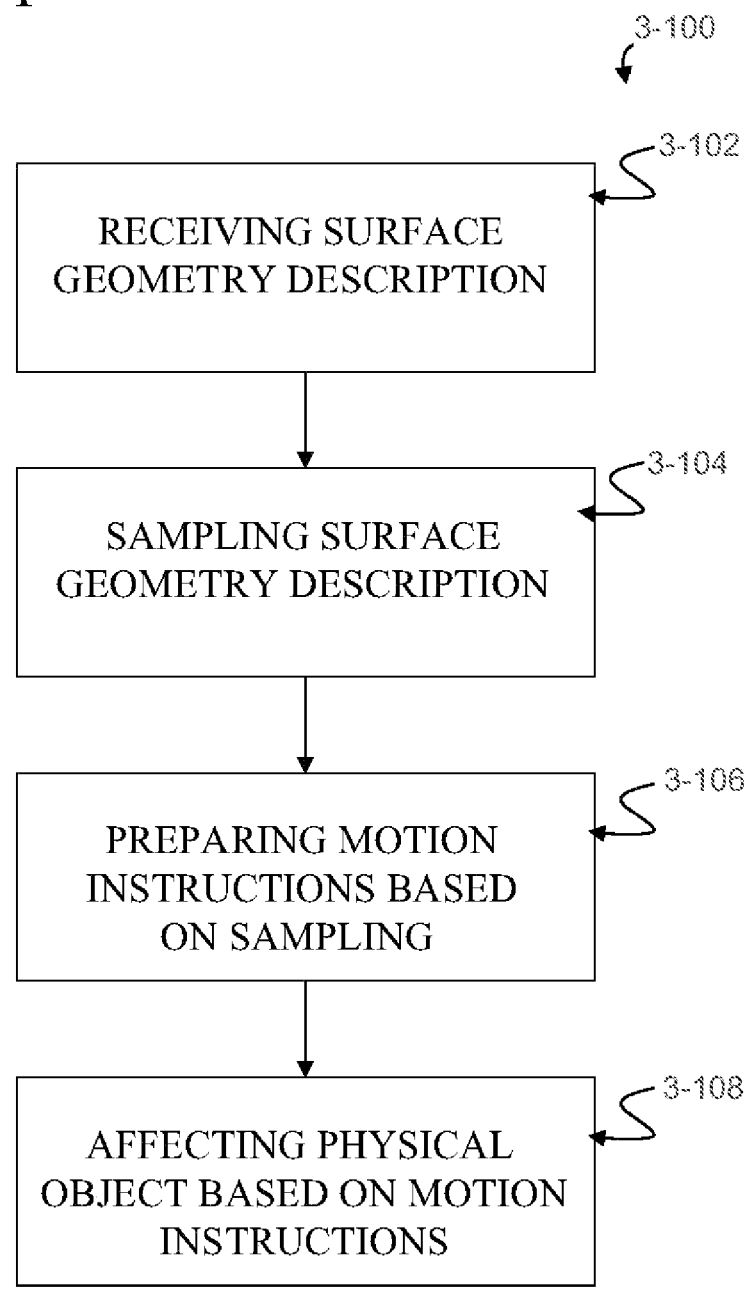
FIG. 41 is a flow diagram of a method for sampling a surface geometry description of an object, preparing motion instructions based on the sampling, and affecting a physical material based on the motion instructions, in accordance with an embodiment of the invention.

FIG. 41 is a flow diagram of a method for sampling a surface geometry description of an object, preparing motion instructions based on the sampling, and affecting a physical material based on the motion instructions, in accordance with an embodiment of the invention. In one embodiment, the method 3-100 includes receiving a surface geometry description of an object at block 3-102, sampling the surface geometry description at block 3-104, preparing motion instructions based on the sampling at block 3-106, and affecting a physical material based on the motion instructions at block 3-108. Any step of the method 3-100 can be performed manually or using one or more software applications.

In one embodiment, the receiving a surface geometry description of an object at block 3-102 includes receiving a triangulated surface geometry description, such as a Standard Tessellation Language (STL), TIN, KML, or other similar file, including non-triangulated surface geometry descriptions. A triangulated surface geometry description describes a surface geometry of a three dimensional object without necessarily representing color, texture, or other common model attributes. The surface geometry is generally described by triangulating a surface of a three-dimensional object, ordering the triangles using the right-hand rule, and recording normals and vertices for each triangle using a Cartesian coordinate system; although alternative methods may be employed such as a point cloud. Accordingly, a surface geometry description is not an image of a three dimensional object, but rather a description of a three dimensional object from which an image of the three-dimensional object can be created. However, for ease of discussion, the specification herein refers to a triangulated surface geometry description as if it were a three-dimensional representation of an object. In one particular embodiment, a three dimensional drawing is established or created and saved or exported into a surface geometry description, which is then received at block 3-102.

In one embodiment, the sampling a surface geometry description at block 3-104 includes defining an x and y axis plane relative to the surface geometry description. The x and y axis plane can be at any position relative to the surface geometry description. For instance, the x and y axis plane can be above, below, to a side of, or oblique to the surface geometry description. Once a given x and y axis plane is defined, its position is referred to as theta and gamma zero ($\theta_0, \gamma_0$). Theta and gamma reference a position of the x and y axis plane relative to the surface geometry description, which can be altered as discussed in reference to later figures. At position $\theta_0, \gamma_0$, it is possible to determine a z-value for each x and y coordinate on the x and y axis plane. The z-value is a normalized distance between the surface geometry description and the x and y axis plane at a given x and y coordinate. Sampling is a process by which z-values are determined for each desired x and y coordinate on the x and y axis plane at a given $\theta, \gamma$ position. The set of x, y, and z values obtained from the sampling can be considered a rasterization of a surface of the surface geometry description at position $\theta_0, \gamma_0$. In further embodiments, the sampling a surface geometry description at block 3-104 includes defining a cylinder, pyramid, or other shape relative to the surface geometry description instead of a plane and determining a z-value for each coordinate on the shape.

In one embodiment, the preparing motion instructions based on the sampling at block 3-106 includes preparing motion instructions to direct a point to trace the set of x, y, and z values obtained from the sampling through space (or vice versa, such as directing a space to move relative to the point). For example, if the set of x, y, and z values include (0,0,0), (0,1,1), (0,2,2), (0,3,3), the motion instructions would direct the point to move along a y and z axis and to remain constant with regard to an x axis. In certain embodiments the preparing motion instructions includes directing a plurality of points to trace a subset of x, y, and z values obtained from the sampling through space (or vice versa). Because the set of x, y, and z values obtained from the sampling is a rasterization of a surface of the surface geometry description, preparing motion instructions that direct a point to trace the set of x, y, and z values has an effect of directing the point to trace a surface of the surface geometry description. In another embodiment, the preparing motion instructions based on the sampling at block 3-106 includes preparing motion instructions to direct a point, or a plurality of points, to move to an x and y coordinate relative to a space and depress to a depth associated with a respective z-value (or vice versa) before returning to an undepressed location. The motion instructions continue to direct the point in a similar fashion for the set of x, y, and z values obtained from the sampling. In yet another embodiment, the preparing motion instructions based on the sampling at block 3-106 includes preparing motion instructions to direct a point, or a plurality of points, to move to an x and y coordinate relative to a space and deposit material to a depth associated with a respective z-value (or vice versa). The motion instructions continue to direct the point in a similar fashion for the set of x, y, and z values obtained from the sampling.

In one embodiment, the affecting a physical material based on the motion instructions at block 3-108 includes coupling an affector to the point, or plurality of points, and implementing the motion instructions to trace the affector relative to a physical material. The affector can be any tool as described herein. Alternatively, the affecting includes implementing the motion instructions to depress or deposit as discussed herein. As the affector traces the set of x, y, and z values relative to the physical material, it affects the physical material at a depth of z for a given x and y coordinate. For example, in one embodiment the affector is a rasp and the physical material is a block that is configurable to being carved and shaped by the rasp. As the rasp traces the set of x, y, and z values relative to the block, it affects the block by removing material from the block to create a physical manifestation of a surface of the surface geometry description. In another embodiment, the affector is any other aforementioned tool such as a laser, water jet, oscillating knife, custom tool, jig saw, planer, joiner, drill press, sander, buffer, borer, lathe, cutter, router, welder, drill, saw, bonder, scanner, shaper, print head, sewing tool, sculpting tool, etching tool, ultrasonic knife, plasma torch, optical scanner, ink head, camera, turbine spindle, extruder, glue depositor, air dispenser, chemical depositor, sprayer, proximity sensor, welder, laser range finder, light applicator, punch pin, rasp, hammer, writing instrument, screwdriver, pliers, wrench, magnet, density sensor, or any other tool that serves to alter, preserve, or retrieve information. Accordingly, an affector in certain embodiments applies material, such as paint, air, chemicals, or glue, to a physical material. An affector in other embodiments removes material from a physical material, such as with a laser, sound, or drill bit. An affector yet further embodiments traces a set of x, y, and z values (or an offset value) relative to a physical material, such as to apply UV light, air, cure, heat, or observe a physical material, without necessarily applying or removing material. In one particular embodiment, the affecting a physical material is accomplished in whole or in part, such as with an override feature, without using the motion instructions, such as by directing affecting manually or using software.

In one particular embodiment, the prepared motion instructions are offset relative to the set of x, y, and z values obtained from the sampling. For example, the prepared motion instructions can have uniformly or non-uniformly, linearly or non-linearly, adjusted z-values for a purpose of affecting a physical material as desired. Thus, if a physical material has a surface that requires heat treatment, the prepared motion instructions can have uniformly adjusted z values to keep an affector proximate to a physical material to apply heat without actually touching a physical material. Further, if certain aspects of a surface of a surface geometry description should be accentuated, the prepared motion instructions can have smaller z values for certain x and y coordinates so an affector removes less material from certain places on a physical material. Indeed, the prepared motion instructions can have uniformly or non-uniformly, linearly or non-linearly, adjusted x, y, z, $\theta$, or $\gamma$ values for affecting the physical material as desired.

In one particular embodiment, the motion instructions are implemented on a personal affector machine as described herein. In one embodiment, the personal affector machine includes an affector movably coupled to a personal affector machine and configurable to move in an x, y, and z direction. The personal affector machine further includes a cassette for holding a physical material in place relative to the affector. The cassette is also configurable to rotating and revolving the physical material relative to the affector to various $\theta, \gamma$ positions. Accordingly, the affector is configurable to implementing the motion instructions relative to the physical material.

In one particular embodiment, the method 3-100 is used in architectural modeling, where it is desirable to have a capability to quickly and cost effectively produce customized physical models. For example, the method 3-100 can be used in architectural modeling to produce a physical model showing topography of a plot of land for a client. First, a surface geometry description of the topography of a plot of land is obtained. Next, the surface geometry description of the topography of a plot of land is sampled for z values at a plurality of x and y coordinates after an x and y axis plane ($\theta, \gamma$ position) is defined relative to the topography. In one instance, the x and y axis plane is parallel to the topography. The set of x, y, and z values obtained from the sampling are then used to prepare motion instructions. The prepared motion instructions direct a point to trace the set of x, y, and z values through space with the z values being adjusted to accentuate land relative to water on the topography. The prepared motion instructions are then implemented on a personal affector machine whereby a drill bit is an affector and a cassette holds a foam material configurable to being carved by the drill bit. Accordingly, the drill bit traces the x, y, and adjusted z values through space as directed by the motion instructions relative to the foam material, thereby removing material from the foam material at a depth of an adjusted z for each x and y coordinate. Upon completion of the implementation of the motion instructions, the foam material has the topography of a plot of land embodied thereon. A further step can be performed to provide surface coloration on the foam material. An image of the topography of a plot of land is received, sized, and aligned with the surface geometry description of the topography of the plot of land and a color is sampled for each x and y coordinate on the x and y axis. The motion instructions prepared above are modified to further include the color that is sampled for each x and y coordinate on the x and y axis. Accordingly, the modified motion instructions direct a point to trace the set of x, y, and adjusted z values through space and to include a color at each x and y coordinate. The modified motion instructions are implemented on the personal affector machine whereby the drill bit is replaced with a paint applicator. As the paint applicator traces the topography of the plot of land on the foam material as directed by the motion instructions, it deposits the color associated with each x and y coordinate. Upon completion of the implementation of the modified motion instructions, the foam material further includes color. Thus, a physical representation of a topography of a plot of land, including color, can be easily and cost effectively created. It will be appreciated that many other applications of the method 3-100 are possible; for instance, the method 3-100 can be used to create three-dimensional images of people or faces, machine tools, or even produce furniture.

Figure 42:
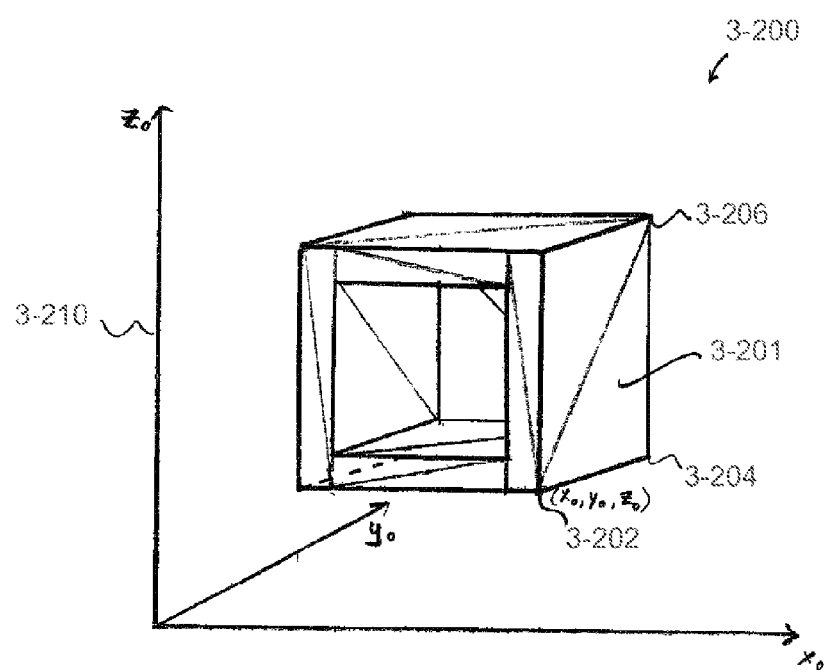
FIG. 42 is a perspective view of a graphical representation of a surface geometry description of an object, in accordance with an embodiment of the invention.

FIG. 42 is a perspective view of a graphical representation of a surface geometry description of an object, in accordance with an embodiment of the invention. In one embodiment, a surface geometry description 3-200 is includes a coordinate system 3-210 and a plurality of triangles 3-201. The coordinate system 3-210 is a Cartesian coordinate system and the plurality of triangles 201 are defined in reference to the coordinate system 3-210. Each triangle 3-201 has three vertices 3-202, 3-204, and 3-206, each of which is described by an x, y, and z value relative to the coordinate system 3-210. Adjacent triangles 3-201 share two common vertices and all the triangles together describe the surface geometry description of an object. In certain embodiments, the surface geometry description 3-200 can describe any object of any dimension.

Figure 43:
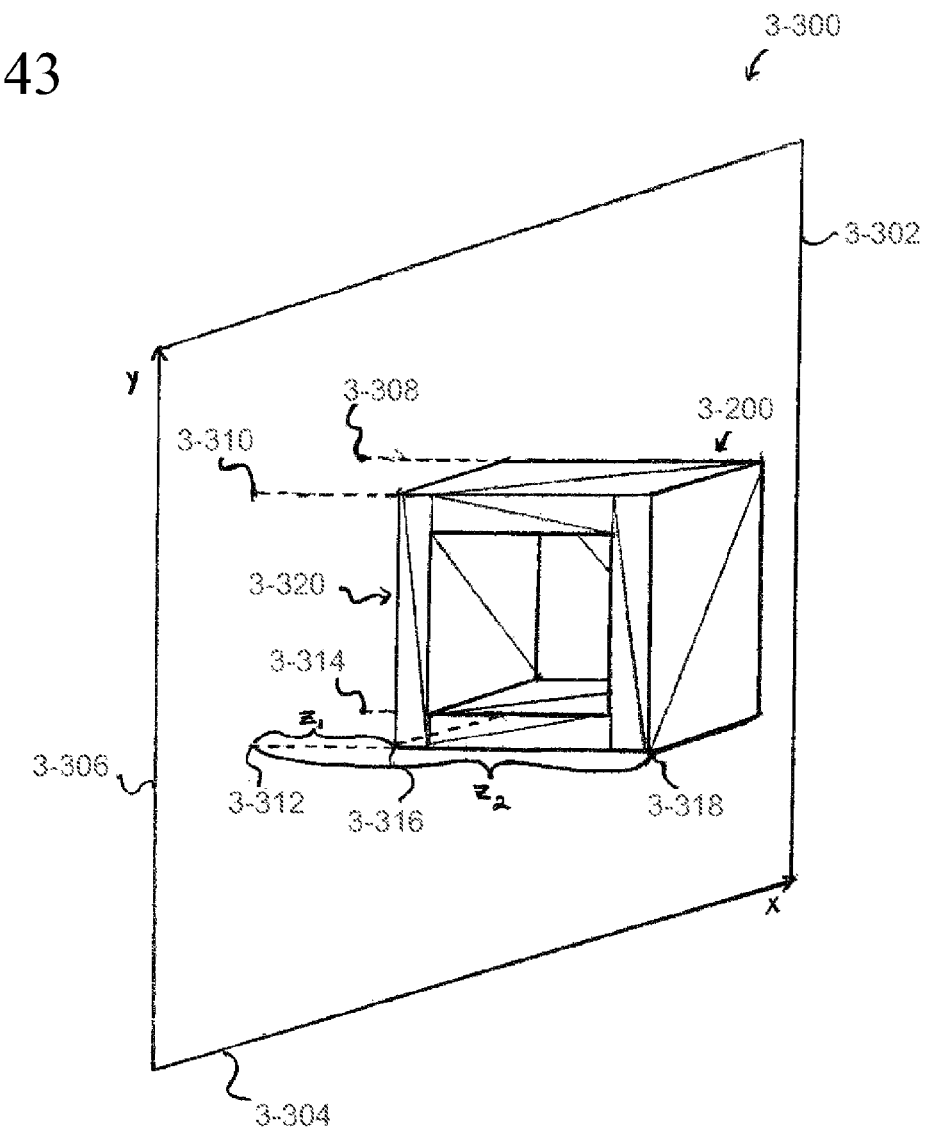
FIG. 43 is a perspective view of a physical representation of sampling a surface geometry description of an object, in accordance with an embodiment of the invention.

FIG. 43 is a perspective view of a physical representation of sampling the surface geometry description of an object, in accordance with an embodiment of the invention. In one embodiment, physical representation of sampling 3-300 includes the surface geometry description 3-200 and an x-axis 3-304 and y-axis 3-306, which define a plane 3-302. The plane 3-302 is defined relative to the surface geometry description 3-200 at position $\theta_0, \gamma_0$. Although the plane 3-302 is shown positioned on a side of the surface geometry description 3-200, the plane 3-302 can be positioned anywhere relative to the surface geometry description 3-200. At each x and y coordinate on the x-axis 3-304 and the y-axis 3-306 there exists a z-value. The z-value is a normalized distance between the surface geometry description 3-200 and the plane 3-302 at a given x and y coordinate on the plane 3-302. For example, for x and y coordinates inside points 3-308, 3-310, 3-312, and 3-314, the z-value is $z_1$, the distance between points 3-316 and 3-312. For x and y coordinates outside points 3-308, 3-310, 3-312, and 3-314, the z-value is $z_2$, the distance between points 3-318 and 3-312. The set of x, y, and z values at position $\theta_0, \gamma_0$ can be considered a rasterization of a surface 3-320 of the surface geometry description 3-200.

Figure 44:
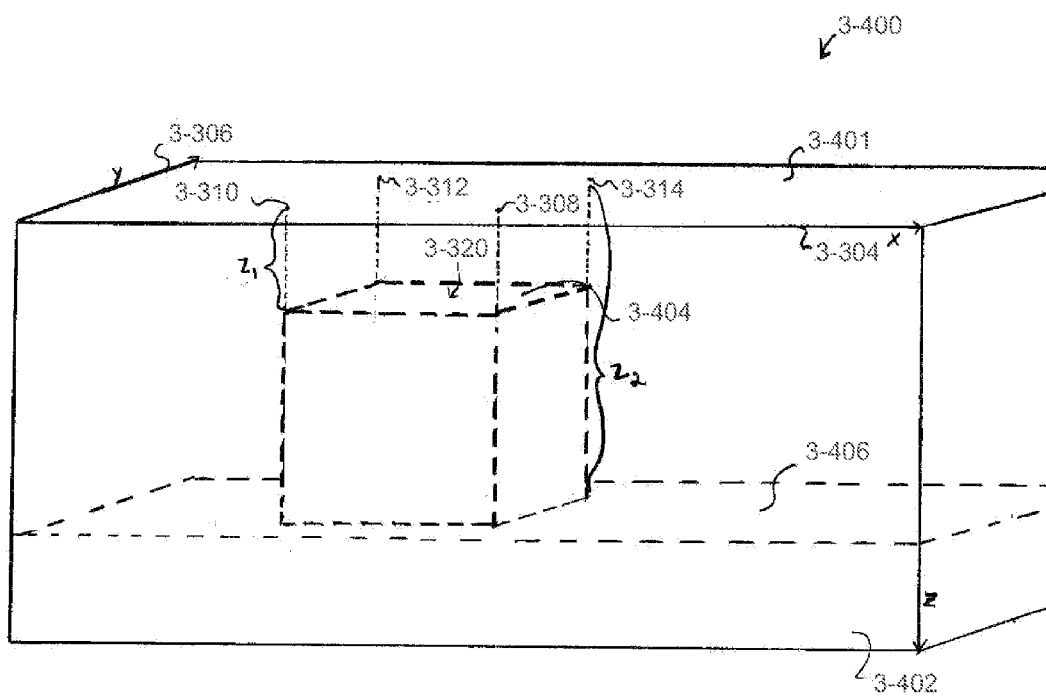
FIG. 44 is a perspective view of a set of x, y, and z values at position $\theta_0$, $\gamma_0$ obtained from a sampling superimposed on a physical material, in accordance with an embodiment of the invention.

FIG. 44 is a perspective view of a set of x, y, and z values at position $\theta_0, \gamma_0$ obtained from a sampling superimposed on a physical material, in accordance with an embodiment of the invention. In one embodiment, system 3-400 includes a physical material 3-402 with the x-axis 3-304, the y-axis 3-306, and the plane 3-302 superimposed on an upper surface 3-401 of the physical material 3-402. The broken lines (not labeled) are graphical representations of the set of x, y, and z values at position $\theta_0, \gamma_0$ obtained from the sampling 3-300 superimposed on the physical material 3-402. Accordingly, for x and y coordinates between points 3-308, 3-310, 3-312, and 3-314 on the upper surface 3-401 the z value is $z_1$, which is a distance between upper surface 3-401 and surface 3-404. For x and y coordinates outside of points 3-308, 3-310, 3-312, and 3-314 on the upper surface 3-401 the z value is $z_2$, which is a distance between upper surface 3-401 and surface 3-406. Accordingly, because the set of x, y, and z values at position $\theta_0, \gamma_0$ obtained from the sampling 3-300 are representative of the surface 3-320 of the surface geometry description 3-200, superimposing the set of x, y, and z values on the physical material 3-402 has an effect of revealing the surface 3-320 of the surface geometry description 3-200.

Figure 45:
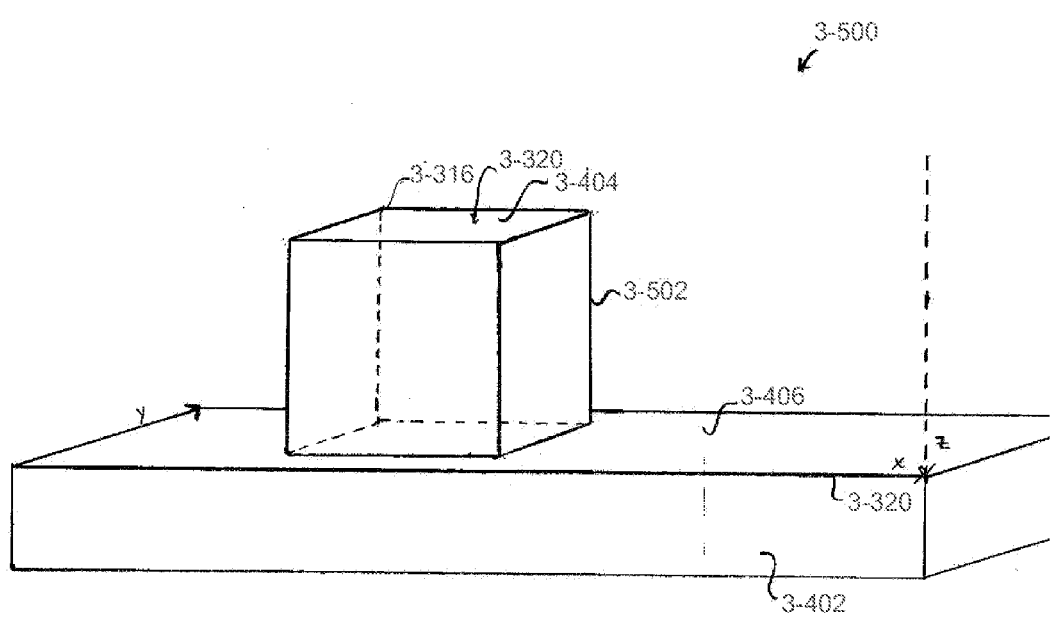
FIG. 45 is a perspective view of a physical object having material removed based on a set of x, y, and z values at position $\theta_0$, $\gamma_0$ obtained from a sampling, in accordance with an embodiment of the invention.

FIG. 45 is a perspective view of a physical object having material removed based on a set of x, y, and z values at position $\theta_0, \gamma_0$ obtained from a sampling, in accordance with an embodiment of the invention. In one embodiment, system 3-500 includes the physical material 3-402 having a physical manifestation 3-502 of the surface 3-320 of the surface geometry description 3-200 disposed thereon. The physical manifestation 3-502 is producible by removing material from the physical material 3-402 based on the set of x, y, and z values at position $\theta_0, \gamma_0$ obtained from the sampling.

Figure 46:
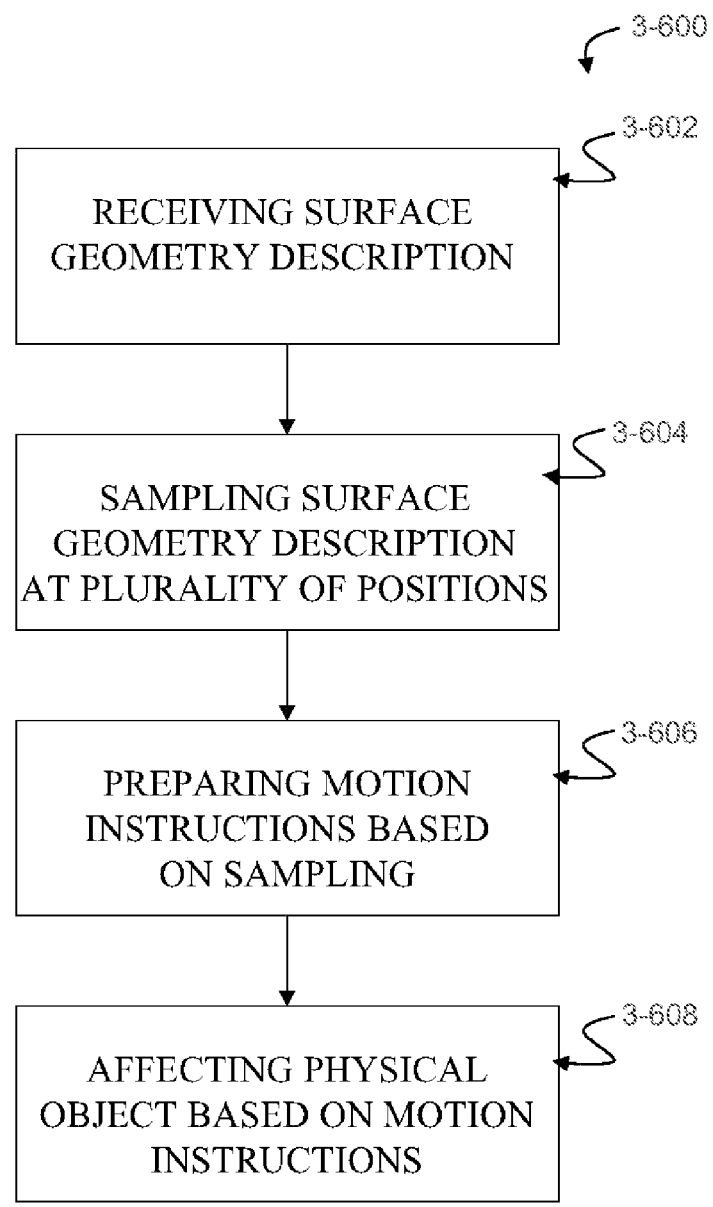
FIG. 46 is a flow diagram of a method for sampling a surface geometry description of an object from a plurality of positions, preparing motion instructions based on the sampling, and affecting a physical material based on the motion instructions, in accordance with an embodiment of the invention.

FIG. 46 is a flow diagram of a method for sampling a surface geometry description of an object from a plurality of positions, preparing motion instructions based on the sampling, and affecting a physical material based on the motion instructions, in accordance with an embodiment of the invention. In one embodiment method 3-600 includes receiving a surface geometry description of an object at block 3-602, sampling the surface geometry description of an object at a plurality of positions at block 3-604, preparing motion instructions based on the sampling at block 3-606, and affecting a physical material based on the motion instructions at block 3-608. In one embodiment, the receiving a surface geometry description of an object at block 3-602 is substantially the same as discussed in reference to FIG. 41 supra.

In one embodiment, the sampling a surface geometry description of an object at a plurality of positions at block 3-604 includes defining a first x and y axis plane position relative to a surface geometry description, sampling for z-values for the first x and y axis plane, defining a second x and y axis plane position relative to the surface geometry description, and sampling for z-values for the second x and y axis plane.

In one embodiment, defining the first x and y axis plane position relative to the surface geometry description is substantially the same as described in reference to FIG. 41. Thus, the first x and y axis plane position can be at any position relative to the surface geometry description. For instance, the x and y axis plane position can be above, below, to a side of, or oblique to the surface geometry description. Once the first x and y axis plane position is defined relative to the surface geometry description, its position is referred to as position $\theta_0$, $\gamma_0$. Theta ($\theta$) and gamma ($\gamma$) represent a coordinate system, with $\theta$ defining a longitudinal position of an x and y axis plane relative to the surface geometry description and $\gamma$ defining a latitudinal position of an x and y axis plane relative to the surface geometry description. At position $\theta_0$, $\gamma_0$, it is possible to sample a z-value for each desired x and y coordinate on the first x and y axis plane. The set of x, y, and z values at position $\theta_0$, $\gamma_0$ obtained from the sampling can be considered a rasterization of a first surface of the surface geometry description.

In one embodiment, defining the second x and y axis plane position relative to the surface geometry description is substantially similar as described supra and in reference to FIG. 41 with an exception that the second x and y axis plane position is referred to as position $\theta_1$, $\gamma_1$. That is, the second x and y axis plane position can have a different longitudinal or latitudinal position than the first x and y axis plane position relative to the surface geometry description. At position $\theta_1$, $\gamma_1$, it is possible to sample a z-value for each desired x and y coordinate on the second x and y axis plane as described in reference to FIG. 41. The set of x, y, and z values at position $\theta_1$, $\gamma_1$ obtained from the sampling can be considered a rasterization of a second surface of the surface geometry description.

Because the set of x, y, and z values at position $\theta_0$, $\gamma_0$ obtained from the sampling is a rasterization of the first surface of the surface geometry description and the set of x, y, and z values at position $\theta_1$, $\gamma_1$ obtained from the sampling is a rasterization of the second surface of the surface geometry description, the set of x, y, and z values at positions $\theta_0$, $\gamma_0$ and $\theta_1$, $\gamma_1$ are rasterizations of multiple surfaces of the surface geometry description. Additional surface rasterizations of the surface geometry description can be obtained by sampling for x, y, and z values at additional $\theta$, $\gamma$ positions relative to the surface geometry description.

In one embodiment, the preparing motion instructions based on the sampling at block 3-606 is substantially the same as described in reference to FIG. 41 with an exception that the motion instructions at block 3-606 further integrate $\theta$, $\gamma$ positions. For example, in one embodiment the motion instructions first direct a point to trace the set of x, y, and z values at position $\theta_0$, $\gamma_0$ relative to a space (or vice versa). Because the set of x, y, and z values at position $\theta_0$, $\gamma_0$ is a rasterization of the first surface of the surface geometry description, tracing the set of x, y, and z values at position $\theta_0$, $\gamma_0$ has an effect of tracing the first surface of the surface geometry description relative to the space. The motion instructions then direct the point to rotationally shift relative to the space (or vice versa) to a position corresponding to $\theta_1$, $\gamma_1$. The motion instructions then direct the point to trace the set of x, y, and z values at position $\theta_1$, $\gamma_1$ relative to the space (or vice versa). Because the set of x, y, and z values at position $\theta_1$, $\gamma_1$ is a rasterization of the second surface of the surface geometry description, tracing the set of x, y, and z values at position $\theta_1$, $\gamma_1$ has an effect of directing the point to trace the second surface of the surface geometry description. The motion instructions continue in a similar fashion for each set of x, y, and z values at each $\theta$, $\gamma$ position.

In one embodiment, the affecting a physical material based on the motion instructions at block 3-608 is substantially the same as described in reference to FIG. 41. For example, in one embodiment an affector is coupled to the point and the affector implements the motion instructions relative to a physical material using a personal affector machine. As the affector traces the set of x, y, and z values at each $\theta$, $\gamma$ position relative to the physical material, it affects the physical material to a depth of z for a given x and y coordinate at each $\theta$, $\gamma$ position.

Figure 47:
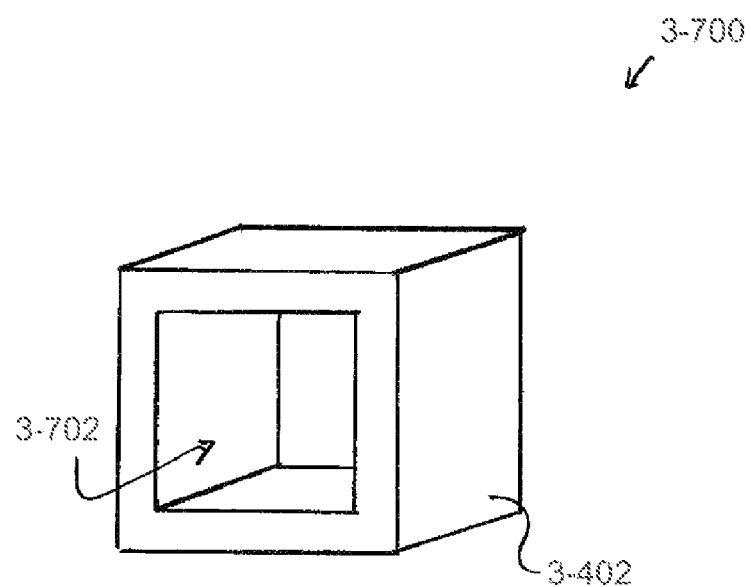
FIG. 47 is a perspective view of a physical object having material removed based on samplings from a plurality of $\theta$, $\gamma$ positions, in accordance with an embodiment of the invention.

FIG. 47 is a perspective view of a physical object having material removed based on samplings from a plurality of $\theta$, $\gamma$ positions, in accordance with an embodiment of the invention. In one embodiment, system 3-700 includes the physical material 3-402 having physical manifestations of a plurality of surfaces of the surface geometry description 3-200, including a physical manifestation of a cavity 3-702. The physical manifestations of a plurality of surfaces can be created using the method described in reference to FIG. 46.

Figure 48:
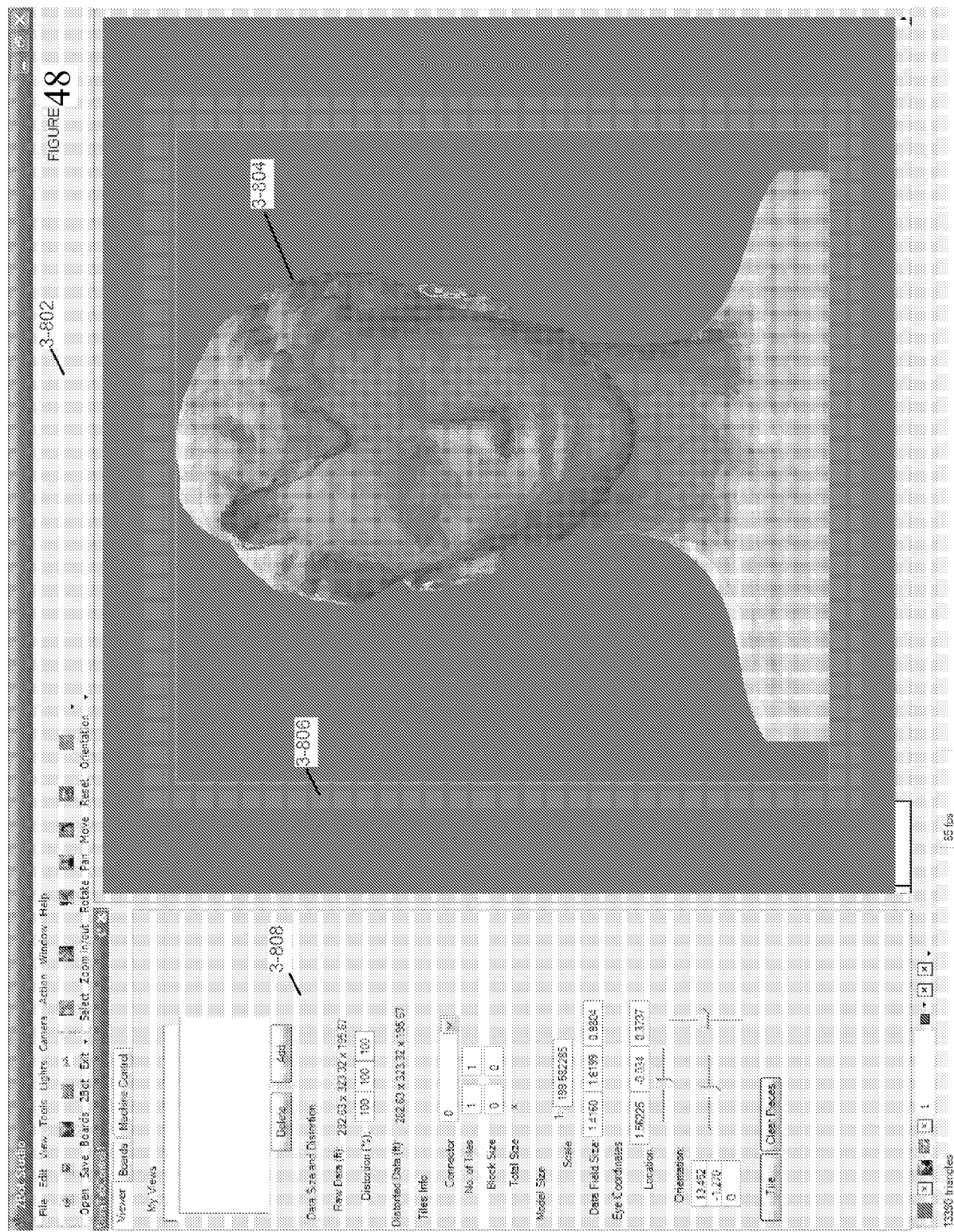
FIG. 48 is a screenshot of software configurable to implement one or more embodiments described herein, in accordance with an embodiment of the invention.

FIG. 48 is a screenshot of software configurable to implement one or more embodiments described herein, in accordance with an embodiment of the invention. In one embodiment, the software includes a user interface 3-802, which includes an input panel 808 and an x and y axis plane 3-806.

In one embodiment, the x and y axis plane 3-806 is superimposed on a visual representation of a surface geometry description 3-804, which in this instance is a front perspective view of a three dimensional human face. The visual representation of a surface geometry description 3-804 can be obtained from an STL, TIN, KML, or other file format or can be created using the user interface 3-802. The x and y axis plane 3-806 is configurable to remaining constant while the visual representation of a surface geometry description 3-804 is configurable to move relative to the x and y axis plane 3-806. For instance, the visual representation can be increased in size, decreased in size, shifted, stretched, skewed, turned, or rotated relative to the x and y axis plane 3-806 to provide a different perspective of the visual representation as viewed through the x and y axis plane 3-806. Once the visual representation of a surface geometry description 3-804 is moved to a desired position relative to the x and y axis plane 3-806, its position is defined as $\theta_0$, $\gamma_0$. At position $\theta_0$, $\gamma_0$, z values are sampled for a set of x and y coordinates. In one particular embodiment, the z values can be scaled to smaller or larger values. The visual representation can then be moved to another desired position relative to the x and y axis plane 3-806, a position defined as $\theta_1$, $\gamma_1$, and z values can be sampled for a set of x and y coordinates at position $\theta_1$, $\gamma_1$. This process can be repeated for additional $\theta$, $\gamma$ positions. Once the set of x, y, and z values is obtained for each desired $\theta$, $\gamma$ position, motion instructions are prepared based on the set of values and are configurable to being implemented on a personal affector machine. The personal affector machine includes an affector that affects a physical material based on the motion instructions, such as to create a physical manifestation of at least one surface of the visual representation of a surface geometry description 3-804.

Figure 49:
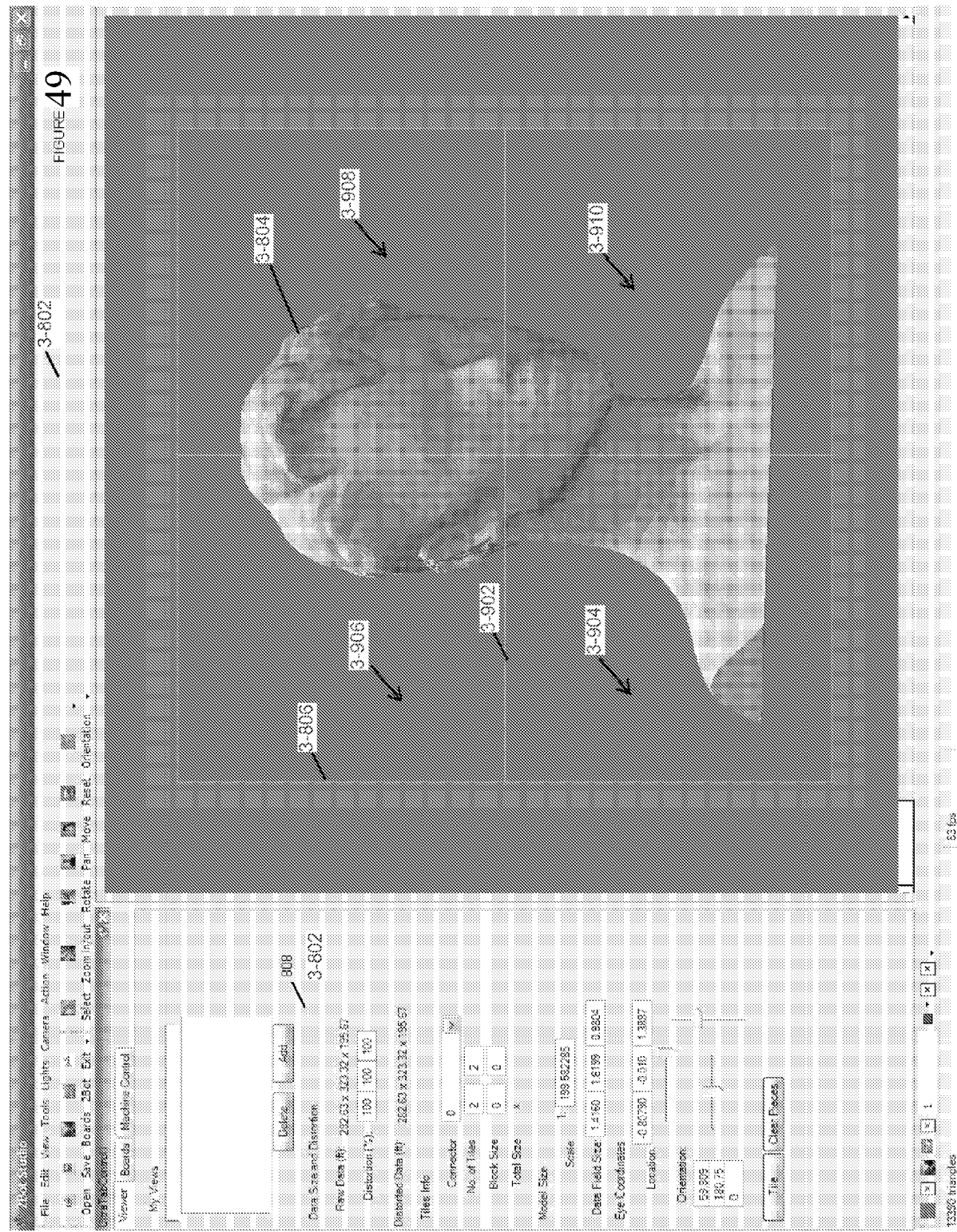
FIG. 49 is a screenshot of software configurable to implement one or more embodiments described herein, in accordance with an embodiment of the invention.

FIG. 49 is a screenshot of software configurable to implement one or more embodiments described herein, in accordance with an embodiment of the invention. In one embodiment, the software includes the user interface 3-802, which includes the input panel 3-808 and the x and y axis plane 3-806. The x and y axis plane 3-806 is superimposed on the visual representation of a surface geometry description 3-804.

In one embodiment, the x and y axis plane 3-806 is broken into a plurality of tiles 3-904, 3-906, 3-908, 3-910 by a tile divider 3-902. The tile divider 3-902 can be adjusted on the input panel 3-808 or elsewhere to define a single tile (FIG. 48) or two or more tiles. The plurality of tiles 3-904, 3-906, 3-908, 3-910 each include a portion of the visual representation of a surface geometry description 3-804. The plurality of tiles 3-904, 3-906, 3-908, 3-910 also each correspond to a physical material which can be affected by a personal affector machine, such as a block of foam size. The visual representation can be moved relative to the x and y axis plane 3-806 as discussed supra thereby providing different perspectives of the visual representation as viewed through the x and y axis plane 3-806. Once the visual representation of a surface geometry description 3-804 is moved to a desired θ, γ position, z values are sampled for x and y coordinates and motion instructions are prepared from the set of x, y, and z values obtained. The prepared motion instructions are conceptually partitioned into sections corresponding to the plurality of tiles 3-904, 3-906, 3-908, 3-910, each of which is configurable to being implemented on a different physical material. Once the different physical materials are affected, they can be joined to produce a large size physical manifestation of at least one surface of the surface geometry description. In one particular embodiment, a similar system of tiles is employed along a z-axis to produce a lengthy physical manifestation of at least one surface of the surface geometry description.

Figure 50:
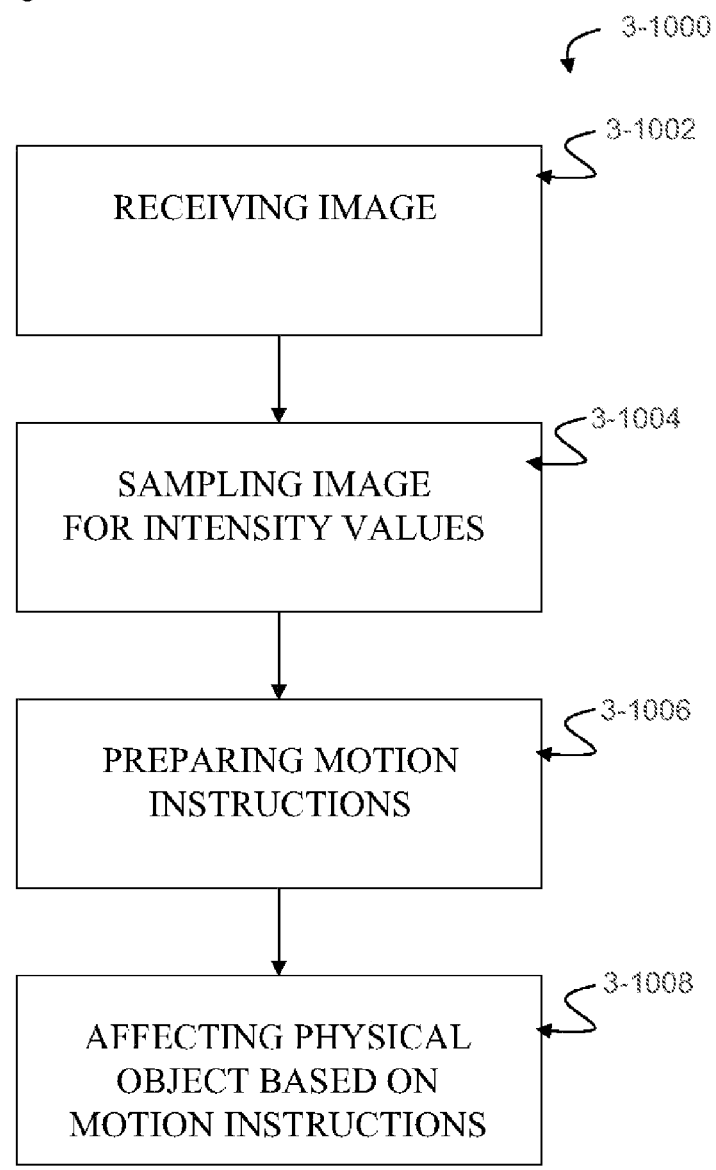
FIG. 50 is a method for sampling an image for intensity values, translating the intensity values into z-values, preparing motion instructions based on the translation, and affecting a physical material based on the motion instructions, in accordance with an embodiment of the invention.

FIG. 50 is a method for sampling an image for intensity values, translating the intensity values into z-values, preparing motion instructions based on the translation, and affecting a physical material based on the motion instructions, in accordance with an embodiment of the invention. In one embodiment, method 3-1000 includes receiving an image at block 3-1002, sampling the image for intensity values at block 3-1004, preparing motion instructions at block 3-1006, and affecting a physical material based on the motion instructions at block 3-1008.

In one embodiment, the receiving an image at block 3-1002 includes receiving any picture, photo, drawing, painting, computer file, or other image or representation of an image. In one embodiment, the sampling the image for intensity values at block 3-1004 includes defining a coordinate system and superimposing the coordinate system on the image. In one particular embodiment, the coordinate system is a two-dimensional Cartesian coordinate system and the image is a two dimensional image. With the coordinate system defined and superimposed on the image, a first x, y coordinate is selected and a first color on the image corresponding to the first x, y coordinate is evaluated for intensity. A brighter first image color receives a higher intensity evaluation and a darker first image color receives a lower intensity evaluation, although this can be modified. The first image color is assigned a numerical value corresponding to the intensity evaluation, which may be linearly or logarithmically calculated. The numerical value is retained as a z-value of the first x, y coordinate. For instance, at x, y coordinate (1, 5) the first image color could be white. For a white image color, a 10 could be assigned as a z-value. Thus, the x, y, and z values would be (1, 5, 10). The process of selecting a coordinate value, evaluating an image color corresponding to the coordinate value for intensity, assigning a numerical value for the image color intensity, and retaining the numerical value as a z-value can be repeated for a plurality of x and y coordinates to create a set of x, y, and z values.

In one embodiment, the preparing motion instructions at block 3-1006 is substantially similar as discussed in reference to FIG. 41. Accordingly, in one particular embodiment the preparing includes directing a point to trace through space the set of x, y, and z values obtained from the sampling at block 3-1004 (or vice-versa). Because the set of x, y, and z values obtained from the sampling at block 3-1004 include z-values corresponding to intensity on an image at a various x, y coordinates, preparing motion instructions that direct a point to trace the set of x, y, and z values has an effect of directing the point to trace a physical representation of color intensity at various locations on the image. In one embodiment, the affecting a physical material based on the motion instructions at block 3-1008 is substantially similar as discussed in reference to FIG. 41. In one particular embodiment, method 3-1000 can be repeated for various θ, γ positions for 3D images as described in reference to FIG. 46.

Figure 51:
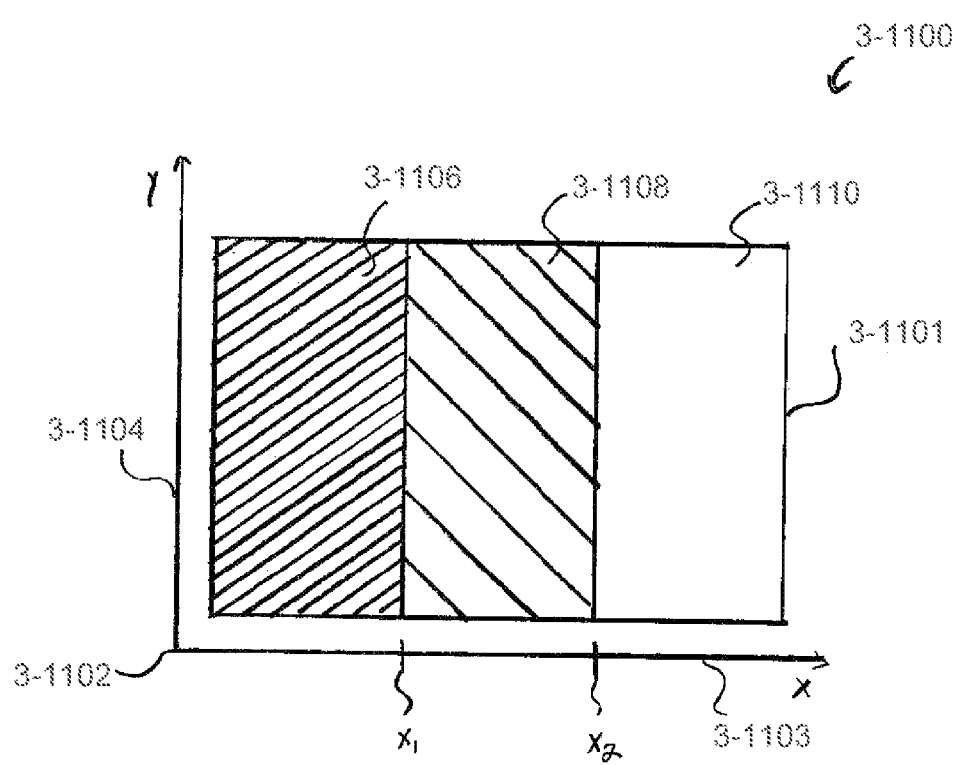
FIG. 51 is a plan view of an image having different intensity values, in accordance with an embodiment of the invention.

FIG. 51 is a plan view of an image with different intensity values, in accordance with an embodiment of the invention. In one embodiment, system 3-1100 includes an image 3-1101 and a coordinate system 3-1102. The image 3-1101 includes a low intensity portion 3-1106, a mid intensity portion 3-1108, and a high intensity portion 3-1110. The coordinate system 3-1102 includes an x-axis 3-1103 and a y-axis 3-1104. The coordinate system 3-1102 is superimposed on the image 3-1101 whereby x and y coordinate values correspond to a location on the image 3-1101. Accordingly, for a given x and y coordinate value over the image 3-1101, there is a corresponding image color having an intensity level. The intensity level is translated into a numerical value, which is assigned as to the x and y coordinate as a z value. In one particular embodiment, the numerical value is higher for higher intensity levels and lower for lower intensity levels. The set of desired x, y, and z values is a translation of the image 3-1101. The image 3-1101 can include many more colors or patterns.

Figure 52:
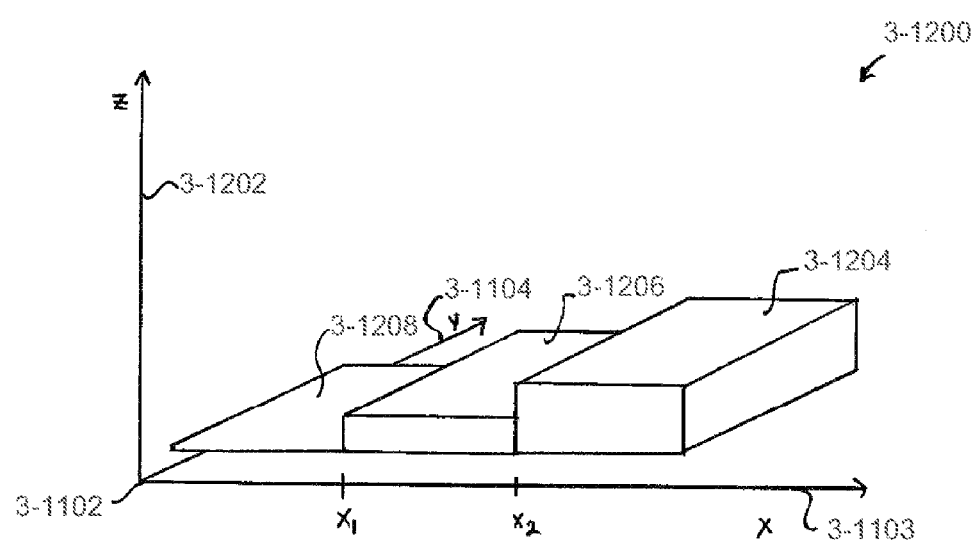
FIG. 52 is a graphical representation of translated values, in accordance with an embodiment of the invention.

FIG. 52 is a graphical representation of translated values, in accordance with an embodiment of the invention. In one embodiment, system 3-1200 includes the coordinate system 3-1102 having the x-axis 3-1103 and the y-axis 3-1104 and a z-axis 3-1202. The set of translated x, y, and z values of the image 3-1101 is graphed on the coordinate system 3-1102. Accordingly, portion 3-1204 corresponds to the high intensity portion 3-1110, portion 3-1206 corresponds to the mid intensity portion 3-1108, and portion 3-1208 corresponds to the low intensity level 3-1106.

Figure 53:
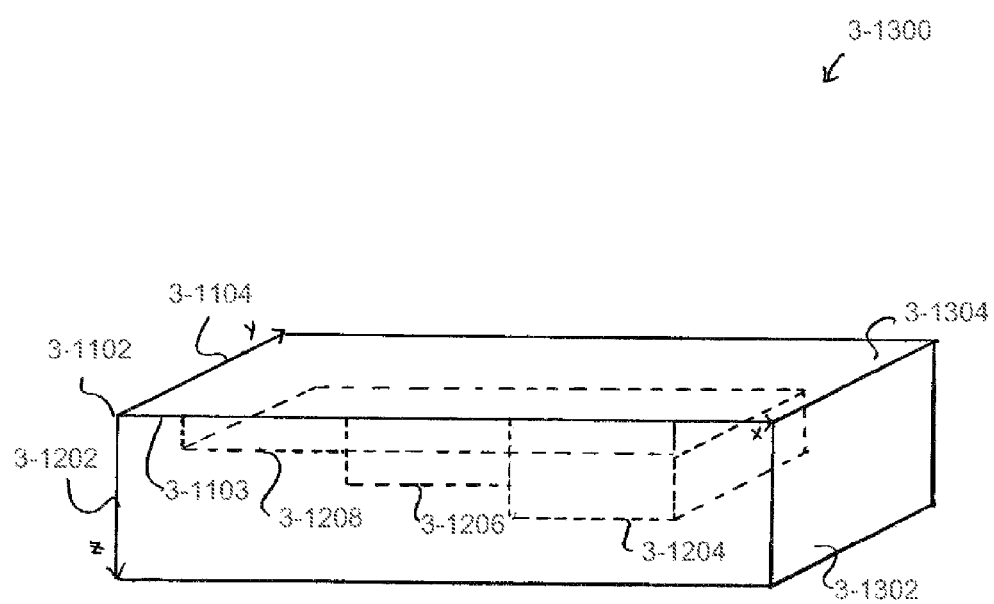
FIG. 53 is a perspective view of a set of the translated values superimposed on a physical material, in accordance with an embodiment of the invention.

FIG. 53 is a perspective view of a set of translated values superimposed on a physical material, in accordance with an embodiment of the invention. In one embodiment, system 3-1300 includes a physical material 13-1302 and the coordinate system 3-1102 superimposed on an upper surface 3-1304 of the physical material 3-1302, whereby the x-axis 3-1103 and the y-axis 3-1104 are positioned on the upper surface 3-1304 and the z-axis is positioned along a depth of the physical material 3-1302. The set of translated x, y, and z values is superimposed on the physical material 3-1302, with the dashed lines (not numbered) representing the set of x, y, and z values. Accordingly, the portion 3-1204 corresponds to the high intensity portion 3-1110, the portion 3-1206 corresponds to the mid intensity portion 3-1108, and the portion 3-1208 corresponds to the low intensity level 3-1106.

Figure 54:
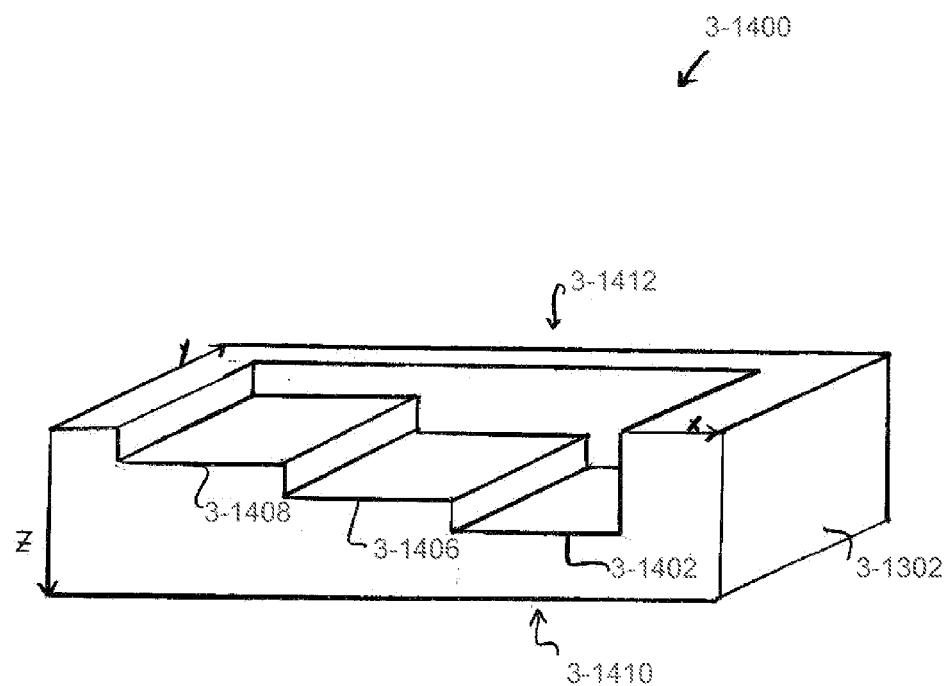
FIG. 54 is a perspective view of a physical object having material removed based on translated values, in accordance with an embodiment of the invention.

FIG. 54 is a perspective view of a physical object having material removed based on translated values, in accordance with an embodiment of the invention. In one embodiment, system 3-1400 includes the physical material 3-1302 having material removed based on the set of the translated x, y, and z values. At each x and y coordinate value in the translated set, material is removed from the physical material 3-1302 to a depth of a corresponding z-value. Therefore, portion 3-1402 corresponds to the high intensity portion 3-1110, portion 3-1406 corresponds to the mid intensity portion 3-1108, and portion 3-1408 corresponds to the low intensity portion 3-1106. In one particular embodiment, a light source can be proximate to a rear surface 3-1410 of the physical material 3-1302 and configured to shine through the rear surface 3-1410. A viewer on a front surface 3-1412 of the physical material 3-1302 would perceive higher intensity light through portion 3-1402, a lower intensity light through portion 3-1406, and an even lower intensity light through portion 3-1408, thereby correlating to the image 3-1101 intensity values. In one particular embodiment, material is removed using a personal affector machine.

Figure 55:
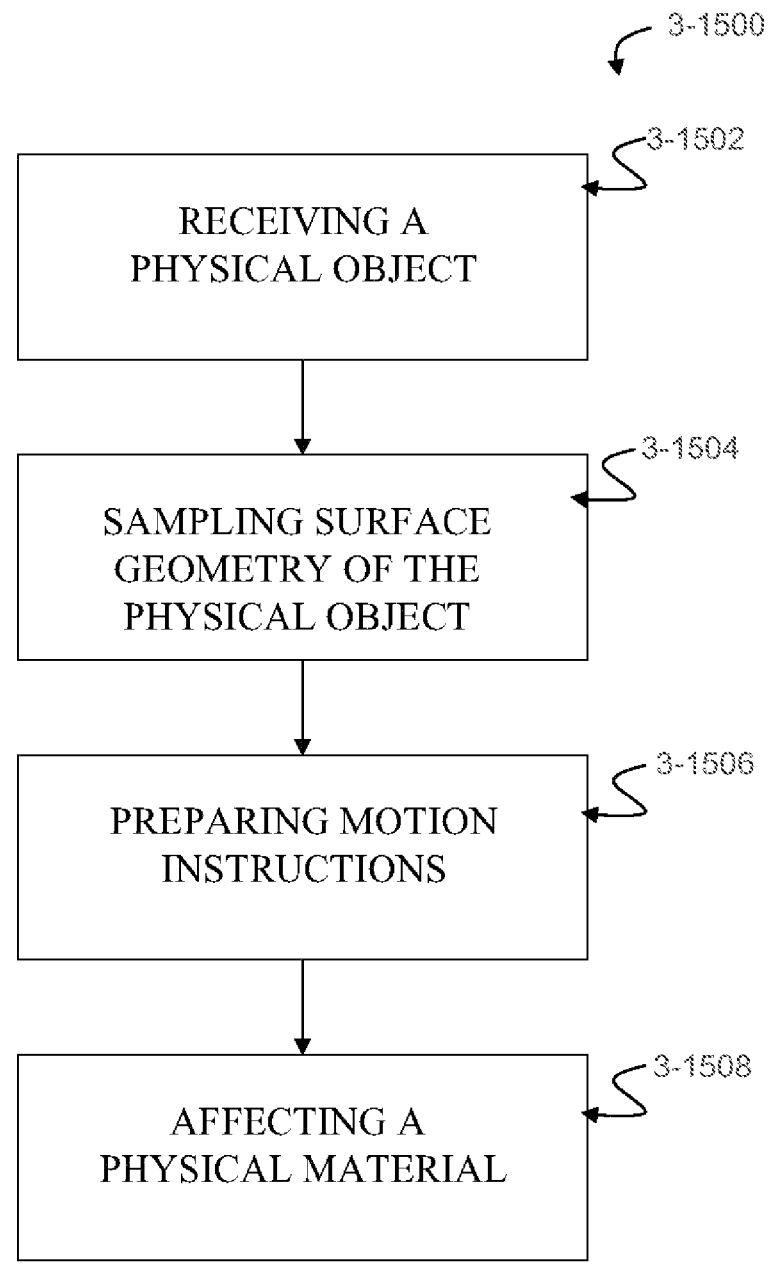
FIG. 55 is a flow diagram of a method for receiving a first physical object, sampling a surface geometry of the first physical object, preparing motion instructions based on the sampling, and affecting a physical material based on the motion instructions, in accordance with an embodiment of the invention.
Figure 56:
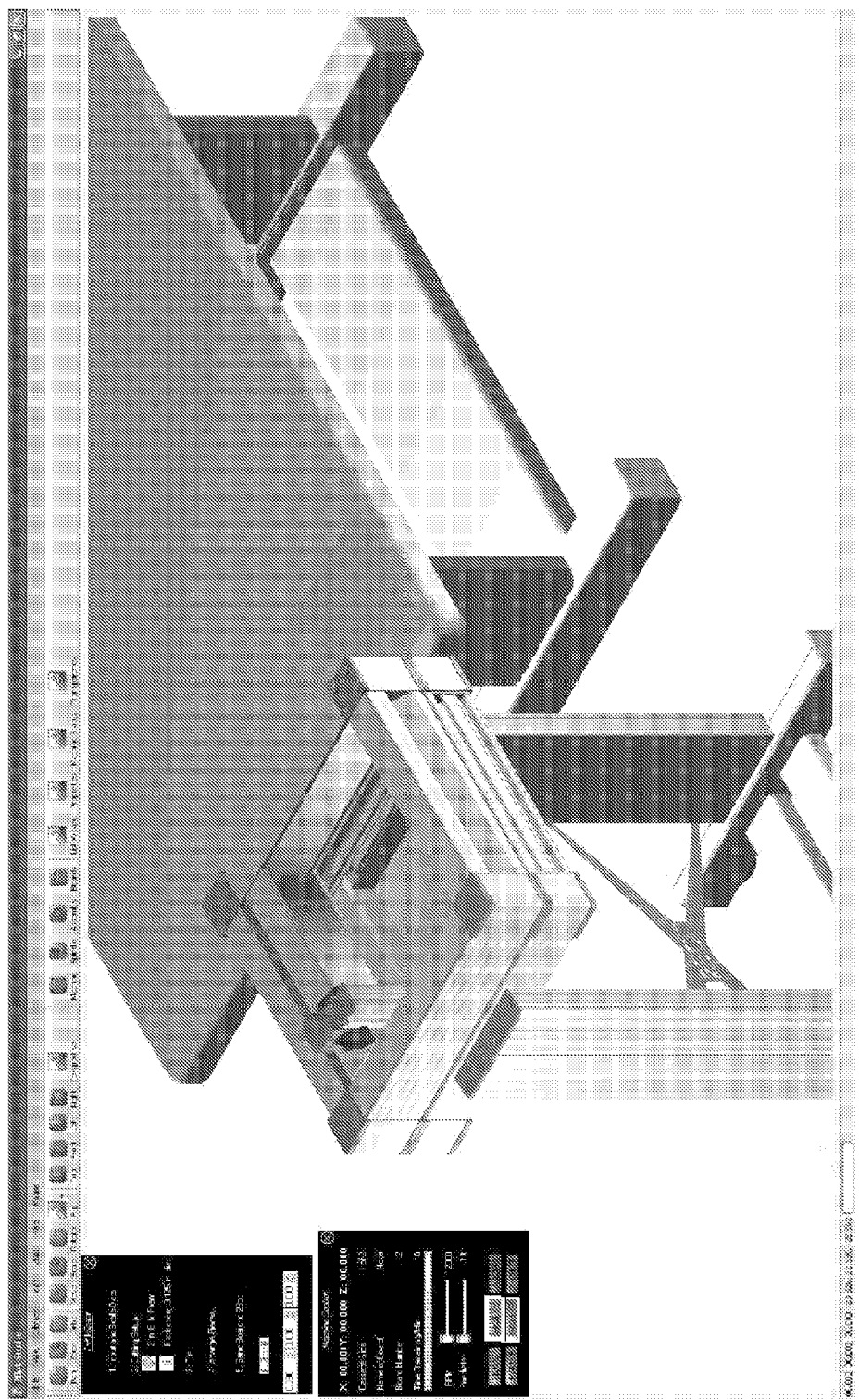
FIGS. 56, 57, and 58 are screenshots of a software application for sampling a surface geometry description of an object, in accordance with an embodiment of the invention.
Figure 57:
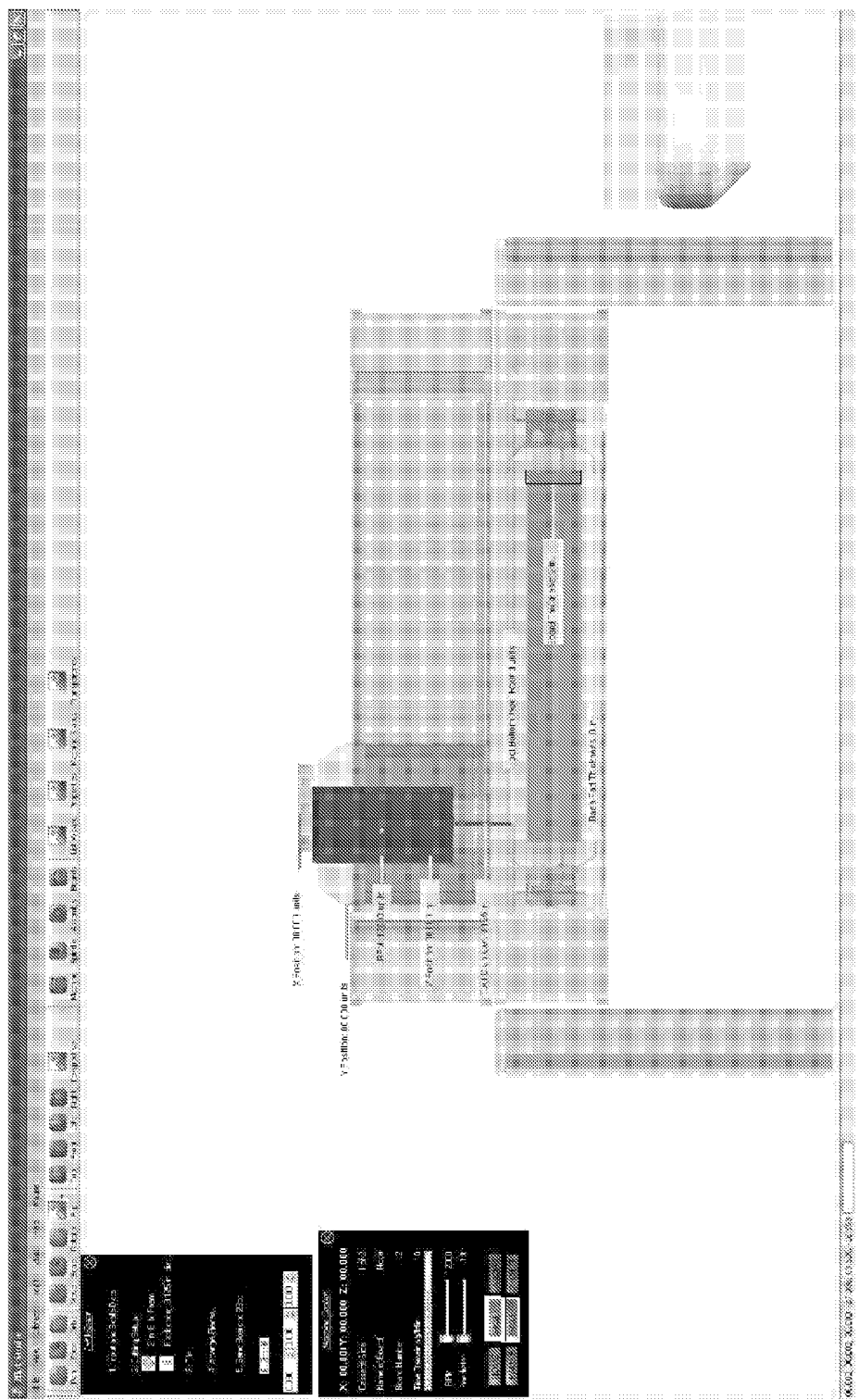
Figure 58:
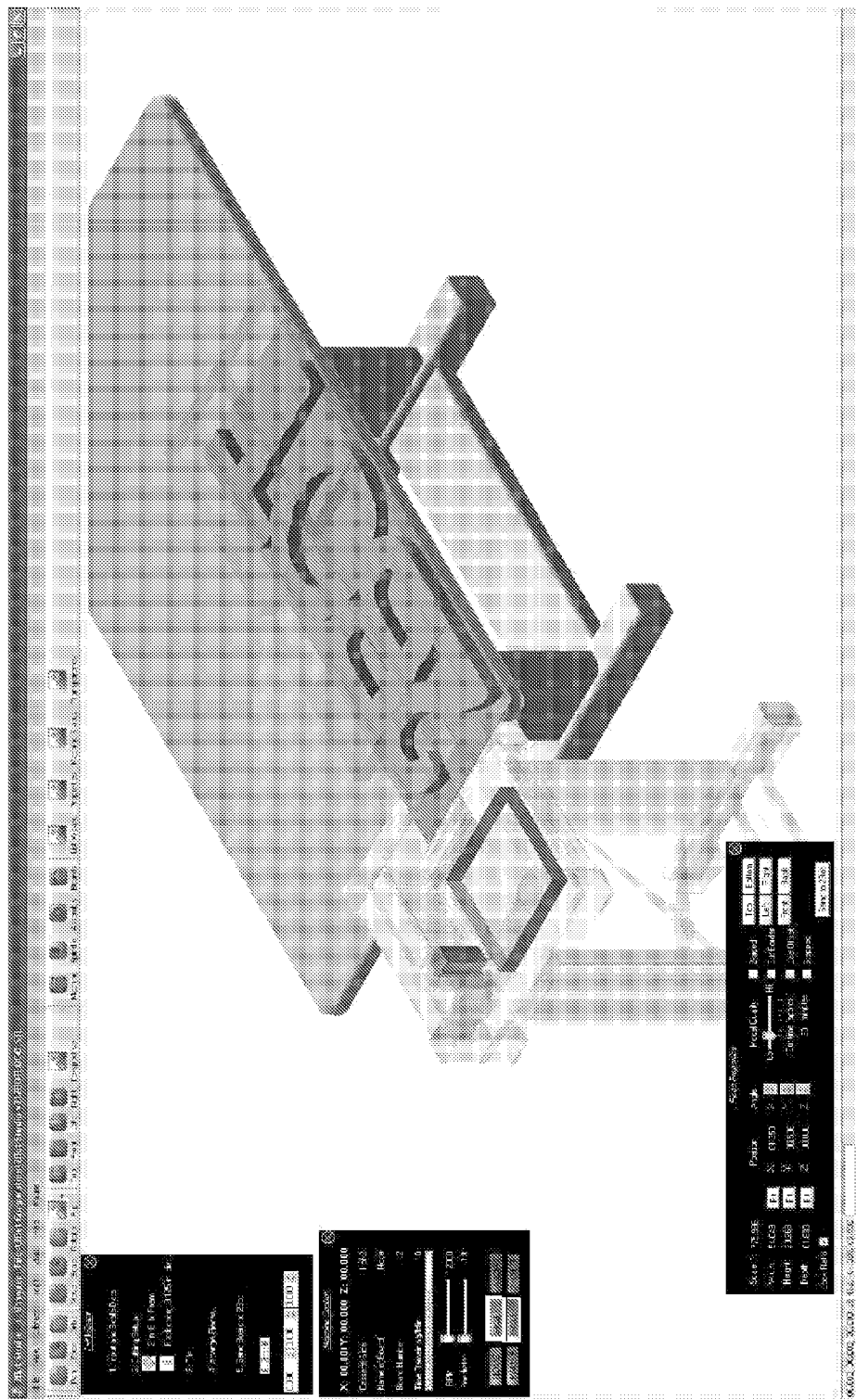

FIG. 55 is a flow diagram of a method for receiving a first physical object, sampling a surface geometry of the first physical object, preparing motion instructions based on the sampling, and affecting a physical material based on the motion instructions, in accordance with an embodiment of the invention. In one embodiment, method 3-1500 includes receiving a first physical object at block 3-1502, sampling a surface geometry of the first physical object at block 3-1504, preparing motion instructions at block 3-1506, and affecting a physical material at block 3-1508.

In one embodiment, the receiving a first physical object at block 3-1502 includes identifying any two or three dimensional object. Such objects can include, but are not limited to, pictures, sculptures, drawings, statutes, animals, humans, furniture, keys, tools, or any other two or three dimensional object.

In one embodiment, the sampling a surface geometry of the first physical object at block 3-1504 is substantially similar as described in reference to FIG. 41 with an exception that a physical object replaces a surface geometry description. Accordingly, in one embodiment the sampling includes first defining and holding constant a position of the first physical object. Once the position of the first physical object is held constant, an x and y axis plane is defined relative to the first physical object, which can be at any position relative to the first physical object. With the x and y axis plane defined, it is possible to determine a z-value for each x and y coordinate on the x and y axis plane. The z-value is a normalized distance between the physical object and the x and y axis plane at a given x and y coordinate. Sampling is the process by which z-values are determined for each desired x and y coordinate on the x and y axis. The set of x, y, and z values obtained from the sampling can be considered a rasterization of a surface of the first physical object.

In one embodiment, the preparing motion instructions based on the sampling at block 3-1506 and the affecting a physical material at block 3-1506 are substantially the same as discussed in reference to FIG. 41. In certain embodiments, the method 3-1500 can be repeated for a plurality of θ, γ positions as described in FIG. 46. Accordingly, in one embodiment, a human can be embodied in a physical object to create an action figure.

This application also relates generally to material affecting, and more specifically, to systems and methods for using an affector geometry description to automatically adjust an affector path.

Figure 59:
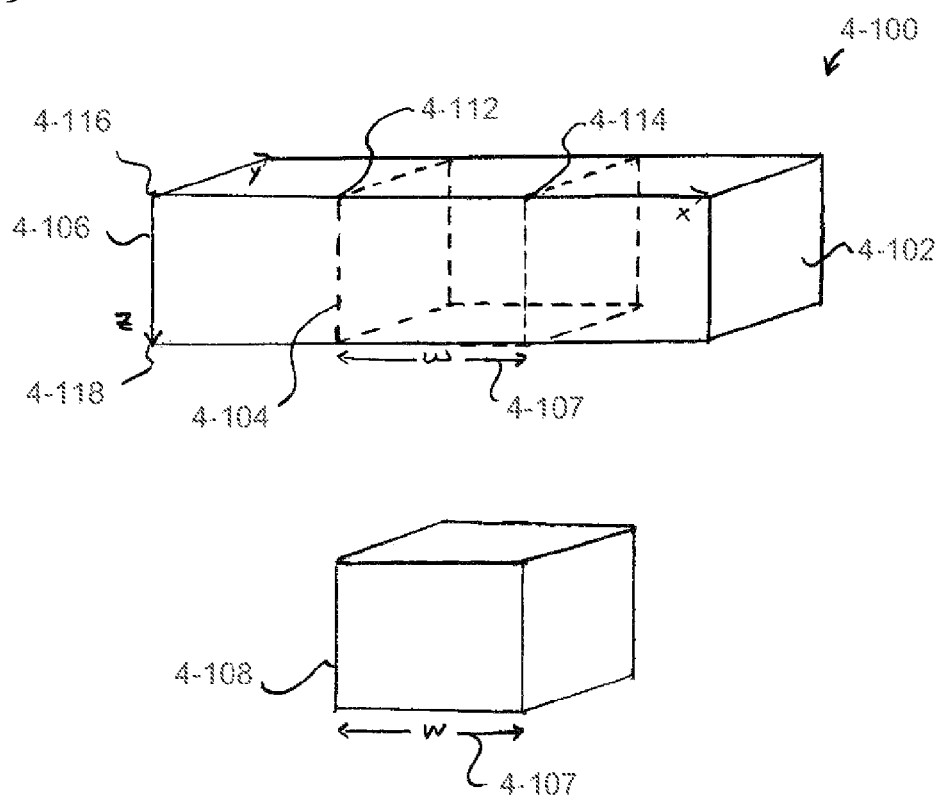
FIG. 59 is a perspective view of an object produced by removal from a material, in accordance with an embodiment of the invention.

FIG. 59 is a perspective view of an object produced by removal from a material, in accordance with an embodiment of the invention. In one embodiment, system 4-100 includes a material 4-102 having a set of coordinates 4-106 superimposed thereon to reveal a representation of an object 4-104 having a width 4-107. An object 4-108 corresponding to the representation of an object 4-104 and having a width 4-107 is produced by removing matter from the material 4-102 according to the set of coordinates 4-106. In one particular embodiment, the object 4-108 is produced using a personal affector machine.

In one embodiment the material 4-102 is a block of dense foam configurable to being carved and cut; although, other materials are possible. The set of coordinates 4-106 include a set of x, y, and z values based on a Cartesian coordinate system, which together define the representation of an object 4-104. For instance, z values between points 4-112 and 4-114 correspond with point 4-116 while z values outside points 4-112 and 4-114 correspond with point 4-118. When the set of coordinates 4-106 is superimposed on the material 4-102, such as with an x and y axis on a top surface of the material 4-102 and a z-axis running along a depth of the material, it reveals the representation of an object 4-104 (dashed lines) having the width 4-107 within the material 4-102. Accordingly, removal of matter from the material 4-102 according to the set of coordinates 4-106 produces the object 4-108 having the width 4-107.

Figure 60:
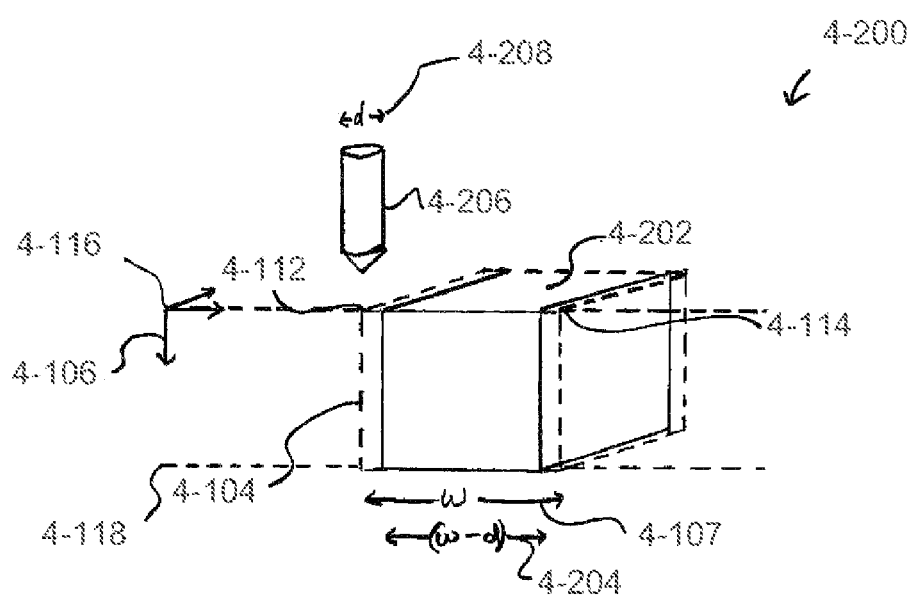
FIG. 60 is a perspective view of an object produced by removal from a material using a rasp, in accordance with an embodiment of the invention.

FIG. 60 is a perspective view of an object produced by removal from a material using a rasp, in accordance with an embodiment of the invention. In one embodiment, system 4-200 includes an object 4-202 having a width 4-204 produced from the material 4-102 (FIG. 59) using rasp 4-206 according to the set of coordinates 4-106.

In one embodiment, the rasp 4-206 is configured to remove matter from the material 4-102 based on the set of coordinates 4-106. For instance, the rasp 4-206 is configured to remove matter from the material 4-102 at a depth corresponding to the point 4-118 for values outside the points 4-112 and 4-114 and at a depth corresponding to the point 4-116 for values inside the points 4-112 and 4-114. The object 4-108 from FIG. 59 produced in this manner has the width 4-107; however, because the rasp 4-206 has a diameter 4-208, the object 4-202 has the width 4-204, an amount less than the width 4-107. To retain the object 4-202 having the width 4-107 the set of coordinates 4-106 is adjusted to compensate for the diameter 4-208 of the rasp 4-206.

Figure 61:
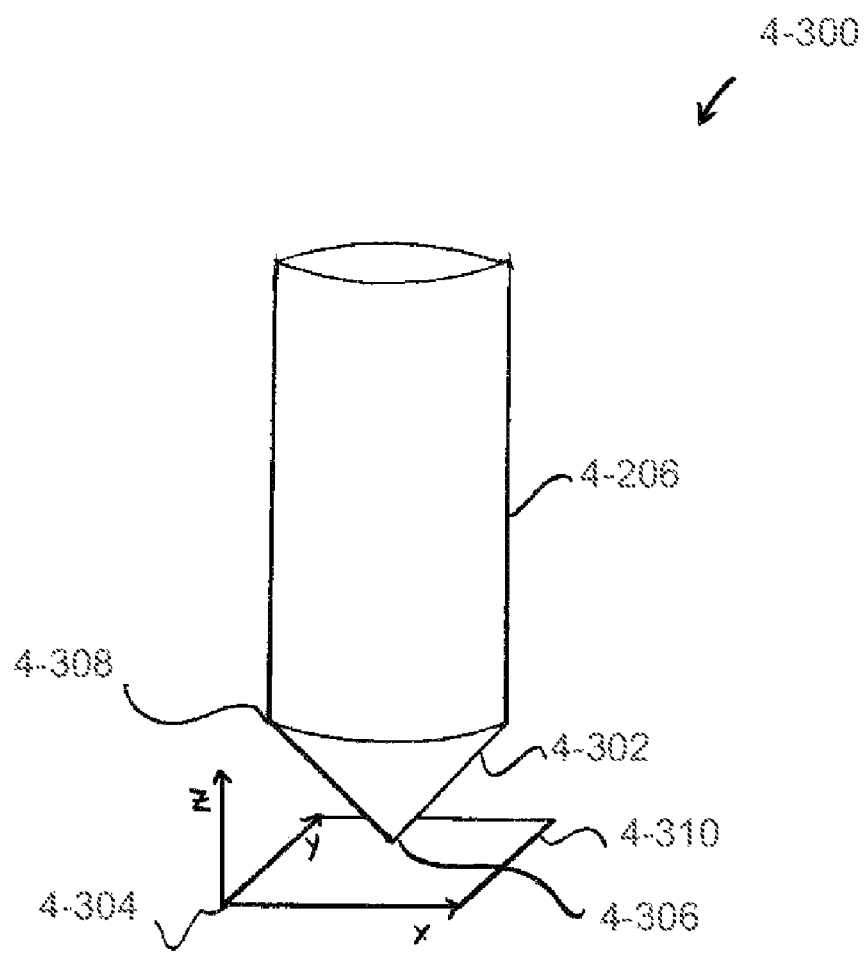
FIG. 61 is a visual representation of a rasp geometry description, in accordance with an embodiment of the invention.

FIG. 61 is a visual representation of a rasp geometry description, in accordance with an embodiment of the invention. In one embodiment, system 4-300 includes the rasp 4-206 having a surface 4-302 and a coordinate system 4-304 that is positioned perpendicularly and adjacent to the surface 4-302.

In one embodiment, the surface 4-302 includes an elongated cylindrical portion with a conical tip. However, the surface 4-302 can take on any number of shapes and dimensions and can include sharp edges, grooves, protrusions, or friction causing components disposed thereon. Furthermore, the surface 4-302 can be asymmetrical or non-uniform. Regardless of the rasp 4-206 shape or dimension, the surface 4-302 can be described using the coordinate system 4-304. For each x and y coordinate on the coordinates system 4-304 an associated z-value indicates a normalized distance to the surface 4-302. For instance, an x and y coordinate associated with center point 4-306 may have a smaller z-value while an x and y coordinate associated with edge point 4-308 may have a larger z-value. The set of x, y, and z values defines a matrix 4-310 that provides a geometry description of the surface 4-302 of the rasp 4-206.

In other embodiments, the surface 4-302 is describable with the coordinate system 4-304 alternatively positioned relative to the rasp 4-206. In further embodiments, the surface 4-302 is describable using other methods, such as with angles or a series of circles. In certain embodiments, the coordinate system 4-304 is based on a cylindrical, pyramidal, or other shape instead of a plane.

Figure 62:
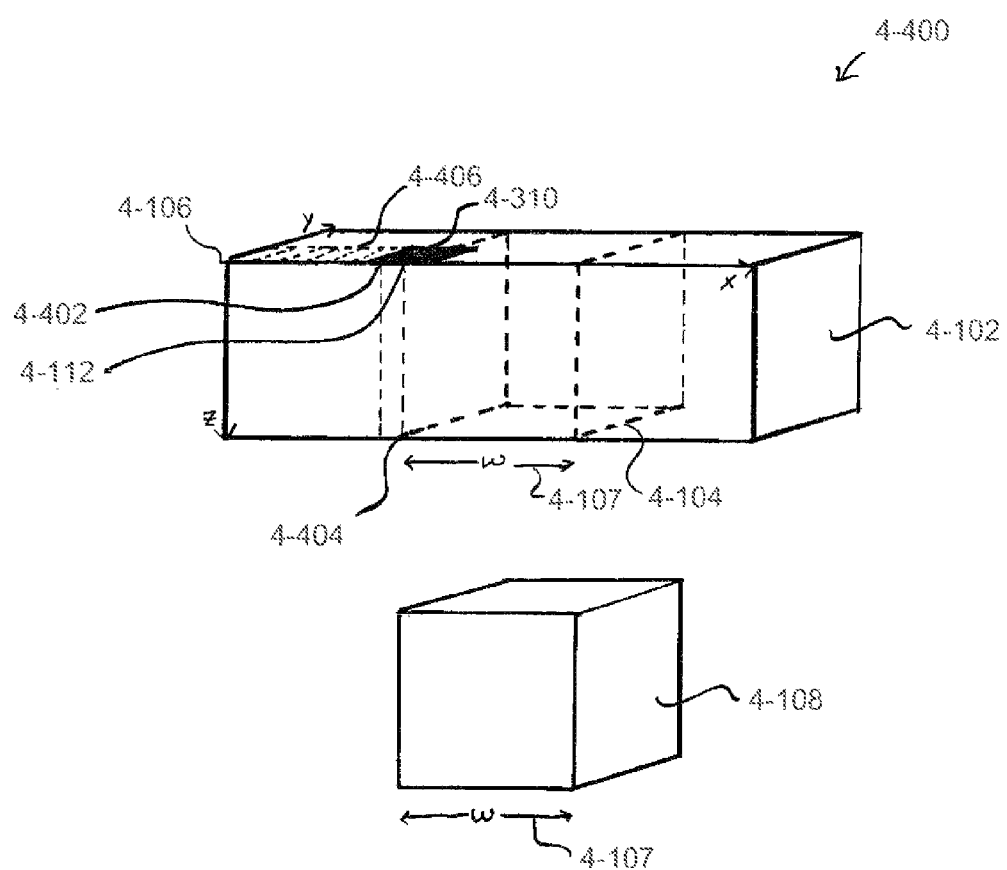
FIG. 62 is a perspective view of an object produced by removal from a material using a rasp, in accordance with an embodiment of the invention.

FIG. 62 is a perspective view of an object produced by removal from a material using a rasp, in accordance with an embodiment of the invention. In one embodiment, system 4-400 includes the material 4-102 having the set of coordinates 4-106 superimposed thereon to reveal the representation of an object 4-104 having the width 4-107. The object 4-108 having the width 4-107 is produced using the rasp 4-206 by removing matter from the material 4-102 according to a set of adjusted coordinates.

In one embodiment, the set of adjusted coordinates is determined by comparing the matrix 4-310 to the set of coordinates 4-106. The set of coordinates 4-106 include a set of x, y, and z values that define the representation of an object 4-104 as described in reference to FIG. 59. Accordingly, when the set of coordinates 4-106 is superimposed on the material 4-102 the z-values are a depth to remove matter from the material 4-102 to produce the object 4-108; although, it is not necessary to superimpose the set of coordinates 4-106 to remove matter from the material 4-102 as this discussion is intended merely for illustration purposes. With an infinitesimally thin removal source, such as a laser, removal of matter from the material 4-102 at a given x and y coordinate to a depth of an associated z-value does not disturb adjacent matter (FIG. 59). However, when the rasp 4-206 is used having the diameter 4-208, removal of matter at a given x and y coordinate to a depth of an associated z-value disturbs adjacent matter (FIG. 60). Therefore, prior to or during removal of matter at a given x and y coordinate on the set of coordinates 4-106, the matrix 4-310 is compared to the set of coordinates 4-106 to determine a new z-value. The new z-value is a depth that the rasp 4-206, represented by the matrix 4-310, can remove desired matter from the material 4-102 at a given x and y coordinate on the set of coordinates 4-106 without undesirably removing matter beyond z-values for adjacent x and y coordinates on the set of coordinates 4-106. For example, at x and y coordinates on the set of coordinates 4-106 before point 4-402, the rasp 4-206, represented by the matrix 4-310, can remove matter from the material 4-102 at a depth associated with point 4-404 without undesirably removing matter for adjacent x and y coordinates. However, at x and y coordinates between the point 4-402 and point 4-112 the rasp 4-206, represented by the matrix 4-310, cannot remove material to a depth associated with point 4-404 without undesirably removing adjacent material (FIG. 60). Accordingly, in this example a new z-value of zero is assigned to x and y coordinates between the points 4-402 and 4-112. New z-values can be similarly determined for each desired x and y coordinate on the set of coordinates 4-106 to produce the set of adjusted coordinates. Removal of matter from the material 4-102 using the rasp 4-206 according to the adjusted set of coordinates produces the object 4-108 having the width 4-107.

System 4-400 illustrates the above principle using a rasp as an affector to create a simple block where z-values are either acceptable or required to be set to zero. However, in certain embodiments system 4-400 can be applied using any affector to create any uniform or non-uniform shape, as is discussed in FIG. 63.

Figure 63:
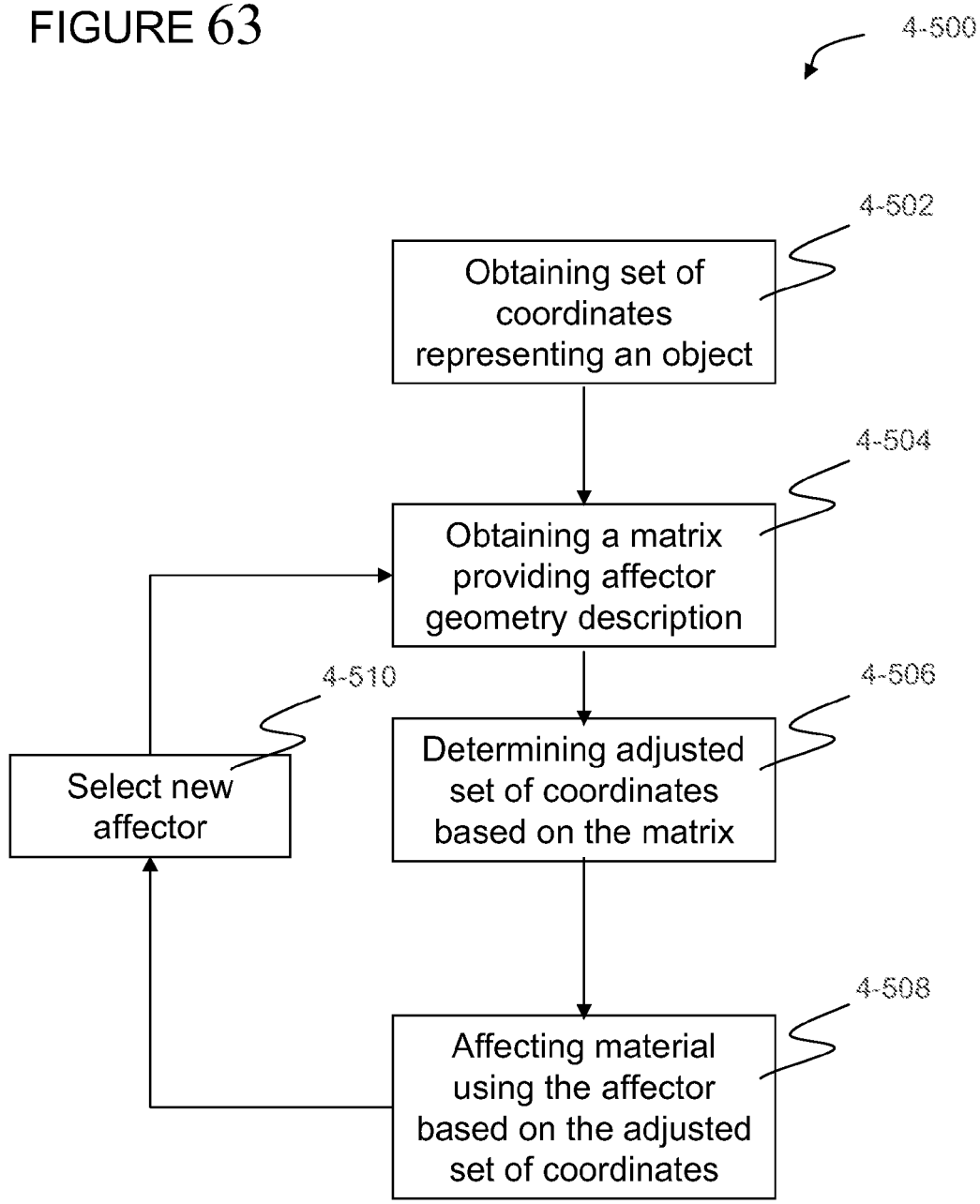
FIG. 63 is a flow diagram of a method for using an affector geometry description to automatically adjust an affector path, in accordance with an embodiment of the invention.

FIG. 63 is a flow diagram of a method for using an affector geometry description to automatically adjust an affector path, in accordance with an embodiment of the invention. In one embodiment, method 4-500 includes obtaining a set of coordinates representing an object at block 4-502, obtaining a matrix providing an affector geometry description at block 4-504, determining an adjusted set of coordinates based on the matrix at block 4-506, and affecting material using the affector based on the adjusted set of coordinates at block 4-508. In one particular embodiment, method 4-500 further includes selecting a new affector at block 4-510 and returning to block 4-504.

In one embodiment, the obtaining a set of coordinates representing an object at block 4-502 includes obtaining a set of x, y, and z values that describe a surface of an object. For each x and y coordinate there is an associated z-value that describes a normalized distance to a point on the surface of an object. For simple objects, such as a block, x and y coordinates will have one z-value for a side of the block and another z value for a surface of the block. For more complex objects, such as a land topography or a face, x and y coordinates may have a number of different associated z-values indicative of varying distances to a surface of the land topography or the face. Whatever the surface of an object, the set of x, y, and z values can be superimposed on a material where x and y coordinates are disposed along a surface of the material and z values are disposed along a depth of the material to reveal a representation of the surface of an object; although, as stated previously, this step may not be necessary.

In one embodiment, the obtaining a matrix providing an affector geometry description at block 4-504 includes obtaining a set of x, y, and z values that describe an affector. The affector can be any aforementioned tool such as a laser, water jet, oscillating knife, custom tool, jig saw, planer, joiner, drill press, sander, buffer, borer, lathe, cutter, router, welder, drill, saw, bonder, scanner, shaper, print head, sewing tool, sculpting tool, etching tool, ultrasonic knife, plasma torch, optical scanner, ink head, camera, turbine spindle, extruder, glue depositor, air dispenser, chemical depositor, sprayer, proximity sensor, welder, laser range finder, light applicator, punch pin, rasp, hammer, writing instrument, screwdriver, pliers, wrench, magnet, density sensor, or any other tool that serves to alter, preserve, or retrieve information. Accordingly, any given affector can have a different shape from another affector and may be asymmetrical or non-uniform. For instance, one particular affector, such as a drill bit, may be very thin with a flat head surface, while another particular affector, such as a paint applicator, may be wide with asymmetrical protrusions. To describe an affector, an x and y axis is positioned perpendicularly to the affector as illustrated in FIG. 61. For each x and y coordinate, an associated z-value is determined, which is a normalized distance to the affector surface. Accordingly, for a center point on the affector surface, an associated z-value may be small and for an edge point on the affector surface, an associated z-value may be larger. Accordingly, the set of x, y, and z values obtained in this manner provides a matrix that is flexible enough to describe many affector geometries.

In one embodiment, the determining an adjusted set of coordinates based on a matrix at block 4-506 includes comparing the matrix obtained from block 4-504 with the set of coordinates obtained from block 4-502. Affecting material based on a set of coordinates is effective when an affector does not affect adjacent matter in the material, such as when the affector is a laser or otherwise very thin. However, when an affector having a diameter is used to affect material based on a set of coordinates, it affects adjacent matter in the material, which may be undesirable (FIG. 60). To avoid undesirably affecting of adjacent matter by an affector, the matrix obtained from block 4-504 is compared with the set of coordinates obtained from the block 4-502. For each x and y coordinate on the set of coordinates, a new z-value is determined. The new z-value is a depth that an affector, represented by the matrix, can affect material at a given x and y coordinate on the set of coordinates without undesirably affecting adjacent matter on the set of coordinates. New z-values are similarly determined for each desired x and y coordinate on the set of coordinates to produce the set of adjusted coordinates.

In one embodiment, the affecting matter using an affector based on the adjusted set of coordinates at block 4-508 includes directing an affector, the matrix of which that was used to determine the adjusted set of coordinates, to affect material based on the adjusted set of coordinates. Therefore, the affector is directed to affect matter to a depth of an adjusted z-value for each x and y coordinate in the adjusted set of coordinates. In one particular embodiment where an affector is a rasp, an object produced by removal of material based on the adjusted set of coordinates may have less material removed than would have been removed using the set of coordinates without adjustment, but the object will not have more material removed than desired.

In one particular embodiment, method 4-500 further includes selecting a new affector at block 4-510 and returning to block 4-504. Accordingly, a large affector can be used initially to affect large amounts of material using method 4-500. After the large amounts of material have been affected, a finer affector can be used to affect smaller amounts of material using method 4-500. Despite a presence multiple affector sizes, only a single set of coordinates representing an object is needed. That is, a set of coordinates does not need to take into account an affector size; instead, method 4-500 automatically adjusts the set of coordinates into an adjusted set of coordinates based on affector geometry. Method 4-500 can be repeated as desired.

Figure 64:
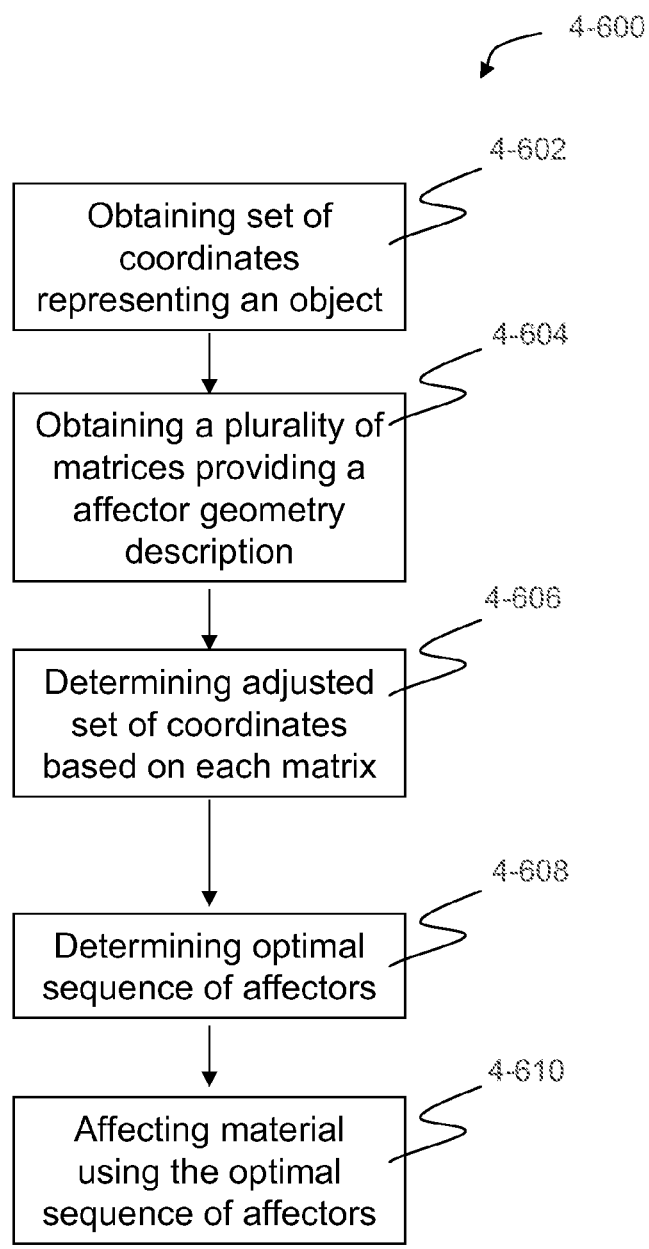
FIG. 64 is a flow diagram of a method for determining an optimal affector sequence, in accordance with an embodiment of the invention.

FIG. 64 is a flow diagram of a method for determining an optimal affector sequence, in accordance with an embodiment of the invention. In one embodiment, method 4-600 includes obtaining a set of coordinates representing an object at block 4-602, obtaining a plurality of matrices providing affector geometry description at block 4-604, determining an adjusted set of coordinates based on each matrix at block 4-606, determining an optimal sequence of affectors at block 4-608, and affecting material using the optimal sequence of affectors at block 4-610.

In one embodiment, the obtaining a set of coordinates representing an object at block 4-602 is substantially similar as discussed in reference to FIG. 63. In one embodiment, the obtaining a plurality of matrices providing affector geometry description at block 4-604 is substantially similar as discussed in reference to FIG. 63 with an exception that a matrix is obtained for a number of affectors. In one particular embodiment, each of the affectors has a different shape. In one embodiment, the determining an adjusted set of coordinates based on each matrix at block 4-606 is accomplished in a substantially similar manner as discussed in reference to FIG. 63.

In one embodiment, the determining an optimal sequence of affectors at block 4-608 involves determining a sequence of affectors to affect material that results in a fastest time to completion. Each of the affectors can affect material based on an associated set of adjusted coordinates in a determinable time frame. Further, each sequence of affectors can affect material based on an associated set of adjusted coordinates in a determinable time frame. Where a great deal of matter must be affected on material with coarse detail, a larger affector may be able to accomplish the affecting in less time than a smaller affector. However, where less matter must be affected with much finer detail, a smaller affector may be able to accomplish the affecting in less time than a larger affector. Alternatively, where both a great deal of matter with coarse detail and less matter with finer detail must be affected, a sequence of first using a larger affector to coarsely affect matter followed by a using a smaller affector to finely affect matter may be able to accomplish the affecting in less time than either of the affectors independently. Indeed, a fastest time to completion will depend on an amount of material to be affected, a shape of material to be affected, a level of detail in material to be affected, and available affectors. Thus, time to completion for each affector and sequence of affector is obtained and analyzed for the fastest time to completion.

In one embodiment, the affecting using the optimal sequence of affectors at block 4-610 includes affecting material as described in reference to FIG. 63 according to the optimal sequence of affectors.

This application also relates generally to material affecting, and more specifically, to systems and methods for providing an automatically adjustable affector.

Figure 65:
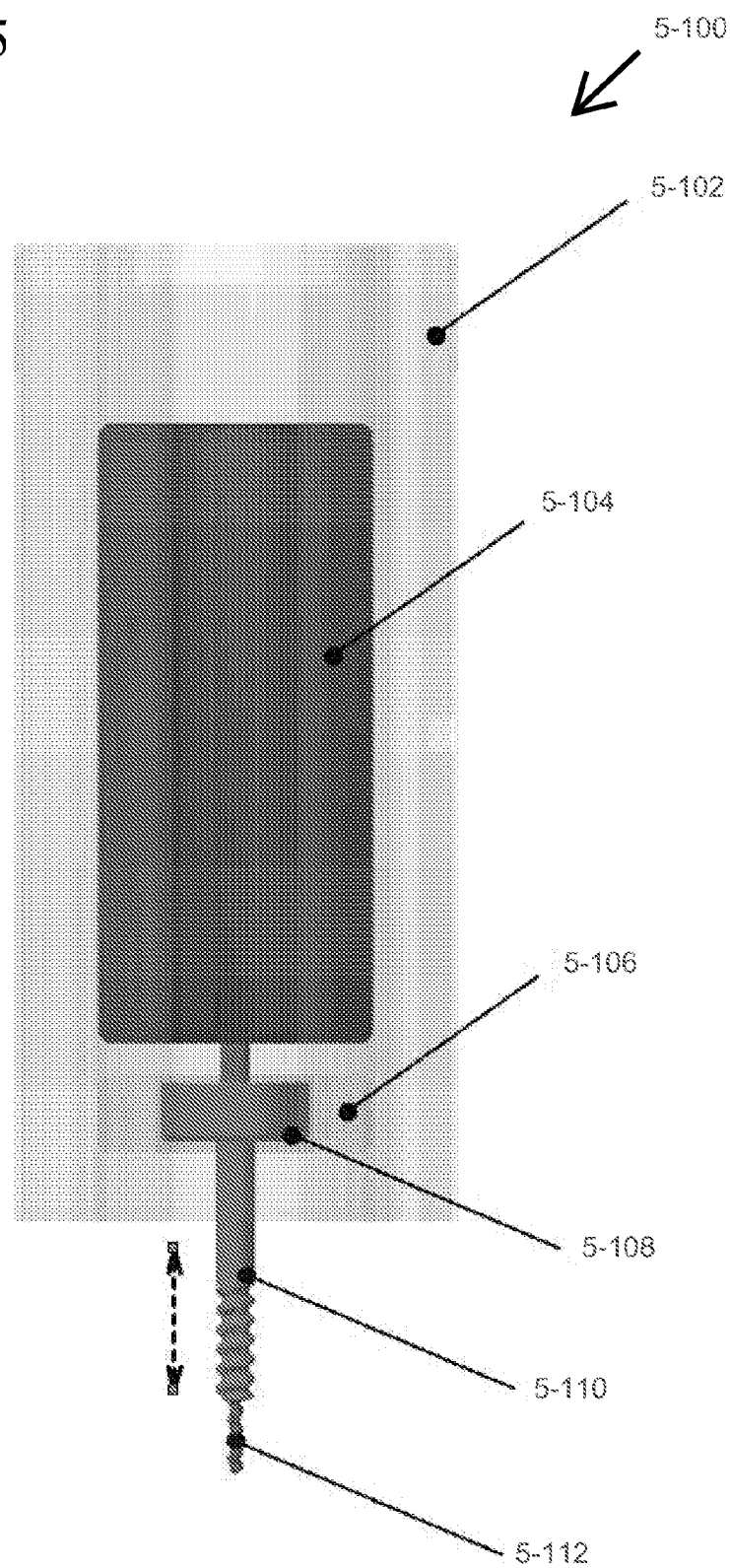
FIG. 65 is a side elevational view of a system employing an automatically adjustable affector, in accordance with an embodiment of the invention.

FIG. 65 is a side elevational view of a system employing an automatically adjustable affector, in accordance with an embodiment of the invention. In one embodiment, system 5-100 includes a housing 5-102, an affector motor 5-104, a solenoid 5-106, a plunger 5-108, a second affector 5-110, and a first affector 5-112.

In one embodiment, the affector motor 5-104 and the solenoid 5-106 are disposed within the housing 5-102. The affector motor 5-104 is a stepper motor configurable to providing rotational motion. The solenoid 5-106 is an electromagnet designed to produce a magnetic field in a volume of space using a loop of wire and electricity. The first affector 5-112 is coupled to the affector motor 5-104 and extends through a center of the solenoid 5-106. The affector motor 5-104 is configurable to provide rotational motion to the first affector 5-112. The second affector 5-110 is an extension of the plunger 5-108, which is a metallic composition, and includes an interior channel disposed along its length (not labeled). The second affector 5-110 and the plunger 5-108 are configurable to receive the first affector 5-112 within the interior channel whereby the plunger 5-108 is configurable to being movably disposed within a center of the solenoid 5-106. The affector motor 5-104 is further configurable to provide rotational motion to the plunger 5-108 and the second affector 5-110. A spring (not illustrated) is disposed on the plunger 5-108 to bias the plunger 5-108 and the second affector 5-110 in one direction relative to the solenoid 5-106, such as to cover the first affector 5-112. Electricity provided to the solenoid 5-106 induces a magnetic field that moves the plunger 5-108 in an opposing direction relative to the solenoid 5-106, such as to reveal the first affector 5-112. Accordingly, the affector motor 5-104 is configurable to provide rotational motion to the first affector 5-112 and the second affector 5-110. Electricity can be selectively applied to the solenoid 5-106 to reveal and conceal the first affector 5-112.

In one particular embodiment, the affector motor 5-104 is configurable to provide different motion such as a depression and rescission motion, to supply material such as ink or glue, or to remove material such as a vacuum source. In another embodiment, a core of paramagnetic or ferromagnetic material is used in association with the solenoid 5-106 to increase a magnetic field strength. In another particular embodiment, the second affector 5-110, the plunger 5-108, and the first affector 5-112 are removable and replaceable from the affector motor 5-104. In another embodiment, the spring is replaced by or complimented with one or more solenoids, which is configurable working in concert with the solenoid 5-106 to move the plunger 5-108 and the second affector 5-110 back and forth relative to the first affector 5-112. In yet a further embodiment, the second affector 5-110 is coupled to the affector motor 5-104 and the plunger 5-108 is coupled to the first affector 5-112; accordingly, electricity supplied to the solenoid 5-106 causes the plunger 5-108 and the first affector 5-112 to extend from and rescind within the second affector 5-110. In a further embodiment, three or more affectors are practiced in the system 5-100. In an alternate embodiment, the first affector 5-112 and the second affector 5-110 are positioned adjacent to one another without one being disposed within another.

Figure 66:
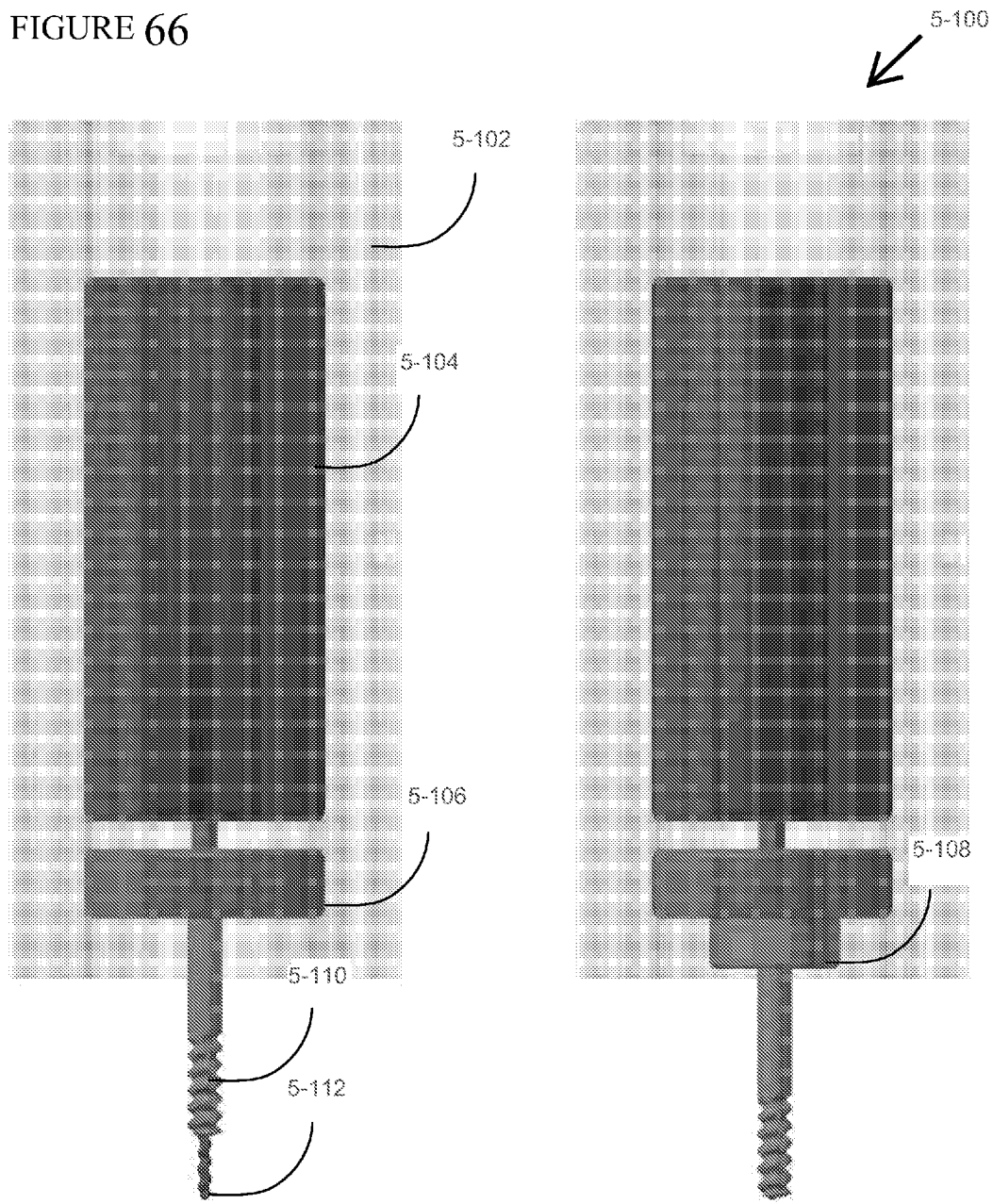
FIG. 66 is a side elevational view of a system employing an automatically adjustable affector, in accordance with an embodiment of the invention.

FIG. 66 is a side elevational view of a system employing an automatically adjustable affector, in accordance with an embodiment of the invention. In one embodiment, the system 5-100 includes the housing 5-102, the affector motor 5-104, the solenoid 5-106, the plunger 5-108, the second affector 5-110, and the first affector 5-112 as described herein.

In one embodiment, the first affector 5-112 is a rasp or drill bit having grooves or protrusions configurable to affecting a material (not illustrated) using a relatively small surface area. When electricity is provided to the solenoid 5-106, the plunger 5-108 and the second affector 5-110 are moved in such a manner to reveal the first affector 5-112; although, this can be reversed (FIG. 66 LEFT). Rotational motion from the affector motor 5-104 is then configurable to rotate the first affector 5-112 to affect a material with its relatively small surface area.

In one embodiment, the second affector 5-110 is a rasp or drill bit having grooves or protrusions configurable to affecting using a relatively large surface area. When no electricity is supplied to the solenoid 5-106, the plunger 5-108 and the second affector 5-110 are biased by a spring in such a manner to cover the first affector 5-112; although, this can be reversed (FIG. 66 RIGHT). Rotational motion from the affector motor 5-104 is then configurable to rotate the second affector 5-110 to affect a material using its relatively large surface area.

In one particular embodiment, the first affector 5-112 and the second affector 5-110 have similar grooves or protrusions. In further embodiments, the first affector 5-112 and the second affector 5-110 have different grooves or protrusions. In an alternate embodiment, different affectors are employable as mentioned herein, such as a laser, water jet, oscillating knife, custom tool, jig saw, planer, joiner, drill press, sander, buffer, borer, lathe, cutter, router, welder, drill, saw, bonder, scanner, shaper, print head, sewing tool, sculpting tool, etching tool, ultrasonic knife, plasma torch, optical scanner, ink head, camera, turbine spindle, extruder, glue depositor, air dispenser, chemical depositor, sprayer, proximity sensor, welder, laser range finder, light applicator, punch pin, rasp, hammer, writing instrument, screwdriver, pliers, wrench, magnet, density sensor, or any other tool that serves to alter, preserve, or retrieve information. In one embodiment, the first affector 5-112 and the second affector 5-110 are similar devices having different scales that complement each other. In a further embodiment, the first affector 5-112 and the second affector 5-110 are different devices. In another embodiment, the affector motor 5-104 is configurable to provide multiple functions, such as rotational motion, depression, and suction, and different affectors are selected accordingly. Thus, the first affector 5-112 can be a rasp for use in conjunction with rotational motion and the second affector 5-110 can be a vacuum channel for use in conjunction with suction.

Figure 67:
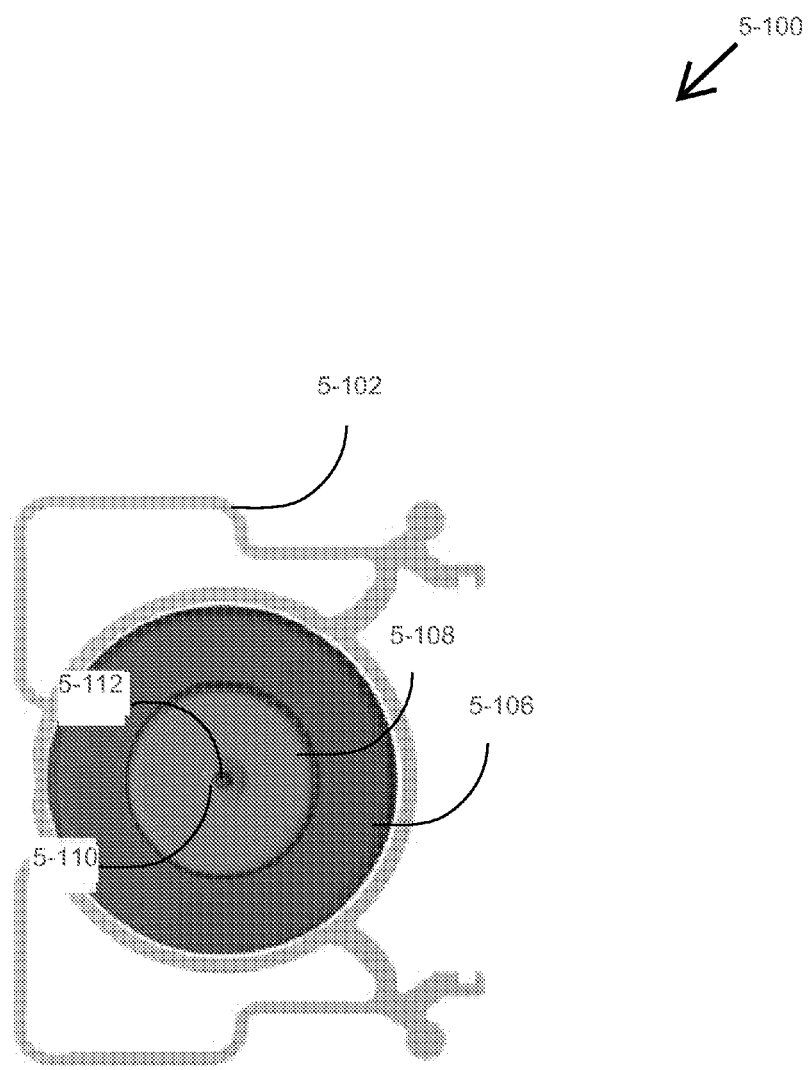
FIG. 67 is a bottom plan view of a system employing an automatically adjustable affector, in accordance with an embodiment of the invention.

FIG. 67 is a bottom plan view of a system employing an automatically adjustable affector, in accordance with an embodiment of the invention. In one embodiment, the system 5-100 includes the housing 5-102, the affector motor 5-104, the solenoid 5-106, the plunger 5-108, the second affector 5-110, and the first affector 5-112 as described herein.

In one embodiment, the affector motor 5-104 (not visible) is configurable to rotate the plunger 5-108, the second affector 5-110, and the first affector 5-112 relative to the housing 5-102 and the solenoid 5-106. The first affector 5-112 includes threads disposed on its surface and is coupled to the affector motor 5-104 through a center of the solenoid 5-106. The second affector 5-110 is an extension of the plunger 5-108, which include an interior channel having threads disposed along their length. The second affector 5-110 and the plunger 5-108 are configurable to receive the first affector 5-112 within the interior channel using mated threads. Accordingly, the first affector 5-112 has a smaller surface area relative to the second affector 5-110. Providing electricity to the solenoid 5-106 moves the plunger 5-108 and the second affector 5-110 relative to the first affector 5-112 to reveal the first affector 5-112 and its smaller surface area. Similarly, an absence of electricity to the solenoid 5-106 serves to move the plunger 5-108 and the second affector 5-110 relative to the first affector 5-112 to cover the first affector 5-112 and provide a larger surface area; although, this can be reversed. The mated threads of the internal channel and the first affector 5-112 prevent the second affector 5-110 and the plunger 5-108 from undesirably rotating relative to the first affector 5-112, such as when the second affector 5-110 meets frictional resistance from a material it is affecting. In one embodiment, the second affector 5-110 is internally movably embedded in guide channels (or vice versa) on the first affector 5-112. The guide channels permit the second affector 5-110 to be displaced along a length of the first affector 5-112 without permitting rotational movement of the second affector 5-110 relative to the first affector 5-112.

Figure 68:
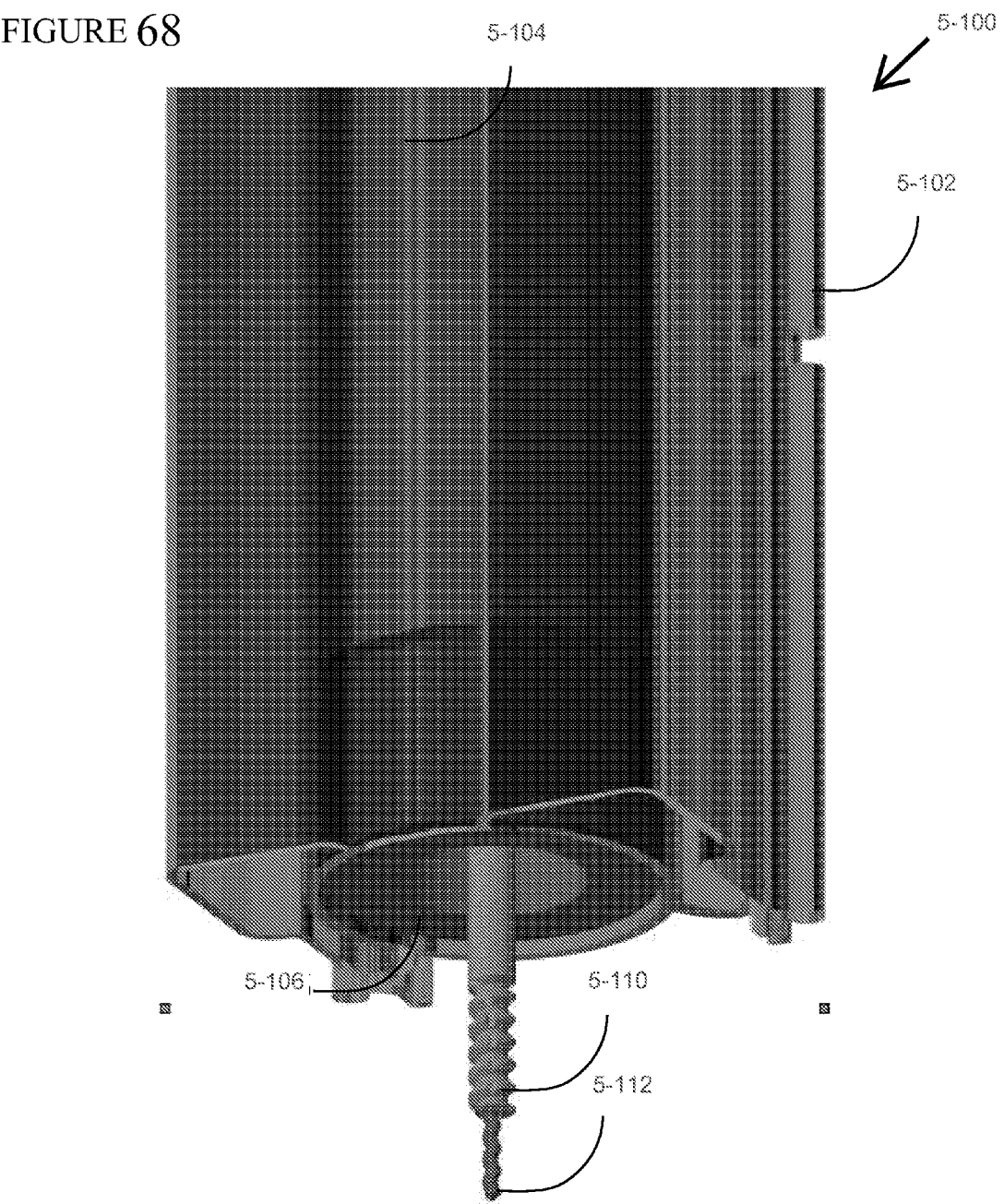
FIG. 68 is a bottom perspective view of a system employing an automatically adjustable affector, in accordance with an embodiment of the invention.

FIG. 68 is a bottom perspective view of a system employing an automatically adjustable affector, in accordance with an embodiment of the invention. In one embodiment, the system 5-100 includes the housing 5-102, the affector motor 5-104, the solenoid 5-106, the plunger 5-108, the second affector 5-110, and the first affector 5-112 as described herein.

In one embodiment, the system 5-100 is used as an affector on a personal affector machine as described herein. Accordingly, a material in a cassette can be affected by an affector employing an automatically adjustable affector. In one embodiment, the preparing motion instructions for affecting a material further includes instructions for switching between a first affector and a second affector. In yet another embodiment, the method for using an affector geometry description to automatically adjust an affector path includes obtaining a set of coordinates representing a surface of an object, obtaining matrices providing an affector geometry description for both a first (relatively smaller) and a second (relatively larger) affector on an affector employing an automatically adjustable affector, determining an adjusted set of coordinates for each of the matrices, affecting material using the second affector based on the adjusted set of coordinates prepared using its matrix, automatically adjusting the affector to the first affector, and affecting material using the first affector based on the adjusted set of coordinates prepared using its matrix. The automatic adjustment between affectors can occur before, during, or after an affecting path. In one embodiment, this method permits removing large amounts of matter from material using a larger affector, automatically switching to a smaller affector, and removing finer amounts of matter from the material without undesirably removing adjacent matter.

Figure 69:
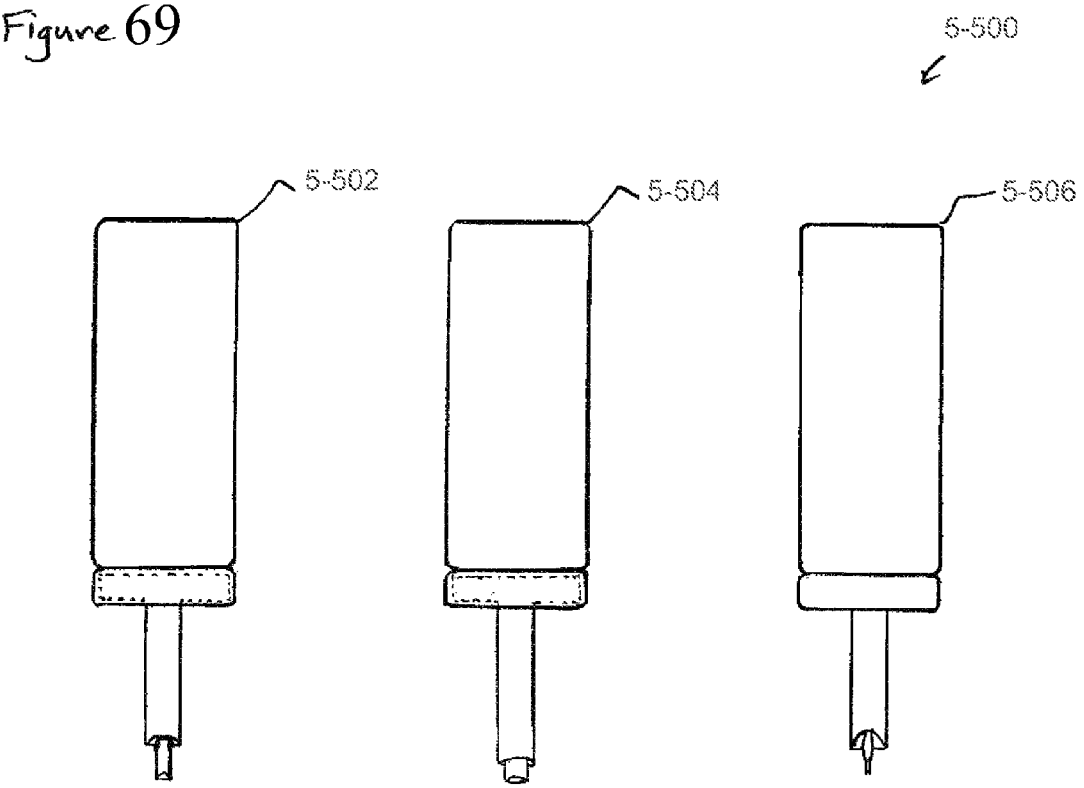
FIG. 69 is a side elevational view of a system employing an automatically adjustable affector, in accordance with an embodiment of the invention.

FIG. 69 is a side elevational view of a system employing an automatically adjustable affector, in accordance with an embodiment of the invention. In one embodiment, system 5-500 includes a plurality of hand tools employing an automatically adjustable affector, including a flathead screwdriver 5-502, a socket wrench 5-504, and an interchangeable screwdriver 5-506. The plurality of hand tools each have a first affector and a second affector that is extendable over the first affector using a solenoid as described herein. The first affector and the second affector can be replaceable or interchangeable. The solenoid can be battery or otherwise powered. The flathead screwdriver 5-502 includes a first affector that provides a relatively small size flathead and a second affector that is configurable to extend the small size flathead. The socket wrench 5-504 includes a first affector that provides a relatively small size socket and a second affector that provides a relatively large size socket when extended beyond the first affector. The interchangeable screwdriver 5-506 includes a first affector that provides a flathead screwdriver and a second affector that works in coordination with the flathead screwdriver to provide a phillips-type screwdriver. The plurality of hand tools are not limited to those embodiments described herein; instead, they are intended merely as examples of vast applications for which the system for employing an automatically adjustable affector can be applied. Indeed, the system 5-500 can be applied to power tools as well as hand tools.

Figure 70:
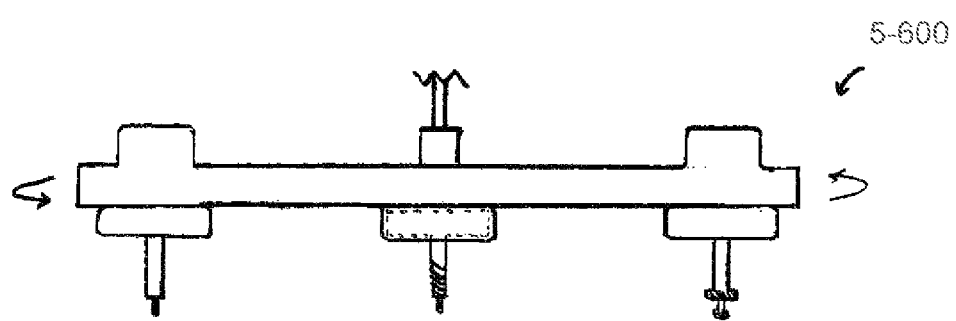
FIG. 70 and FIG. 71 are side elevational views of systems employing a plurality of automatically adjustable affectors, in accordance with an embodiment of the invention.
Figure 71:
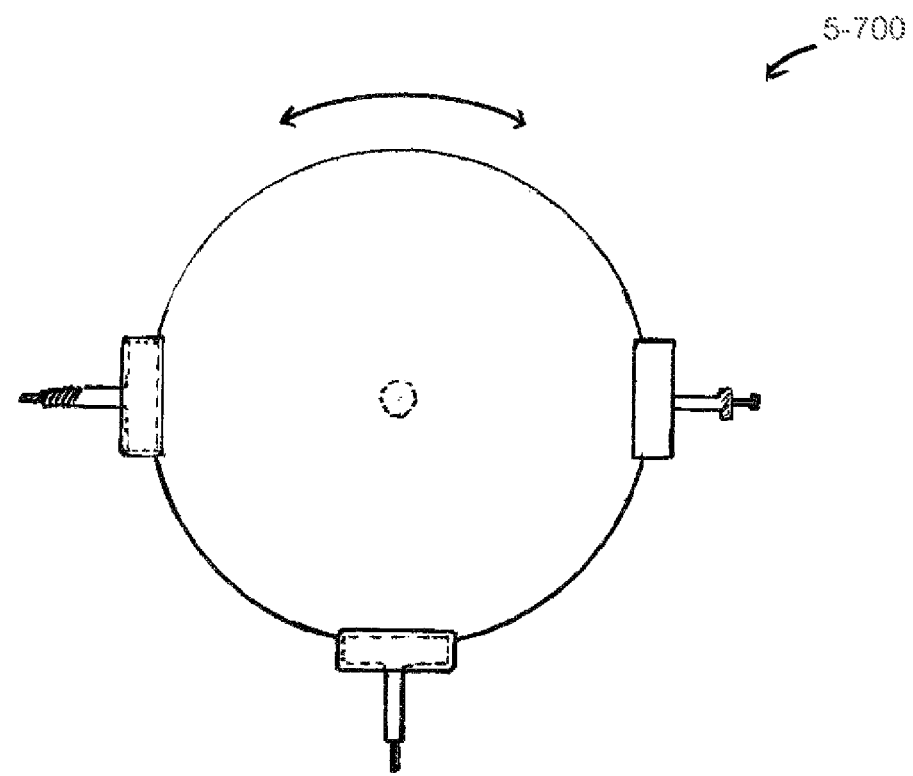

FIG. 70 and FIG. 71 are a side elevational view of systems employing a plurality of automatically adjustable affectors, in accordance with an embodiment of the invention. In one embodiment, system 5-600 includes a plurality of automatically adjustable affectors mounted on a surface of a rotatable plate. System 5-600 can be employed on a personal affector machine as described herein. In another embodiment, system 5-700 includes a plurality of automatically adjustable affectors mounted on an edge of a circular rotatable plate. System 5-700 can be employed on a personal affector machine as described herein. In other embodiments, a plurality of automatically adjustable affectors can be alternatively mounted such as on a sliding plate or on a gimbal.

This application also relates generally to material affecting, and more specifically, to systems and methods for providing a changeable affector head.

Figure 72:
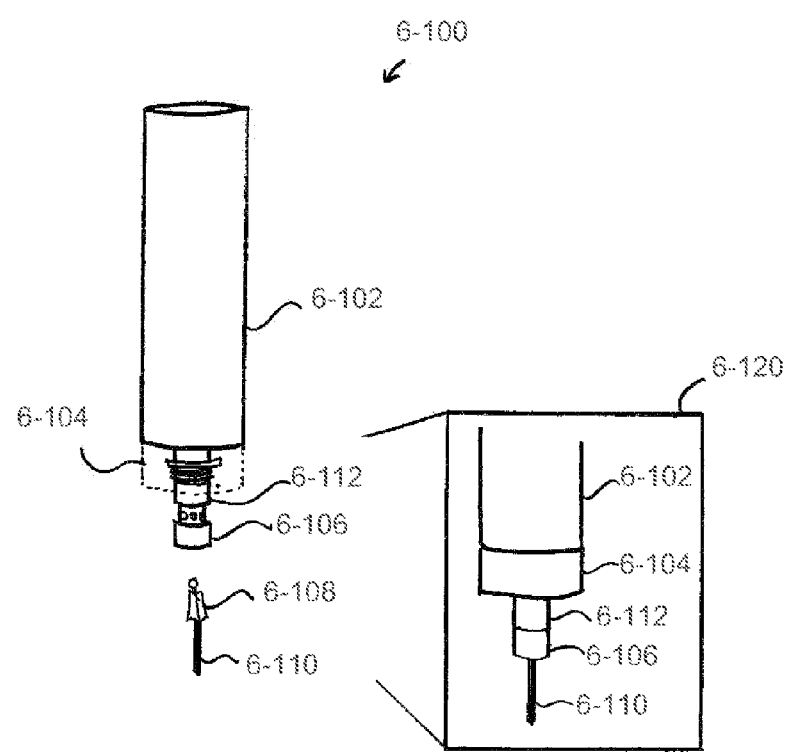
FIG. 72 is a side perspective view of a system for providing a changeable affector head, in accordance with an embodiment of the invention.

FIG. 72 is a side perspective view of a system for providing a changeable affector head, in accordance with an embodiment of the invention. In one embodiment, system 6-100 includes an affector motor 6-102, a solenoid 6-104, an affector mount receiver 6-106, and affector mount 6-108, an affector 6-110, and a collar 6-112.

In one embodiment, the affector motor 6-102 is coupled to the affector mount receiver 6-106 and is configurable to provide rotational motion to the affector mount receiver 6-106. The affector mount 6-108 is coupled to the affector 6-110 and is configurable to be removably inserted within an inner channel (not visible) of the affector mount receiver 6-106. The collar 6-112 circumscribes the affector mount receiver 6-106 and is biased by a spring over bearings that are depressed into the affector mount receiver 6-106 to secure the affector mount 6-108 therein (Inset 120). The collar 6-112 is configurable to movably slide off the bearings to release the affector mount 6-108 when force is applied against the spring. A solenoid 6-104 is coupled to the affector motor 6-102 with the affector mount receiver 6-106 extending through its center. Application of electricity to the solenoid 6-104 induces a magnetic field that is configurable to attract and movably slide the collar 6-112 off the bearings to release the affector mount 6-108. Removal of electricity to the solenoid 6-104 removes the magnetic field, whereby the spring biases the collar 6-112 over the bearings to secure the affector mount 6-108. Accordingly, the affector mount 6-108 can be secured and released from the affector mount receiver 6-106 by adjusting electricity supplied to the solenoid 6-104.

In one embodiment, the affector motor 6-102 is configurable to provide alternative motion to the affector 6-110, such as depression and rescission motion, gyration, or vibration. In yet a further embodiment, the affector motor 6-102 is configurable to supply solids, liquids, gases, waves, or plasmas such as gases, light, or glue, in addition to or in lieu of motion, to the affector 6-110. In yet a further embodiment, the affector motor 6-102 is configurable to remove material, in addition to or in lieu of motion, using the affector 6-110 such as by providing a vacuum source or a conduit to a vacuum source. In another embodiment, the affector motor 6-102 is configurable to provide computer power to sense, in addition to or in lieu of motion, using the affector 6-110. Thus, the affector motor 6-102 can perform a single or a plurality of functions in coordination with the affector 6-110 including motion, application of material, removal of material, sensing of material, or any other similar function. In another particular embodiment, the solenoid 6-104 includes a paramagnetic or ferromagnetic material to increase its magnetic field strength. In yet a further embodiment, the spring is replaced or complimented with another solenoid that works in coordination with the solenoid 6-104 to move the collar 6-112 back and forth over the bearings. In further embodiments, the solenoid 6-104 is configurable to move the affector mount receiver 6-106 as a plunger rather than the collar 6-112. In yet another embodiment, a plurality of affector mount receivers 6-106 are positioned on a gimbal, rotating plate, sliding plate, or circular plate to permit a plurality of affectors 6-110 to be disposed thereon.

Figure 73:
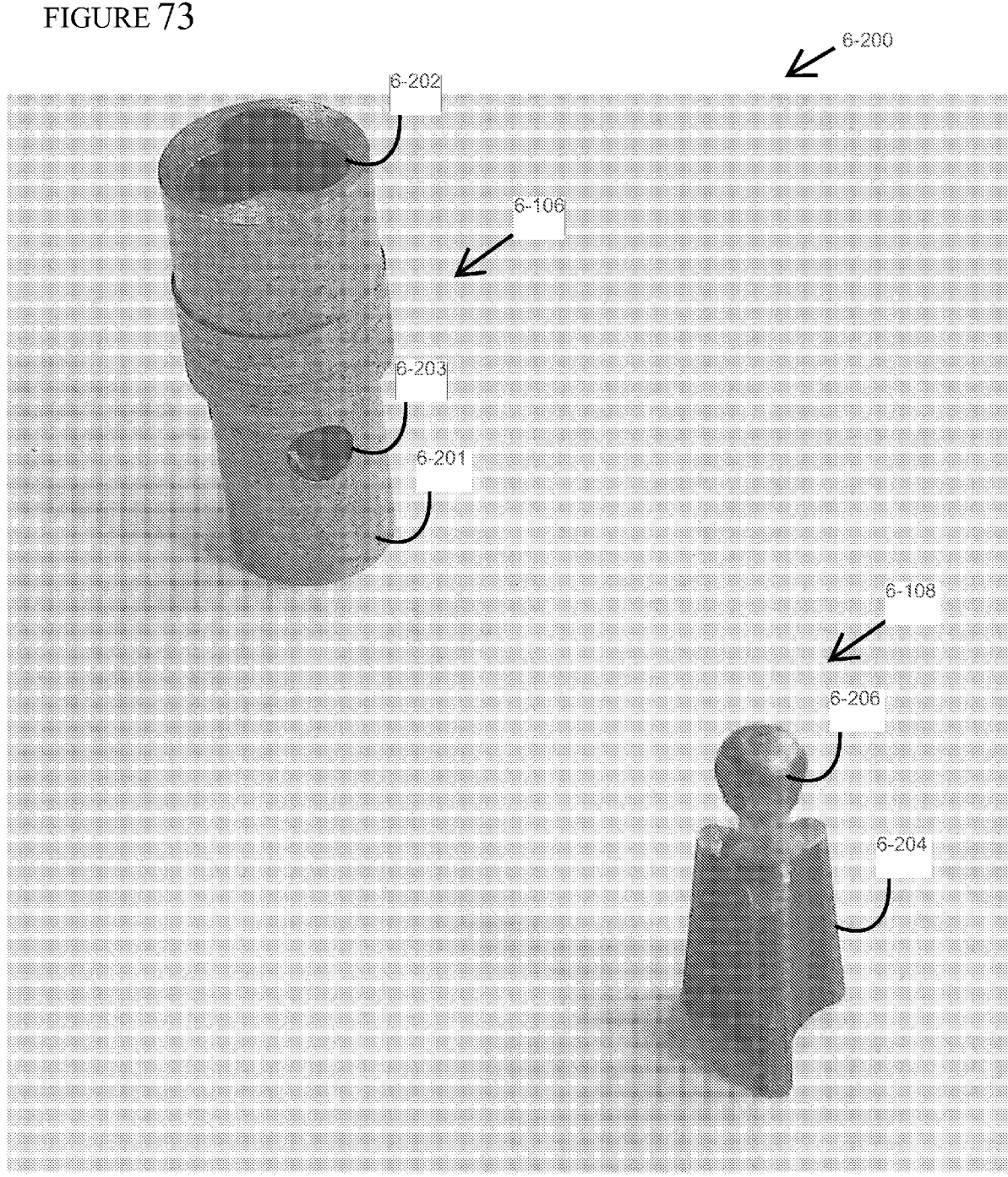
FIG. 73 is a side perspective view of an affector mount and an affector mount receiver, in accordance with an embodiment of the invention.

FIG. 73 is a side perspective view of an affector mount and an affector mount receiver, in accordance with an embodiment of the invention. In one embodiment, system 200 includes an affector mount receiver 6-106 and an affector mount 6-108.

Figure 74:
FIG. 74 is a bottom plan view of an affector mount disposed within an affector mount receiver, in accordance with an embodiment of the invention.

In one embodiment, the affector mount 6-108 includes a body 6-204 and a bulbous member 6-206, which extends from the body 6-204 to define a recession. The body 6-204 is characterized by an elongated triangular shaped member, or similarly shaped member, having edges with concave surfaces, that is slightly larger at an end opposite to the bulbous member 6-206. The affector mount 6-108 is configurable to couple to an affector (center point on FIG. 74) on a side opposite to the bulbous member 6-206. The affector mount receiver 6-106 includes a body 6-201 that defines a plurality of apertures 6-203 (only one visible) on its surface and an inner channel 6-202 along its interior. The inner channel 6-202 is characterized by a plurality of crests and valleys and gradually diminishes in size from its opening along its length. The affector mount 6-108 is configurable to being removably inserted within the inner channel 6-202 of the affector mount receiver 6-106, whereby the bulbous member 6-206 is positioned proximate to the plurality of apertures 6-203. The edges of the body 6-204 are disposed against the valleys of the inner channel 6-202 and the concave surfaces of the body 6-204 bend around the crests of the inner channel 6-202 (FIG. 74) defining a cavity between the inner channel 6-202 and the affector mount 6-108. Bearings (not illustrated) are depressed into the plurality of apertures 6-203 to rest within the recession on the affector mount 6-108 between the bulbous member 6-206 and the body 6-204 and thereby removably secure the affector mount 6-108 to the affector mount receiver 6-106. System 6-200 thereby permits the affector mount 6-108 to be indiscriminately inserted and automatically mechanically aligned within the inner channel 6-202 of the affector mount receiver 6-106. Furthermore, the cavity defined between the inner channel 6-202 and the affector mount 6-108 when the affector mount 6-108 is inserted within the affector mount receiver 6-106 permits tiny debris to escape, such as on rotation from the affector motor 6-102 (FIG. 73), which otherwise may need to be separately cleaned or removed.

In one particular embodiment, the affector mount 6-108 is of a different shape and may include an elongated square, hexagon, octagon, circle or any other two or three dimensional shape. In a further embodiment, the recession between the bulbous member 6-206 and the body 6-204 is an impression, a ridge, or even non-existent. In another embodiment, the affector and the affector mount 6-108 are constructed from a single mold. In a further embodiment, the affector is removably or permanently positionable within or on the affector mount 6-108. In an additional embodiment, the inner channel 6-202 is a different shape, such as circular, square, or other shape and may include additional crests and valleys. In further embodiments, the affector mount 6-108 is disposed flush within the inner channel 6-202 without defining a cavity. In yet a further embodiment, the plurality of apertures 6-203 is reduced or augmented in number. In an alternate embodiment, the bearings are replaced by a system of latching, snapping, hinging, or otherwise coupling to the affector mount 6-108. In further embodiments, the affector provides different or additional functionality such as being a knife, a hammer, a depression device, a writing instrument, a paint head, a vacuum head, a torch, a light applicator, a screwdriver, pliers, a wrench, a glue dispenser, a scanner, a magnet, a density sensor, or any other tool that alters, preserves, senses, or otherwise affects.

Figure 75:
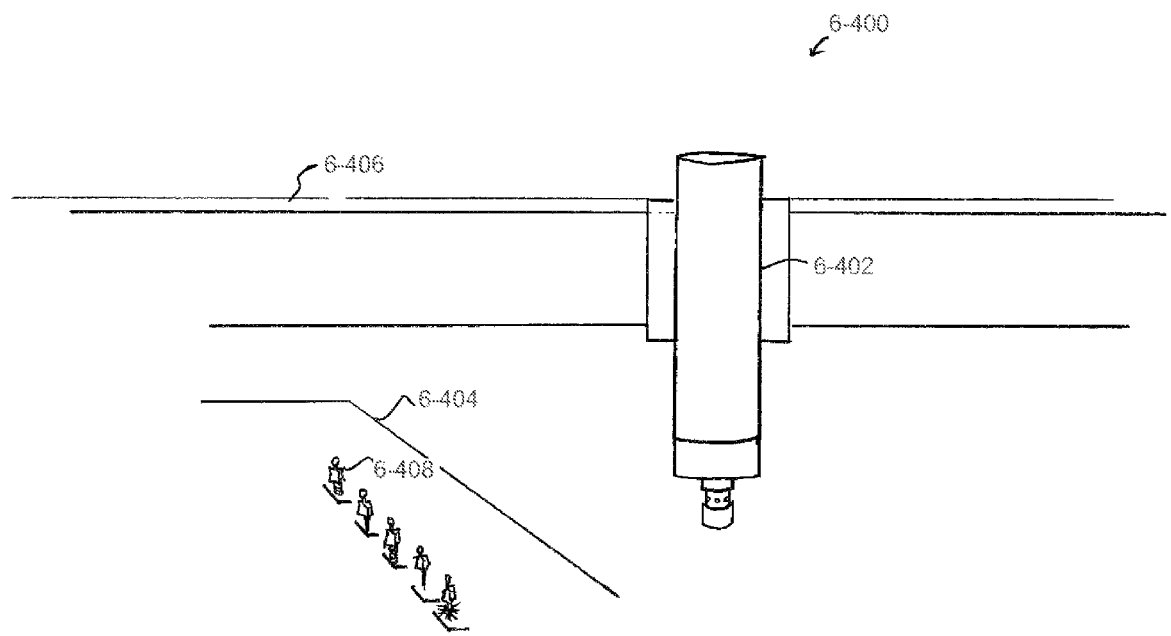
FIG. 75 is a perspective view of a personal affector machine having a changeable affector head, in accordance with an embodiment of the invention.

FIG. 75 is a perspective view of a personal affector machine having a changeable affector head, in accordance with an embodiment of the invention. In one embodiment, system 6-400 includes a personal affector machine 6-406, a changeable affector head 6-402, a storage receptacle 6-404, and a plurality of affector mounts 6-408 having affectors disposed thereon.

In one embodiment, the changeable affector head 6-402 is coupled to the personal affector machine 6-406, as described herein, and is configurable to affect a material using an affector. The storage receptacle 6-404 is disposed within or proximate to the personal affector machine 6-406 and contains the plurality of affector mounts 6-408 having affectors disposed thereon. The affectors include number of different types, sizes, or shapes to affect a material in different ways, such as coarsely or finely. The changeable affector head 6-402 is configurable to move to the storage receptacle 6-404 and obtain or deposit a particular affector mount 6-408 to affect a material as desired using adjustable application of electricity to a solenoid as described herein.

In one particular embodiment, the preparing motion instructions to affect a material include instructions to obtain or deposit an affector mount with an affector from or on the storage receptacle 6-404. In yet another embodiment, the method for using an affector geometry description to automatically adjust an affector path includes obtaining a set of coordinates representing a surface of an object, obtaining matrices providing affector geometry descriptions for the plurality of affectors on the affector mounts 6-408, determining an adjusted set of coordinates for each of the matrices, affecting material using a first affector based on the adjusted set of coordinates prepared using its matrix, obtaining a second affector, and affecting material using the second affector based on the adjusted set of coordinates prepared using its matrix. In one embodiment, this method permits removing large amounts of matter from material using a larger affector, switching to a smaller affector, and removing finer amounts of matter from the material without undesirably removing adjacent matter. In yet a further embodiment, the method for determining an optimal affector sequence includes obtaining a set of coordinates representing an object, obtaining matrices providing affector geometry descriptions for each of the affectors on the affector mounts 6-408, determining an adjusted set of coordinates based on each matrix, determining an optimal sequence of affectors, and affecting material using the optimal sequence of affectors by obtaining and depositing affectors from the storage receptacle 6-404 in the prescribed order. In one particular embodiment, the storage receptacle 6-404 provides the matrices having affector geometry descriptions for the affectors on the affector mounts and their positions on the storage receptacle 404.

Figure 76:
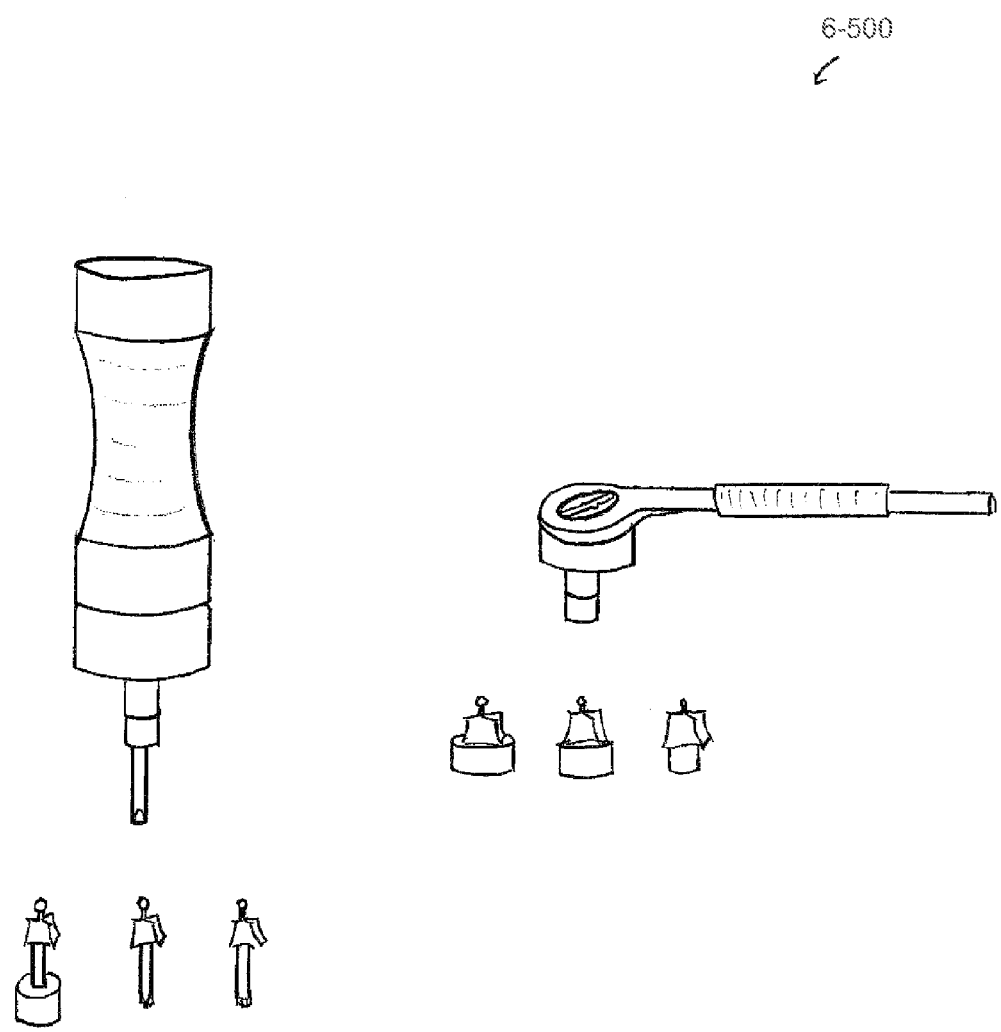
FIG. 76 is a perspective view of a plurality of tools employing a changeable affector head, in accordance with an embodiment of the invention.

FIG. 76 is a perspective view of a plurality of tools employing a changeable affector head, in accordance with an embodiment of the invention. In one embodiment, system 6-500 includes a grip tool and a socket wrench. The grip tool includes a handle and an affector mount receiver and uses a solenoid to secure and release an affector on an affector mount therein. The affectors are any of a socket, a flat-head, a phillips-type head, an allen head, or any other similar device. The socket wrench similarly includes a handle and an affector mount receiver and uses a solenoid to secure and release an affector on an affector mount therein. The affectors include a plurality of sockets embodying various sizes or any other similar device. The solenoids can be battery or otherwise powered. The tools in system 6-500 are intended merely as examples as any known or future discovered tool can implement various embodiments of the invention.

This application also relates generally to material affecting, and more specifically, to systems and methods for providing intuitively customizable object creation.

In one embodiment, the term botlet as used herein is intended to mean a programming function or its equivalent configured to accept at least one argument to produce information used to create a physical object. The term may be further limited or expanded in meaning. In certain embodiments, no argument is accepted and/or no information is produced.

Figure 77:
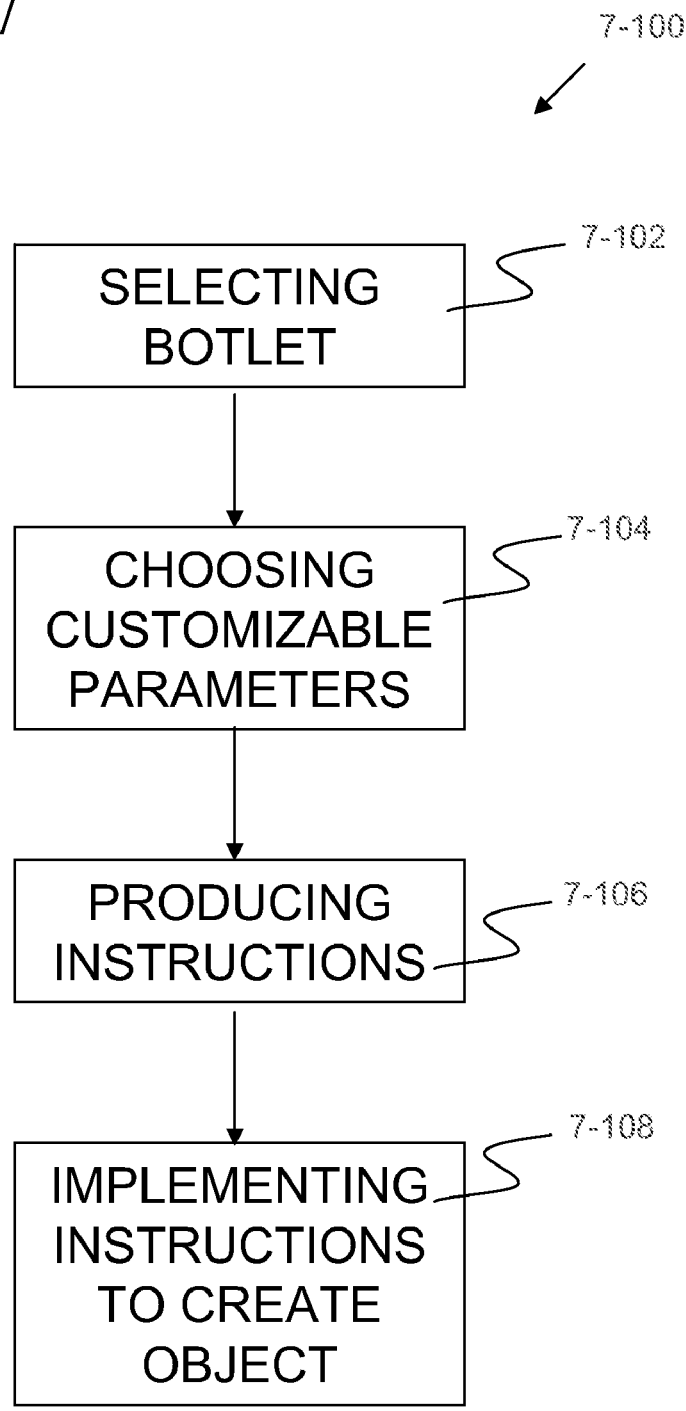
FIG. 77 is a block diagram of a method for providing intuitively customizable object creation, in accordance with an embodiment of the invention.

FIG. 77 is a block diagram of a method for providing intuitively customizable object creation, in accordance with an embodiment of the invention. In one embodiment, method 7-100 includes selecting a botlet at block 7-102, choosing customizable parameters at block 7-104, producing instructions at block 7-106, and implementing the instructions to create an object at block 7-108. One or more steps in the method 7-100 may be practiced using one or more software applications on one or more hardware platforms.

In one embodiment, the selecting a botlet at block 7-102 includes perceiving a representation of an object for which a botlet is configurable to be used to create, such as viewing an image of an object or reading or listening to a description of an object. A botlet, as described supra, is a function that is configurable to accept arguments to produce information used to create an object. Accordingly, a given botlet can be used produce information for creating a plurality of objects based on various inputted arguments. Further, different botlets can be used for producing instructions to create various objects such as signs, engravings, sculptures, masterpieces, famous structures, architectural models, building blocks, models, custom flooring or paneling, culinary art, dishware, furniture, dental products, toys, presentation articles, prototypes, cards, displays, semi-conductors, computer boards, biological cells, molecules, or any other solid, liquid, gas, or plasma object. Various botlets are also combinable to produce instructions to create more complex objects. As an example, a botlet can accept as arguments size, color, and dimension parameters for creating book shelf. Based on the arguments, the botlet can produce instructions that are usable with a personal affector machine to create the particular book shelf having size, color, and dimensions as specified. Many other book shelf variations can be produced using the botlet by changing the size, color, and dimension arguments inputted therein. Therefore, perceiving a representation of an object does not necessarily involve perceiving botlet programming code, but rather typically involves perceiving a representation of an object that a botlet can be used to create; although, perceiving botlet programming code is certainly possible. In the book shelf example above, perceiving a representation of an object can include perceiving an image of a book shelf that can be produced using instructions from a given botlet, wherein the given botlet is potentially configurable to produce instructions for other book shelf variations based on inputted arguments. A representation of an object can be perceived on or using any medium, including a website, a movie, a song, a radio broadcast, a television broadcast, a satellite signal, an e-mail, a video game, a sign, a magazine, a toy, word-of-mouth, or a periodical. Further, a representation of an object can be electronically linked to a botlet for creating the object or can be a mere reference to a botlet that can be obtained using a phone, mail, a product purchase, a lottery, or in another similar fashion.

In certain embodiments, a representation of an object produced from a botlet further includes information such as arguments that a botlet accepts and potential object variations that can be created using the botlet. For instance, using the book shelf example above, a representation can further include information that a botlet used to produce the book shelf accepts color, material, and size arguments. Furthermore, a representation can include information that a botlet used to produce the book shelf can create a metal, wood, or plastic bookshelf with up to 7 shelves and a total dimension of 3'×3'×7'. Certainly, other information such as an author of a botlet, price of a botlet, location of a botlet, cost to manufacture an object using a botlet, time to manufacture an object using a botlet, information about an object producible using a botlet, or other useful information can be included with a representation of an object.

In one embodiment, a botlet is obtained after perceiving a representation of an object. The botlet can be obtained electronically using a LAN, WAN, internet, satellite, or other network; using mail or phone; from a storage medium, such as a disk associated with a toy or book; or can be obtained in some other similar fashion. In one particular embodiment, royalties or other fees are incurred to license or purchase a botlet and use of the botlet is limited in some manner. The royalties or other fees can be distributed to any of a seller of a botlet, a creator of a botlet, a broker of a botlet, or any other person or entity. In one particular embodiment, a botlet is not obtained, but rather is accessed for use using any of the aforementioned mediums.

In one embodiment, the choosing customizable parameters at block 7-104 includes choosing parameters and inputting the parameters as arguments to a botlet. A botlet can be selected as described in reference to block 7-102. Once selected, the botlet can be viewed using a computer at code level, using a graphical user interface, or using some other non-graphical user interface or non-computer interface. Alternatively, the botlet is non-viewable and parameters are mailed or otherwise delivered to another entity for input. A computer is any of a personal computer, a PDA, a mobile phone, a music player, a television, a personal affector machine as described herein, or any other similar device. In certain embodiments, a graphical user interface displays fields using a computer display, which may be pre-populated or have default values, for receiving parameters for input as arguments to a botlet. In one particular embodiment, the graphical user interface further provides a representation of an object that will be created based on parameters selected for input as arguments to a botlet. As parameters are modified, the graphical user interface is updated with a corresponding representation of an object. In further embodiments, the graphical user interface presents information such as time to completion; costs; dimensions; video or textual assembly instructions; and required tools or instrumentalities such as affectors, personal affector machine capabilities, or supplies for creating an object using the botlet based on selected parameters. For instance, using the book shelf example above, a graphical user interface is configurable to provide fields for inputting parameters to a book shelf botlet and to present a representation of a book shelf. The fields include a material type for shelves, a material type for a frame, a color for the shelves, a color for the frame, dimensions for the book shelf, a number of shelves, and a text field for engraving a surface of a shelf. The material type field for the shelves and the frame include wood, metal, and plastic; the color field for the shelves and the frame include red, white, black, and blue; the dimensions field for the book shelf includes a depth, width, and height value; the number of shelves field includes values of one through five; and the text field provides for free form text entry. Fewer or greater fields and associated values are possible. As the fields are modified, the book shelf representation is updated to provide an illustration of a book shelf that will be created using the selected parameters. Accordingly, when fields are selected where the shelves are wood and white in color, the frame is metal and black in color, the dimensions are 4'×2'×6', and the number of shelves is five, the representation is updated to illustrate a book shelf with five white wooden shelves on a frame that is metal and black that defines a space of 4'×2'×6'. In one particular embodiment, parameters can be inputted by altering a visual representation of an object to further define arguments, such as by moving the wooden shelves to create different spacing between them. In yet another particular embodiment, the botlet code can be modified to permit additional or fewer arguments to be accepted or additional object variations to be created. In another embodiment, another botlet can be simultaneously viewed to create more complex objects. In certain embodiments, a fee or royalty is imposed for an ability to select particular parameters for input as arguments to a botlet. The royalty or other fee can be distributed to any of a seller of a botlet, a creator of a botlet, a broker of a botlet, or any other person or entity.

In one embodiment, the producing instructions at block 7-106 includes producing instructions using a botlet for creating an object based on parameters selected at block 7-104. In one particular embodiment, the instructions include motion instructions and corresponding affectors for implementation on a personal affector machine, as described herein. For example, continuing the book shelf example above, the selected parameters are for five wooden white shelves and a black metal frame that define a space of 4'×2'×6'. A botlet accepts the parameters as arguments and produces instructions for creating a book shelf embodying such parameters using a personal affector machine. For instance, the instructions first include moving a saw-type affector along a 4'×2'×1" path to create a single shelf, changing to a paint applicator affector having white paint for coating wood, moving the paint applicator affector along a surface defined by the 4'×2'×1" path, changing $\theta$, $\gamma$ positions of the paint applicator affector, moving the paint applicator affector along additional surfaces defined by the 4'×2'×1" path, and repeating these steps for an additional four shelves to produce five wooden white shelves. The instructions then include moving a plasma-torch affector along a 2"×1"×6' path to define a single frame member, moving the plasma-torch affector in two small circles at five intervals along a length of the frame member to define screw bosses, changing to a paint applicator affector having black paint for coating metal, moving the paint applicator affector along a surface defined by the 2"×1"×6' path, changing $\theta$, $\gamma$ positions of the paint applicator affector, moving the paint applicator affector along additional surfaces defined by the 2"×1"×6' path, and repeating these steps for an additional three frame members to produce four black metal frame members. The instructions can be reduced to a file that is accessible, downloadable, savable, exchangeable, distributable, changeable, or otherwise usable. In certain embodiments, a fee or royalty is paid to produce instructions and a limit may be imposed on their use. The royalty or other fee can be distributed to any of a seller of a botlet, a creator of a botlet, a broker of a botlet, or any other person or entity.

In a further embodiment, the instructions include descriptions for assisting a user to prepare for and implement the instructions on a personal affector machine. For example, the descriptions can include types of material, fasteners, affectors, supplies, and personal affector machine capabilities that are needed to implement the instructions. Further, the descriptions can include steps and visualizations such as videos to assist a user to create and assemble a created object.

In one embodiment, the implementing the instructions to create an object at block 7-108 includes implementing instructions produced at block 7-106 on a personal affector machine, as described herein, to create an object. Produced instructions can be saved for later use on a personal affector machine or can be fed into a personal affector machine directly or by a LAN, WAN, satellite, or other similar system to create an object. Produced instructions can also be exported to different file formats or implemented on object affecting machines different from a personal affector machine. In certain embodiments, the methods for using an affector geometry description to automatically adjust an affector path, for providing an automatically adjustable affector head, and for providing a changeable affector head as described herein are configurable to being practiced while implementing the instructions. In another embodiment, a system for managing objects produced by a personal affector machine is implemented to assist a user in creating and assembling an object.

Figure 78:
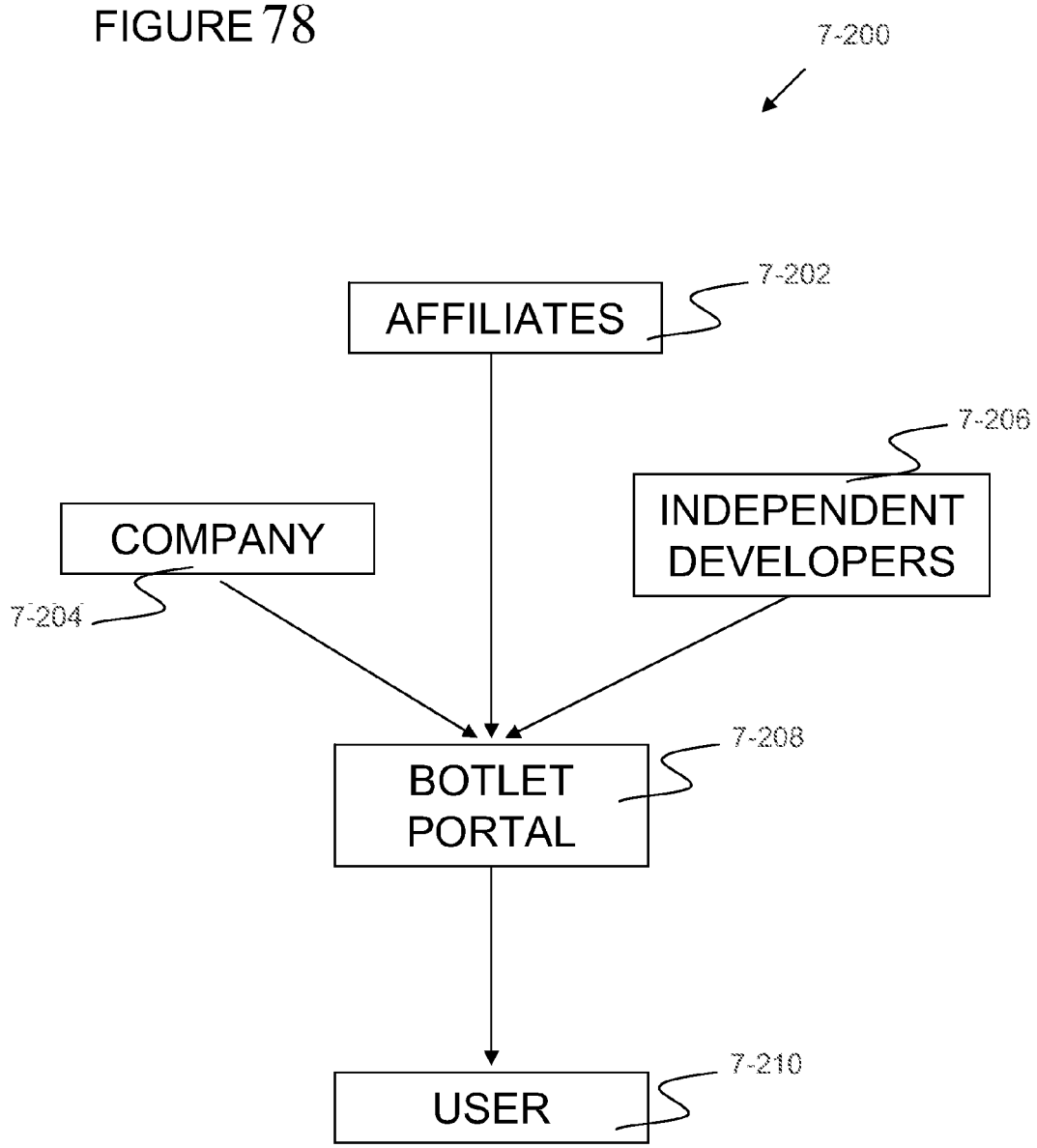
FIG. 78 is a block diagram of a system for providing intuitively customizable object creation, in accordance with an embodiment of the invention.

FIG. 78 is a block diagram of a system for providing intuitively customizable object creation, in accordance with an embodiment of the invention. In one embodiment, system 7-200 includes affiliates 7-202, a company 7-204, independent developers 7-206, a botlet portal 7-208, and a user 7-210.

In one embodiment, the company 7-204 is a primary developer of botlets or certification source. The affiliates 7-202 are companies or other groups of individuals that are certified by the company 7-204 to develop botlets. Similarly, the independent developers 7-206 are individuals who are certified by the company 7-204 to develop botlets. Accordingly, botlets can be developed by the company 7-204 or by the affiliates 7-202 and the independent developers 7-206 that are certified to do so; although; non-certified entities may also develop botlets. As described supra, a developed botlet includes a software function or its equivalent that accepts parameters as arguments and produces instructions for creating a physical object using a personal affector machine based thereon.

In one embodiment, the botlet portal 7-208 provides a medium to locate, review, and access developed botlets, such as a website like eBay®, a 3D computer world, a video game, a satellite broadcast, a book, a television broadcast, a text message, a song, a billboard, a newspaper advertisement, a radio broadcast, a movie, a magazine or any other electronic, printed, or other perceivable medium. The company 7-204, the affiliates 7-202, and the independent developers 7-206 make developed botlets available on the botlet portal 7-208; although, the company 7-204, the affiliates 7-202, or the independent developers 7-206 can directly trade botlets or make botlets accessible with each other or users without the botlet portal 7-208. Furthermore, a single or more entities may consolidate developed botlets and make them available on the botlet portal 7-208. The user 7-210 can locate available botlets on the botlet portal 7-208 using descriptions, visual representations of objects for which the botlets can create, botlet code, or by some other aspect. The user 7-210 can review available botlets using information such as author, author feedback, fees, related botlets, necessary instrumentalities, variations of objects possible, necessary supplies, cost to complete an object, time to complete an object, or other similar information. The user 7-210 can access desired botlets directly, such as by an electronic link; indirectly, such as by mail, phone, or with a book, toy, or other purchase; or in some other similar manner. In certain embodiments, the user 7-210 pays a royalty or other fee to use or purchase a botlet and limits on botlet use are imposed. The royalty or other fee can be distributed to a botlet developer, broker, or any other person or entity. An accessed botlet can be used to produce instructions for creating a physical object as described supra. In other embodiments, a plurality of botlet portals and/or non-portal trading systems are employed. Accordingly, system 7-200 provides a division of labor where developers can develop botlets and users can access the botlets to create objects; although users can also be developers and vice versa. In certain embodiments, the botlet portal 7-208 provides a forum where the user 7-210 can connect with other users to present objects that have been created, communicate, and share botlets. In one particular embodiment, the botlet portal 7-208 can include instructions that can be used to create an object instead of or in addition to botlets.

Figure 79:
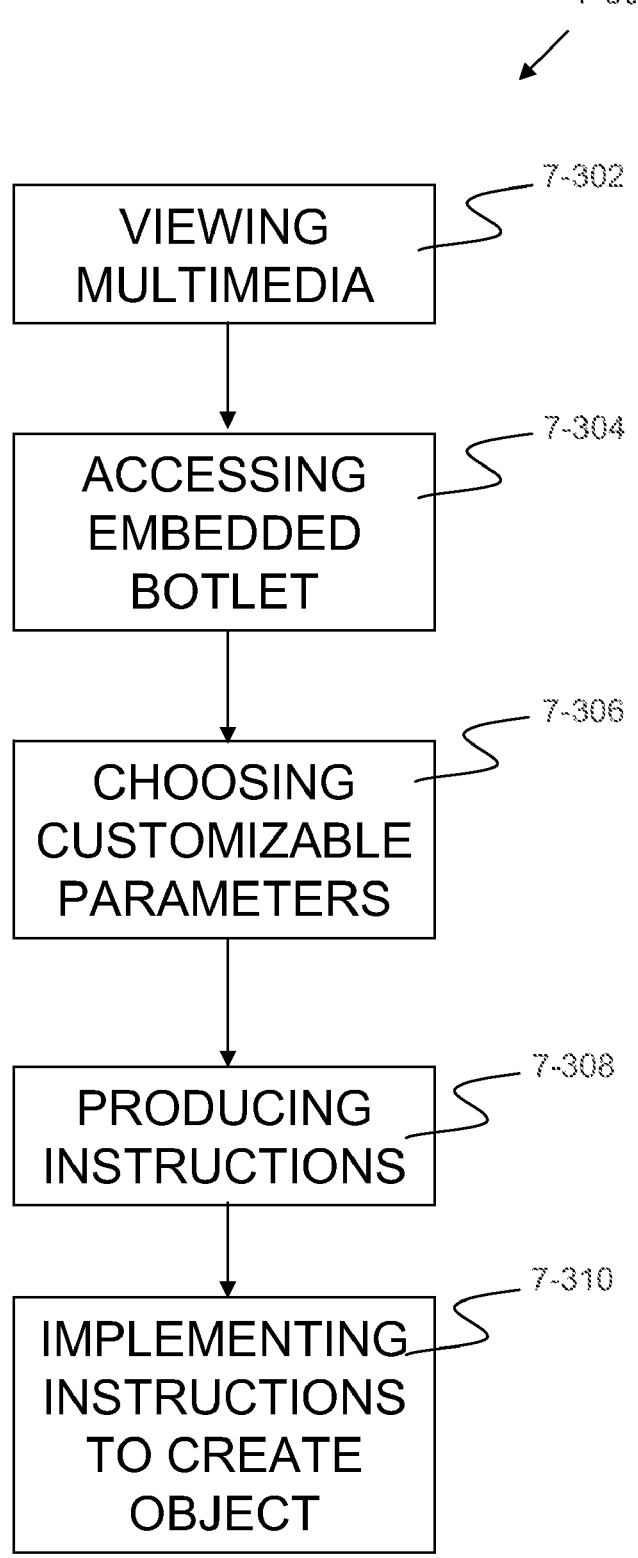
FIG. 79 is a block diagram of a method for providing intuitively customizable object creation, in accordance with an embodiment of the invention.

FIG. 79 is a block diagram of a method for providing intuitively customizable object creation, in accordance with an embodiment of the invention. In one embodiment, method 7-300 includes viewing multimedia at block 7-302, accessing an embedded botlet at block 7-304, choosing customizable parameters at block 7-306, producing instructions at block 7-308, and implementing instructions to create an object at block 7-310. Any step of method 7-300 can be implemented on one or more software applications and one or more hardware platforms.

In one embodiment, the viewing multimedia at block 7-302 includes viewing any medium having content including a video game, a 3D computer world, a television show, a television commercial, a website, a movie, a video clip, an animation, a comic strip, a book, a billboard, a newspaper, a magazine, radio broadcast, a satellite broadcast, or any other electronic or non-electronic medium having content. The multimedia includes or provides access to one or more embedded botlets associated with objects that are on or within the multimedia; although, the embedded botlets need not be associated with an object. The embedded botlets are designatable by a symbol, color, sound, impression, smell, or by any other perceivable aspect on or within the multimedia. Typically, the embedded botlet is configurable to be used to create an object or variation of an object for which it is associated. For example, in a woodworking television show, a shelving unit erected behind a show host is highlighted yellow to indicate an existence of an embedded shelving unit botlet for the shelving unit. Similarly, in a children's cartoon show, a character in the cartoon show has an asterisk to indicate an existence of an embedded action figure botlet for the character. Alternatively, in a novel a described sculpture has a footnote providing a reference to an embedded sculpture botlet for the sculpture that is available for download at a website. Further, a song making reference to a type of car has a sound indicating an existence of an embedded car botlet available on an associated storage disk. Alternatively, a blueprint for a building has a marker indicating an existence of an embedded building botlet for the building available online. Indeed, any multimedia can have any number of botlets embedded or accessible for creating anything from signs, engraving, sculptures, building blocks, models, custom flooring, custom paneling, culinary dishes, dishware, furniture, dental products, toys, tools, presentations, prototypes, cards, displays, or any other conceivable object using a personal affector machine, wherein the multimedia provides an intuitive organizational and distribution model for botlets.

In one embodiment, the accessing an embedded botlet at block 304 includes locating a botlet designator on or within multimedia, accessing the botlet, and reviewing the botlet. The locating a botlet designator is accomplished by perceiving multimedia and finding a botlet designation on or within the multimedia. For example, the botlet designation can be a marker on a character in a television show, a footnote next to a word in a magazine, or even a sound following a word on a radio broadcast as discussed supra. In certain embodiments, a fee is charged for providing botlet designations on or within a particular multimedia. Once a botlet designation is located, a botlet associated with the botlet designation can be accessed either directly such as with an electronic link within a movie, website, or video game or indirectly such as with a related website, storage disk, mail, or phone system. In certain embodiments, a fee is charged for accessing a botlet. The accessed botlet is reviewable by reading its code, using a graphical user interface, or by using a non-graphical user interface. The graphical user interface is configurable to provide information as discussed supra, such as a visual representation of an object for which an accessed botlet can create, an author, author feedback, fees, related botlets, necessary instrumentalities, variations of objects possible, necessary supplies, cost to complete an object, time to complete an object, accepted parameters, or other similar information. For example, using the children's cartoon show example supra, an action figure botlet is accessed by using a mouse cursor or remote control to click on a character in the cartoon show having an asterisk designation. The action figure botlet is presented on a monitor using a graphical user interface that provides a visual representation of an action figure that can be created using the action figure botlet along with requirements for creating the action figure including a standard personal affector machine, laser and paint affectors, plastic material, and various paints. Further, the graphical user interface provides information that the action figure botlet costs fifty dollars for a single use, takes approximately two hours on average to create an action figure, and accepts position, badge name, clothes, and accessories as parameters for arguments. In another embodiment, the accessing an embedded botlet at block 304 includes accessing a plurality of embedded botlets associated with a multimedia, similar to that of a soundtrack that includes a plurality songs from a movie.

In one embodiment, the choosing customizable parameters at block 7-306 is substantially similar as described in reference to FIG. 77. For instance, using the action figure example above, a graphical user interface is configurable to provide fields for inputting position, badge name, clothes, and accessories parameters as arguments to an action figure botlet and to provide a visual representation of an action figure that will be created based on the inputted parameters. The position field includes selections for various action figure positions including standing, running, crouching, or jumping. The badge name field provides for free text entry for inputting a name that will be placed on the action figure's badge. The clothes field includes selections for various action figure outfits including camouflage, military dress garb, and casual military garb. The accessories field includes selections for various accessories to be included with the action figure such as a machine gun, a radio, a first aid kit, and a back pack. Fewer or greater number of fields and selections are possible. As the fields are modified, the visual representation of an action figure is updated to provide an illustration of an action figure that will be created using the selected parameters. Accordingly, when fields are selected where the position is standing, the badge name is Commando, the clothes are camouflage, and the accessories include a back pack, the visual representation is updated to illustrate an action figure in a standing position with camouflage clothing having a back pack and a name tag reading Commando. In certain embodiments, botlets are combinable and can integrate surface geometry descriptions.

In one embodiment, the producing instructions at block 7-308 and the implementing instructions to create an object at block 7-310 are substantially similar as discussed in reference to FIG. 77.

Figure 80:
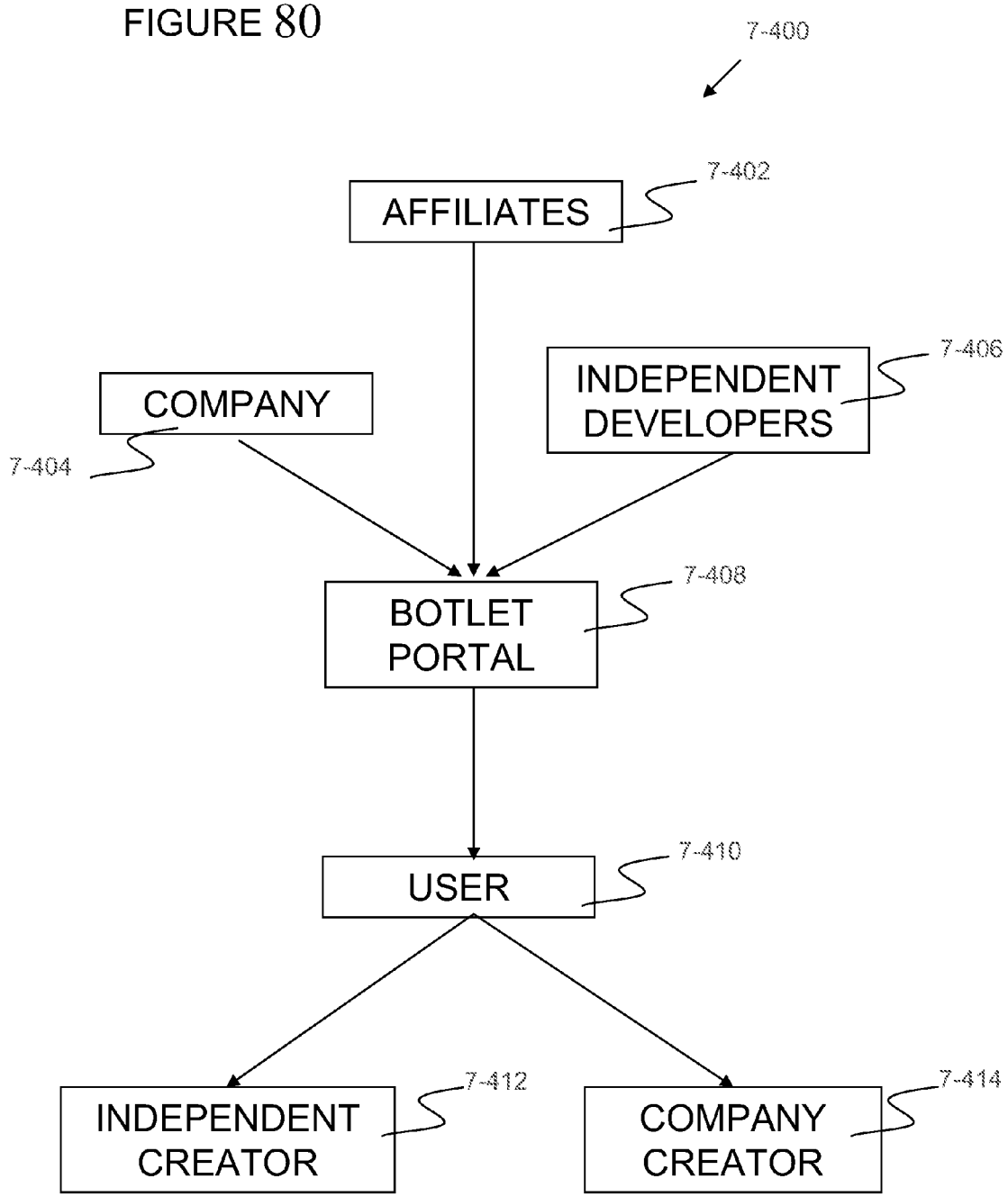
FIG. 80 is a block diagram of a system for providing intuitively customizable object creation, in accordance with an embodiment of the invention.

FIG. 80 is a block diagram of a system for providing intuitively customizable object creation, in accordance with an embodiment of the invention. In one embodiment, system 7-400 includes affiliates 7-402, a company 7-404, independent developers 7-406, a botlet portal 7-408, an end user 7-410, an independent creator 7-412, and a company creator 7-414.

In one embodiment, the company 7-404, the affiliates 7-402, the independent developers 7-406, the botlet portal 7-408, and the user 7-410 are substantially similar as discussed in reference to FIG. 79. Accordingly, any of the company 7-404, the affiliates 7-402, and the independent developers 7-406 can develop a botlet and make the botlet or instructions accessible to the user 7-410 using the botlet portal 7-408, or some other means, without necessarily creating objects themselves. The user 7-410 can access a botlet or instructions on the botlet portal 7-408, or from some other source such as from multimedia, a friend, a gift, or direct from an entity, and use the botlet or instructions to create an object on a personal affector machine. Accordingly, the user 7-410 can create an object without necessarily developing a botlet. Alternatively, the user 7-410 can outsource the instructions in whole or in part to the independent creator 7-412 or the company creator 7-414, who may charge a fee, to create an object. The independent creator 7-412 is any individual having a personal affector machine or its instrumentalities capable of creating an object based on instructions. Similarly, the company creator 7-414 is any entity, group of people, or group of entities having a personal affector machine or its instrumentalities capable of creating an object based on instructions. The independent creator 7-412 or the company creator 7-414 can be certified to create objects, such as by the company 7-404. Accordingly, the user 7-410 can create an object without necessarily having a personal affector machine. In certain embodiments, the independent creator 7-412 or the company creator 7-414 can further outsource the instructions in whole or in part to other persons or entities. In one particular embodiment, a portal is implemented to assist the user 7-410, the independent creator 7-412, or the company creator 7-414 in outsourcing and/or tracking creations. In another embodiment, a botlet or instructions recommend the independent creator 7-412 or the company creator 7-414 based on needed capabilities for creating an object. In one particular embodiment, the independent creator 7-412 or the company creator 7-414 is a hybrid outfit that permits the user 7-410 to rent a personal affector machine to create an object, similar to Kinkos®.

Accordingly, the system 7-400 provides a means to profit in any number of different ways including developing botlets, trafficking in botlets, producing instructions, trafficking in instructions, creating objects, or trafficking in objects.

Figure 81:
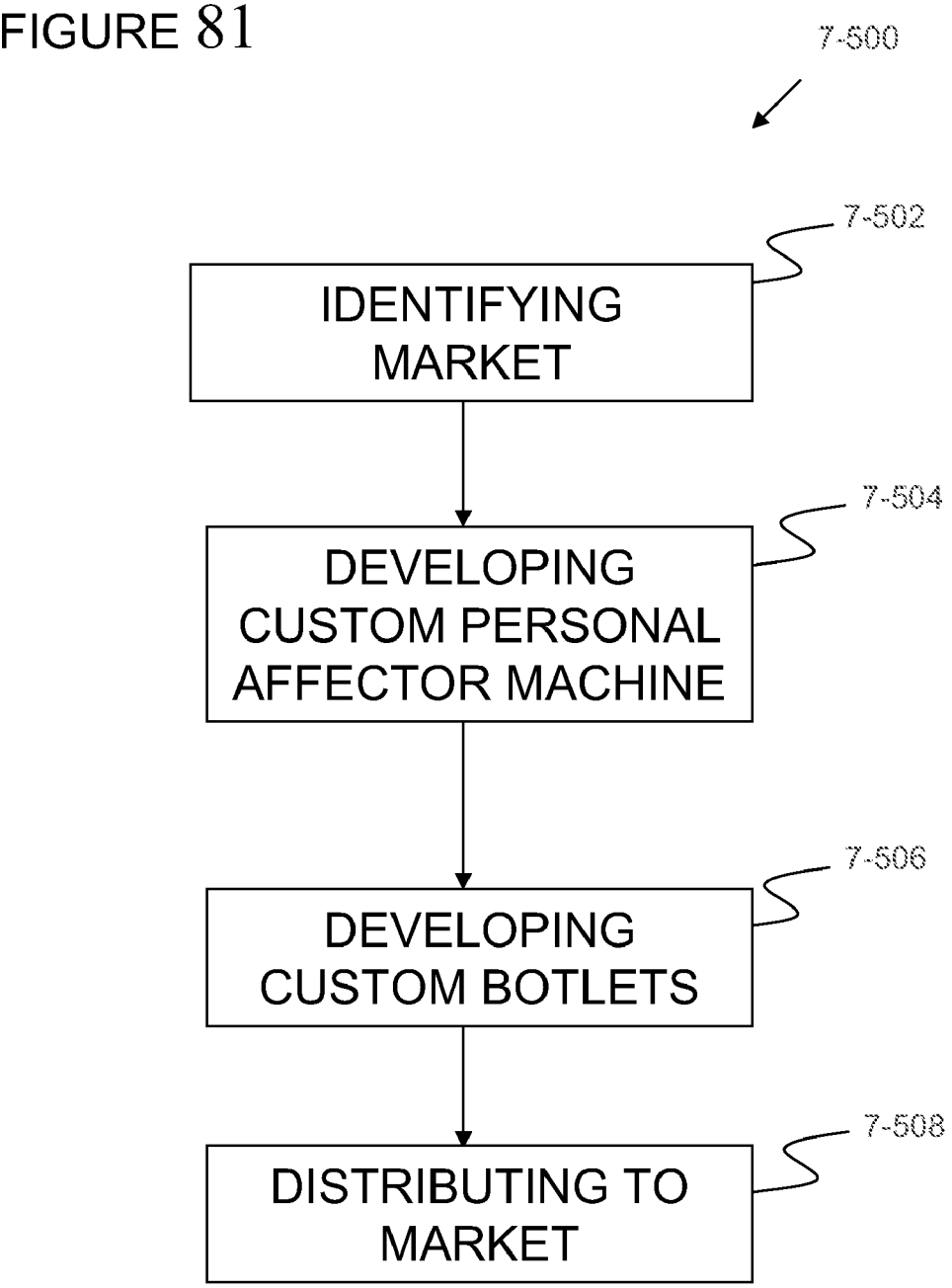
FIG. 81 is a block diagram of a method for providing intuitively customizable object creation, in accordance with an embodiment of the invention.

FIG. 81 is a block diagram of a method for providing intuitively customizable object creation, in accordance with an embodiment of the invention. In one embodiment, method 7-500 includes identifying a market at block 7-502, developing a custom personal affector machine and consumables at block 7-504, developing custom botlets at block 7-506, and distributing to the market at block 7-508. Any step of the method 7-500 can be performed by one or more individuals, companies, or other entities. Accordingly, one company can identify a market at block 7-502 while one or more other companies can develop a custom personal affector machine at block 7-504, develop custom botlets at block 7-506, and distribute the custom personal affector machine and botlets at block 7-508, thereby permitting symbiotic partnerships to exist for spreading personal affector machines and botlets.

In one embodiment, the identifying a market at block 7-502 includes determining an identifiable segment of individuals or entities, such as an industry, having a need for a personal affector machine or botlets to create an object. The market can include dental, medical, architectural, legal, science, business, education, consumer, furniture, framing, flooring, construction, culinary, dishware, printer, computer, biological, chemical, electrical, or research industries or any other known or later discovered segment of individuals or entities. For instance, the dental market can have a need for a personal affector machine and botlets that are configurable to create prosthetic teeth, while the architectural market can have a need for a personal affector machine and botlets that are configurable to create building, topographical, and floor-plan models. Indeed, the consumer goods market can have a need to create tools, toys, or sculptures; the furniture market can have a need to create shelves, desks, engravings, or tables; the framing market can have a need to create images, matting, or frames; the construction market can have a need to create floor planks, custom carvings, minors, or moldings; the culinary market can have a need to create cake decorations; the computer market can have a need to create semiconductors or circuit boards; and the research market can have a need to create precision placed biological matter, each of which can have different personal affector machine and botlet requirements to address their respective needs. Many other needs are possible within any market and many other markets and sub-markets can be defined.

In one embodiment, the developing a custom personal affector machine at block 7-504 includes tailoring size, potential axis of movement, ad-on options, consumables, or other aspects of a personal affector machine to meet needs of a market identified at block 7-502. With regard to size, a personal affector machine can take on any dimension, form, and shape or can be combinable with other personal affector machines. For instance, a personal affector machine can be defined by a small square frame. Alternatively, a personal affector machine can be spherical or another geometric shape. Similarly, a personal affector machine can be as large as a room, a factory, or even larger. With regard to a potential axis of movement, a personal affector machine can have an affector configurable to move in one, two, three, four, five, or more dimensions to affect material. The potential axis of movement can be achieved in different ways and with different systems. For instance, various axis of movement can originate on a frame of a personal affector machine, on an affector head, or on a cassette. Different systems can include lead screws, linear motors, rack and pinion gears, or other systems. With regard to ad-on options, a personal affector machine can include a vacuum base, a vacuum disposal system, a stand, a plurality of cassettes, drawers, auto-adjustable affectors, auto-changeable affectors, a project island, an assembly line, or any other embodiment described or inferable herein. With regard to consumables, these can include different affectors, various materials, or any other solid, liquid, gas, light source, or plasma distributable using the affectors. Indeed, many other aspects of a personal affector machine can be tailored to the needs of a market identified at block 7-502. For example, a personal affector machine for the dental market can be small in size with a number of different size rasp affectors for use on an affector head configurable to affect durable material in up to five dimensions. Such a personal affector machine would be desirable to create prosthetic teeth in a small office. A personal affector machine for the architectural market can be larger in size having a vacuum drawer system and having a number of different size drill, paint applicator, and sander affectors for use on an affector head configurable to affect foam material in three dimensions. Such a personal affector machine would be desirable to create three dimensional models of buildings, houses, and floor plans. A personal affector machine for a consumer goods market can be small with a rotatable cassette for receiving a plastic material and can include small rasp affector configurable to move in two dimensions relative to the plastic material as it is rotated. Such a personal affector machine would be desirable to create small three-dimensional plastic action figure toys. Thus, a personal affector machine can be tailored to any need of any market to create any object using any material. In certain embodiments, a standardized personal affector machine is suitable for a particular market without requiring customization.

In one embodiment, the developing custom botlets at block 7-506 includes developing botlets that are configurable to produce instructions or developing instructions themselves that are usable to create objects for a market identified at block 7-502 using a custom personal affector machine developed at block 7-504. For example, within the framing market a custom personal affector machine for creating various size picture frames can be developed. A custom botlet can then be developed that accepts material type, size, and style as arguments and produces instructions for creating a frame based on the arguments using the custom personal affector machine. Similarly, within the culinary market a custom personal affector machine for creating various types of cake decorations can be developed. A custom botlet can then be developed that accepts decoration type, such as a rose or a birthday candle, as an argument and produces instructions for creating a decoration based on the argument using the custom personal affector machine. In certain embodiments, standardized botlets are suitable for creating objects for a particular market without requiring customization.

In one embodiment, the distributing to the market at block 7-508 includes selling, renting, giving, lending, or otherwise transferring a custom personal affector machine or custom botlets to a market identified at block 7-502. The custom personal affector machine and the custom botlets can be distributed together or separately, such having the custom botlets on a disk, on a website, or within the custom personal affector machine.

This application also relates generally to object affecting, and more specifically, to systems and methods for providing multi-dimensional faxing.

The term fax and its variants as used herein are intended to mean any transmission of information over any medium, including wire and wireless technology; they shall not be construed to be limited to their traditional meaning of transmitting data over a telephone system.

Figure 82:
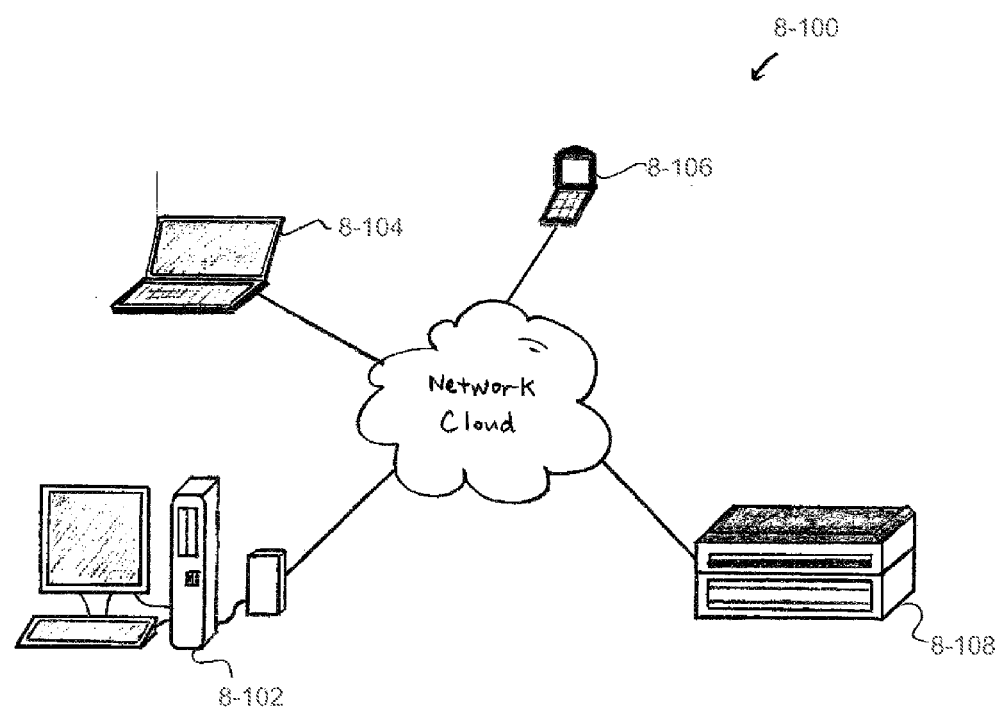
FIG. 82 is a diagram of a system for providing multi-dimensional faxing, in accordance with an embodiment of the invention.

FIG. 82 is a diagram of a system for providing multi-dimensional faxing, in accordance with an embodiment of the invention. In one embodiment, system 8-100 includes a desktop computer 8-102, a mobile computer 8-104, a handheld device 8-106, a personal affector machine 8-108, and a network cloud 8-110. The desktop computer 8-102, the mobile computer 8-104, and the handheld device 8-106 are configurable to transmit and receive information to and from the personal affector machine 8-108 through the network cloud 8-110.

In one embodiment, the desktop computer 8-102, the mobile computer 8-104, and the handheld device 8-106 are any computing device having a processor, including laptops, personal digital assistants, mobile phones, music players, portable game systems, or other similar devices. The desktop computer 8-102, the mobile computer 8-104, or the handheld device 8-106 are configurable to create or obtain motion instructions for creating an object on a personal affector machine, as described herein. The motion instructions can be created using systems and methods described herein, such as by sampling a surface geometry description of an stl, kml, or other similar file, sampling an image color intensity, using a botlet, or by creating them manually. Alternatively, the motion instructions can be obtained from another source such as by email, a storage disk, a website, or the like.

In one embodiment, the network cloud 8-110 is any of a private or public wire or wireless network, including the internet. The network cloud 8-110 is configurable to transmit the motion instructions from any of the desktop computer 8-102, the mobile computer 8-104, and the handheld device 8-106 to the personal affector machine 8-108. In certain embodiments, information from the personal affector machine 8-108 is transmitted back to the desktop computer 8-102, the mobile computer 8-104, or the handheld device 8-106, such as to indicate completion of object creation on the personal affector machine. In one particular embodiment, the motion instructions are created or obtained by the personal affector machine 8-108 and any of the desktop computer 8-102, the mobile computer 8-104, and the handheld device 8-106 control or modify the motion instructions through the network cloud 8-110.

In one embodiment, the personal affector machine 8-108 includes any of the embodiments described herein. Accordingly, in one particular embodiment, the personal affector machine 8-108 includes a top frame having an affector head for affecting material disposed within a cassette inserted within the bottom frame to create an object. The personal affector machine 8-108 is configurable to receiving the motion instructions through the network cloud 8-110 and implementing the motion instructions to create an object, which can be one, two, or three-dimensional. Thus, a system is thereby provided for multi-dimensional faxing.

For example, a user on a desktop computer can use a software application to import a surface geometry description of a building, sample the surface geometry description at a given position, and create motion instructions based on the sampled values. The motion instructions can be packaged and sent, or streamed, to a personal affector machine through the internet, whereby the personal affector machine can implement the motion instructions to create an object embodying the building described in the surface geometry description. Alternatively, a user on a handheld device can obtain motion instructions created from a botlet for creating a wooden flower and can send the motion instructions through a satellite connection to a personal affector machine located at a significant other's domicile. The personal affector machine can implement the motion instructions to create the wooden flower for the significant other. Alternatively, a user on a mobile computer can create motion instructions manually, such as by programming or using a software interface, and transmit the motion instructions to a personal affector machine to create an object based on the manually created motion instructions.

Figure 83:
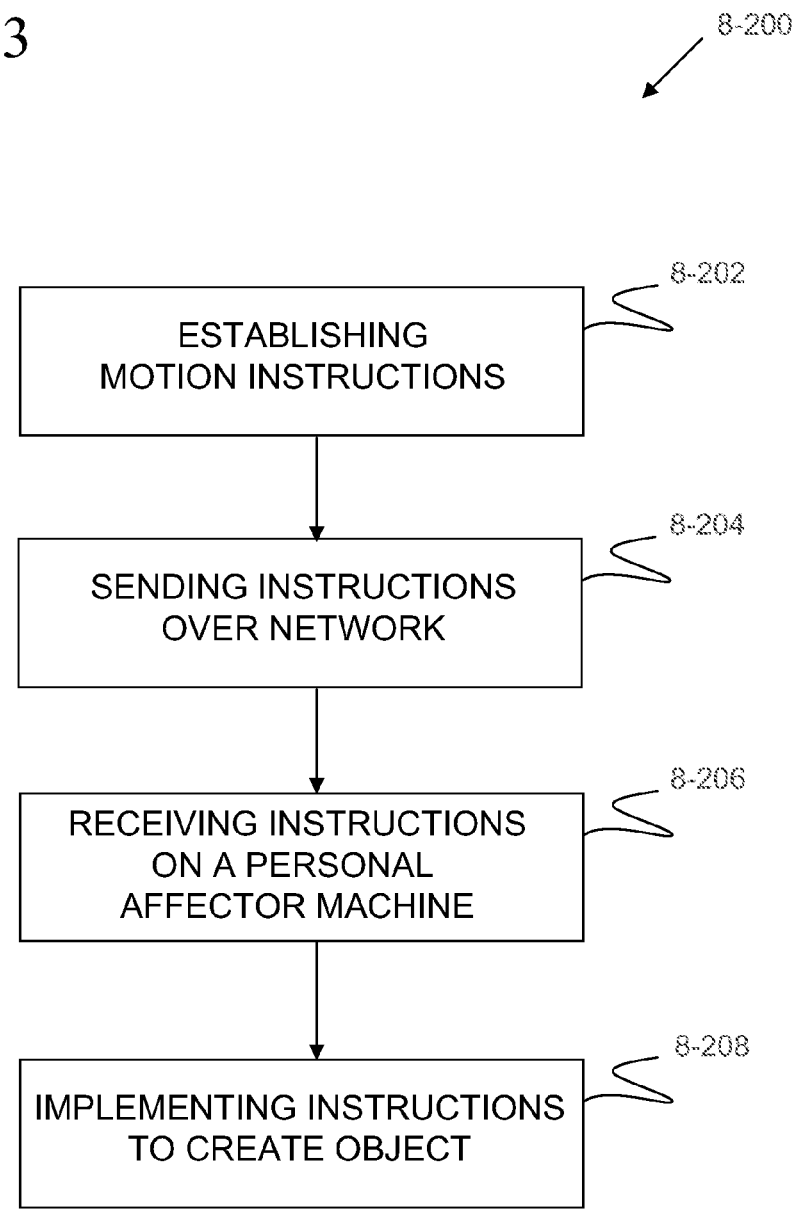
FIG. 83 is a block diagram of a method for providing multi-dimensional faxing, in accordance with an embodiment of the invention.

FIG. 83 is a block diagram of a method for providing multi-dimensional faxing, in accordance with an embodiment of the invention. In one embodiment, method 8-200 includes establishing motion instructions at block 8-202, sending the motion instructions over a network at block 8-204, receiving the motion instructions on a remote personal affector machine at block 8-206, and implementing the motion instructions to create an object at block 8-208.

In one embodiment, the establishing motion instructions at block 8-202 includes any of the methods as described herein, including obtaining motion instructions from another source, creating motion instructions manually or by sampling a surface geometry description, creating motion instructions by sampling intensity values of an image, or creating motion instructions using a botlet. As also described herein, the surface geometry description can be obtained from a file format such as .stl or .kml, from a scanned image, from a drawing, from a point cloud, or from another source. The established motion instructions are configurable to direct an affector on a personal affector machine in multiple dimensions, such as five dimensions, relative to material to affect the material, such as to create an object from the material.

In one embodiment, the sending the instructions over a network at block 8-204 includes packaging the motion instructions created or obtained at block 8-202 and sending or streaming the motion instructions to a personal affector machine over a wire or wireless based network, such as the internet. The personal affector machine can be distantly located in a home, business, automobile, plane, boat, or other similar place or can be locally based.

In one embodiment, the receiving the instructions on a personal affector machine at block 8-206 includes receiving the motion instructions that are sent or streamed at block 8-204 on a remote personal affector machine. The motion instructions can be stored on the personal affector machine or implemented on receipt. In an alternate embodiment, the motion instructions are received by another device that manages the motion instructions and forwards them to the personal affector machine.

In one embodiment, the implementing motion instructions to create an object at block 8-208 includes directing an affector head on a personal affector machine relative to a material based on the motion instructions received at block 8-206 to affect an object. In one particular embodiment, the implementing motion instructions includes directing an affector head to deposit, sense, remove, or otherwise affect material.

This application also relates generally to object affecting, and more specifically, to systems and methods for providing a shuttle system for use with a personal affector machine.

Figure 84:
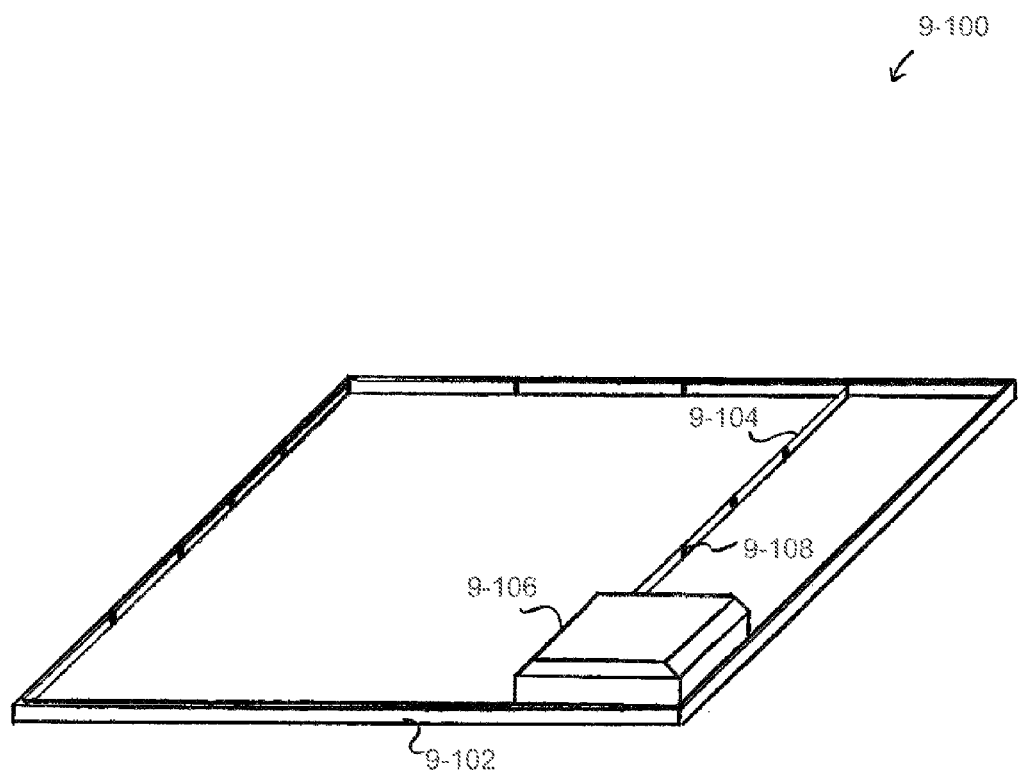
FIG. 84 is a perspective view of a shuttle system for use with a personal affector machine, in accordance with an embodiment of the invention.

FIG. 84 is a perspective view of a shuttle system for use with a personal affector machine, in accordance with an embodiment of the invention. In one embodiment, system 9-100 includes a frame 9-102, a divider 9-104, a personal affector machine 9-106, and a positioner 9-108. The frame 9-102 defines a perimeter that is sub-divided by the divider 9-104. The personal affector machine 9-106 is configurable to being disposed and movable within the frame 9-102 to various positions using the divider 9-104 as a guide.

In one embodiment, the personal affector machine 9-106 includes various embodiments as described herein. Accordingly, the personal affector machine 9-106 can include a top frame having an affector head configurable to moving in multiple dimensions relative to a material to affect the material. Thus, the top frame of the personal affector machine can be separated from a bottom frame to affect material that is oddly shaped or too large to fit within the bottom frame. For instance, the personal affector machine 9-106 having a top frame can be placed on a wood panel, a floor, a wall, a ceiling, a car body, a boat hull, an airplane fuselage, or on some other large material to affect the material.

In one embodiment, the frame 9-102 is a rigid structure made of metal, plastic, composite, or other similar material and is configurable to being disposed on a large or oddly shaped material (not illustrated). In another embodiment, the frame 9-102 is a flexible material that permits bending or shaping. The frame can be square, as depicted, or rectangular, curvilinear, or otherwise shaped to comfortably rest against or to be coupled to the material.

In one embodiment, the divider 9-104 is a rigid beam, which can be linear or curvilinear, made of metal, plastic, composite, or other similar material, that movably extends between opposing sides of the frame 9-102. In another embodiment, the divider 9-104 is a flexible material that permits bending or shaping. The frame 9-102 and the divider 9-104 can include the positioners 9-108 disposed at regular intervals along their lengths.

In one embodiment, the personal affector machine 9-106 is configurable to being movably and removably disposed within or proximate to the frame 9-102, whereby the divider 9-104 and/or the frame 9-102 can act to guide the personal affector machine 9-106 to different positions relative to the material using the positioners 9-108. In certain embodiments, the personal affector machine 9-106 is manually moved between various positions and in other embodiments the personal affector machine 9-106 is automatically moved using motors or another similar system. The divider 9-104 is movable, either manually or automatically, within the frame 9-102 to permit the personal affector machine to be disposed at additional positions; additional dividers may be employed and/or the frame 9-102 can be augmented, rearranged, or reduced in size. In one particular embodiment, a plurality of personal affector machines can be employed on one or more shuttle systems.

Accordingly, a shuttle system is provided for use with a personal affector machine that serves to amplify an affecting envelope of a personal affector machine and permit a personal affector machine to systematically affect large or oddly shaped material, such as to create or clean a large or oddly shaped object. In one particular embodiment, the shuttle system is replaced or complimented with an independently movable personal affector machine, such as one having wheels. In one particular embodiment, motion instructions, as described herein, are indexed or otherwise organized to provide for affecting an oddly shaped or large material using a personal affector machine on a shuttle system.

Figure 85:
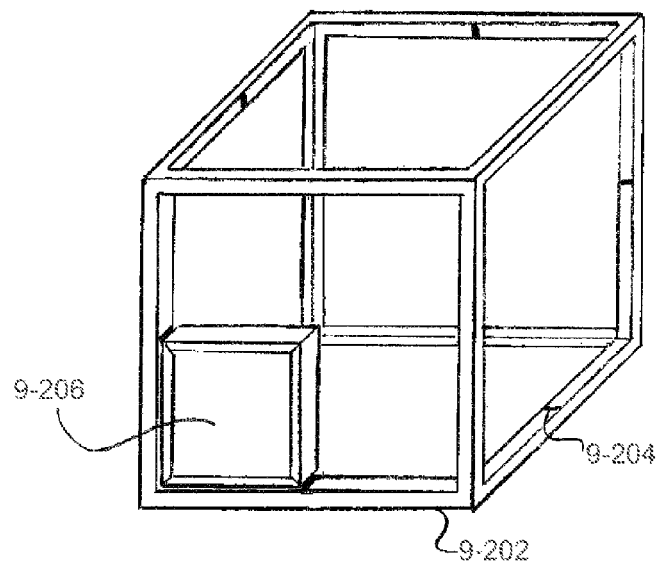
FIG. 85 is a perspective view a multi-dimensional shuttle system for use with a personal affector machine, in accordance with an embodiment of the invention.

FIG. 85 is a perspective view a multi-dimensional shuttle system for use with a personal affector machine, in accordance with an embodiment of the invention. In one embodiment, system 9-200 includes a frame 9-202, a positioner 9-204, and a personal affector machine 9-206. System 9-200 implements many of the embodiments as discussed in reference to FIG. 84 with an exception that the frame 9-202 is three-dimensionally shaped to permit the personal affector machine 9-206 to affect large or oddly three-dimensionally shaped material. Indeed, the frame 9-202 can be one, two, or three-dimensionally shaped and can even be a part of a larger frame system, movable, or rotatable.

Figure 86:
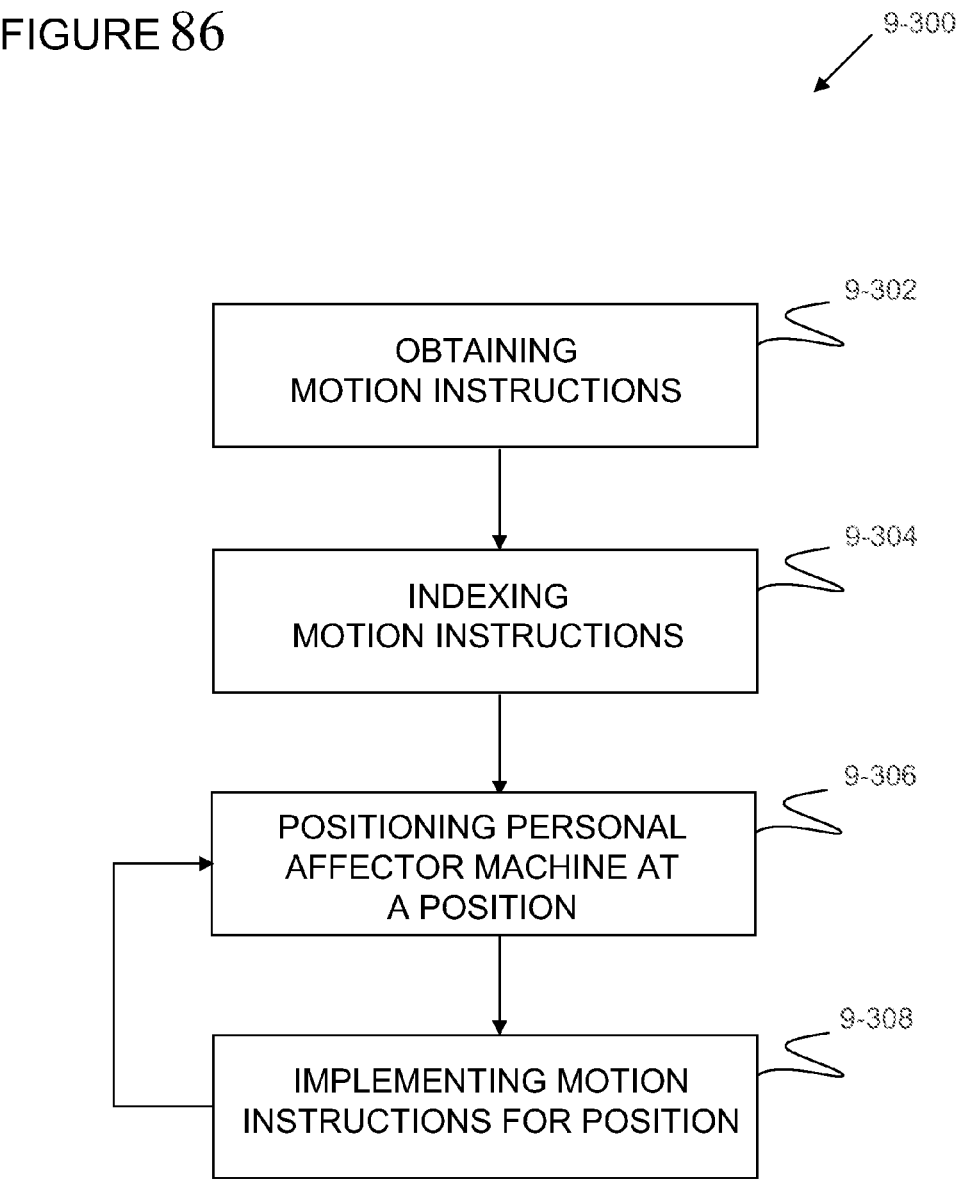
FIG. 86 is a flow diagram of a method for implementing a personal affector machine on a shuttle system, in accordance with an embodiment of the invention.

FIG. 86 is a flow diagram of a method for implementing a personal affector machine on a shuttle system, in accordance with an embodiment of the invention. In one embodiment, method 9-300 includes obtaining motion instructions at block 9-302, indexing the motion instructions at block 9-304, positioning a personal affector machine at a position at block 9-306, and implementing the indexed motion instructions for the position at block 9-308.

In one embodiment, the obtaining motion instructions at block 9-302 is by way of sampling a surface geometry description, sampling color intensity of an image, using a botlet, creating manually, receiving from another source, or by using another method as described herein. Accordingly, the motion instructions are directions to a personal affector machine for affecting a material, such as to create an object. However, in method 9-300 the motion instructions may include directions to affect material that is larger than an affecting envelope of a personal affector machine.

In one embodiment, the indexing the motion instructions at block 9-304 includes partitioning the motion instructions obtained at block 9-302 into sections that correspond to different positions of a personal affector machine. Thus, if a personal affector machine must be moved to nine different positions to affect a large material, then the motion instructions can be partitioned into nine sections corresponding to the nine different positions of the personal affector machine.

In one embodiment, the positioning a personal affector machine at a position at block 9-306 includes disposing a personal affector machine at a position relative to a material on a shuttle system as described herein. The implementing the indexed motion instructions for the position at block 9-308 includes directing the personal affector machine to affect the material at the position based on the corresponding section of the motion instructions. Method 9-300 can return to block 9-306 whereby the personal affector machine is disposed at another position relative to the material using the shuttle system. The implementing the indexed motion instructions for the position at block 9-308 then includes directing the personal affector machine to affect the material at the new position based on the corresponding section of the motion instructions. Method 9-300 can continue in a similar fashion until the personal affector machine has affected the entire material. Accordingly, a method is provided for systematically affecting a large or oddly shaped object using a relatively small or uniformly shaped personal affector machine. Method 9-300 can be implemented on one, two, and three dimensional shuttle systems.

This application also relates generally to object affecting, and more specifically, to systems and methods for providing a personal affector machine manufacturing farm.

Figure 87:
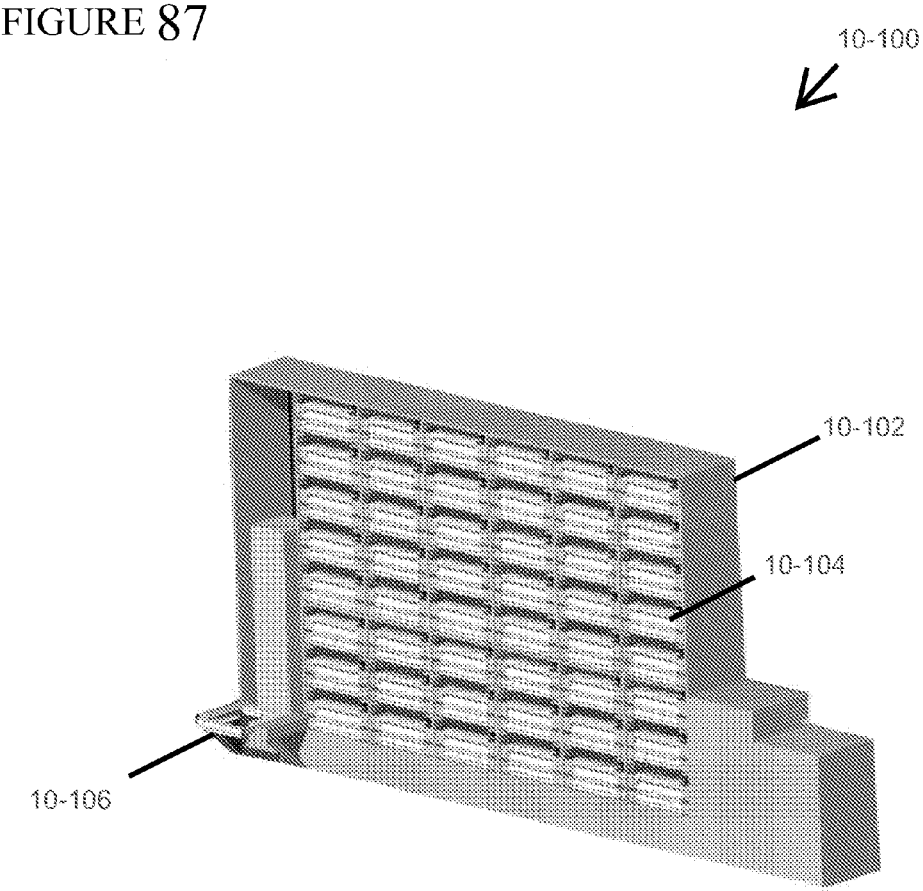
FIG. 87 is a perspective view of a system for providing a personal affector machine manufacturing farm, in accordance with an embodiment of the invention.

FIG. 87 is a perspective view of a system for providing a personal affector machine manufacturing farm, in accordance with an embodiment of the invention. In one embodiment, system 10-100 includes a storage rack 10-102, a plurality of personal affector machines 10-104, and a cassette handler 10-106. The storage rack 10-102 is configurable to house the plurality of personal affector machines 10-104 and the cassette handler 10-106 is movable relative to the storage rack 10-102 and the plurality of personal affector machines. Each of the plurality of personal affector machines 10-104 includes various embodiments as described herein. For instance, in one particular embodiment each of the plurality of personal affector machines 10-104 includes a top frame having an affector head configurable to affect material disposed within a cassette that is removably insertable within a bottom frame. Accordingly, each of the plurality of personal affector machines 10-104 can include a cassette (not labeled) or be configurable to removably receive a cassette. As described in various embodiments herein, the cassette can include clamps or other mounting means to secure a material therein, which can be affected by the affector head of the personal affector machine. Each of the plurality of personal affector machines 10-104 can operate independently of the other personal affector machines on material contained therein, such as to create a multitude of similar or different objects. The cassette handler 10-106 is configurable to handle cassettes, such as by way of inserting, removing, and delivering cassettes to and from the plurality of personal affector machines 10-104 to automatically facilitate the affecting of various materials. Accordingly, system 10-100 provides a means to automate the use of a number of personal affector machines.

As an example, system 10-100 can accept internet orders for an object and have the cassette handler 10-106 deliver a cassette having the appropriate material contained therein to an available personal affector machine, which can implement motion instructions to create the object. The cassette handler 10-106 can remove the cassette after the personal affector machine has created the object and deliver the cassette to personnel for shipping the object. Alternatively, system 10-100 can manage the affecting of a large object requiring a plurality of sub-objects to be assembled.

In one particular embodiment, the storage rack 10-102 is differently shaped, expanded, reduced in size, or even include a plurality of storage racks. Further, the personal affector machines can be larger or smaller in size and include any embodiments described herein, such as those with regard to a cassette providing multiple dimensions of rotation. The cassette handler 10-106 can be movably coupled to the storage rack 10-102 using gears, linear motors, lead screws, or other motion system; alternatively the cassette handler 10-106 can be separate from the storage rack 10-102, such as a robot. Further, the cassette handler 10-106 can be omitted in favor of manual handling of cassettes. In another embodiment, cassettes are omitted and material is directly inserted and removed from the personal affector machine. System 10-100 can be a part of a larger manufacturing system.

Figure 88:
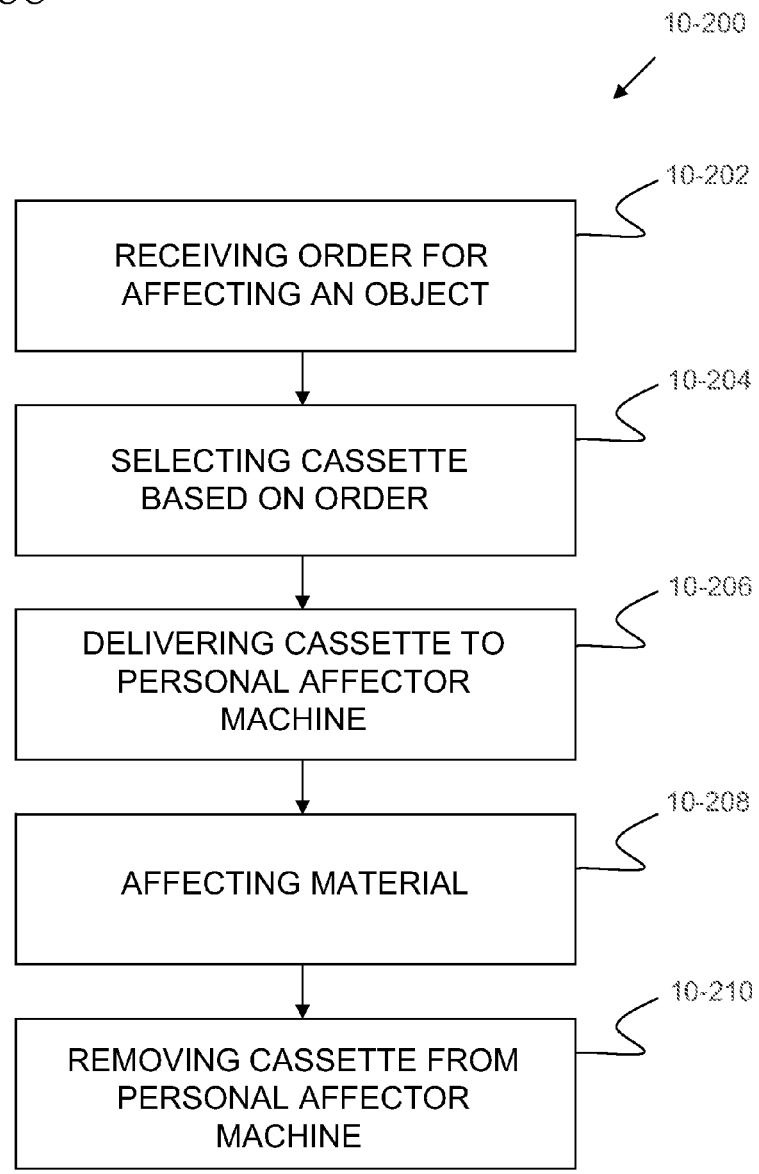
FIG. 88 is a block diagram of a method for using a personal affector machine in a manufacturing farm, in accordance with an embodiment of the invention.

FIG. 88 is a block diagram of a method for using a personal affector machine in a manufacturing farm, in accordance with an embodiment of the invention. In one embodiment, method 10-200 includes receiving an order for affecting an object at block 10-202, selecting a cassette based on the order at block 10-204, delivering the cassette to a personal affector machine at block 10-206, affecting material at block 10-208, and removing the cassette from the personal affector machine at block 10-210. In one particular embodiment, method 10-200 is implemented on a system for providing a personal affector machine manufacturing farm as described in reference to FIG. 87.

In one embodiment, the receiving an order for affecting an object at block 10-202 includes receiving a request to affect an object, which can include motion instructions for creating the object. The request can be over any communication system, including wire or wireless based private and public systems, and can be received by a computer. The selecting a cassette based on the order at block 10-204 includes reviewing the order and selecting a cassette having material disposed therein from which the order can be fulfilled. The cassette can include any of the embodiments described herein and the selecting can be performed by an automated mechanical system, such as a robot. Alternatively, material can be selected and disposed into a cassette from which the order at block 10-204 can be fulfilled. The delivering the cassette to a personal affector machine at block 10-206 includes inserting the cassette selected at block 10-204 into a personal affector machine, whereby the personal affector machine is configurable to affect material disposed within the cassette. The personal affector machine can include any of the embodiments described herein and can be disposed within a manufacturing farm having a plurality of additional personal affector machines as also described herein. The affecting material at block 10-208 includes using the affector head within the personal affector machine to affect material disposed within the cassette inserted at block 10-206 to fulfill the order, such as to create an object. The removing the cassette at block 10-210 can be performed by an automated mechanical system, such as a robot, and can further include delivering the object affected at block 10-208 to an entity responsible for submitting the order. Accordingly, a method is established for accepting orders for affecting objects and automatically affecting objects based on the orders using a personal affector machine.

This application also relates generally to object affecting, and more specifically, to systems and methods for providing a personal affector machine project island.

Figure 89:
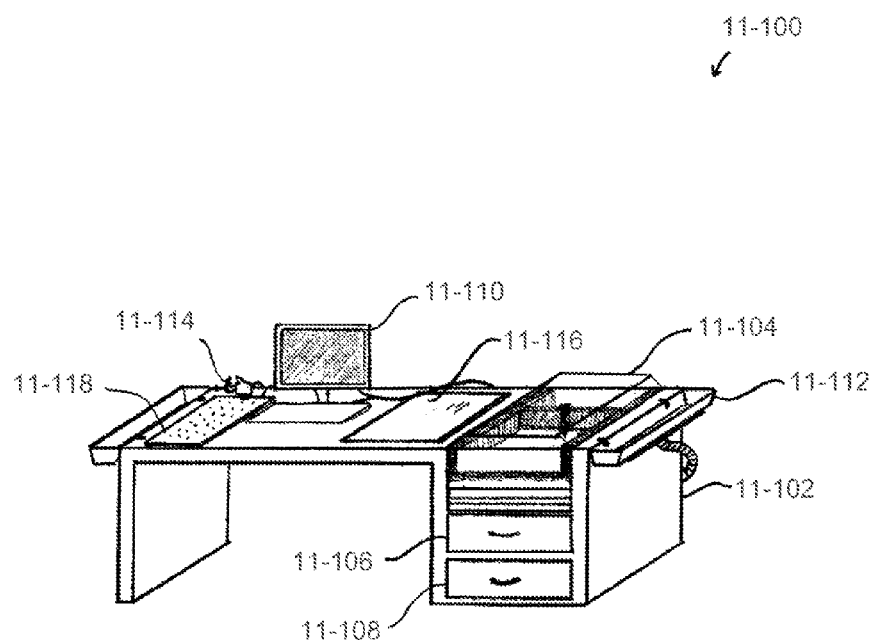
FIG. 89 is a perspective view of a personal affector machine project island, in accordance with an embodiment of the invention.

FIG. 89 is a perspective view of a personal affector machine project island, in accordance with an embodiment of the invention. In one embodiment, system 11-100 includes a working surface 11-102, a personal affector machine 11-104, a vacuum bag system 11-106, a spare storage compartment 11-108, a computer 11-110, a movable vacuum hood 11-112, an automatic clamp point 11-114, a removable film surface 11-116, and a vacuum surface 11-118. The working surface 11-102, in this case a desk, is configurable to storably receive the personal affector machine 11-104, which can include any of the embodiments discussed herein. Accordingly, the personal affector machine 11-104 can include a top frame having an affector head that is configurable to affect material disposed within a cassette insertable into a bottom frame in a plurality of dimensions. The cassette (not labeled) can be removably and slidably inserted into the personal affector machine 11-104 while the personal affector machine 11-104 is disposed within the working surface 11-102. The personal affector machine 11-104 can be disposed within a cavity in the working surface 11-102 as illustrated, within a sliding drawer on the working surface 11-102, on the working surface 11-102, attached to the working surface 11-102, under a flip top or removable surface in the working surface 11-102, or at any other position relative to the working surface 11-102. The vacuum bag system 11-106 includes any of the embodiments described herein and is disposed adjacent to the personal affector machine 11-104 within the working surface 11-102, such as under the personal affector machine 11-104 within a drawer, for suctionaly removing debris from the personal affector machine 11-104 that results from object affecting. The spare storage compartment 11-108 includes a drawer or compartment that is configurable to store another cassette, various affectors, materials, consumables, or any other device described in relation to any embodiment contained herein. The computer 11-110 is coupled to the personal affector machine 11-104 and, in certain embodiments, is configurable to obtain or create motion instructions usable to affect objects on the personal affector machine 11-104. The computer 11-110 can also be used to directly control, receive feedback from, or monitor the status of the personal affector machine 11-104. The movable vacuum hood 11-112 is hingedly coupled to the working surface 11-102 and includes an aperture therein, which is coupled via a conduit to a vacuum source (not visible). Debris on the working surface 11-102 can be swept into the movable vacuum hood 11-112 for removal and/or the movable vacuum hood 11-112 can be moved via its hinges to make debris removal more convenient. In certain embodiments, a plurality of movable vacuum hoods can be employed and alternate hood shapes and connections to the working surface 11-102 may be practiced, including embedding a vacuum hood within the working surface 11-102. The automatic clamp point 11-114 provides a device for securably receiving an object therein. The automatic clamp point 11-114 can be controlled using a compressor or using a mechanical arrangement, such as a screw based clamp. The removable film surface 11-116 is disposed on the working surface 11-102 and includes a plurality of thin plastic sheets stacked adjacent to one another. The sheets can be constructed from other material. A top sheet of the plurality of thin plastic sheets is configurable to receiving operations on an object by a user, such as cutting, sawing, sanding, painting, or other operations. Once the top sheet has received such operations, or when otherwise desired, the top sheet can be removed whereby a new top sheet is exposed from the plurality of thin plastic sheets. The new top sheet is configurable to similarly receiving operations and being removed when desired. The vacuum surface 11-118 includes a planar surface interrupted by a series of apertures, which are configurable to focusing suction from a vacuum source (not visible). The planar surface is configurable to receiving an object thereon, whereby the object is removably securable using suction provided by the series of apertures. Accordingly, a personal affector machine project island is provided, whereby an individual can comfortably and conveniently position himself or herself proximate to a working surface and have at his or her disposal a plurality of devices, including a personal affector machine, for affecting objects.

In certain embodiments, the working surface 11-102 can be of any shape, size, or material, including a table, an automobile dashboard, a counter top, or a wall. The working surface 11-102 can be extended by coupling to other surfaces or additional working surfaces and can be movable, such as with wheels or along a conveyor system. In other embodiments, the working surface 11-102 can have any device or combination of devices described for any embodiment herein disposed therein.

This application also relates generally to object affecting, and more specifically, to systems and methods for producing an object having an image disposed thereon.

Figure 90:
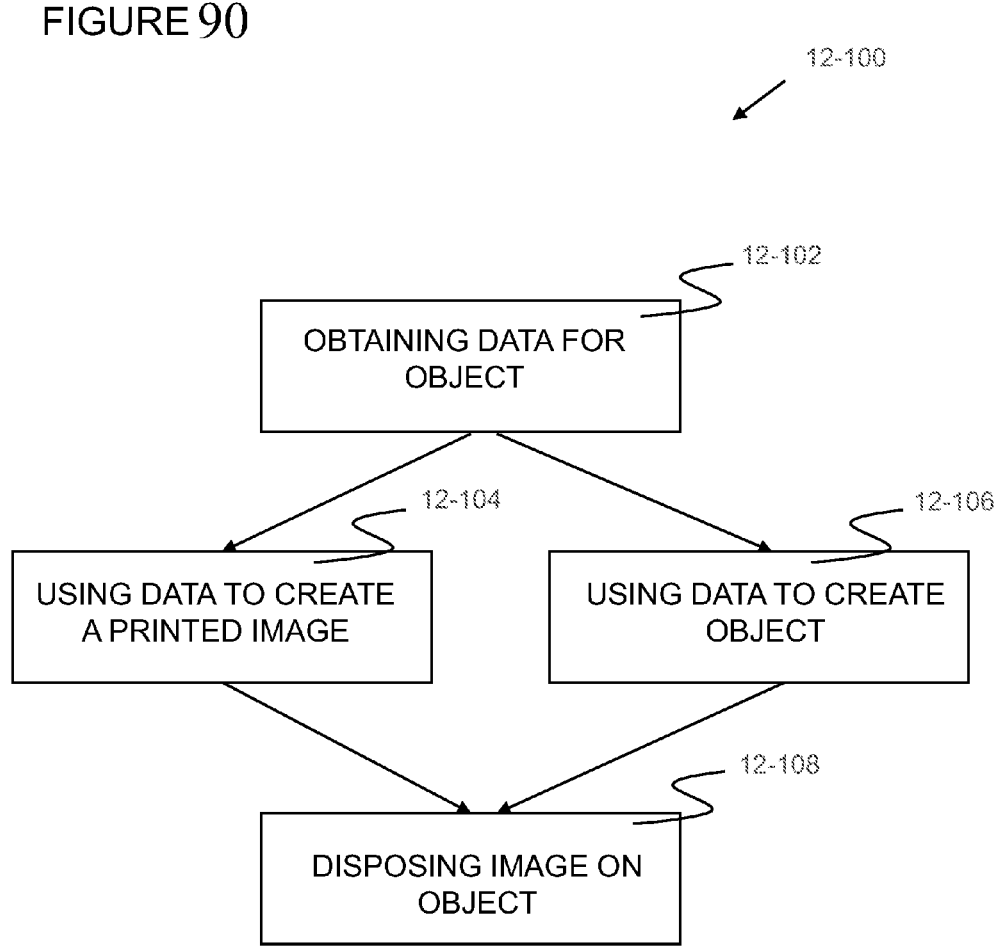
FIG. 90 is a block diagram of a method for producing an object having an image disposed thereon, in accordance with an embodiment of the invention.

FIG. 90 is a block diagram of a method for producing an object having an image disposed thereon, in accordance with an embodiment of the invention. In one embodiment, method 12-100 includes obtaining data for an object at block 12-102, using the data to create a printed image at block 12-104, using the data to create an object at block 12-106, and disposing the image on the object at block 12-108.

In one embodiment, the obtaining data for an object at block 12-102 includes obtaining data having a surface geometry description of an object and surface coloration information of the object. The surface geometry description can be in any format as described herein, including .stl, .kml, and point cloud, and can be obtained from any source as described herein, including from a computer aided drawing (CAD) package, from a scanner, from a 2D image having three-dimensional data, from a botlet, and from manual creation. The surface coloration information can include a raster, vector, or other type of description of colors on a surface of the surface geometry description and can be obtained from any source. For example, the surface geometry description can represent a human head and the surface coloration information can be a rasterized description of colors on a surface of the human head. In some embodiments, both the surface geometry description and the surface coloration information are contained within the same file and in other cases they are contained in different files.

In one embodiment, the using the data to create an object at block 12-106 includes sampling the surface geometry description, producing motion instructions from the sampled values, and implementing the motion instructions on a personal affector machine to create an object, as described herein. Following the example above, the surface geometry description of the human head can be sampled at a $\theta_0$, $\gamma_0$ position corresponding to a front facial view to obtain a set of x, y, and z values. The set of x, y, and z values can be used to create motion instructions that direct an affector to trace the set of x, y, and z values relative to a material. The motion instructions can be implemented on a personal affector machine to create an object having a physical representation of the surface geometry description at the $\theta_0$, $\gamma_0$ position, in this instance a three-dimensional model of a human face.

In one embodiment, the using the data to create a printed image at block 12-104 includes reducing the surface coloration information for a corresponding $\theta$, $\gamma$ position to a printed form. In one particular embodiment, this includes inserting a film into a printer and printing the surface coloration information on the film that corresponds to a $\theta$, $\gamma$ position that was sampled from at block 12-106. The film can be paper, plastic, composite, or any other type of material of any size and dimension. Continuing the example supra, the surface coloration information at position $\theta_0$, $\gamma_0$ corresponds to eye, nose, mouth, and skin colors of a front view of the human head surface geometry description. Accordingly, the eye, nose, mouth, and skin colors can be reduced to a film using a printer to create a printed image of the front view of the human head.

In one embodiment, the disposing the image on the object at block 12-108 includes disposing the printed image from block 12-104 on the object from block 12-106. Because the object from block 12-106 is a physical representation of the surface geometry description at a given position and the printed image from block 12-104 is a depiction of the surface coloration of the surface geometry description at the same position, disposing the printed image to the object establishes a multi-dimensional colored object. Continuing the example supra, disposing the printed image of the eyes, nose, mouth, and skin on the object embodying a physical representation of the same provides a three-dimensional colored human face.

In certain embodiments, the image is permanently disposed on the object, such as by way of vacuum forming, using heat and thermoplastic film, or adhesive properties. In the case of vacuum forming, the object can have channels disposed therein, such as in the case of foam, whereby a vacuum source can be coupled to the foam to suction the printed image thereon. In other embodiments, the image is non-permanently disposed on the object. For instance, in architectural settings the object can be a three-dimensional representation of a proposed building site. A printed image of one construction layout can be non-permanently disposed on the building site and possibly replaced by a printed image of an alternate construction layout to illustrate various projects. Further, a printed image of one level of systems can be disposed on the building site, such as plumbing systems, while printed images of additional levels of systems, such as electrical systems, can be superimposed thereon. In yet further embodiments, the image includes controllable indicator lights that are strategically placed, thereby permitting a presenter, such as in the above scenarios, to highlight certain areas of the image when it is disposed on an object. In further embodiments, the printed image is disposed on the object to form a multi-dimensional mold of the printed image. In one particular embodiment, alignment of the printed image from block 12-104 with the object from block 12-106 is accomplished by retaining a created object within a cassette and aligning location points on the printed image with location points on the cassette. Other registration methods are possible including using physical holes, codes, or other data. In yet another particular embodiment, the using the data to create a printed image at block 12-104 further includes distorting the printed image to compensate for any distortion that results in disposing the printed image on the object at block 12-108. In a further embodiment, the film can be an object itself thereby permitting surface coloration to be reduced directly on an object. In yet a further embodiment, the film from block 12-104 includes a conductive surface to connect devices that can be disposed thereon.

This application also relates generally to object affecting, and more specifically, to systems and methods for controlling an affector on a personal affector machine.

Figure 91:
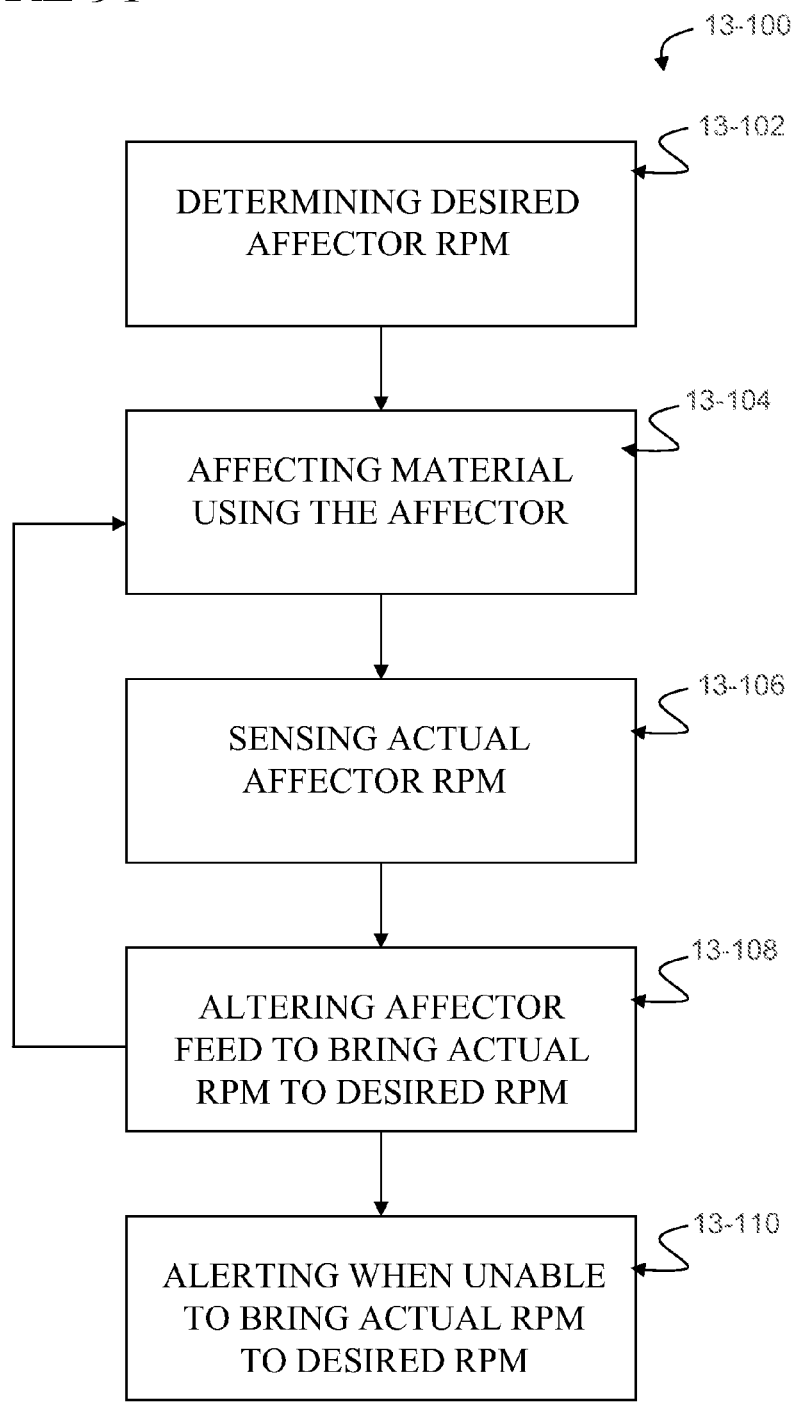
FIG. 91 is a block diagram of a method for controlling an affector on a personal affector machine, in accordance with an embodiment of the invention.

FIG. 91 is a block diagram of a method for controlling an affector on a personal affector machine, in accordance with an embodiment of the invention. In one embodiment, method 13-100 includes determining a desired affector rotation per minute (RPM) at block 13-102; affecting material using the affector at block 13-104; sensing actual affector RPM at block 13-106; and altering affector feed to bring the actual RPM to the desired RPM at block 13-108. The method 13-100 can return to block 13-104. In one particular embodiment, the method 13-100 further includes the step of alerting at block 13-110 when the method is unable to bring the actual RPM to the desired RPM. Method 13-100 can be implemented on a personal affector machine, as described herein.

In one embodiment, the determining a desired affector RPM at block 13-102 includes determining a baseline rotational speed of an affector. In one particular embodiment, a personal affector machine includes a top frame and a bottom frame. The top frame is configurable to providing an affector that can move in a plurality of dimensions to affect material that is removably disposed within a cassette inserted within the bottom frame. Affecting can include any of depositing, removing, or sensing the material and the material can be made from any number of substances including plastic, foam, wood, etc. In the case where affecting includes removing, the affector can be a rasp and the material can include foam. Accordingly, in this instance the rasp is configurable to move in a plurality of dimensions relative to the foam to remove material therefrom. The rasp includes a baseline rotational speed that provides for optimal removal of material from the foam. Thus, when the rasp rotates at a speed less than the baseline rotational speed, removal of material is less precise. Oppositely, when the rasp rotates at a speed greater than the baseline rotational speed, removal of material is more precise. The level of precision can be determined by a visual inspection of a removal path. Therefore, the step of determining the desired affector RPM at block 13-102 includes determining a baseline rotational speed for a given affector usable on a personal affector machine whereby removing the material using the affector at or above the baseline speed is determined to be precise. Indeed, each affector can have a different baseline rotational speed based on its inherent properties such as size and shape and different entities can determine different baseline rotational speed levels based on precision preference levels.

In one embodiment, the affecting material using the affector at block 13-104 includes implementing motion instructions on a personal affector machine whereby the affector from block 13-102 is directed to move in a plurality of dimensions relative to a material at or above the desired affector RPM from block 13-102 to create an object. Continuing the example supra, the affector can be a rasp and the material can be foam whereby the rasp is directed to move relative to the foam at or above the determined baseline rotational speed to remove material therefrom to create an object.

In one embodiment, the sensing the actual affector RPM at block 13-106 includes determining actual rotational speed of an affector as it affects a material. While an affector is affecting material, it can be extended into various depths and through differing densities of a material. The different depths and densities can provide varying levels of frictional resistance to an affector, which can reduce the actual rotational speed of the affector to below the desired affector RPM for a given current level. For instance, continuing the example above, when an object is an architectural model such as a topography, a building site, or a model building, a rasp-type affector can find itself at different depths within foam material in an effort to remove material to create the intended multi-dimensional object. At these different depths, differing frictional resistance is applied to the affector thereby reducing its actual rotational speed and its level of precision.

In one embodiment, the altering affector feed to bring the actual RPM to the desired RPM at block 13-108 includes reducing a translational speed of the affector through a material to reduce frictional force applied against the affector. Reduction of the frictional force against the affector permits the rotational speed of the affector to increase towards the desired RPM thereby improving precision of the affector. Alternatively, a current level can be increased to the affector to maintain its rotational speed instead or in addition to reducing the translational speed of the affector. The method 13-100 can return to block 13-104 whereby the affecting material using the affector continues. In one particular embodiment, the alerting when unable to bring actual RPM to desired RPM includes notifying a user, stopping affector movement, or taking some other action when reducing a translational speed of an affector fails to yield a rotational speed that is approximate to the desired RPM. This can occur when an affector is dull, dirty, or damaged or when a material is not subject to being cut or traversed.

This application also relates generally to object affecting, and more specifically, to systems and methods for initializing an affector on a personal affector machine.

Figure 92:
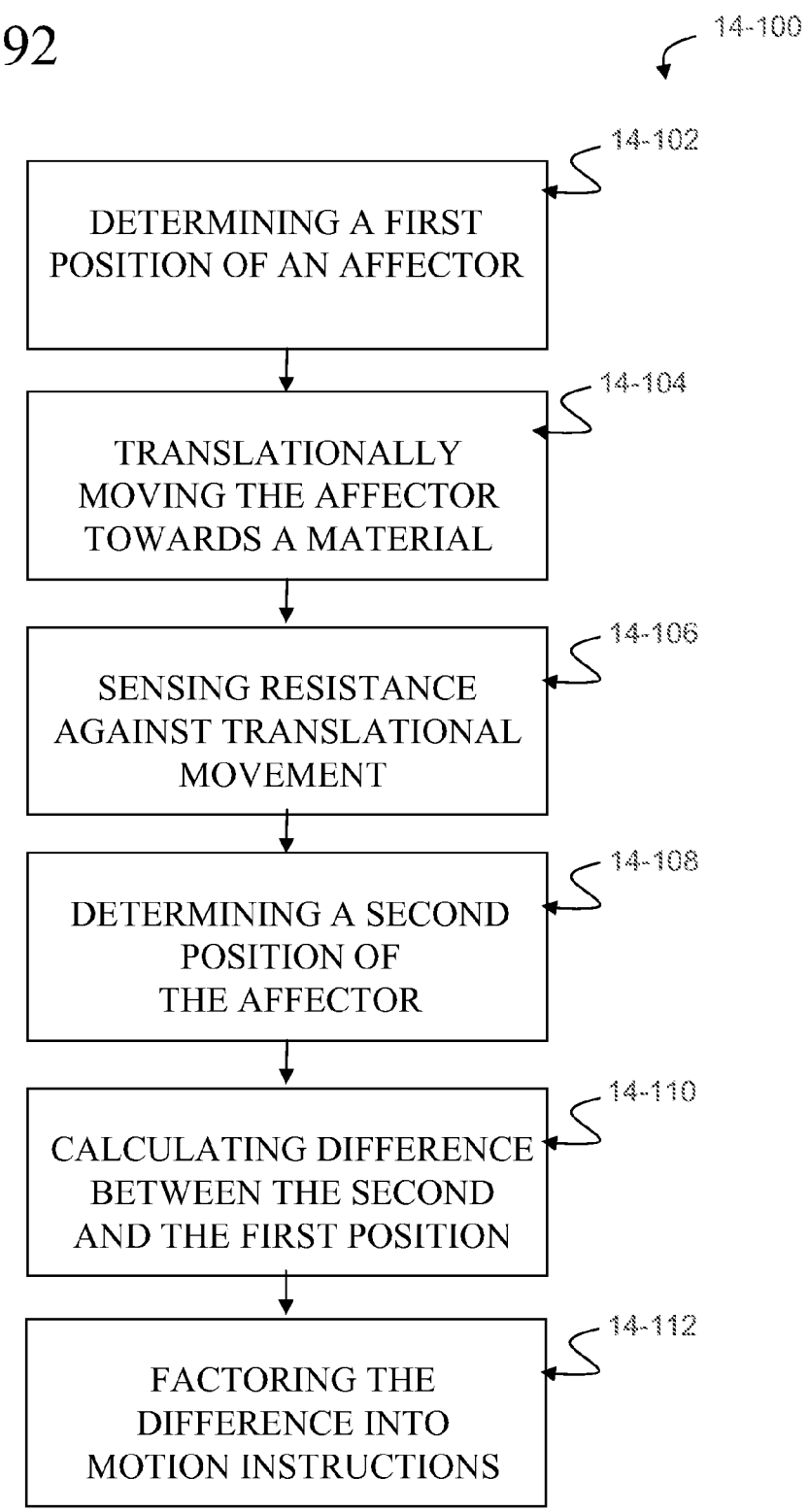
FIG. 92 is a block diagram of a method for initializing an affector on a personal affector machine, in accordance with an embodiment of the invention.

FIG. 92 is a block diagram of a method for initializing an affector on a personal affector machine, in accordance with an embodiment of the invention. In one embodiment, method 14-100 includes determining a first position of an affector at block 14-102, translationally moving the affector towards a material at block 14-104, sensing resistance against the translational movement at block 14-106, determining a second position of the affector at block 14-108, calculating a difference between the second and the first position at block 14-110, and factoring the difference into motion instructions at block 14-112.

In one embodiment, the determining a first position of an affector at block 14-102 includes determining a resting position of an affector on a personal affector machine, as described more fully herein. Accordingly, in one embodiment, the personal affector machine can include a top frame having an affector that is configurable to affect material in a plurality of dimensions that is disposed within a cassette inserted into a bottom frame. The affector within the personal affector machine has a resting position where it begins from to affect the material, which can be located some distance from the resting position of the affector. Thus, the determining a first position of an affector includes determining the resting position where the affector begins from to affect material.

In one embodiment, the translationally moving the affector towards a material at block 14-104 includes slowly moving the affector on a personal affector machine towards material contained within a cassette beginning from the first position determined at block 14-102. In certain embodiments, the movement is along a z-axis whereby the affector is depressed towards the material. However, the movement can be along an alternative axis and the material can alternatively be moved towards the affector.

In one embodiment, the sensing resistance against the translational movement at block 14-106 includes determining when the affector is unable to continue moving unimpeded towards the material. The inability to continue unimpeded movement is often caused because the affector has reached a surface of the material. In certain embodiments, when the affector motion is established by a rack and pinion gear system, the resistance is determined when a pinion gear jumps a step.

In one embodiment, the determining a second position of the affector at block 14-108 includes determining a position of the affector when resistance is sensed at block 14-106. Because resistance is usually sensed at block 14-106 when the affector reaches a surface of the material, the second position is a reflection of where the affector should be to make initial contact with the material.

In one embodiment, the calculating a difference between the second and the first position includes determining a distance between the second and the first position. The first position reflects a resting position of the affector on a personal affector machine and the second position reflects a position where the affector makes contact with a surface of a material to be affected, as described herein. Thus, the difference between the second and the first position reflects a distance that the affector must move prior to contacting the material. In the embodiment where the affector is a rasp and is intended to remove matter from the material, the difference between the second and the first position reflects a distance that the rasp should move prior to implementing motion instructions to remove matter from the material.

In one embodiment, the factoring the difference into motion instructions at block 14-112 includes adding the difference determined at block 14-110 to corresponding axis values within the motion instructions, as described herein. In certain embodiments, the motion instructions direct an affector to trace a set of x, y, and z values relative to a material to create a multi-dimensional object therefrom. However, the motion instructions may not account for the affector having to travel a distance before being positioned at an appropriate starting place relative to the material. For example, the affector may need to be depressed a given distance along a z-axis before making contact with a material, as described supra, but the motion instructions may inaccurately assume that the affector begins from a position of contact with the material. Accordingly, in this example the difference determined at block 14-110 is added to the z-axis values within the motion instructions to ensure the affector implements the motion instructions as intended. In certain embodiments, more or less of the difference determined at block 14-110 can be factored into the motion instructions.

This application also relates generally to object affecting, and more specifically, to systems and methods for establishing a mould for use in an injection moulding process using a personal affector machine.

Figure 93:
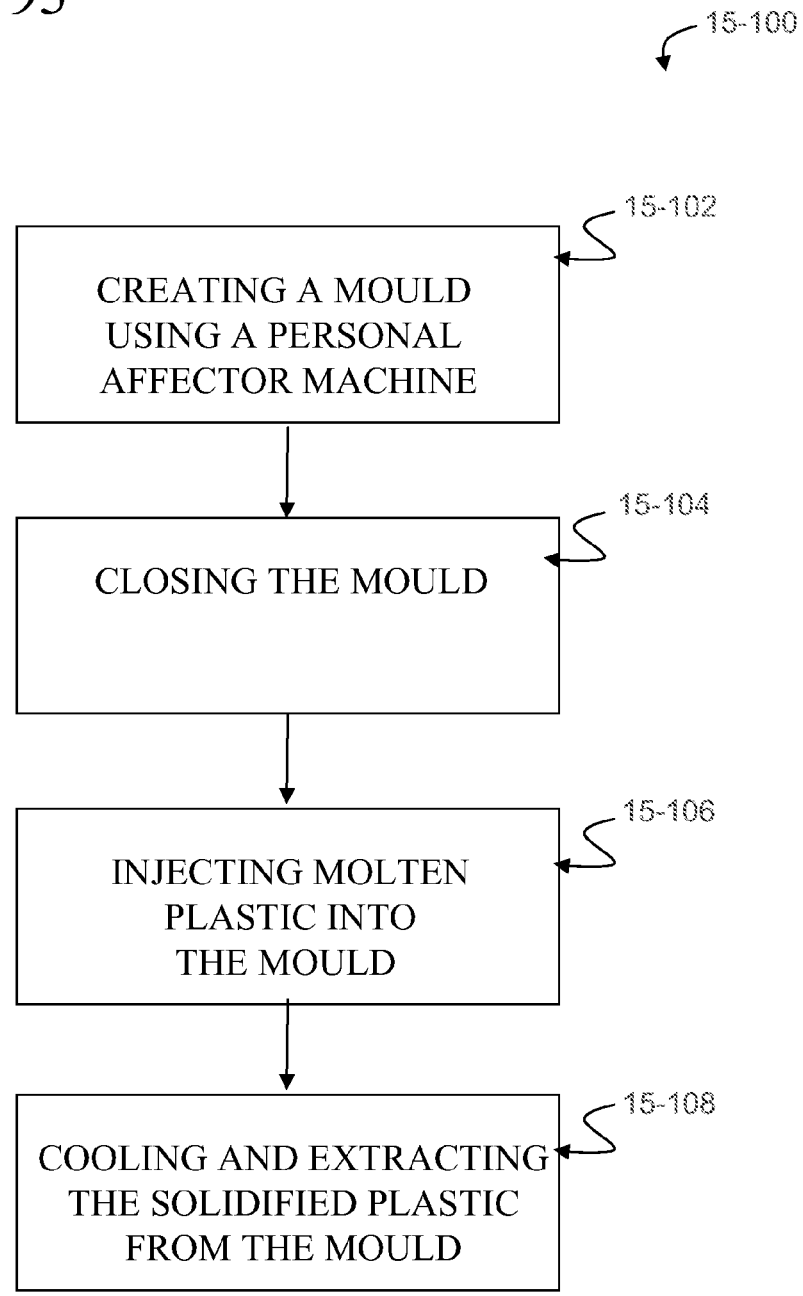
FIG. 93 is a block diagram of a method for establishing a mould for use in an injection moulding process using a personal affector machine, in accordance with an embodiment of the invention.

FIG. 93 is a block diagram of a method for establishing a mould for use in an injection moulding process using a personal affector machine, in accordance with an embodiment of the invention. In one embodiment, method 15-100 includes creating a mould using a personal affector machine at block 15-102, closing the mould at block 15-104, injecting molten plastic into the mould at block 15-106, and cooling and extracting the solidified plastic from the mould at block 15-108.

In one embodiment, the creating a mould using a personal affector machine at block 15-102 includes using an affector to remove matter from a material to define at least one cavity. In one embodiment, a personal affector machine includes a top frame having an affector configurable to affecting material disposed within a cassette inserted into a bottom frame in a plurality of dimensions. The affector is configurable to removing matter from the material contained within the cassette to define a cavity and thus establish a mould. The affector can be directed by motion instructions, which can be established by any method as described herein; accordingly, the cavity can take on any possible shape. In one particular embodiment, motion instructions for creating an object can automatically be reversed to create a cavity for creating the object through injection moulding. In one example, the affector is a rasp and the material is a plastic with a relatively high melting temperature. Thus, in this example the rasp can remove material from the plastic having a relatively high melting temperature to define at least one cavity. The plastic having a relatively high melting temperature defining a cavity therein is the mould. In additional embodiments, the material can be any material including wood, metal, or some composite material. Further, the affector can be any affector described herein including a drill bit, a laser, or an erosion device. In certain embodiments, the material includes a plurality of portions that are configurable to being collapsed against each other. The affector can remove matter from each of the plurality of portions of the material to define a multiple cavities, whereby the multiple cavities can be joined together by collapsing the plurality of portions of the material against one another. For example, in the embodiment where the affector is a rasp and the material is plastic having a relatively high melting temperature, the plastic can be segmented into two portions that are connected by a hinge. The rasp can remove matter from each of the two portions of the plastic to define two cavities and thus create a mould. The two cavities can be joined together by folding the two portions of the plastic along the hinge. In further embodiments, the affector is configurable to removing matter from the material to define channels, such as channels that can be used to receive molten plastic or provide an exhaust outlet.

In one embodiment, the closing the mould at block 15-104 includes sealing the cavity in the material created at block 15-102 for receiving molten plastic therein. The sealing can be accomplished in any number of ways, such as by pressing a flat panel against the cavity or by collapsing the plurality of portions of the material together along a hinge. In certain embodiments, the sealing is accomplished using a press that holds the mold in either a vertical or horizontal position. In one particular embodiment, an injection moulding machine is established and is configurable to receiving a material having two portions that are collapsible against each other. The injection moulding machine facilitates the collapsing of the material automatically. In another particular embodiment, the personal affector machine includes a cassette that facilitates collapsing of the two portions of the material against each other.

In one embodiment, the injecting molten plastic into the mould at block 15-106 includes heating a thermoplastic having a melting temperature below that of the mould material from block 15-102 and depositing the heated thermoplastic into the cavity of the mould. The thermoplastic can include any of polystyrene, acrylonitrile butadiene styrene, nylon, polypropylene, polyethylene, polyvinyl chloride, or other similar plastic. In one embodiment, the cooling and extracting the solidified plastic from the mould at block 15-108 includes waiting for the molten plastic injected into the mould at block 15-106 to cool and opening the mold to receive the solidified plastic. In one particular embodiment, the mould includes channels for circulating a cooling liquid to facilitate cooling of the molten plastic.

In one embodiment, an affector for use on a personal affector machine includes an inflatable rubber bit having embedded bearings disposed on its exterior surface. The inflatable rubber bit is configurable to rotate proximate to a material to permit the bearings to exert frictional force against the material, such as to sand the material. The inflatable rubber bit can be controllably filled with gas, such as air, to expand and contract the bit as desired. When the inflatable rubber bit is expanded it defines a relatively larger surface area; when the inflatable rubber bit is contracted it defines a relatively smaller surface area. The rubber can be any durable composition of matter cable of expanding and contracting. The bearings can be made of hard plastic or metal and can be of any size or shape; fewer or greater numbers of bearings can be disposed on the inflatable rubber bit.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A personal affector machine for affecting material, the personal affector machine comprising:
    a frame;
    a cross-member extending from the frame, the cross-member configured to translate relative to the frame;
    an affector head coupled to the cross-member, the affector head configured to translate relative to the frame, the affector head having an affector;
    a cassette configured to removably secure the material therein, wherein the cassette comprises a cassette frame defining a cassette cavity, wherein the cassette is removably attachable to the frame; and
    a vacuum system articulably coupled to the affector head and configured to move in concert with the affector head to remove debris,
    wherein the affector is configured to affect the material secured therein the cassette in a plurality of dimensions.

2. The personal affector machine of claim 1, wherein the frame comprises a top frame and a bottom frame, wherein the top frame defines a perimeter and wherein the cross-member extends between opposing sides of the top frame.

3. The personal affector machine of claim 2, wherein the bottom frame defines a cavity and a cassette opening and wherein the cassette is configured to removably attach to the bottom frame by being inserted within the cavity through the cassette opening.

4. The personal affector machine of claim 3, further comprising:
    a cross-member motor configured to controllably move the cross-member relative to the top frame; and
    an affector head motor configured to controllably move the affector head relative to the top frame.

5. The personal affector machine of claim 4, wherein the bottom frame is any of hingedly and slidably coupled to the top frame.

6. The personal affector machine of claim 1, wherein any of electrical power, data, water, air, metal, ink, and suction are provided to the affector head through the vacuum system.

7. The personal affector machine of claim 1, wherein the cassette further comprises at least one clamp disposed against the cassette frame, the at least one clamp configured to removably secure the material within the cassette cavity.

8. The personal affector machine of claim 5, wherein the cassette cavity is accessible from opposing sides of the cassette and wherein the cassette is flipably insertable through the cassette opening of the bottom frame.

9. The personal affector machine of claim 1, wherein the cassette further comprises:
    an axle rotatably coupled to the cassette frame; and
    a material receiving surface rotatably coupled to the axle, wherein the material is removably secured to the material receiving surface and rotated about an axle axis defined by the axle and a material receiving surface axis defined by the material receiving surface.

10. The personal affector machine of claim 9, further comprising:
    an axle motor configured to controllably rotate the axle; and
    a material receiving surface motor configured to controllably rotate the material receiving surface.

11. A personal affector machine for affecting material, the personal affector machine comprising:
    a frame for supporting an affector head, wherein the frame defines a cassette opening;
    a cassette comprising at least one clamp configured to removably secure the material within a cavity defined therein the cassette, wherein the cassette is insertable through the cassette opening;
    a means for translating the affector head relative to the frame; and
    a means for removing debris resulting from the affector head affecting the material,
    wherein the affector head is configurable to affect the material in a plurality of dimensions.

12. A method for affecting material, the method comprising the steps of:
    providing a personal affector machine comprising:
        a frame;
        a cross-member extending from the frame, the cross-member configured to translate relative to the frame;
        an affector head coupled to the cross-member, the affector head configured to translate relative to the frame, the affector head having an affector; and
        a cassette configured to removably secure the material therein, the cassette being removably attachable to the frame;
    securing the material therein the cassette;
    attaching the cassette to the personal affector machine through a cassette opening defined in the frame;
    removing portions of the material with the affector head; and
    providing a vacuum system articulably coupled to the affector head and configured to move in concert with the affector head to remove debris.

13. The method of claim 12, wherein the frame defines a cavity and wherein the cassette is configured to removably attach to the frame by being inserted within the cavity through the cassette opening.

14. The method of claim 13 further comprising the steps of:
providing a cross-member motor configured to controllably move the cross-member relative to the frame; and
providing an affector head motor configured to controllably move the affector head relative to the frame.

15. The method of claim 14, wherein the frame comprises a top frame and a bottom frame, and wherein the bottom frame is any of hingedly and slidably coupled to the top frame.

16. The method of claim 12, wherein the step of affecting the material with the affector head comprises affecting a first side of the material with the affector head, removing the cassette from the personal affector machine, flipping the cassette, attaching the cassette to the personal affector machine through the cassette opening and affecting a second side of the material that is opposed to the first side.

17. A personal affector machine for affecting material, the personal affector machine comprising:
a frame;
a cross-member extending from the frame, the cross-member configured to translate relative to the frame;
an affector head coupled to the cross-member, the affector head configured to translate relative to the frame, the affector head having an affector;
a cassette configured to removably secure the material therein, wherein the cassette comprises:
a cassette frame defining a cassette cavity, and wherein the cassette is removably attachable to the frame;
an axle rotatably coupled to the cassette frame; and
a material receiving surface rotatably coupled to the axle,
wherein the material is removably secured to the material receiving surface and rotated about an axle axis defined by the axle and a material receiving surface axis defined by the material receiving surface,
wherein the affector is configured to affect the material secured therein the cassette in a plurality of dimensions.

18. The personal affector machine of claim 17, wherein the frame comprises a top frame and a bottom frame, wherein the top frame defines a perimeter and wherein the cross-member extends between opposing sides of the top frame.

19. The personal affector machine of claim 18, wherein the bottom frame defines a cavity and a cassette opening and wherein the cassette is configured to removably attach to the bottom frame by being inserted within the cavity through the cassette opening.

20. The personal affector machine of claim 19, further comprising:
a cross-member motor configured to controllably move the cross-member relative to the top frame; and
an affector head motor configured to controllably move the affector head relative to the top frame.

21. The personal affector machine of claim 20, wherein the bottom frame is any of hingedly and slidably coupled to the top frame.

22. The personal affector machine of claim 19, wherein the cassette cavity is accessible from opposing sides of the cassette and wherein the cassette is flipably insertable through the cassette opening of the bottom frame.

23. The personal affector machine of claim 17, wherein any of electrical power, data, water, air, metal, ink, and suction are provided to the affector head through the vacuum system.

24. The personal affector machine of claim 17, wherein the cassette further comprises at least one clamp disposed against the cassette frame, the at least one clamp configured to removably secure the material within the cassette cavity.

25. The personal affector machine of claim 17, further comprising:
an axle motor configured to controllably rotate the axle; and
a material receiving surface motor configured to controllably rotate the material receiving surface.

* * * * *